United States Patent [19]
Okamoto et al.

[11] Patent Number: 5,805,678
[45] Date of Patent: Sep. 8, 1998

[54] CORDLESS SUBUNIT FACSIMILE SYSTEM

[75] Inventors: Teiji Okamoto, Fujisawa; Seiji Tanaka, Katsuta; Shinya Imanishi; Toru Tanaka, both of Fujisawa; Tetsuo Shinagawa, Odawara; Yumiko Watanabe, Tokyo, all of Japan

[73] Assignee: Hitachi, Ltd., Tokyo, Japan

[21] Appl. No.: 138,119

[22] Filed: Oct. 20, 1993

[30] Foreign Application Priority Data

| Oct. 21, 1992 | [JP] | Japan | 4-282728 |
| Jun. 17, 1993 | [JP] | Japan | 5-146373 |
| Jul. 23, 1993 | [JP] | Japan | 5-182368 |

[51] Int. Cl.⁶ .................................................. H04M 11/00
[52] U.S. Cl. ...................... 379/100.01; 358/442; 455/462
[58] Field of Search ................................. 379/100, 61, 62, 379/63, 60, 59, 58, 110, 100.01, 100.02, 100.12, 100.15, 100.16, 100.17; 358/400, 442, 468; 455/462, 463, 464, 465, 556, 557

[56] References Cited

U.S. PATENT DOCUMENTS

| 4,868,865 | 9/1989 | Ogawa et al. . | |
| 4,881,129 | 11/1989 | Mitsuhashi | 379/100 |
| 4,930,149 | 5/1990 | Matsushima | 379/61 |
| 4,956,876 | 9/1990 | Koshiishi | 379/100 |
| 4,974,253 | 11/1990 | Hashimoto | 379/97 |
| 5,020,094 | 5/1991 | Rash et al. | 379/61 |
| 5,146,489 | 9/1992 | Telibasa | 379/102 |
| 5,200,991 | 4/1993 | Motoyanagi | 379/100 |
| 5,353,329 | 10/1994 | Hayashi | 379/100 |
| 5,426,511 | 6/1995 | Nagatomo | 379/100 |
| 5,479,485 | 12/1995 | Hayashi | 379/100 |

FOREIGN PATENT DOCUMENTS

| 0 373 921 A3 | 6/1990 | European Pat. Off. . | |
| 0 455 987 A2 | 11/1991 | European Pat. Off. . | |
| 0457556 | 2/1992 | Japan | H04M 11/00 |
| 0400964 | 4/1992 | Japan | H04N 1/00 |
| A-04-115762 | 4/1992 | Japan . | |
| 0429458 | 5/1992 | Japan | H04M 11/00 |
| 4150657 | 5/1992 | Japan | H04N 1/00 |
| 5160948 | 10/1993 | Japan | H04N 1/00 |

*Primary Examiner*—Stella Woo
*Attorney, Agent, or Firm*—Antonelli, Terry, Stout & Kraus, LLP

[57] ABSTRACT

A facsimile system with the body thereof usable as a subunit of a cordless telephone is disclosed. A parent unit is connected to the telephone line. A facsimile subunit is connected by radio to the parent unit. A telephone subunit is also connected by radio to the parent unit. A circuit included in the parent unit detects a signal indicating that the other party is in facsimile transmission mode. When a call signal is detected from the telephone line, the parent unit connects the line. When a CNG signal is detected, on the other hand, the parent unit connects the facsimile subunit by radio. In the case where a CNG signal is not detected, the parent unit starts the ring-up tone on the telephone subunit. An AGC circuit and a voice mute circuit are included in the parent unit.

14 Claims, 65 Drawing Sheets

FAX PRIORITY SYSTEM

PHONE PRIORITY SYSTEM

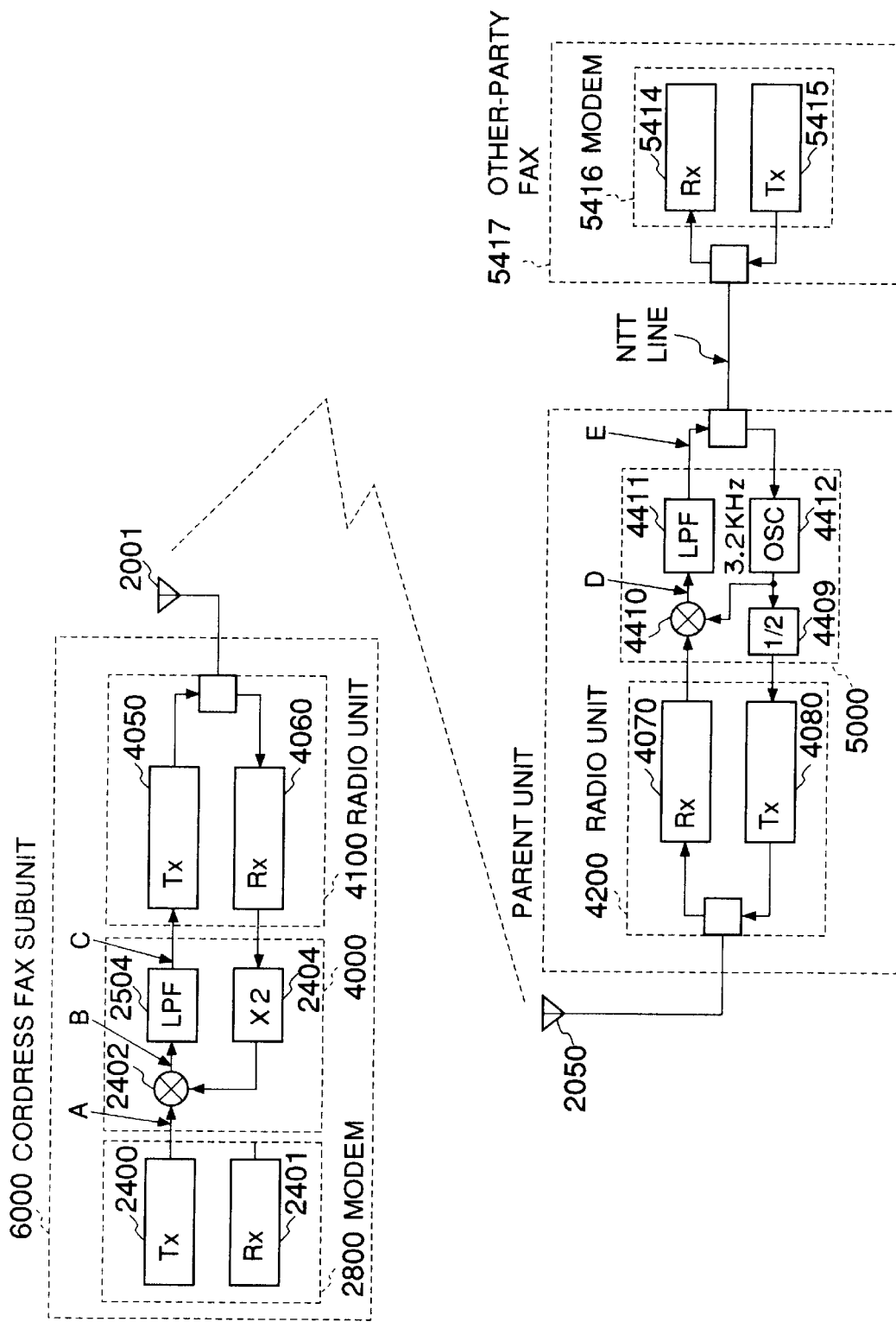

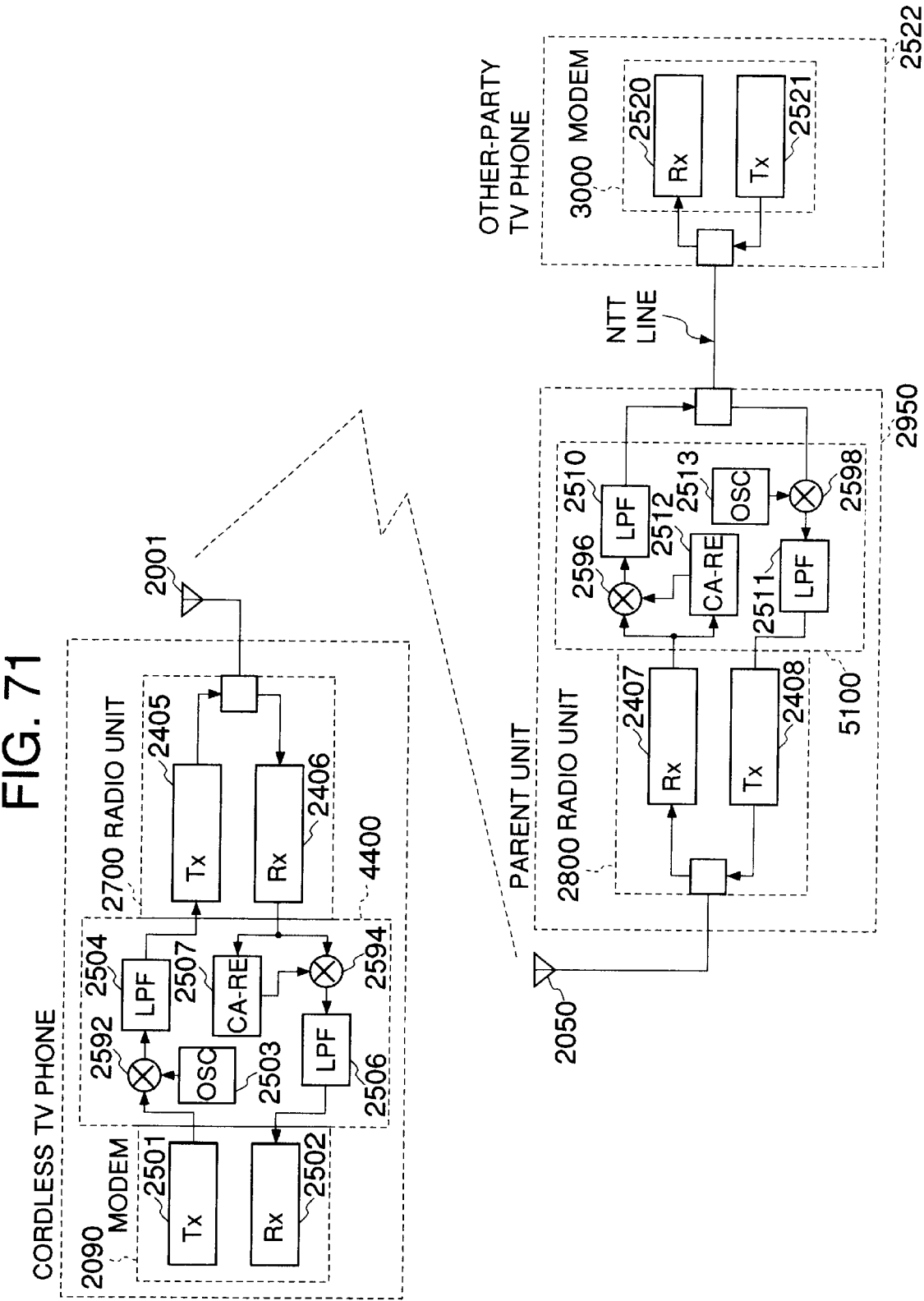

CORDLESS SUBUNIT FACSIMILE SYSTEM

BACKGROUND OF THE INVENTION

The present invention relates to a facsimile system, or more in particular to a cordless subunit facsimile system made up of a parent unit connected to the telephone line and a facsimile subunit for transmitting and receiving the facsimile signal with the parent unit by radio communication.

Facsimile system, which are transmission system by which video information including documents and figures can be transmitted to and received from remote areas by the use of the public telephone line, are widely used. In conventional ordinary facsimile systems, the facsimile system proper is required to be installed near to a terminal of the telephone line and the place of installation is thus limited.

On the other hand, cordless telephone have come into widespread use as telephone systems. A cordless telephone includes a parent unit and a subunit. The parent unit, which is connected to a telephone line terminal, is limited in the place of installation near to the telephone channel terminal as in the conventional telephone. The subunit, on the other hand, is connected by radio with the parent unit, and therefore can be used at any place within the range covered by electric wave from the parent unit.

A facsimile system was suggested, which is connected by radio with a parent unit with its own facsimile system as a subunit, thereby making the facsimile system proper usable at a place far away from a telephone line terminal. In the case where a facsimile system is operated as a subunit, it is not necessary to install the system in proximity to a telephone line terminal unlike the other conventional systems, and the facsimile transmission or receiving is made possible at any place covered by the electric wave from the parent unit.

A configuration in which the facsimile system proper is used as a cordless subunit is disclosed in JP-A-4-57556, JP-A-4-115762 and JP-A-4-150657, for example.

SUMMARY OF THE INVENTION

According to the prior art described above, in which the facsimile system proper is constructed as a subunit connected by radio with the parent unit, as far as the parent unit is installed near a telephone line terminal, facsimile transmission and receiving is possible anywhere within the range covered by the electric wave from the parent unit. It is therefore not necessary to install the facsimile system proper in proximity to a telephone line terminal unlike other conventional systems.

A facsimile system, when used in a business enterprise or an office, is often connected to the telephone line exclusive to the facsimile transmission. For home use or applications at small offices, however, the facsimile often shares a telephone line for speech with the telephone. When a telephone call arrives, i.e., when a call signal sent from the line is detected, however, it is immediately unknown whether the signal is intended for speech or facsimile transmission. If a single telephone line is to be shared by the telephone intended for speech and the facsimile, therefore, what is called the telephone-facsimile automatic switching function is required. The facsimile system transmits a signal indicating the facsimile transmission called the CNG (calling tone) signal. The conventional facsimile system includes a device for detecting the CNG signal. When a telephone call arrives, this device detects the CNG signal after line connection. If the CNG signal is actually detected, the line is switched for receiving the facsimile transmission.

In the above-mentioned conventional configuration, the facsimile system proper is constructed as a cordless subunit radio-connected with the parent unit. In the case where the parent unit is connected with a telephone subunit by radio, i.e., where a call has arrived and is received by the telephone subunit into the speech mode, however, the facsimile system proper cannot monitor the line condition, being unable to detect the CNG signal. The resulting problem is that the automatic switching between telephone and facsimile using the CNG signal is impossible.

Also, the conventional system, which fails to take into consideration the deteriorated signal quality peculiar to the radio communication, may develop frequent communication errors. This leads to the problem of a reduced communication speed and a lengthened communication time.

The object of the present invention is to obviate the above-mentioned problems by providing a cordless facsimile system comprising a telephone subunit connected with a parent unit by radio and a facsimile subunit connected also with the parent unit by radio, wherein the automatic switching between telephone and facsimile is made possible as required when a single telephone line is shared by speech and facsimile transmission without sacrificing the quality of radio communication.

According to the present invention, there is provided a cordless subunit facsimile system comprising a parent unit connected to a telephone line, a telephone subunit connected with the parent unit by radio and a facsimile subunit also connected with the parent unit by radio, wherein the parent unit includes call signal detection means for detecting the call signal of the line, CNG signal detection means for detecting the CNG signal indicating a facsimile transmission from the other party after line connection, and voice response generating means for sending out a voice response to the line. In the case where the call signal detection means detects a call signal from the telephone line, the parent unit connects the telephone line, the voice response means sends out a voice response to the telephone line and the CNG detection means detects whether the CNG signal is sent from the other party. In the event that the CNG signal is detected, the parent unit connects the facsimile subunit by radio for facsimile communication. If the CNG signal is not detected, on the other hand, the parent unit connects the telephone subunit by radio and starts the ring-up tone for the telephone subunit, while at the same time continuing to detect the CNG signal. When the CNG signal is thus detected, the radio connection with the telephone subunit is cut off, and at the same time the facsimile subunit is connected by radio for facsimile communication. In the case where the telephone subunit is not hooked off after a predetermined number of ring-up tones of the telephone subunit, the radio connection between the parent unit and the telephone subunit is cut off, while the facsimile subunit is connected by radio to proceed to facsimile communication. Further, after the telephone subunit is hooked off into the speech mode while the ring-up tone of the telephone subunit is sounding, the parent unit may detect the CNG signal. In the case where the CNG signal is thus detected during conversation, the radio connection with the telephone subunit is suspended and the radio connection with the facsimile subunit is established for performing the facsimile communication.

The above-mentioned object is achieved by inserting automatic level adjusting means in the signal route from the line connection means to the radio communication means of the parent unit and also by providing signal cut-off means for preventing the radio received signal of the radio communication means of the parent unit from mixing with the radio transmitted signal at the time of facsimile receiving operation.

In the case where the call signal detection means of the parent unit detects a call signal from the telephone line and thus a telephone call is detected, the parent unit sets the telephone line in connection. At this time point, the subunit is not called by the parent unit, and therefore no ring-up tone of the telephone subunit sounds. After connecting the telephone line, the parent unit sends a voice response to the telephone line by the voice response means. The voice response is such as to transmit to the other party the signal indicating that the other party should either proceed with the facsimile transmitting operation, or if speech is intended, should wait a little until called. As a result, in the case where the other party is a manually-operated facsimile system, the facsimile transmission is started immediately. After sending out the voice response, the parent unit continues to detect the CNG signal. If the other party is operating a facsimile system for automatic transmission, the CNG signal is detected at this time point. Also, in the case of manual transmission where the facsimile transmission is started by a facsimile system which sends out the CNG signal at the same time and where the other party performs the operation for facsimile transmission in accordance with the above-mentioned voice response, the CNG signal is detected at that timing. Upon detection of the CNG signal, the parent unit connects the facsimile subunit by radio while at the same time starting the facsimile receiving. In the case where the CNG signal is not detected, on the other hand, the parent unit connects the telephone subunit by radio and sounds a ring-up tone of the telephone subunit. When the telephone subunit goes off hook in response to the ring-up tone, the speech mode is entered. Even in the case where the other party starts the facsimile transmission while the ring-up tone of the telephone subunit is sounding or after the telephone subunit enters the speech mode, the line is switched to facsimile receiving as the parent unit is detecting the CNG signal. Also, in the case where the telephone subunit fails to go off hook while the ring-up tone of the telephone subunit is sounding, by contrast, the parent unit starts the facsimile receiving operation by connecting the facsimile subunit by radio after radio disconnection with the telephone subunit, and therefore the facsimile receiving is possible even in the case where the other party is doing the facsimile transmission with a facsimile system which sends no CNG signal.

Further, the automatic level adjusting means and the signal cut-off means of the parent unit permit radio transmission to the subunit at optimum level and high signal-to-noise ratio in the facsimile receiving operation, thereby minimizing the signal quality deterioration due to radio communication.

BRIEF DESCRIPTION OF THE DRAWINGS

FIG. 67 is a block diagram showing a baseband processing section according to the seventh embodiment.

FIG. 71 is a block diagram showing a baseband processing section according to the eighth embodiment.

DESCRIPTION OF THE PREFERRED EMBODIMENTS

Preferred embodiments of the invention will be described below with reference to the accompanying drawings.

Figure 1A:
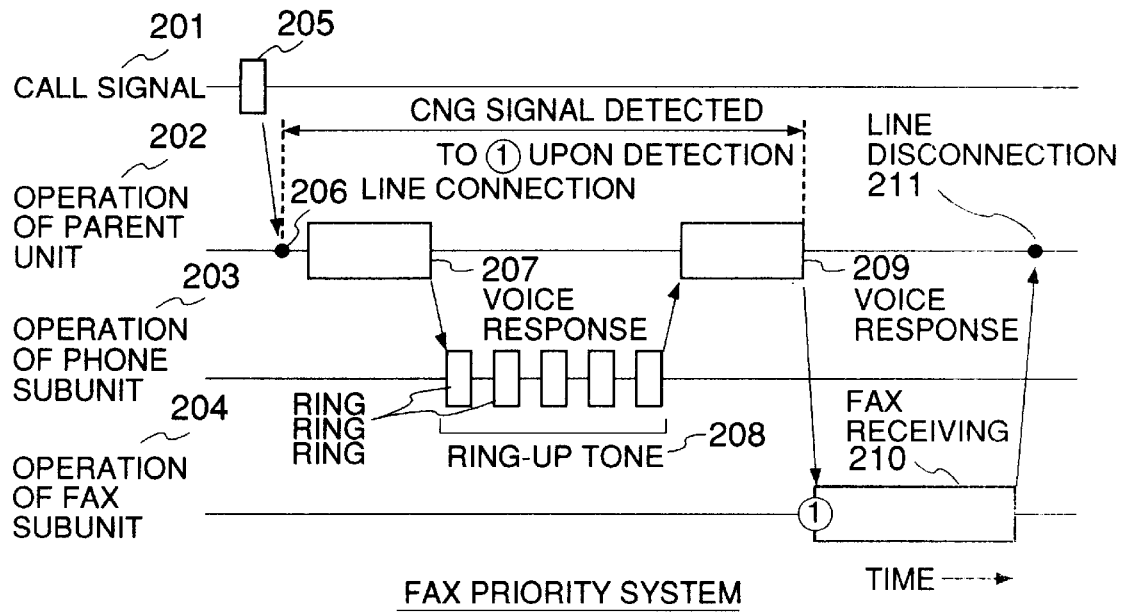
FIGS. 1A, 1B are diagrams for explaining the general operation of a facsimile system according to the present invention.
Figure 1B:
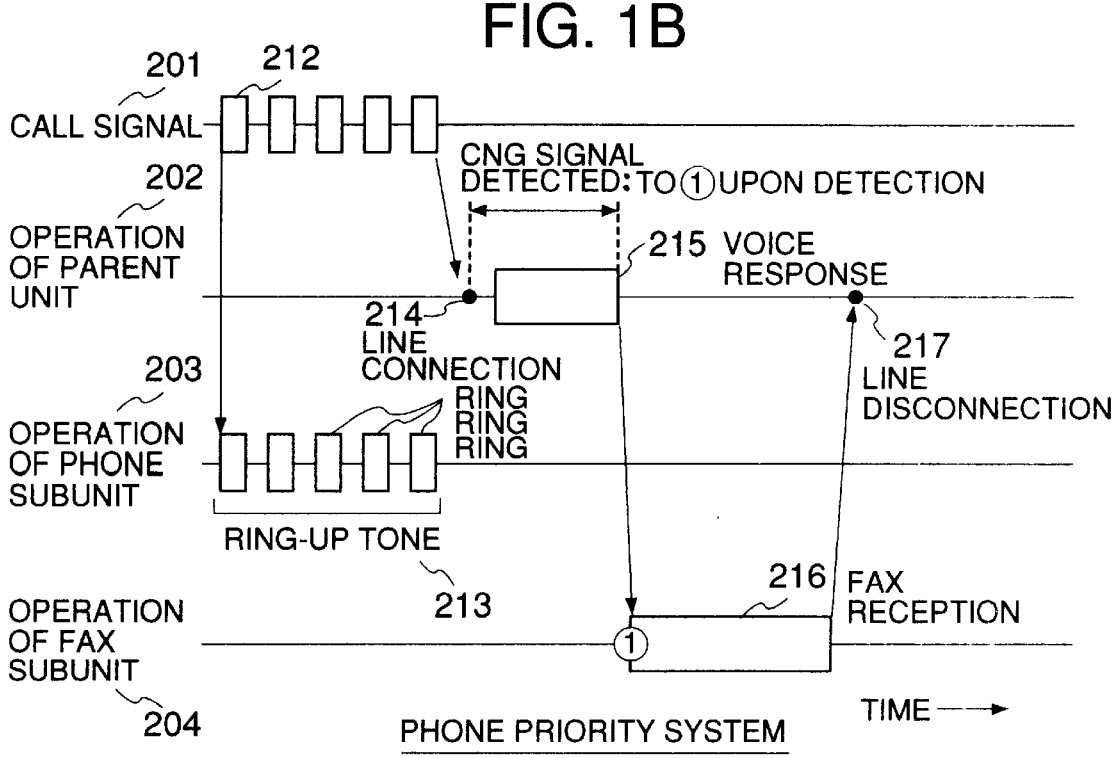

FIGS. 1A, 1B are diagrams showing an outline of the operation of the facsimile system with a facsimile system control means according to the invention. In the facsimile system according to this embodiment, two methods are offered for selection, the telephone priority system and the facsimile priority system, in automatic switching between telephone and facsimile operation. The telephone priority system is an automatic switching system between telephone and facsimile modes suited to the case frequented by speech, and the facsimile priority system is the one suitable to the case where many calls are for facsimile communications.

The operation for automatic switching between telephone and facsimile of the facsimile priority system will be explained with reference to FIG. 1A. In FIG. 1A, numeral 201 designates a call signal sent to the telephone line connected with a parent unit, numeral 202 the operation of the parent unit, numeral 203 the operation of a telephone subunit connected by radio with the parent unit, and numeral 204 the operation of a facsimile subunit connected by radio with the parent unit. Assume that a telephone call has arrived with the automatic switching operation between telephone and facsimile modes in the facsimile priority system. The parent unit connects the telephone line upon detection of the first call signal 205 (step 206). Then the parent unit sends a voice response 207 to the telephone line. This voice response says, for example, "The person wanting facsimile transmission send message directly. The person wanting telephone message wait until our call." The parent unit, after the accomplishing of the line connection 206, gives a voice response while starting to detect whether or not the CNG signal is sent from the telephone line. Upon complete sending of the voice response 207, the parent unit connects the telephone subunit by radio and sounds the ring-up tone of the telephone subunit (step 208). In the case where the telephone subunit is not hooked off after a predetermined number of ring-up tones of the telephone subunit, the parent unit sends a voice response again to the telephone line (step 209). This voice response is intended to inform the other party that the other party did not answer the call and that the line is switched to facsimile transmission. The detection of the CNG signal started at the time of line connection is continued until the end of the voice response at 209. After the voice response 209, the parent unit connects the facsimile subunit by radio to accomplish the facsimile receiving operation 210. After the facsimile receiving operation 210 at the facsimile subunit, the parent unit disconnects the line at 211. As described above, the detection of the CNG signal is continued by the parent unit from the line connection 206 to the voice response 209. In the case where the CNG signal is not detected, on the other hand, the control is transferred to the facsimile receiving mode 210 by the facsimile subunit.

The operation for automatic switching between telephone and facsimile for the telephone priority system using a facsimile control system according to the present invention will be explained with reference to FIG. 1B. In the telephone priority system, when a telephone call arrives, the parent unit connects the telephone subunit by radio and sounds the telephone ring-up tone 13 of the telephone subunit in synchronism with the call signal 212 sent from the telephone line. In the case where the telephone subunit is not hooked off after the sounding of the ring-up tone of the telephone subunit a predetermined number of times, the parent unit stops sounding the ring-up tone of the telephone subunit, while at the same time connecting the telephone line (step 214). After that, the parent unit sends out the voice response 215 to the telephone line. This response is intended to inform the other party that the telephone cannot be answered for the moment and the line will be switched to facsimile. Upon completion of the sending of voice response 215, the parent unit connects the facsimile subunit by radio to carry out the facsimile receiving operation 216. When the facsimile receiving operation 216 by the facsimile subunit ends, the parent unit disconnects the line at 217. While sending out the voice response 215 to the telephone line, the parent unit detects whether the CNG signal is sent or not from the other party, and if the CNG signal is not detected, transfers the control to the facsimile receiving operation 216 by the facsimile subunit.

Figure 2:
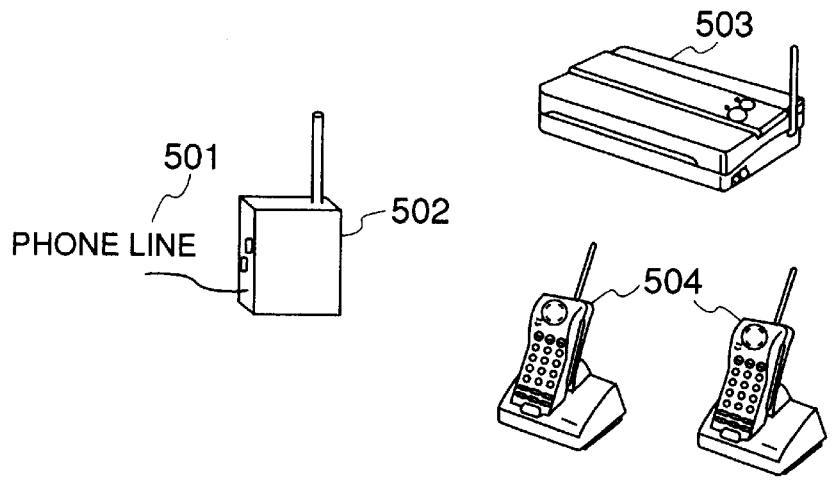
FIG. 2 is a perspective view showing an equipment configuration of a facsimile system according to a first embodiment of the invention.
Figure 3:
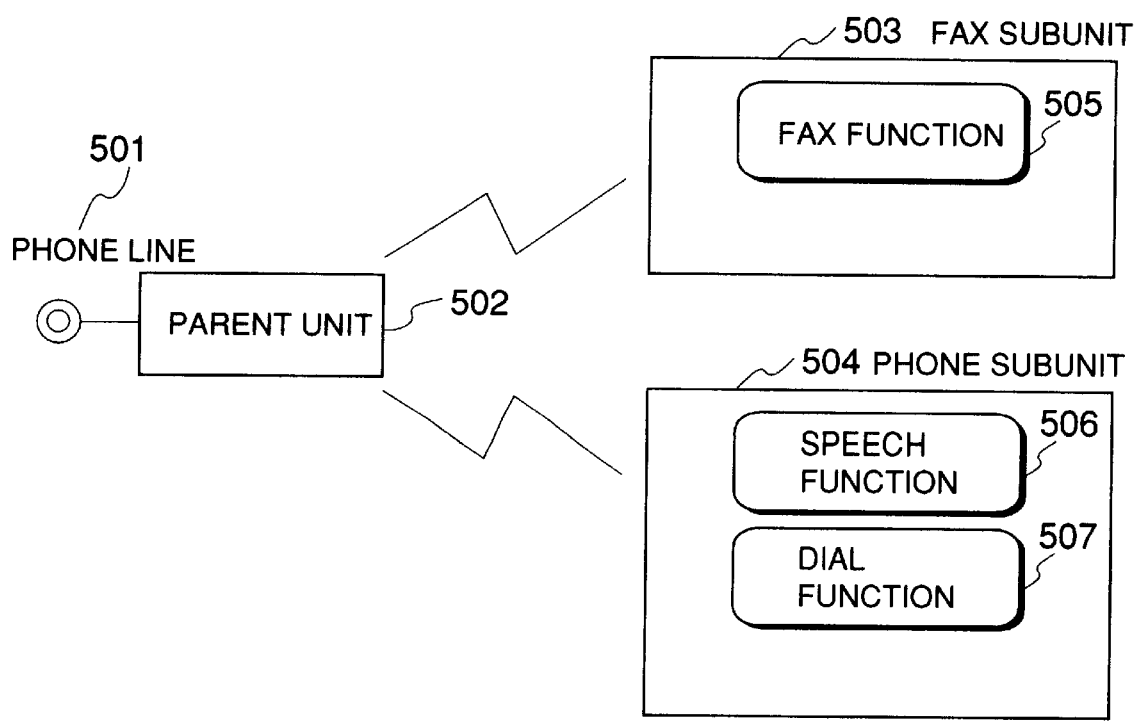
FIG. 3 is a block diagram showing a functional configuration of the devices shown in FIG. 2.

FIG. 2 shows an equipment configuration of a facsimile system to which the facsimile system control method according to the invention is applied. Numeral 502 designates a parent unit connected to the telephone line 501. Numeral 503 designates a facsimile subunit connected with the parent unit 502 by radio. Numeral 504 designates a telephone subunit, which is connected with the parent unit 502 by radio like the facsimile subunit 503. FIG. 3 shows a functional configuration of the various devices shown in FIG. 2. The facsimile subunit 503 includes a facsimile function 505. Also, the telephone subunit 504 includes a speech function 506 and a dial function 507 for calling the other party over the telephone line.

Now, a configuration of the devices shown in FIGS. 2 and 3 will be explained with reference to FIG. 4 and subsequent drawings.

Figure 4:
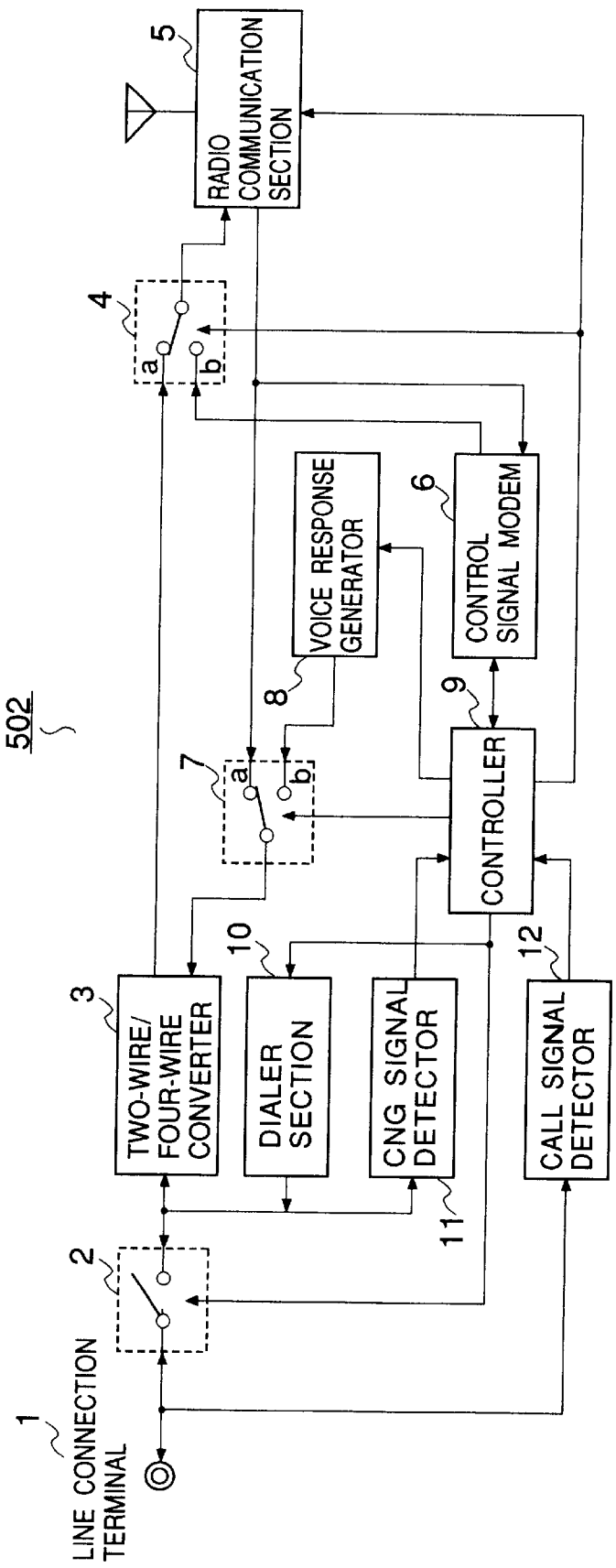
FIG. 4 is a block diagram showing an internal configuration of a parent unit 502 shown in FIG. 2.

A configuration of the parent unit 502 is shown in FIG. 4. An office line connection terminal 1 is for connecting the parent unit 502 to the telephone line. Numeral 2 designates a line connection relay, which may be turned on to connect the parent unit 502 to the telephone line. Numeral 12 designates a call signal detector for detecting the call signal sent to the telephone line. A dialer section 10 is for sending out a dial signal to the telephone line in calling the other party by telephone. A CNG signal detector 11 is for detecting the CNG signal sent from the telephone line. Numeral 3 designates a two-wire/4-wire converter normally including a hybrid transformer or the like. Numeral 8 designates a voice response generating section for sending out a voice response to the telephone line. Numeral 5 designates a radio communication section for effecting radio communication with the facsimile subunit 503 and the telephone subunit 504. Numeral 6 designates a control signal modem section for modulating and demodulating the control signal in the radio communication with the facsimile subunit 503 and the telephone subunit 504. Numeral 4 designates a radio transmission change-over switch which, when connected to side a, applies the signal arriving from the telephone line through the two-wire/four-wire converter 3 and when connected to side b, applies the signal output at the control signal modem section 6, to the radio communication section 5, respectively. Numeral 7 designates a line transmission change-over switch, which when connected to side a, applies the signal received at the radio communication section 5, and when connected to side b, applies the output signal of the voice generator 8, to the two-wire/four-wire converter 3, respectively. Numeral 9 designates a controller for controlling the blocks described above thereby to control the operation of the parent unit 502.

Figure 5:
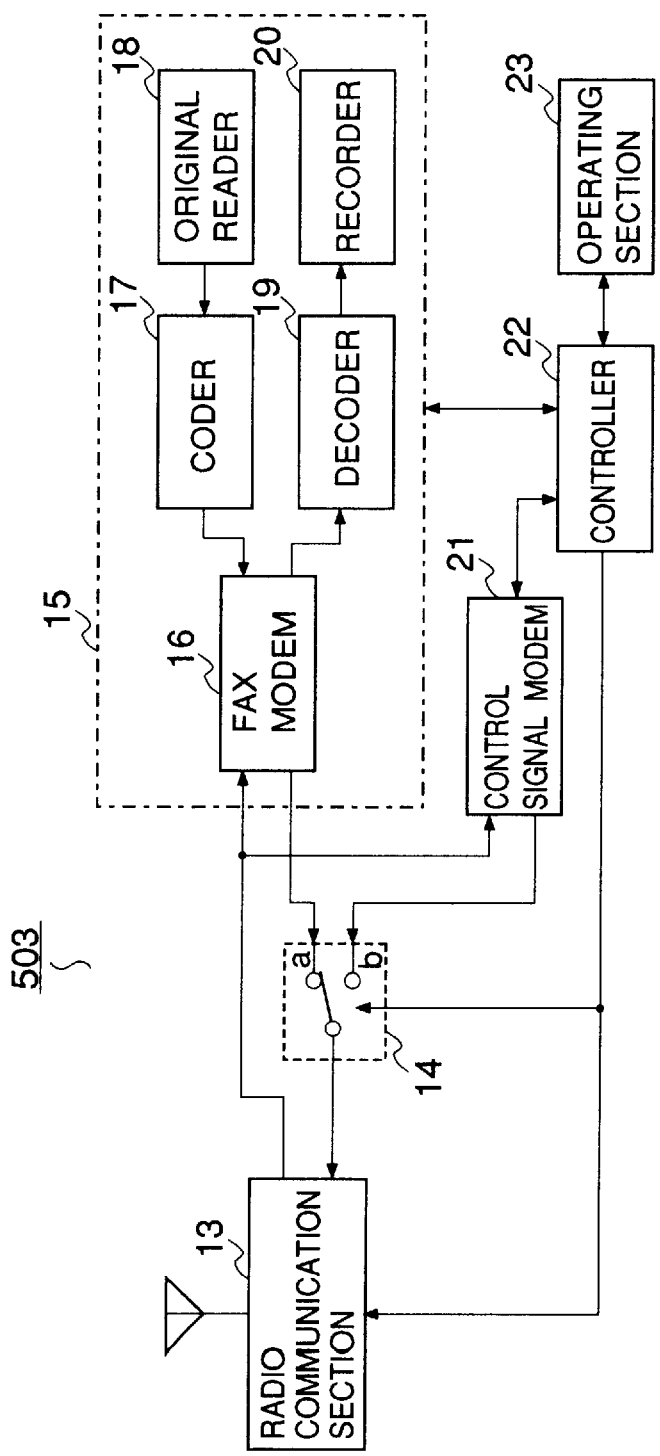
FIG. 5 is a block diagram showing an internal configuration of a facsimile subunit 503 shown in FIG. 2.

Now, the configuration of the facsimile subunit 503 will be described with reference to FIG. 5. The radio communication section 13 is for carrying out radio communication with the radio communication section 5 of the parent unit 502. Numeral 15 designates a facsimile signal processor including a FAX modem section 16, an encoder 17, a decoder 19, an original reader 18 and a recorder 20. When the facsimile information is received, the signal transmitted from the parent unit 502 and received by the radio communication section 13 is demodulated by the FAX modem 16, decoded as image information by the decoder 19 and produced as an output from the recorder 20. Normally, the recorder 20 includes a thermal printer or the like for printing the image information on the thermal paper. In facsimile transmission, the original information is read as image information by the original reader 18, encoded by the encoder 17, modulated by the FAX modem 16, and sent to the parent unit 502 by the radio communication section 13. Numeral 21 designates a control signal modem for modulating and demodulating the control signal for radio communication. Numeral 14 designates a radio transmission change-over switch, which when connected to side a, applies the signal output at the FAX modem 16, and when connected to side b, applies the signal output at the control signal modem 21, to the radio communication section 13, respectively. Numeral 23 is an operating section including an operating unit, a display unit, etc. required for operating the facsimile subunit 503. The configuration of the operating section 23 will be described in detail later. Numeral 22 designates a control section for controlling the operation of the facsimile subunit 503 by controlling each block described above.

Figure 6:
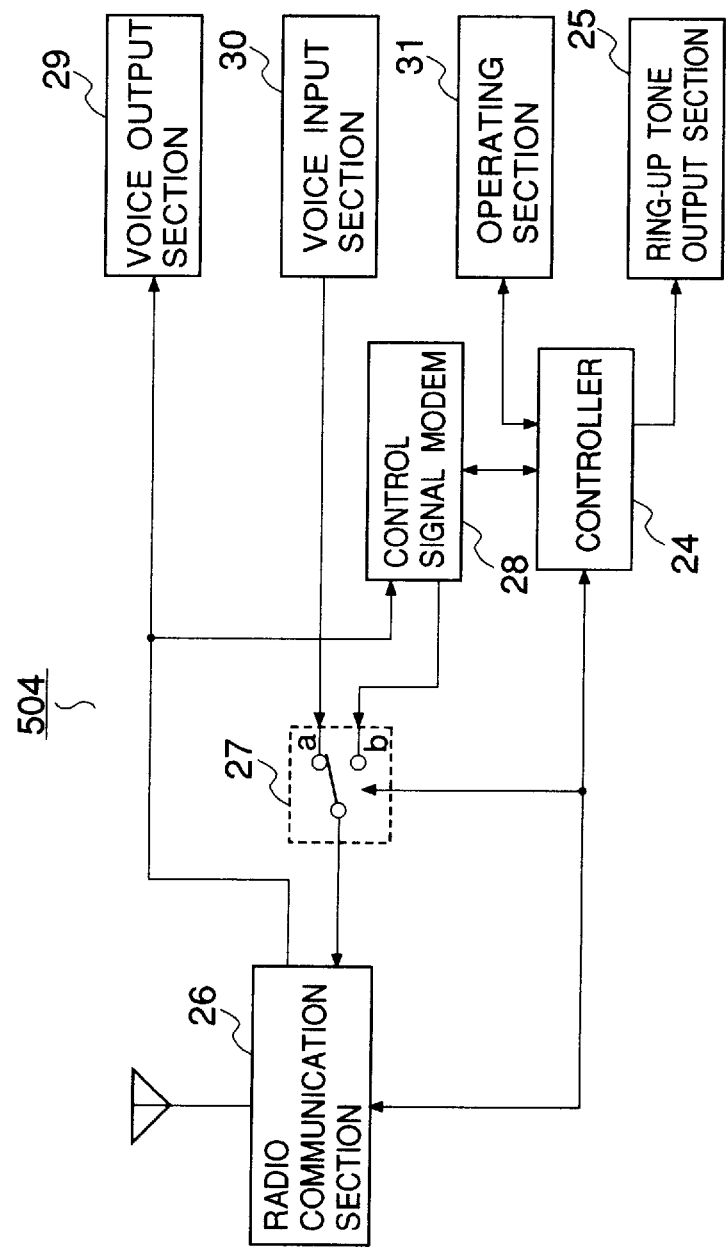
FIG. 6 is a block diagram showing an internal configuration of a telephone subunit 504 shown in FIG. 2.

Now, explanation will be made about a configuration of the telephone subunit 504 with reference to FIG. 6. The radio communication section 26 is for effecting radio communication with the radio communication section 5 of the parent unit 502. Numeral 29 designates a voice output section, and numeral 30 a voice input section for voice output and input in speech mode. Normally, the voice output by the voice output section 29 is produced through the speaker and the voice input at the voice input section is applied through the microphone. Numeral 28 designates a control signal modem for modulating and demodulating the control signal for radio communication with the parent unit 502. Numeral 27 designates a radio transmission change-over switch, which when connected to side a, applies the signal output at the voice input section 30, and when connected to side b, applies the output signal at the control signal modem 28, respectively, to the radio communication section 26. Numeral 25 designates a ring-up tone output section for sounding the ring-up tone for telephone. Numeral 31 designates an operation section including operating buttons required for operating the telephone subunit 504 and dial buttons for dialling the telephone number of the other party in telephone communication. The configuration of the operating section 31 will be described later. Numeral 24 designates a controller for controlling the operation of the telephone subunit 504 by controlling each of the blocks described above.

Figure 7:
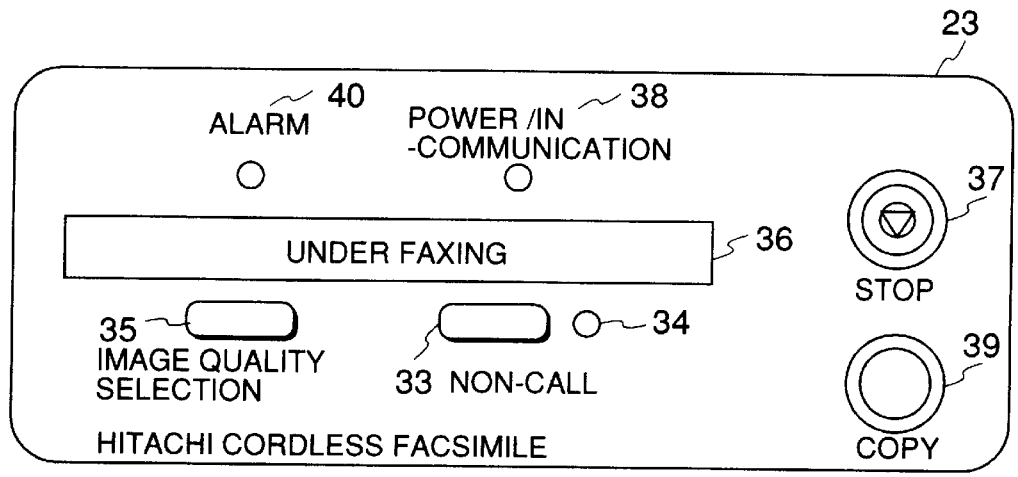
FIG. 7 is a diagram for explaining the configuration of an operating section 23 of the facsimile subunit 503 in FIG. 5.

FIG. 7 shows a configuration of the operating section 23 of the facsimile subunit 503. The operating section 23 includes a liquid crystal display unit 36 for displaying the operating condition, the telephone number and the method of operation of the facsimile subunit 503, a stop button 37 for instructing the facsimile subunit 503 to stop the operation, a copy button 39 for giving an instruction on starting the copying operation, an alarm lamp 40 for giving a warning on an abnormal condition which may occur in the operation of the facsimile subunit 503, a power/in-communication lamp 38 for notifying that power is switched on for the facsimile subunit 503 and that the facsimile communication is proceeding, an image quality selection button 35 for selecting the image quality of the original to be transmitted by facsimile or to be copied, a non-call button 33 for selecting the method of telephone/facsimile automatic switching between telephone priority system and facsimile priority system, and a non-call lamp 34 for indicating that the facsimile priority system is selected as the method of telephone/facsimile automatic switching. According to this embodiment, as described above, the facsimile/telephone automatic switching function is used by the operator who selects either the telephone priority system or the facsimile priority system as desired. In the case where the telephone priority system is selected, the non-call lamp 34 is off. Assuming that the non-call button 33 is depressed under this condition, the facsimile priority system is selected as the method of telephone/facsimile automatic switching, with the non-call lamp 34 turned on. The control flow in this setting will be explained later.

A copy button 39 is used for taking a copy using the facsimile subunit 503. The copying function, which is not directly related to the present invention, will be described only briefly. When the user of the facsimile subunit 503 performs the copying work, the original to be copied is placed in an original reader 18 of the facsimile subunit 503 and the COPY button 39 is depressed. Upon depression of the COPY button 39, the controller 22 of the facsimile subunit 503 sends the image information on the original read from the original reader 18 directly to the recorder 20, which in turn produces it as an output.

In facsimile transmission or the above-mentioned copying work, the image quality of the original is selected by the image quality selection button 35. The method of selecting the image quality according to the present embodiment will be explained. When the original is set in the original reader 18, the controller 22 of the facsimile subunit 503 indicates a normally-used image quality such as "NORMAL" on the liquid display unit 36. In the case where the user of the facsimile subunit 503 desires to use the image quality other than NORMAL, the image quality selection button 35 is depressed. Each time the image quality selection button 35 is depressed, the display on the liquid crystal display unit 36 changes to FINE to SUPER to HALFTONE. Another depression returns the display to NORMAL. The combination of NORMAL, FINE, SUPER and HALFTONE is only an example of image quality choice available.

The non-call button 33 is for selecting the method of telephone/facsimile automatic switching. The flow of operation with the non-call button 33 depressed will be explained. When the non-call button 33 of the operating section 23 is depressed, the controller 22 of the facsimile subunit 503 controls the radio communication section 13 to establish radio connection with the parent unit 502. In this case, the radio transmission change-over switch 14 of the facsimile subunit 503 is connected to side b, so that the control signal required for radio connection with the parent unit 502 is modulated by the control signal modem 21 and sent to the radio communication section 13. After radio connection is established, the controller 22 of the facsimile subunit 503 transmits a control signal to the parent unit 502 indicating that the non-call button 33 has been depressed, i.e., that the method of telephone/facsimile automatic change-over switching is turned over. As to the parent unit 502, these signals transmitted from the facsimile subunit 503 are received at the radio communication section 5, demodulated at the control signal modem 6 and sent to the controller 9 of the parent unit 502. The controller 9 of the parent unit 502 holds the information as to which method of telephone/facsimile automatic switching, telephone priority system or facsimile priority system, is valid at present. When the control signal indicating the depression of the non-call button 33 is received from the facsimile subunit 503, the set information is changed by the controller 9 to the facsimile priority system if the presently-set system for telephone/facsimile automatic switching is of telephone priority, and to the telephone priority system if the presently-set system for telephone/facsimile automatic switching is of facsimile priority. Further, the controller 9 modulates by the control signal modem 6 the signal indicating whether the newly-set method of telephone/facsimile automatic switching is the telephone priority system or the facsimile priority system, and applies the resultant signal to the facsimile subunit 503 by the radio communication section 5. At the same time, the radio transmission change-over switch 4 of the parent unit 502 is connected to side b. In the facsimile subunit 503, the information sent by the parent unit 502 is received at the radio communication section 13, demodulated at the control signal modem 6, and sent to the controller 22 of the facsimile subunit 503. In the case where the newly-set method of telephone/facsimile automatic switching is of telephone priority, the non-call lamp 34 of the operating section 23 is turned off, and turned on when facsimile transmission is the priority. In this way, according to this embodiment, the telephone priority system or the facsimile priority system is selectable as a method of telephone/facsimile automatic switching. Which of the systems is to be selected can be set by operating the facsimile subunit 503. The information on which of the two priority systems is employed is held in the parent unit 502.

Figure 8:
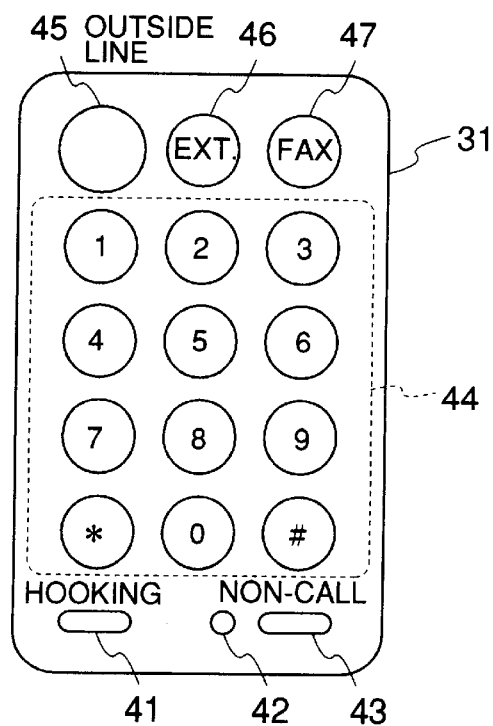
FIG. 8 is a diagram for explaining the configuration of an operating section 31 of the telephone subunit 504 in FIG. 6.

A configuration of the operating section 31 of the telephone subunit 504 is shown in FIG. 8. The operating section 31 of the telephone subunit 504 includes a line wire button 45, an extension button 46, a fax button 47, a dial button 44, a hooking button 41, a non-call button 43 and a non-call lamp 42. The line wire button 45 is depressed when making a telephone call on the telephone line and has a line wire lamp built therein. The extension button 46, on the other hand, is operated for calling another telephone subunit in the case where there are a plurality of telephone subunits 504, and has an extension lamp built therein. The fax button 47 is for instructing the facsimile subunit 503 to start the operation. The dial button 44 is for dialling a telephone number, and the hooking button 41 is for designating the hooking operation during conversation. The non-call button 43 and the non-call lamp 42 have the same functions as the non-call button 33 and the non-call lamp 34 of the facsimile subunit 503. The operation resulting from the depression of the non-call button 43 is identical to that resulting from the depression of the non-call button 3 of the facsimile subunit 503 described above.

Figure 9:
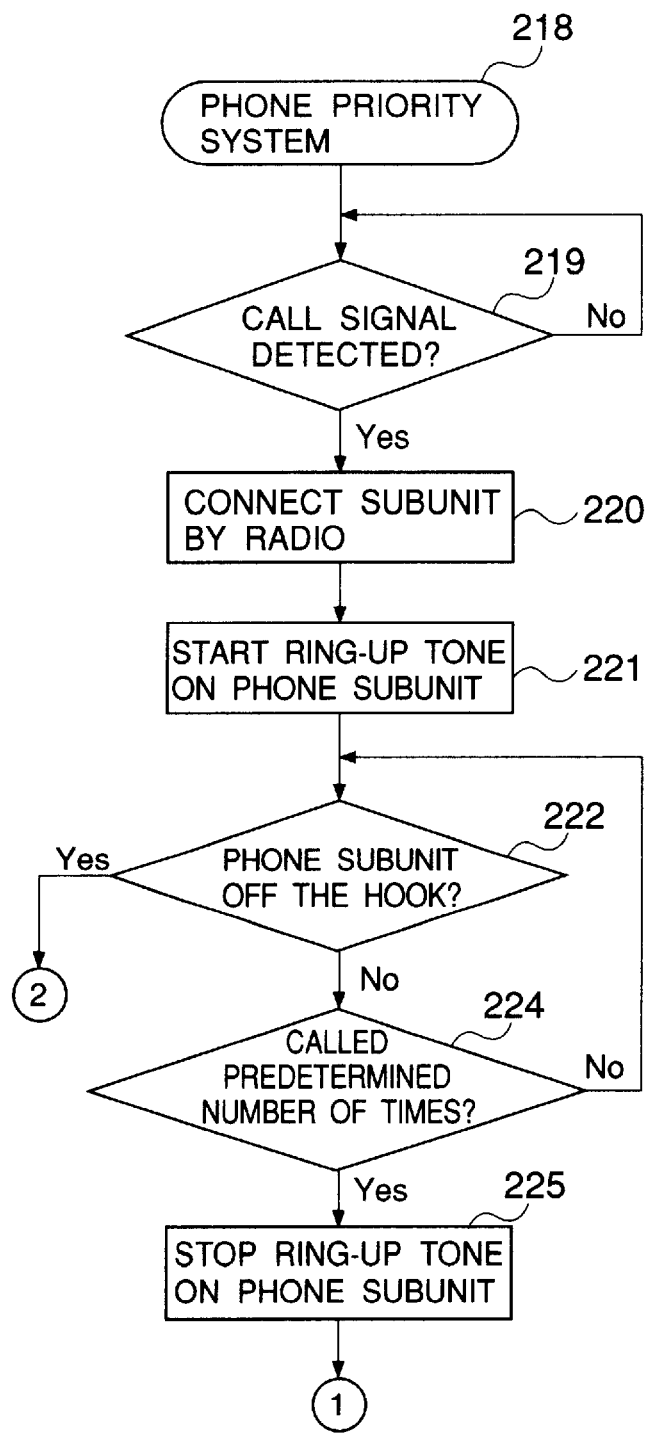
FIG. 9 is a flowchart showing a part of the operation flow in the telephone priority system according to a first embodiment.
Figure 10:
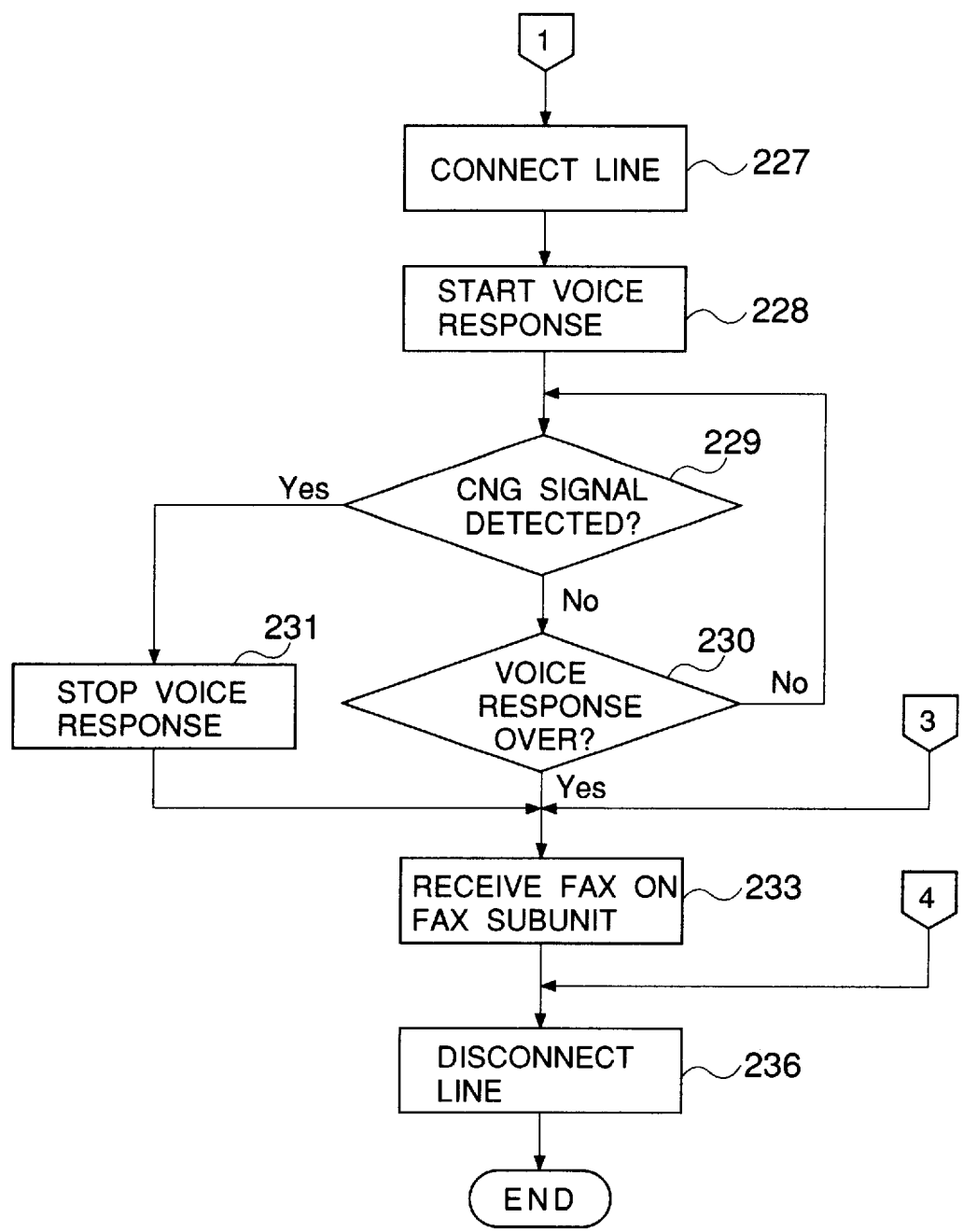
FIG. 10 is a flowchart showing another part of the operation flow in the telephone priority system according to the first embodiment.
Figure 11:
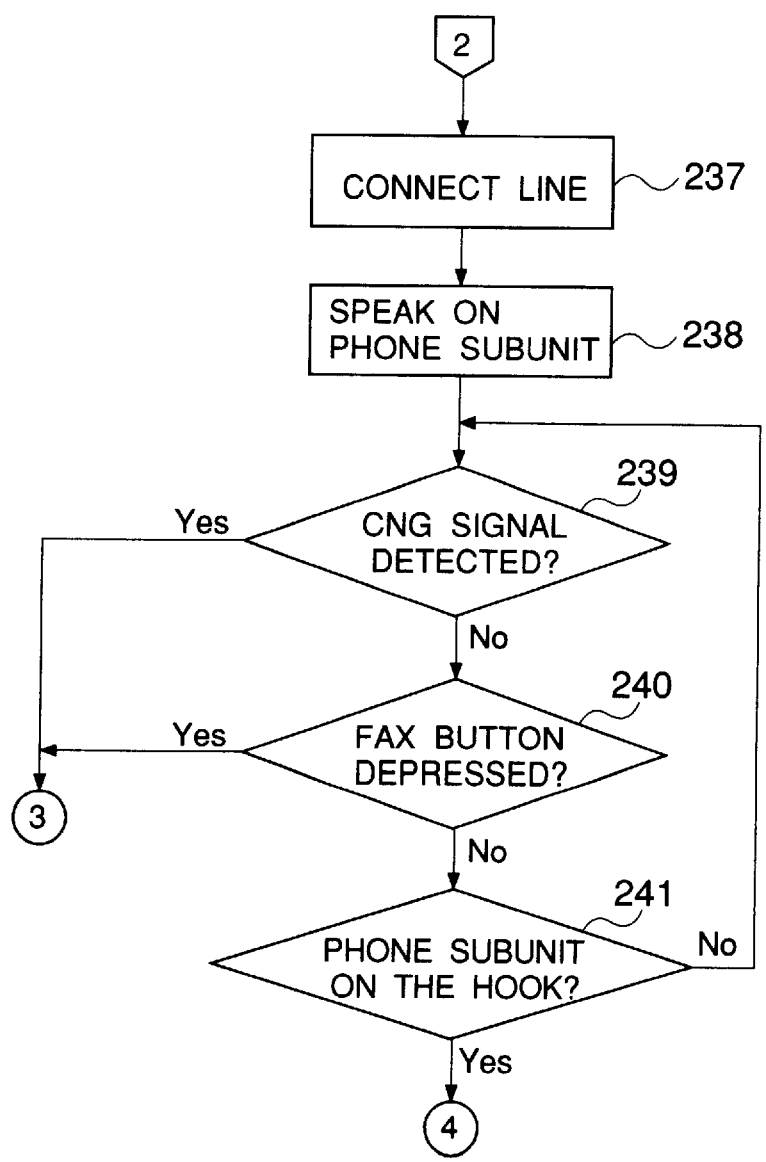
FIG. 11 is a flowchart showing still another part of the operation flow in the telephone priority system according to the first embodiment.

Now, the operation of telephone/facsimile automatic switching will be explained with reference to the case in which the telephone priority system is selected as the method of telephone/facsimile automatic switching, i.e., where the non-call lamp 42 of the telephone subunit 504 and the non-call lamp 34 of the facsimile subunit 503 are turned off. FIGS. 9, 10 and 11 show the general flow of operation covering the facsimile subunit 503, the telephone subunit 504 and the parent unit 502. FIGS. 12, 13, 14 and 15 show the flow of operation for radio communication between the parent unit 502, the facsimile subunit 503 and the telephone subunit 504. The radio communication between the parent unit 502 and the facsimile subunit 503 or the telephone subunit 504 assumes the same system as a well-known radio communication by the cordless telephone using a control channel and a speech channel. The very nature of radio communication will therefore be not described herein.

Figure 12:
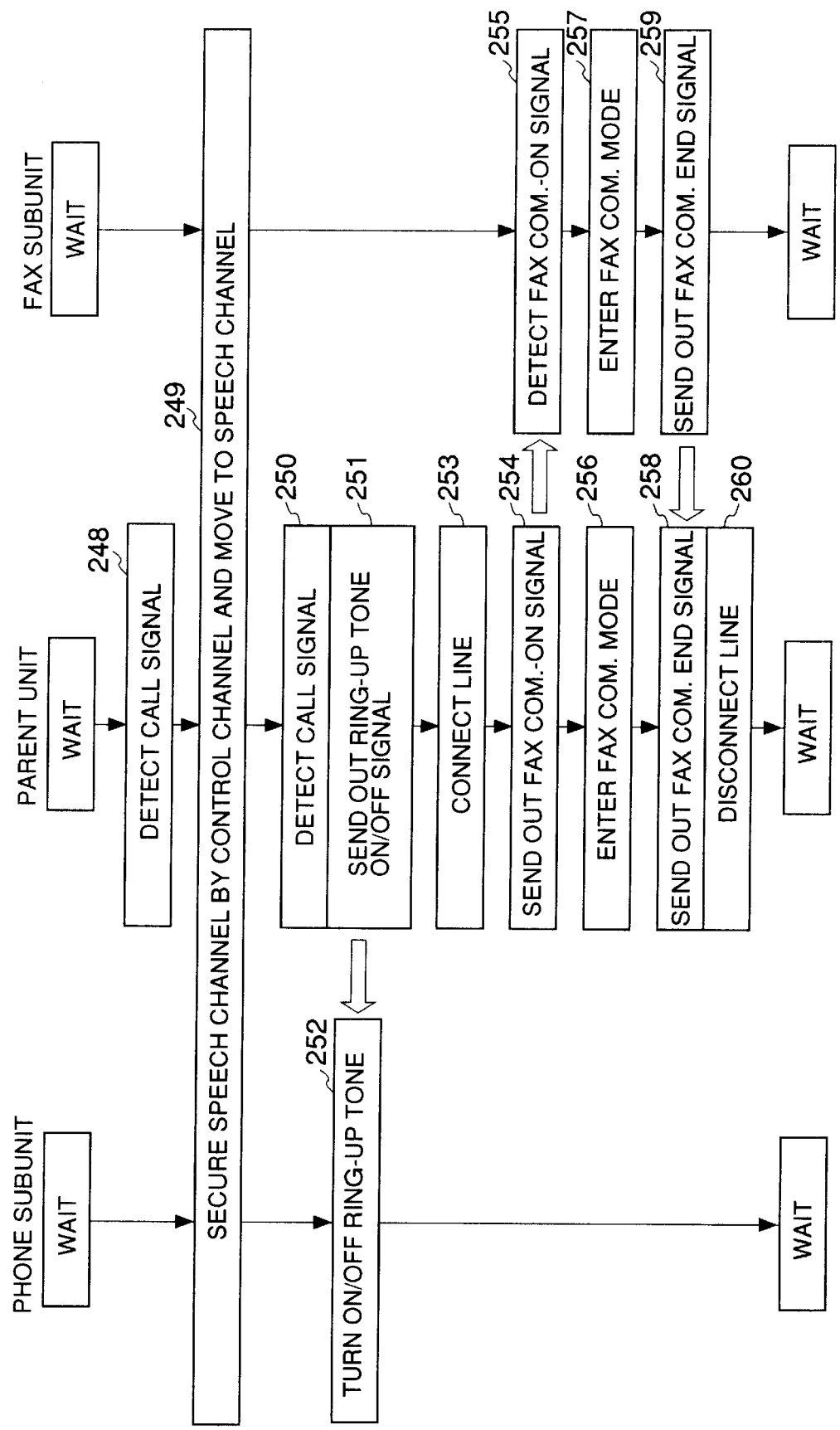
FIG. 12 is a flowchart showing the operation flow for radio communication in the telephone priority system according to the first embodiment.

As shown in the telephone priority system 218 of FIG. 9, the controller 9 of the parent unit 502 detects whether the call signal is sent from the telephone line by the call signal detector 12 in a waiting mode (step 219). In the case where the call signal detector 12 detects that a call signal is sent from the telephone line, the controller 9 connects the telephone subunit 504 and the facsimile subunit 503 by radio (step 220). The flow of operation for radio communication will be explained with reference to FIG. 12. As shown in FIG. 12, assuming that a call signal is detected (step 248) at the parent unit 502, a speech channel is secured by the control channel and the process is moved to the speech channel (step 249).

The flow of operation at step 249 will be explained with reference to FIGS. 4, 5 and 6.

The parent unit 502 confirms that the control channel is not busy by the radio communication section 5. Upon this confirmation, a signal designating the radio communication is sent to the telephone subunit 504 and the facsimile subunit 503 by use of the control channel. In the process, the controller 9 connects the radio transmission change-over switch 4 to side b, and at the same time controls the control signal modem 6 to send a signal designating the radio communication (hereinafter called "the connection designating signal") to the radio communication section 5. The connection designating signal is sent together with the data on speech channel for which the radio communication section 5 of the parent unit 502 confirmed that it is not busy, immediately before the detection of the call signal at step 248. Also, the radio communication is effected by time division through the same control channel for the telephone subunit 504 and the facsimile subunit 503. In the facsimile subunit 503, the radio signal sent by the parent unit 502 is received at the radio communication section 13 and demodulated at the control signal modem 21. In the telephone subunit 504, on the other hand, the radio signal sent by the parent unit 502 is received at the radio communication section 26 and demodulated at the control signal modem 28. Upon confirmation of the fact that the connection designating signal is sent by the parent unit 502, the controller 22 of the facsimile subunit 503 and the controller 24 of the telephone subunit 504 respond to it by sending a connection confirming signal to the parent unit 502. This connection confirming signal is sent also by the control channel. More specifically, with the telephone subunit 504, the controller 24 connects the radio transmission change-over switch 27 to side b, controls the control signal modem 28, and sends the connection confirming signal to the radio communication section 26. With the facsimile subunit 503, on the other hand, the controller 2 connects the radio transmission change-over switch 14 to side b, controls the control signal modem 21 and sends the connection confirming signal to the radio communication section 13. The telephone subunit 504 and the facsimile subunit 503, after sending the connection confirming signal to the parent unit 502, transfer to the speech channel. In the process, the speech channel is selected by the data of the channel through which the parent unit 502 sent the connection confirming signal. Also, the parent unit 502, upon receipt of the connection confirming signal sent from the facsimile subunit 503 or the telephone subunit 504, i.e., upon detection of the connection confirming signal by the control signal modem 6 from the signal received at the radio communication section 5, transfers to the speech channel. After transfer to the speech channel, the telephone subunit 504 and the facsimile subunit 503 confirm the unoccupied (not busy) state of the speech channel. Upon confirmation of the unoccupied state of the speech channel, a speech channel transfer end signal is sent to the parent unit 502 from the speech channel. The signal flow for this operation is the same as that for sending the connection confirming signal at the control channel. The parent unit 502, like when receiving the connection confirming signal through the control channel, receives a speech channel transfer end signal sent by the controller 9 from the telephone subunit 504 and the facsimile subunit 503. As a result, the transfer of the parent unit 502, the facsimile subunit 503 and the telephone subunit 504 to the speech channel is completed.

Upon complete radio connection between the parent unit 502 with the facsimile subunit 503 or the telephone unit 504 at step 220 in FIG. 9, the parent unit 502 starts the ring-up tone on the telephone subunit 504 (step 221). The parent unit 502 continues to sound the ring-up tone on the telephone subunit 504 while checking to see whether the telephone subunit 504 has been placed off the hook (step 222) and whether the telephone ring-up tone has been sounded a predetermined number of times on the telephone subunit 504 (step 224). The associated flow of operation for radio communication will be explained with reference to FIG. 12. As shown in FIG. 12, the ring-up tone on the telephone subunit 504 sounds in such a manner that the call signal sent from the telephone line is detected (step 250), while sending a signal from the parent unit 502 instructing the telephone subunit 504 to sound the ring-up tone in synchronism with the turning on/off of the call signal (ring-up tone-on signal) and a signal instructing the sounding ring-up tone to be stopped (ring-up tone-off signal) (step 251). In the process, when the telephone subunit 504 receives the ring-up tone-on signal, the ring-up tone begins to be sounded, and upon receipt of the ring-up tone-off signal, the sounding telephone ring-up tone is stopped (step 252). As long as the telephone ring-up tone on the telephone subunit 504 continues sounding, the facsimile subunit 503 suspends radio communication with the parent unit 502 but waits while holding the speech channel. The process to be taken upon detection that the telephone subunit 504 is placed off the hook at step 222 will be described later.

The flow of processing for the sounding of the telephone ring-up tone at steps 250 to 252 will be explained with reference to FIGS. 4, 5 and 6. The parent unit 502 detects the call signal sent from the telephone line by the call signal detector 12. The call signal continues to be detected at step 219 in FIG. 9 after detection of the call signal. The controller 9 connects the radio transmission change-over switch 4 to side b, and in accordance with the turning on/off of the call signal detected by the call signal detector 12, controls the control signal modem 6 and sends out the ring-up tone-on signal and the ring-up tone-off signal to the radio communication section 5. With the telephone subunit 504, the signal received by the radio communication section 26 is demodulated by the control signal modem 28. In the case where the control signal modem 28 detects that the ring-up tone-on signal and the ring-up tone-off signal are sent from the parent unit 502, the controller 24 controls the ring-up tone output section 25 and starts the telephone ring-up tone. More specifically, in the case where the ring-up tone-off signal is detected, the ring-up tone output of the ring-up tone output section 25 is turned on, while when the ring-up tone-off signal is detected, the ring-up tone output of the ring-up tone output section 25 is turned off.

Explanation will be made about the processing executed when the telephone subunit 504 fails to be placed off the hook even after the ring-up tone of the telephone subunit 504 is sounded a predetermined number of times at step 224 of FIG. 9. In this case, the sounding of the ring-up tone of the telephone subunit 504 is stopped (step 225) first. As described above, the ring-up tone of the telephone subunit 504 is sounded by the parent unit 502 transmitting the ring-up tone-on signal and the ring-up tone-off signal alternately to the telephone subunit 504 in synchronism with the ring-up tone sent from the telephone line. In the case where the ring-up tone of the telephone subunit 504 is to be stopped, therefore, the ring-up tone-on signal and the ring-up tone-off signal are prevented from being transmitted subsequently to the transmission of the ring-up tone-off signal. After the sounding of the ring-up tone on the telephone subunit 504 has stopped, the parent unit 502 connects the telephone line (step 27 in FIG. 10 and step 253 in FIG. 12). More specifically, in FIG. 4, the controller 9 turns off a line connection relay 2. As a result, the telephone line connected to the line wire connection terminal 1 is connected with the two-wire/four-wire converter 3, thereby connecting the parent unit 502 to the telephone line. After that, the controller 9 connects the line transmission change-over switch 7 to side b, and starts sending a voice response through the voice generator 8 (step 228). The contents of the voice response thus sent are, for example, "I am away from home now. Please call again later. Just proceed with fax transmission." or the like, thereby informing the other party that facsimile transmission is possible although answering the phone is impossible. The controller 9 continues to detect whether the CNG signal has been sent from the other party through the CNG signal detector 11 until the voice response is completely sent by the voice response generator 8 (step 230). In the case where step 229 detects that the CNG signal has been sent from the other party through the CNG signal detector 11 at step 229, the controller 9 stops the sending out of the voice response by the voice response generator 8 (step 231 in FIG. 10), and transfers the control to the facsimile receiving operation by the facsimile subunit 503. Also, in the event that the CNG signal could not be detected by the CNG signal detector 11 before complete transmission of the voice response by the voice response generator 8, the control is similarly transferred to the facsimile receiving by the facsimile subunit 503 (step 233).

The flow of communication operation for facsimile receiving by the facsimile subunit 503 at step 233 in FIG. 10 will be explained with reference to FIG. 12. The controller 9 of the parent unit 502 connects the radio transmission change-over switch 4 to side b, and sends out the fax communication-on signal to the facsimile subunit 503 through the control signal modem 6 (step 254). The communication-on signal, like the ring-up tone-on signal and the ring-up tone-off signal to the telephone subunit 504 described above, is transmitted by utilizing the speech channel. The controller 9 of the parent unit 502, after transmitting the fax communication-on signal, connects the radio transmission change-over switch 4 to side a, and further the line transmission change-over switch 7 to side a, thereby introducing the fax communication mode (step 256). Under this condition, the signal transmitted from the telephone line connected to the line wire connection terminal 1 in the parent unit 502 is sent to the radio communication section 5 through the two-wire/four-wire converter 3 and then transmitted to the facsimile subunit 503. Also, the signal transmitted by radio from the facsimile subunit 503 is received by the radio communication section 5 and sent out to the telephone line connected with the line wire connection terminal 1 through the two-wire/four-wire converter 3. In the facsimile subunit 503, on the other hand, in the case where the controller 22 detects that the fax communication signal transmitted by the parent unit 502 at step 254 is received by the control signal modem 21 (step 255), the controller 22 connects the radio transmission change-over switch 14 to side a into the fax communication mode (step 257). Under this condition, the signal transmitted by the parent unit 502 and received by the radio communication section 13 is applied to the fax modem 16, and the signal outputted from the fax modem 16 is transmitted to the parent unit 502 by the radio communication section 13. As a result, under the condition in which both the parent unit 502 and the facsimile subunit 503 are in fax communication mode, i.e., in which the parent 502 is at step 256 with the facsimile subunit 503 at step 257, the signal sent from the telephone line connected to the line wire connection terminal 1 of the parent unit 502 is sent out to the fax modem 16 of the facsimile subunit 503 by radio communication, and the signal outputted by the fax modem 16 is transmitted to the telephone line connected to the line wire connection terminal 1 of the parent unit 502 by radio communication. Under this condition, the facsimile data transmitted by the other party in speech is received. The facsimile signal sent from the other party is demodulated by the fax modem 16, decoded into the image information by the decoder 19, and outputted to the recorder 20.

Upon completion of facsimile receiving operation by the facsimile subunit 503, the facsimile subunit 503 sends the fax communication end signal to the parent unit 502 (step 259). The controller 22 of the facsimile subunit 503 connects the radio transmission change-over switch 14 to side b, produces the fax communication end signal through the control signal modem 21, and transmits the same signal to the parent unit 502 through the radio communication section 13. The controller 9 of the parent unit 502, on the other hand, upon detection that the fax communication end signal is sent from the facsimile subunit 503 through the control signal modem 6 (step 258), turns off the line connection relay 2 and cuts off the telephone line (step 236 in FIG. 10, and step 260 in FIG. 12). After that, the facsimile subunit 503, the telephone subunit 504 and the parent unit 502 enter the waiting mode.

Figure 13:
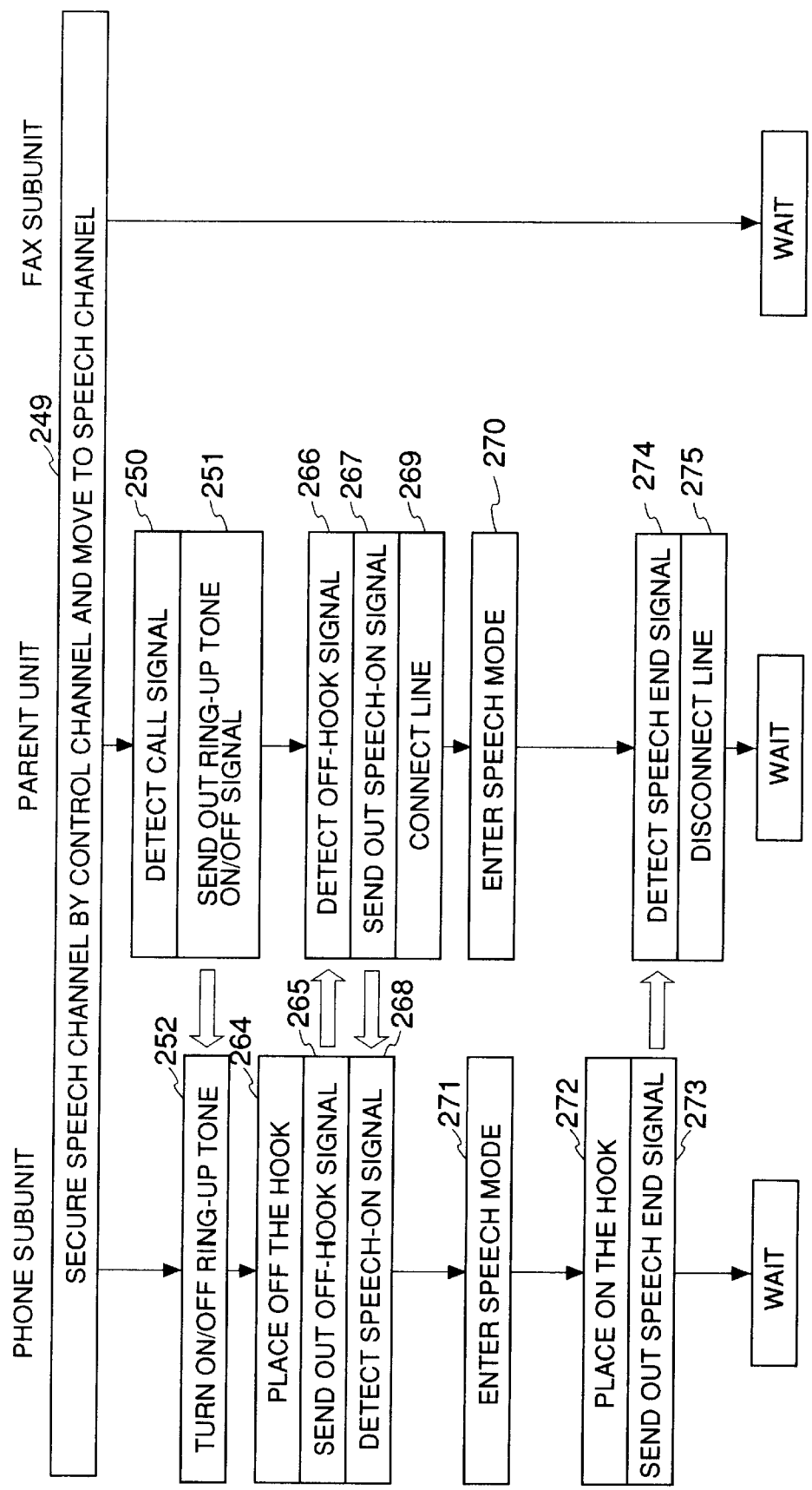
FIG. 13 is a flowchart showing the processing flow for radio communication with the telephone subunit hooked off in the telephone priority system according to the first embodiment.

Now, explanation will be made about the control operation in which step 222 detects that the telephone subunit 504 is placed off the hook. According to the present embodiment, the telephone subunit is placed off the hook against the ring-up tone on the telephone subunit 504 by depressing the line wire button 45 of the operating section 31 shown in FIG. 8. In the case where the line wire button 45 of the operating section 31 is depressed, the controller 24 of the telephone subunit 504 turns on the line wire lamp built in the line wire button 45 for indicating that the line is busy with conversation. The processing with the telephone subunit 504 placed off the hook against the ring-up tone will be explained with reference to FIG. 13. In FIG. 13, the transfer to the speech channel (step 249) and the control of the sounding of the ring-up tone on the telephone subunit (steps 250, 251, 252) are the same as that explained with reference to FIG. 12. The controller 24 of the telephone subunit 504, as described above, sends out an off-hook signal to the parent unit 502 (step 265) when the line wire button 45 of the operating section 31 is depressed, i.e., when the telephone subunit 504 is placed off the hook (step 264). In this case, the controller 24 of the telephone subunit 504 connects the radio transmission change-over switch 27 to side b, sends out the off-hook signal to the radio communication section 26 through the control signal modem 6, and transmits it further to the parent unit 502 by radio communication. The controller 9 of the parent unit 502, upon detection of the off-the-hook signal sent from the telephone subunit 504 by the control signal modem 6 (step 266), sends out a speech-on signal to the telephone subunit 504 (step 267). In the process, the controller 9 of the parent unit 502 connects the radio transmission change-over switch 4 to side b, sends out the speech-on signal to the radio communication section 5 through the control signal modem 6 for radio transmission to the telephone subunit 504. After that, the controller 9 of the parent unit 502 connects the radio transmission change-over switch 4 to side a, and the line transmission change-over switch 7 to side a, and thus connects the line by turning on the line connection relay 2 (step 269 in FIG. 13, and step 237 in FIG. 11). As a result, the parent unit 502 enters the speech mode (step 270), and the signal sent from the telephone line connected to the line wire connection terminal is transmitted through the two-wire/four-wire converter 3 to the radio communication section 5 and also to the telephone subunit 504. At the same time, the signal transmitted from the telephone subunit 504 is received by the radio communication section 5 and sent to the telephone line through the two-wire/four-wire converter 3. The controller 24 of the telephone subunit 504 that has detected the speech-on signal transmitted from the parent unit 502 (step 268), on the other hand, connects the radio transmission change-over switch 27 to side a. As a result, the telephone subunit 504 is set in speech mode (step 271), so that the signal received at the radio communication section 26 is sent to the voice output section 29. This signal is produced as a voice output on the one hand and the voice inputted by way of the voice input section 30 is transmitted by the radio communication section 26 to the parent unit 502 on the other hand. Since the parent unit 502 and the telephone subunit 504 are both set in speech mode, the speech mode is introduced by the telephone subunit 504 (step 238 in FIG. 11).

While the speech is proceeding by the telephone subunit 504, the parent unit 502 continues to detect whether the CNG signal has been sent from the other party (step 239 in FIG. 11) or whether the FAX button 47 of the telephone subunit 504 has been depressed (step 240 in FIG. 11) until the telephone subunit 504 is placed off the hook (step 241 in FIG. 11). The processing to be executed in the case where the CNG signal is detected at step 239 and where the FAX button 47 was depressed at step 240 will be explained later. For the time being, explanation will be made about the flow of operation performed in the case where the CNG signal is not detected until the telephone subunit 504 is placed off the hook with the FAX button 47 of the telephone subunit 504 not depressed, with reference to FIG. 13.

Explanation will be made about the flow of operation to be executed in the case where the telephone subunit 504 in speech mode as described above is placed off the hook, i.e., when the telephone was hung up, with reference to FIG. 13. When the telephone is hung up in the telephone subunit 504 according to the present embodiment, the line wire button 45 is depressed. As described above, when the line wire button 45 is depressed while the ring-up tone of the telephone subunit 504 is sounding, the telephone subunit 504 is placed off the hook and the line wire lamp built in the line wire button 45 is turned on. As a result, the line wire lamp built in the line wire button 45 is kept on as long as the speech is proceeding on the telephone subunit 504. Assuming that the line wire button 45 is depressed under this condition, the line wire lamp built in the line wire button 45 is turned off. In other words, upon detection of the depression of the line wire button 45 of the operating section 31 during speech (step 272), the controller 24 of the telephone subunit 504 turns off the line wire lamp built in the line wire button 45 of the operating section 31, while at the same time connecting the radio transmission change-over switch 27 to side b, thereby transmitting the speech end signal to the parent unit 502 through the control signal modem 28 (step 273). The telephone subunit 504 enters the waiting mode after transmitting the speech end signal to the parent unit 502. The controller 9 of the parent unit 502, upon detection of the speech end signal transmitted by the telephone subunit 504 through the control signal modem 6 (step 274), turns off the line connection relay 2, thereby cutting off the telephone line (step 236 in FIG. 10 and step 275 in FIG. 13). After the telephone line is cut off, the parent unit 502 enters the waiting mode.

Figure 14:
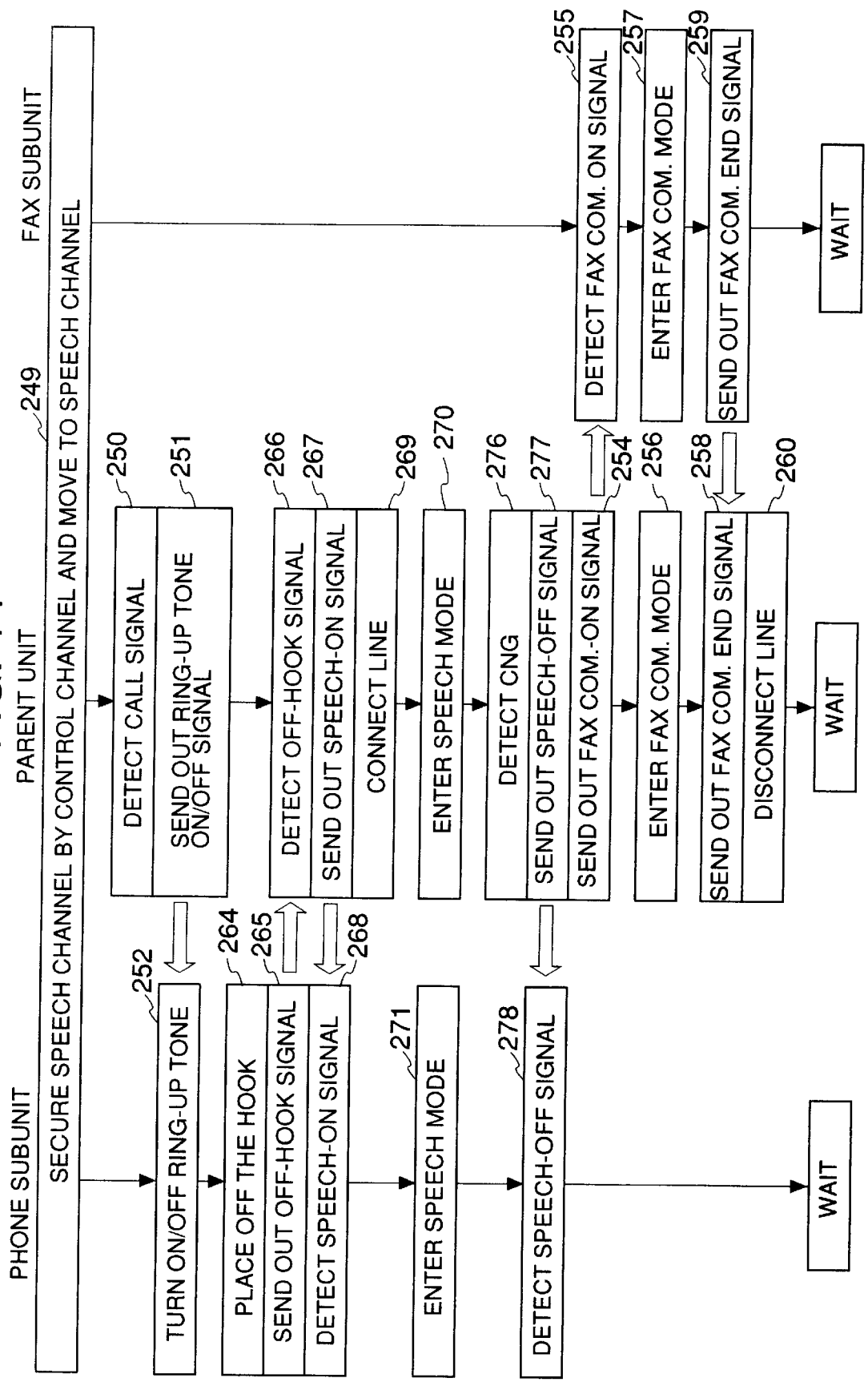
FIG. 14 is a flowchart showing the operation flow for radio communication with the CNG signal detected during conversation in the telephone priority system according to the first embodiment.

Now, explanation will be made about the flow of operation executed upon detection that the CNG signal is transmitted from the other party at step 239 in FIG. 11. FIG. 14 shows the flow of operation performed in such a case. The flow of operation executed before the telephone subunit 504 and the parent unit 502 enter the speech mode (before step 270 for the parent unit and before step 271 for the telephone subunit 504) is the same as that explained with reference to FIG. 13. In the case where the CNG signal being transmitted from the telephone line by the CNG signal detector 11 of the parent unit 502 is detected during speech on the telephone subunit 504 (step 276), a speech-off signal is sent out by the controller 24 of the telephone subunit 504 to the telephone subunit 504 in speech (step 277). More specifically, the radio transmission change-over switch 4 is connected to side b, and the speech-off signal sent out to the radio communication section 5 by the control signal modem 6. In the case where a speech-off signal is detected by the control signal modem 28 during speech (step 278), the controller 24 of the telephone subunit 504 completes the speech mode and enters the waiting mode. The parent unit 502, after sending the speech-off signal to the telephone subunit 504, applies a fax communication-on signal to the facsimile subunit 503, thereby causing the facsimile subunit 503 to perform the receiving operation (step 233 in FIG. 10). The flow of operation of the parent unit 502 and the facsimile subunit 503 at and after step 254 in FIG. 14 is the same as that explained with reference to FIG. 12.

Figure 15:
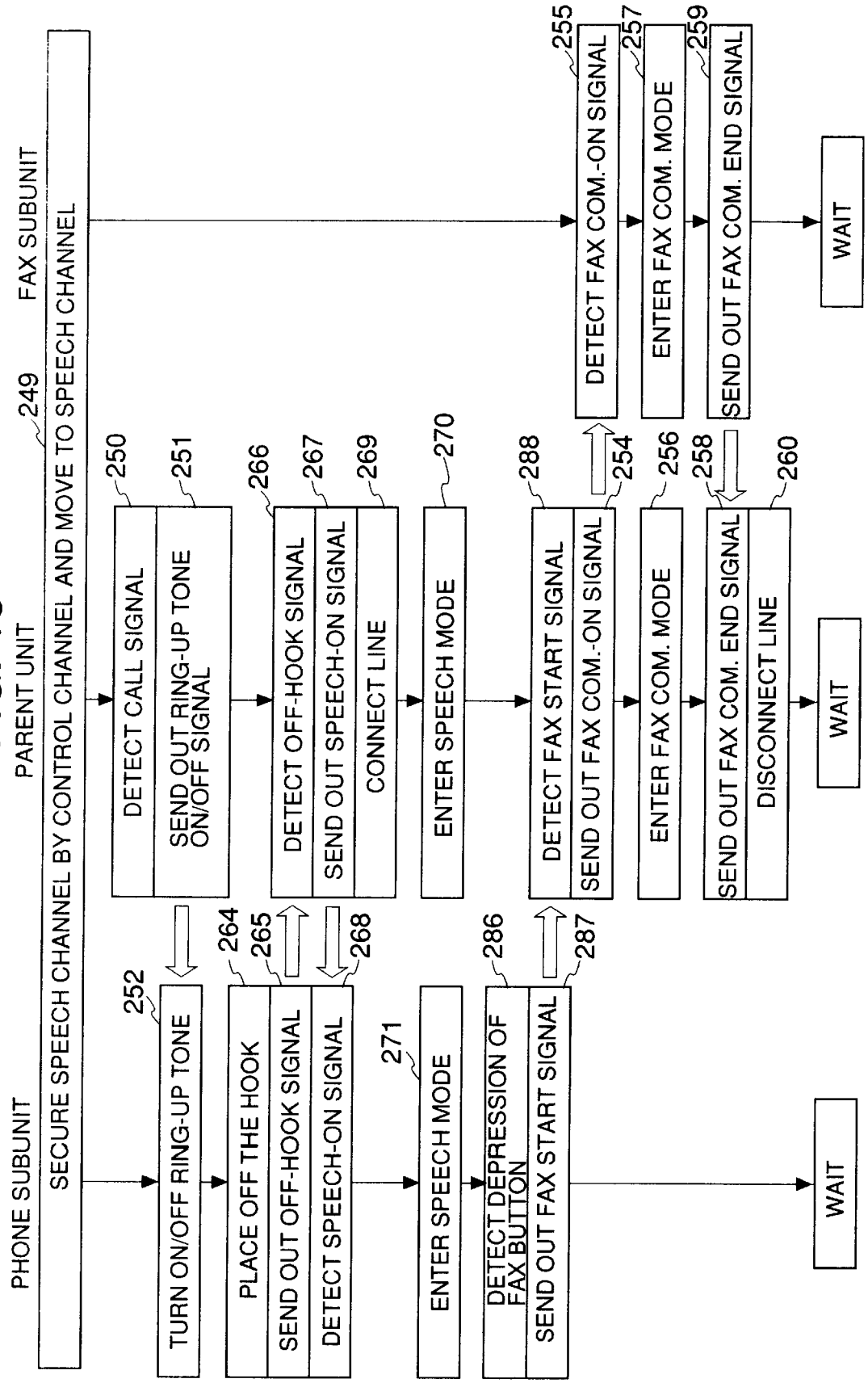
FIG. 15 is a flowchart showing the operation flow for radio communication with the FAX button depressed during conversation in the telephone priority system according to the first embodiment.

Now, explanation will be made about the flow of operation performed in the case where the FAX button 47 of the operating section 31 of the telephone subunit 504 is depressed during speech on the telephone subunit 504 at step 240 in FIG. 11. FIG. 15 shows the flow of operation for such a case. The flow of operation performed before the telephone subunit 504 and the parent unit 502 enter the speech mode (before step 270 for the parent unit and before step 271 for the telephone subunit) is the same as that explained with reference to FIG. 13. Assume that the depression of the FAX button on the operating section 31 of the telephone subunit 504 during speech on the telephone subunit 504 was detected by the controller 24 of the telephone subunit 504 (step 286). The telephone subunit 504 sends out a fax start signal to the parent unit 502 (step 287). More specifically, the controller 25 of the subunit 504 connects the radio transmission change-over switch 27 to side b, and sends out the fax start signal to the radio communication section 26 by way of the control signal modem 28. Also, assume that the controller 9 of the parent unit 502 detects that the fax start signal is sent from the telephone subunit 504 by way of the control signal modem 6 during speech, i.e., in the speech mode on the telephone subunit 504 (step 288). The fax communication-on signal is sent to the facsimile subunit 503, and the facsimile subunit 503 is thereby set in facsimile-receiving operation (step 233 in FIG. 10). The flow of operation executed on the parent unit 502 and the facsimile subunit 503 at and after step 254 in FIG. 15 is the same as that explained above with reference to FIG. 12.

Now, explanation will be made about the telephone/facsimile automatic switching operation performed when the facsimile priority system is selected as a method of telephone/facsimile automatic switching operation, i.e., with the non-call lamp 42 of the telephone subunit 504 and the non-call lamp 34 of the facsimile subunit 503 turned off. The flow of general operation of the facsimile subunit 503, the telephone subunit 504 and the parent unit 502 as a whole is shown in FIGS. 16, 17, 18 and 19, and that of operation for radio communication of the parent unit 502 with the facsimile subunit 503 or the telephone subunit 504 in FIGS. 20, 21, 22, 23 and 24. The method of radio communication of the parent unit 502 with the facsimile subunit 503 or the telephone subunit 504 is the same as the radio communication for the well-known cordless telephone using the control channel and the speech channel. Therefore, the explanation about the very nature of radio communication will not be made herein.

Figure 16:
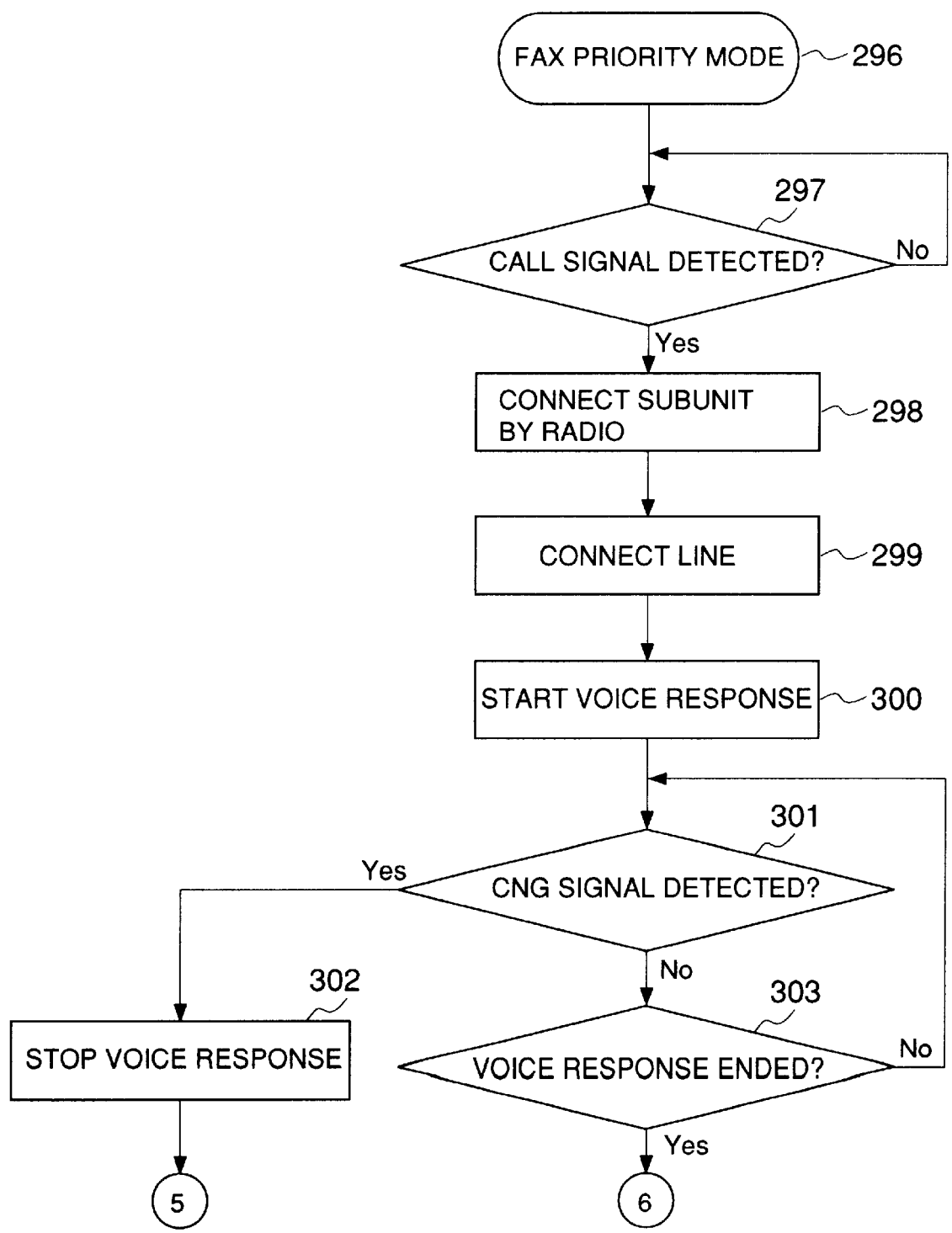
FIG. 16 is a flowchart showing a part of the operation flow in the facsimile priority system according to the first embodiment.
Figure 20:
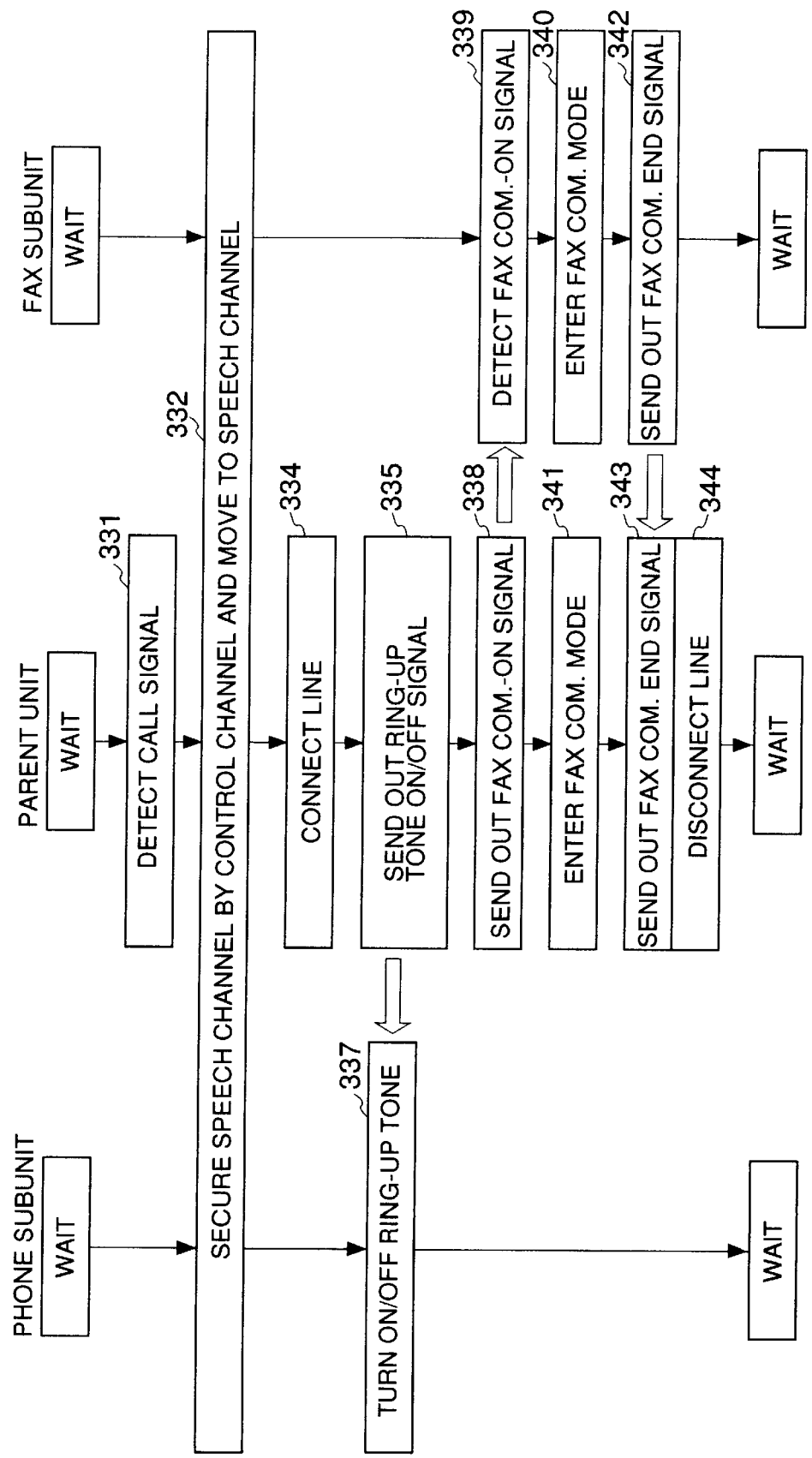
FIG. 20 is a flowchart showing the operation flow for radio communication in the facsimile priority system according to the first embodiment.

As shown by the facsimile priority system in FIG. 16, the controller 9 of the parent unit 502 detects whether a call signal is sent from the telephone line by way of the call signal detector 12 (step 297). In the case where the call signal detector 12 detects that a call signal is sent from the telephone line, the controller 9 connects the telephone subunit 504 and the facsimile subunit 503 by radio (step 298). The flow of operation for radio connection will be explained with reference to FIG. 20. As shown in FIG. 20, when a call signal is detected by the parent unit 502 (step 331), the speech channel is secured by the control channel and the process moves to the speech channel (step 332).

The flow of operation at step 332 will be explained with reference to FIGS. 4, 5 and 6.

The parent unit 502 confirms the unoccupied state of the control channel through the radio communication section 5, and after so confirming, sends out a signal designating radio communication to the facsimile subunit 503 by way of the control channel. At the same time, the controller 9 connects the radio transmission change-over switch 4 to side b, and while controlling the control signal modem 6, sends out a signal designating the radio connection to the radio communication section 5. The signal designating the radio connection (hereinafter called "the connection designating signal") is transmitted together with the data of the speech channel the unoccupied state of which was confirmed by the radio-communication section 5 of the parent unit 502 immediately before detection of a call signal at step 248. Also, the radio communication is carried out by time division between the telephone subunit 504 and the facsimile subunit 503 through the same channel. In the facsimile subunit 503, the radio communication section 13 receives the radio signal sent from the parent unit 502 and the control signal modem 21 demodulates the same signal. The controller 22 of the facsimile subunit 503 and the controller 24 of the telephone subunit 504, upon confirmation that the parent unit 502 sends out the connection designating signal, applies a connection confirming signal as a signal response to the parent unit 502. This connection confirming signal is also sent out from the control channel. More specifically, in the telephone subunit 504, the controller 24 connects the radio transmission change-over switch 27 to side b, while controlling the control signal modem 28, and sends out a connection confirming signal to the radio communication section 26. In the facsimile subunit 503, on the other hand, the controller 22 connects the radio transmission change-over switch 14 to side b, and while controlling the control signal modem 21, sends out a connection confirming signal to the radio communication section 13. The telephone subunit 504 and the facsimile subunit 503, after sending out the connection confirming signal to the parent unit 502, moves to the speech channel. The particular speech channel is selected by the data of the channel through which the parent unit 502 sent out the connection designating signal. In the case where the parent unit 502 receives the connection confirming signal sent from the facsimile subunit 503 and the telephone subunit 504, i.e., in the case where a connection confirming signal is detected by the control signal modem 6 from the signal received at the radio communication section 5, then the parent unit 502 proceeds to the speech channel. The telephone subunit 504 and the facsimile subunit 504, after moving to the speech channel, proceeds to confirm the unoccupied state of the particular speech channel, and if it is unoccupied, sends out a speech channel arrival signal to the parent unit 502 through the same speech channel. The signal flow in this case is the same as that obtained when the connection confirming signal is sent out through the control channel as described above. With the parent unit 502, as in the case of receiving the connection confirming signal by the control channel described above, the controller 9 receives the speech channel arrival signal sent from the telephone subunit 504 and the facsimile subunit 503. As a result, the movement of the parent unit 502, the facsimile subunit 503 and the telephone subunit 504 to the speech channel is completed.

Upon complete movement of the parent unit 502, the telephone subunit 504 and the facsimile subunit 503 to the speech channel, the parent unit 502 connects the telephone line (step 299 in FIG. 16 and step 334 in FIG. 20). More specifically, in FIG. 4, the controller 9 turns on the line connection relay 2. As a consequence, the telephone line connected with the line wire connection terminal 1 is connected to the two-wire/four-wire converter 3, thus realizing a condition in which the telephone line is connected to the parent unit 502. Then, the controller 9 connects the line transmission change-over switch 7 to side b, and the voice response generator 8 starts sending out a voice response (step 30 in FIG. 16). The contents of the voice response thus sent out are, for example, "Continue to send facsimile data. As to telephone, wait for a call which I will make". As seen, the voice response is in order to inform the other party that although the facsimile is immediately available for receiving, the telephone line connection must be awaited until a ring-up tone is started. The controller continues to detect whether the CNG signal is sent from the other party by the CNG signal detector 11 (step 301) until the voice response generator 8 has completely sent out the voice response (step 303). In the case where step 301 detects that the CNG signal has been sent from the other party by the CNG signal generator 11, the controller 9 stops sending the voice response through the voice response generator 8 (step 302), and transfers the control to the facsimile receiving operation (step 317 in FIG. 18) by the facsimile subunit 503. The flow of operation for facsimile receiving will be described later.

Figure 17:
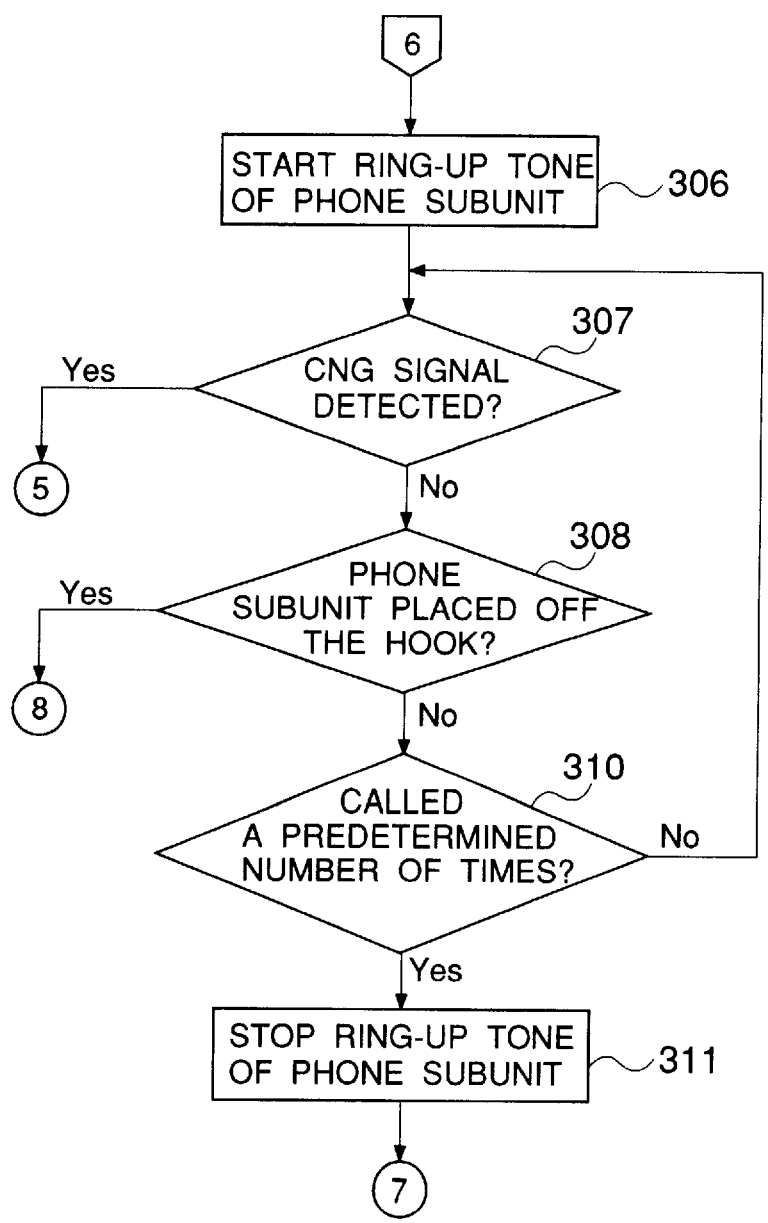
FIG. 17 is a flowchart showing another part of the operation flow in the facsimile priority system according to the first embodiment.

In the event that the CNG signal sent from the other party fails to be detected before the complete sending out of the voice response, the parent unit 502 starts the telephone ring-up tone on the telephone subunit 504 (step 306 in FIG. 17). The parent unit 502 continues sounding the ring-up tone while checking whether the CNG signal has been sent from the telephone line (step 307), whether the telephone subunit 504 has been placed off the hook, and whether the ring-up tone on the telephone subunit 504 has been sounded a predetermined number of times (step 310).

The flow of operation for radio communication in the aforementioned case will be explained with reference to FIG. 20. As shown in FIG. 20, the ring-up tone on the telephone subunit 504 is sounded to the telephone subunit 504 from the parent unit 502 in such a manner that a signal designating the sounding of the ring-up tone (ring-up tone-on signal) and a signal designating the stop of the sounding ring-up tone (ring-up tone-off signal) are sent out (step 335). The facsimile subunit 503, on the other hand, while the ring-up tone on the telephone subunit 504 is sounding, suspends radio communication with the parent unit 502 and is in waiting mode holding the speech channel. The flow of operation executed upon detection of the CNG signal sent from the telephone line while the ring-up tone on the telephone subunit 504 is sounding (where the CNG signal is detected at step 307 in FIG. 17) and the flow of operation performed upon detection of the fact that the telephone subunit 504 is placed off the hook (where the off-the-hook status of the telephone subunit 504 is detected at step 308 in FIG. 17) will be described later.

The flow of operation performed for sounding the ring-up tone at steps 335 and 337 will be explained with reference to FIGS. 4, 5 and 6. The controller 9 of the parent unit 502 connects the radio transmission change-over switch 4 to side b, and while controlling the control signal modem 6, sends out a ring-up tone-on signal and a ring-up tone-off signal to the radio communication section 5 at regular intervals of time. In the above-mentioned telephone/facsimile automatic switching operation of the telephone priority system, the ring-up tone of the telephone subunit 504 is sounded by sending the ring-up tone-on signal and the ring-up tone-off signal in accordance with the turning on/off of the call signal sent from the telephone line. According to the facsimile priority system, by contrast, the telephone line is already connected before the ring-up tone on the telephone subunit 504 is started, so that it is impossible to sound the ring-up tone on the telephone subunit 504 in accordance with the on/off state of the call signal. As a result, in the facsimile priority system, the controller 9 of the parent unit 502 sends out the ring-up tone-on signal and the ring-up tone-off signal at regular time intervals to the telephone subunit 504 thereby to start the ring-up tone on the telephone subunit 504. The time intervals of the ring-up tone-on signal and the ring-up tone-off signal can be set as desired or equal to the time intervals of the turning on/off of the call signal sent from the telephone line. In response to the ring-up tone-on signal and the ring-up tone-off signal transmitted by the parent unit 502, the telephone subunit 504 demodulates the signal received at the radio communication section 26 by way of the control signal modem 28. The controller 24 of the telephone subunit 504, upon detection that the ring-up tone-on signal or the ring-up tone-off signal from the parent unit 502, starts the telephone ring-up tone by controlling the ring-up tone output section 25. In other words, in the case where the ring-up tone-on signal is detected, the ring-up tone output from the ring-up tone output section 25 is turned on, while in the case where the ring-up tone-off signal is detected, the ring-up tone-off output from then ring-up tone output section 25 is turned off.

Explanation will be made about the process of operation performed in the case where the telephone subunit 504 fails to be placed off the hook even when the ring-up tone of the telephone subunit 504 is sounded a predetermined number of times at step 310 in FIG. 17. First, the telephone subunit 504 is stopped sounding the ring-up tone (step 311). As described above, the ring-up tone of the telephone subunit 504 is sounded by the parent unit 502 transmitting the ring-up tone-on signal and the ring-up tone-off signal alternately to the telephone subunit 504. For stopping the ring-up tone of the telephone subunit 504, therefore, the ring-up tone-on signal and the ring-up tone-off signal are inhibited from being transmitted on and after transmission of a ring-up tone-off signal. After the telephone ring-up tone on the telephone subunit 504 is stopped, the controller 9 of the parent unit 502 connects the line transmission change-over switch 7 to side b and starts to send out a voice response by way of the voice response generator 8 (step 313 in FIG. 18). The contents of the voice response are, for example, "The called party is not around here. The phone caller please call again later. The facsimile sender please continue to send data." This is in order to inform the other party that although the telephone call could not be answered in spite of the ring-up tone, the facsimile is ready for reception. The controller 9 continues to detect whether the CNG signal is sent from the other party through the CNG signal detector 11 (step 314) until the voice response generator 8 completely sends the voice response (step 316). Upon detection by the CNG signal detector 11 at step 314 that the CNG signal is sent from the other party, the controller 9 stops sending out the voice response through the voice response generator 8 (step 315), and transfers the control operation to the facsimile reception on the facsimile subunit 503 (step 317). Also when the CNG signal is not detected by the CNG signal detector 11 before the complete sending out of the voice response by the voice response generator 8, the control is transferred to the facsimile reception (step 317) by the facsimile subunit 503 in similar fashion.

Figure 18:
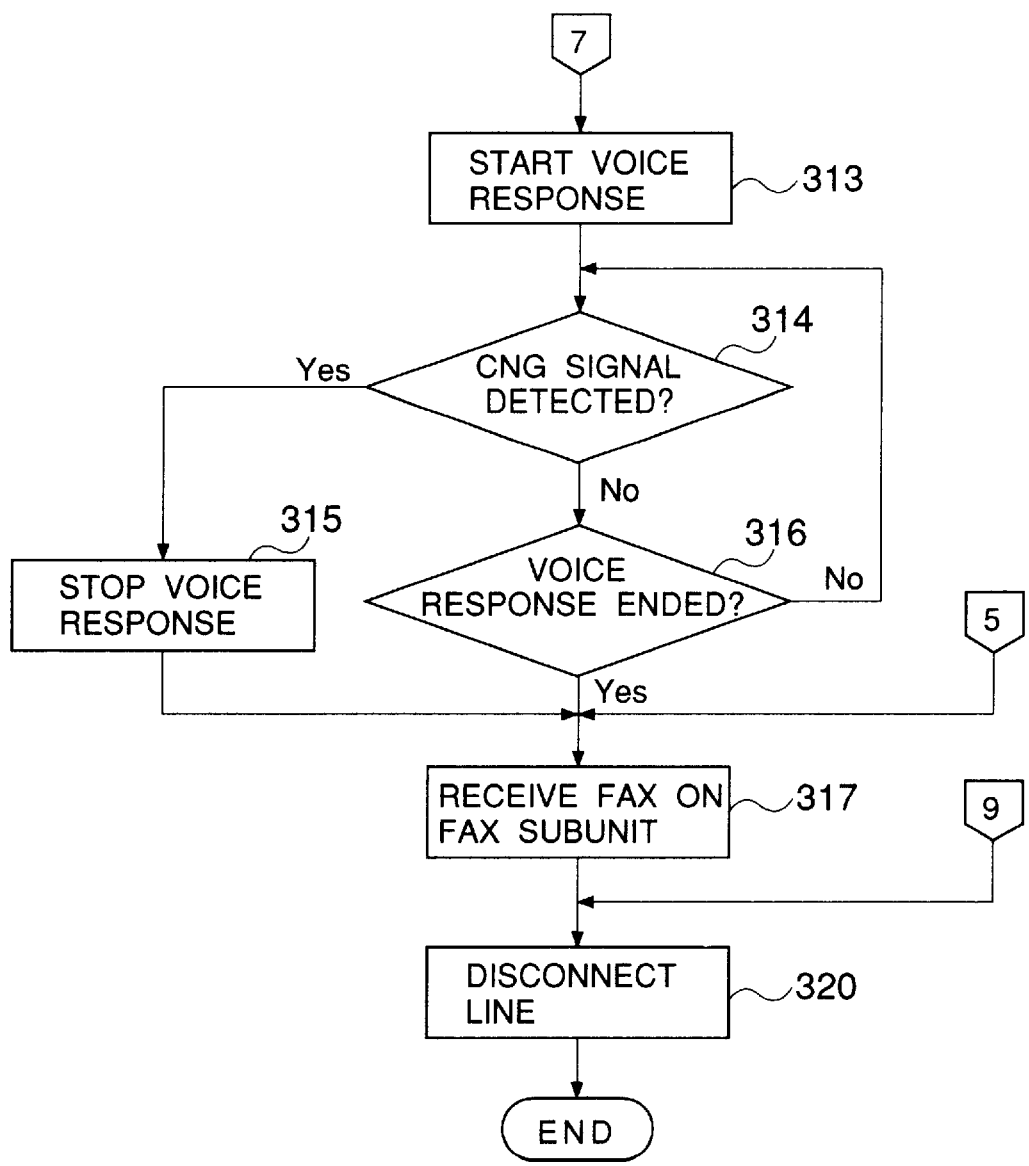
FIG. 18 is a flowchart showing still another part of the operation flow in the facsimile priority system according to the first embodiment.

The flow of operation relating to communication in the facsimile reception on the facsimile subunit 503 at step 317 in FIG. 18 will be explained with reference to FIG. 20. The controller 9 of the parent unit 502 connects the radio transmission change-over switch 4 to side b, and sends out a fax communication-on signal to the facsimile subunit 503 through the control signal modem 6 (step 338). This fax communication-on signal is transmitted by utilizing the speech channel like the ring-up tone-on signal and the ring-up tone-off signal to the telephone subunit 504 described above. The controller 9 of the parent unit 502, after transmitting the fax communication-on signal, connects the radio transmission change-over switch 4 to side a, and further connecting the line transmission change-over switch 7 to side a, enters the fax communication mode (step 341). Under this condition, in the parent unit 502, the signal sent from the telephone line connected with the line wire connection terminal 1 is sent to the radio communication section 5 through the two-wire/four-wire converter 3, and further to the facsimile subunit 503. Also, the signal transmitted by radio from the facsimile subunit 503 is received by the radio communication section 5, and sent out through the two-wire/four-wire converter 3 to the telephone line connected with the line wire connection terminal 1. With the facsimile subunit 503, on the other hand, the controller 22, upon detection that the fax communication-on signal transmitted from the parent unit 502 at step 254 has been received by the control signal modem 21 (step 339), the controller 22 connects the radio transmission change-over switch 14 to side a into the fax communication mode (step 340). Under this condition, the signal sent by the parent unit 502 and received by the radio communication section 13 is applied to the fax modem 16, and the signal produced from the fax modem 16 is transmitted to the parent unit 502 by the radio communication section 13. As a result, under the condition where the parent unit 502 and the facsimile subunit 503 are both in fax communication mode, i.e., where the parent unit 502 is at step 341 and the facsimile subunit 503 at step 340, the signal sent from the telephone line connected with the line wire connection terminal 1 of the parent unit 502 is applied to the fax modem 16 of the facsimile subunit 503 by radio, and the signal output of the fax modem 16 to the telephone line connected with the line wire terminal 1 of the parent unit 502 by radio. The facsimile data transmitted by the other party is received in this way. The facsimile signal sent from the other party is demodulated at the fax modem 16, decoded into the image information at the decoder 19, and applied to the recorder 20. The procedure for facsimile communication is the same as that for the well-known facsimile systems, and will not be described again herein.

Upon complete receiving of the facsimile data at the facsimile subunit 503, the facsimile subunit 503 sends a fax communication end signal to the parent unit 502 (step 342). The controller 22 of the facsimile subunit 502 connects the radio transmission change-over switch 14 to side b, and while producing the fax communication end signal through the control signal modem 21, transmits the same signal to the parent unit 502 through the radio communication section 13. The controller 9 of the parent unit 502, upon detection that the fax communication end signal is sent from the facsimile subunit 503 by way of the control signal modem 6 (step 343), turns off the line connection relay 2 thereby to disconnect the telephone line (step 320 in FIG. 18 and step 344 in FIG. 20). After that, the facsimile subunit 503, the telephone subunit 504 and the parent unit 502 enter into the waiting mode.

Figure 21:
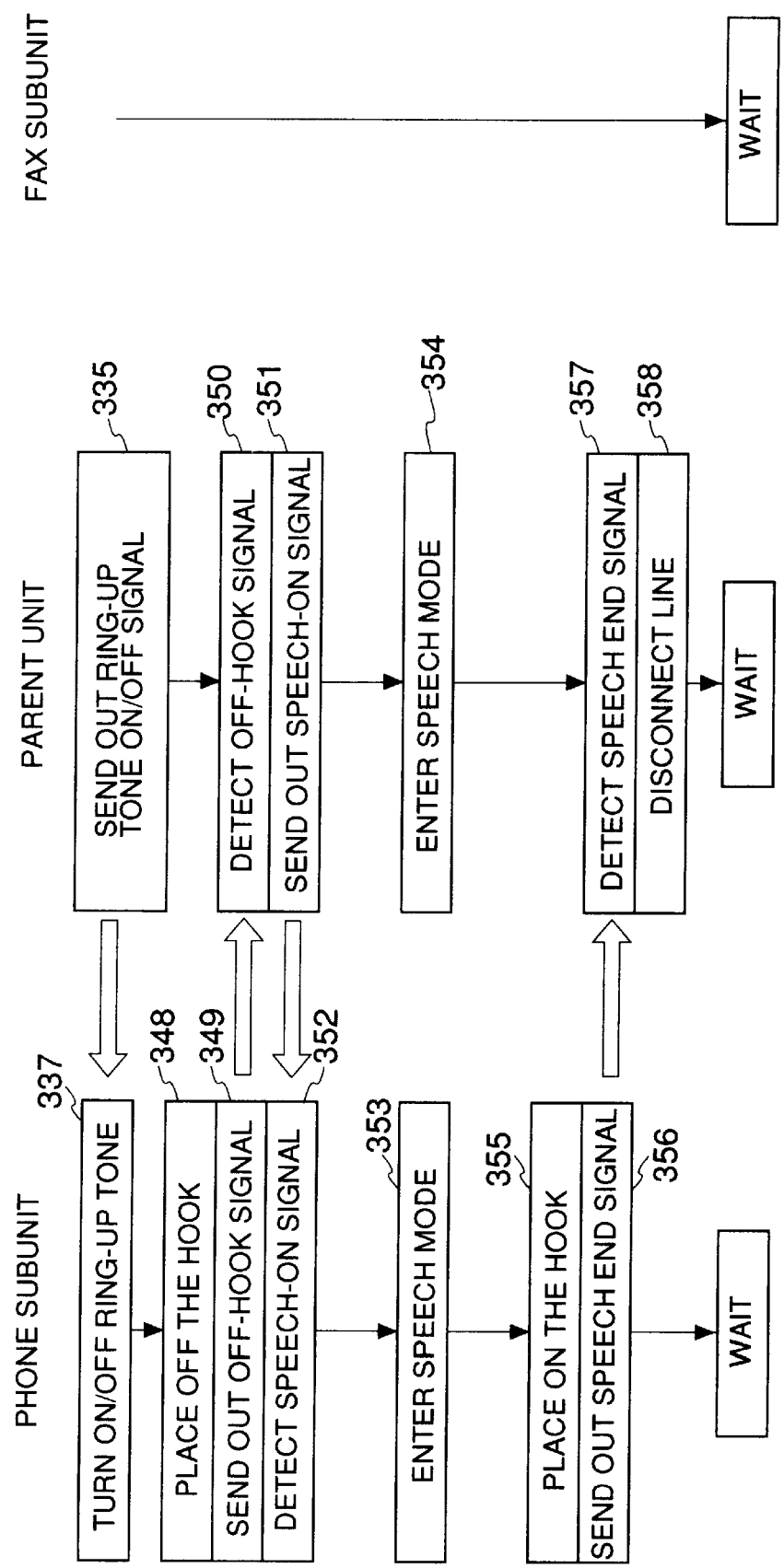
FIG. 21 is a flowchart showing the operation flow for radio communication with the telephone subunit hooked off in the facsimile priority system according to the first embodiment.

Now, explanation will be made about the control operation performed upon detection that the telephone subunit 504 is placed off the hook at step 308 in FIG. 17. According to this embodiment, the telephone subunit 504 is placed off the hook against the telephone ring-up tone on the telephone subunit 504 by depressing the line wire button 45 of the operating section 31 shown in FIG. 8. The controller 24 of the telephone subunit 504, upon depression of the line wire button 45 of the operating section 31, turns on the line wire lamp built in the line wire button 45 in order to indicate that the line is engaged in speech. Explanation will be made about the operation performed in the case where the telephone subunit 504 is placed off the hook against a telephone call with reference to FIG. 21. FIG. 21 is a diagram showing the process after transmission of the ring-up tone-on/off signal from the parent unit 502 in FIG. 20 (step 335) and after the sounding of the ring-up tone-on/off on the telephone subunit 504 (step 337). The flow of operation up to this stage is identical to that shown in FIG. 20. As described above, the controller 24 of the telephone subunit 504, upon detection that the line wire button 45 of the operating section 31 is depressed, i.e., when the telephone subunit 504 is placed off the hook (step 348), sends an off-hook signal to the parent unit 502 (step 349). In the process, the controller 24 of the telephone subunit 504 connects the radio transmission change-over switch 27 to side b, and while sending out the speech-on signal to the radio communication section 5 by way of the control signal modem 6, transmits the same signal to the telephone subunit 504 by radio. After that, the controller 9 of the parent unit 502 connects the radio transmission change-over switch 4 to side a. As a result, the parent unit 502 enters the speech mode (step 354), the signal sent from the telephone line connected to the line wire connection terminal 1 is sent to the radio communication section 5 through the two-wire/four-wire converter 3 on the one hand, and the signal from the telephone subunit 504 is received at the radio communication section 5 and sent to the telephone line through the two-wire/four-wire converter 3. The controller 24 of the telephone subunit 504 that has detected the speech-on signal transmitted from the parent unit 502 (step 352), on the other hand, connects the radio transmission change-over switch 27 to side a. As a consequence, the telephone subunit 504 enters the speech mode (step 353), the signal received at the radio communication section 26 is sent to the voice output section 29 and produced as a voice output, and the voice applied from the voice input section 30 is transmitted to the parent unit 502 by the radio communication section 26. With the parent unit 502 and the telephone subunit 504 both entering the speech mode, the telephone subunit 504 becomes ready for speech (step 321 in FIG. 19).

Figure 19:
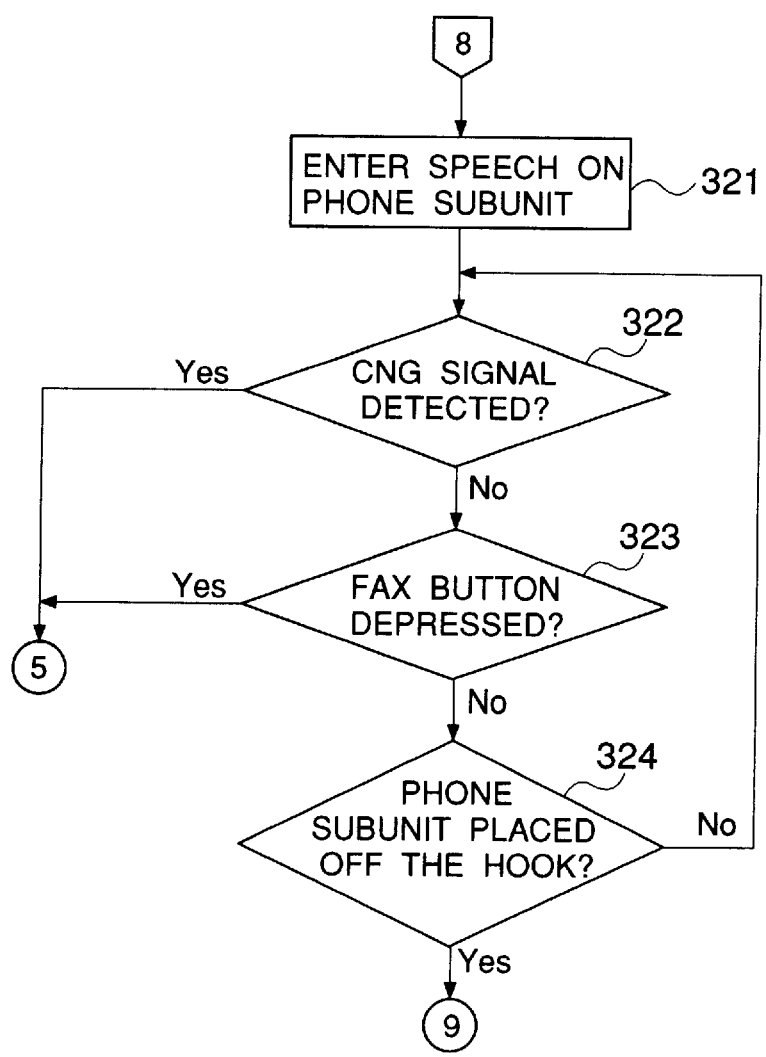
FIG. 19 is a flowchart showing still another part of the operation flow in the facsimile priority system according to the first embodiment.

Even while the speech is conducted by the telephone subunit 504 as described above, the parent unit 502 continues to detect whether the CNG signal is not sent from the other party (step 322 in FIG. 19) or whether the FAX button 47 of the telephone subunit 504 is not depressed (step 323 in FIG. 19) until the telephone subunit 504 is placed off the hook (step 324 in FIG. 19). The process executed in the case where the CNG signal is detected at step 322 and where the FAX button 47 is depressed at step 323 will be described later. For the time being, the flow of operation performed in the case where neither the CNG signal is detected nor the FAX button 47 of the telephone subunit 504 is depressed until the telephone subunit 504 is placed off the hook will be explained with reference to FIG. 21.

The flow of operation executed when the telephone subunit 504 in speech is placed off the hook, i.e., when the telephone is hung up in that state will be explained with reference to FIG. 21. To hung up the telephone on the telephone subunit 504 according to this embodiment, the line wire button 45 is depressed. As described above, by depressing the line wire button 45 with the ring-up tone sounding on the telephone subunit 504, the telephone subunit 504 is placed off the hook and the line wire lamp built in the line wire button 45 is turned on. As a result, the line wire lamp built in the line wire button 45 is kept on as long as the telephone subunit 504 is in speech. If the line wire button 45 is depressed under this condition, the telephone subunit 504 is placed off the hook so that the line wire lamp built in the line wire button 45 is turned off. More specifically, the controller 24 of the telephone subunit 504, upon detection that the line wire button 45 of the operating section 31 is depressed during speech (step 355), turns off the line wire lamp built in the line wire button 45 of the operating section 31, and while at the same time connecting the radio transmission change-over switch 27 to side b, transmits the speech end signal to the parent unit 502 by way of the control signal modem 28 (step 356). After transmitting this speech end signal to the parent unit, the telephone subunit 504 enters the waiting mode. The controller 9 of the parent unit 502, upon detection that the speech end signal transmitted by the telephone subunit 504 has been detected through the control signal modem 28 (step 357), turns off the line connection relay 2, thereby disconnecting the telephone line (step 320 in FIG. 18 and step 358 in FIG. 13). After disconnection of the telephone line, the parent unit 502 enters the waiting mode.

Figure 22:
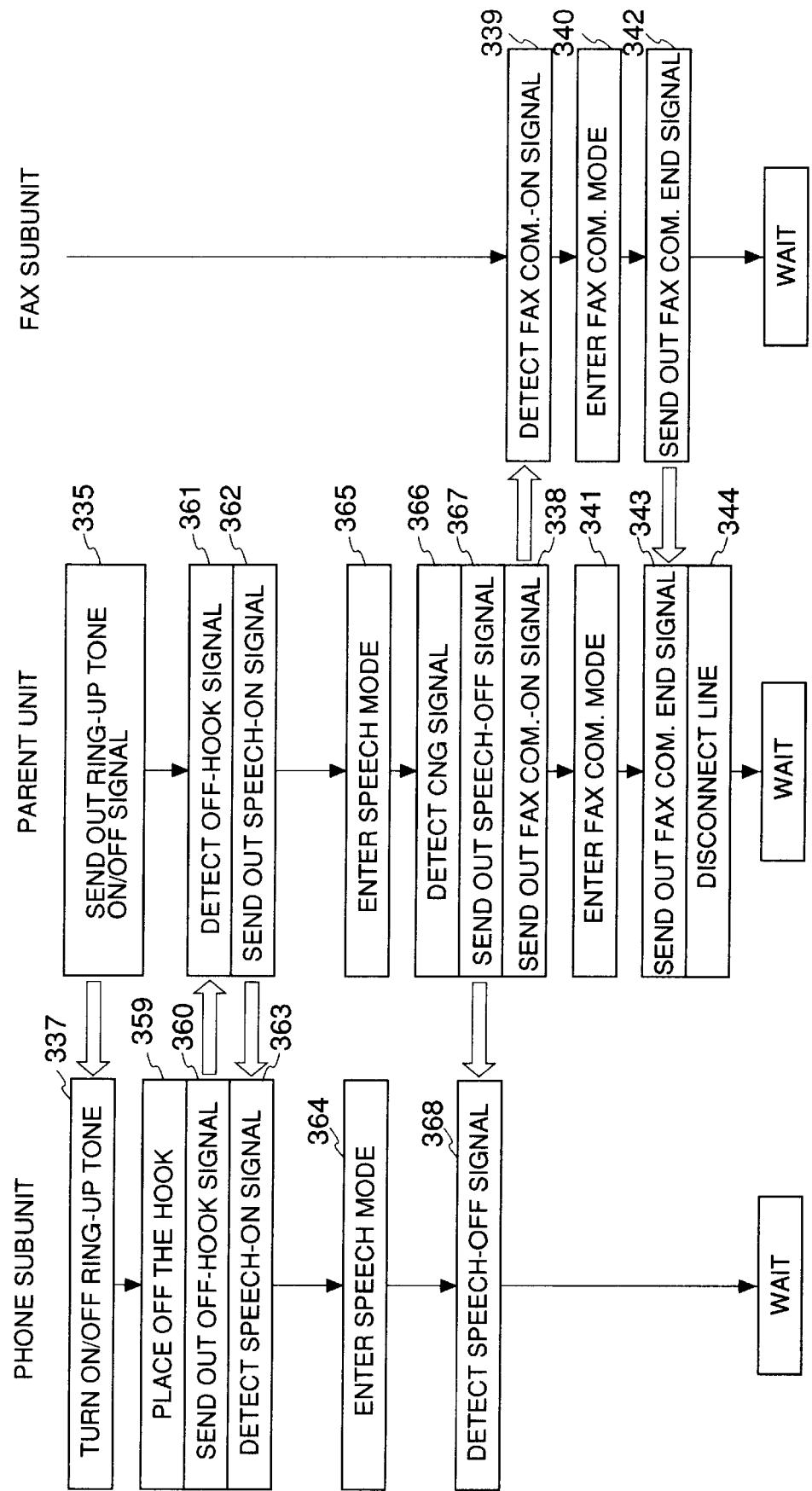
FIG. 22 is a flowchart showing the operation flow for radio communication with the CNG signal detected during conversation in the facsimile priority system according to the first embodiment.

Now, explanation will be made about the flow of operation executed upon detection of the arrival of the CNG signal from the other party at step 322 in FIG. 19. The flow of operation involved is shown in FIG. 22. The flow of operation before the telephone subunit 504 and the parent unit 502 enter the speech mode (before step 365 for the parent unit and before step 364 for the telephone subunit) is the same as that explained above with reference to FIG. 21. Upon detection of the fact that the CNG signal has been sent from the telephone line by the CNG signal detector 11 of the parent unit 502 during speech on the telephone subunit 504 (step 366), the parent unit 502 sends out a speech-off signal to the telephone subunit 504 in speech (step 367). More specifically, the radio transmission change-over switch 4 is connected to side b, and the speech-off signal is sent out to the radio communication section 5 by the control signal modem 6. The controller 24 of the telephone subunit 504, upon detection of the speech-off signal by the control signal modem 28 during speech (step 368), ends the speech mode and enters the waiting mode. The parent unit 502, after sending out the speech-off signal to the telephone subunit 504, applies the fax communication-on signal to the facsimile subunit 503, thereby performing the facsimile receiving operation on the facsimile subunit 503 (step 317 in FIG. 18). The flow of operation for the parent unit 502 and the facsimile subunit 503 at and after step 338 in FIG. 22 is substantially identical to that explained above with reference to FIG. 20.

Figure 23:
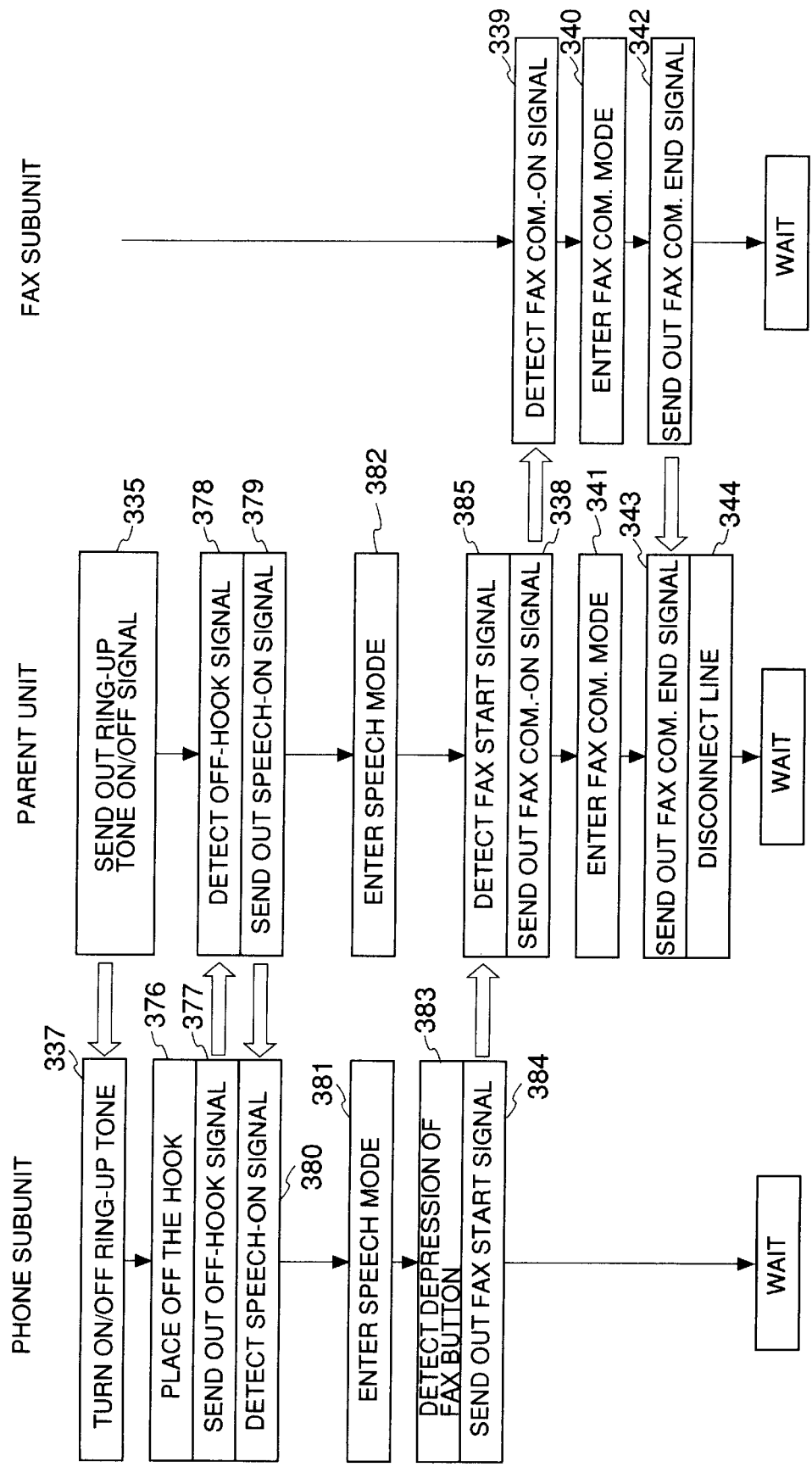
FIG. 23 is a flowchart showing the operation flow for radio communication with the FAX button depressed during conversation in the facsimile priority system according to the first embodiment.

Now, explanation will be made about the flow of operation performed in the case where the FAX button on the operating section 21 of the telephone subunit 504 has been depressed while speech is proceeding on the telephone subunit 504 at step 323 in FIG. 19. FIG. 23 shows the flow of operation involved. The flow of operation performed before the telephone subunit 504 and the parent unit 502 enter the speech mode (before step 382 for the parent unit and before step 381 for the telephone subunit 504) is the same as that explained above with reference to FIG. 21. Assuming that the depression of the FAX button 47 of the operating section 31 of the telephone subunit 504 during speech on the telephone subunit 504 is detected by the controller 24 of the telephone subunit 504 (step 383), the telephone subunit 504 transmits the fax start signal to the parent unit 502 (step 384). More specifically, the controller 25 of the telephone subunit 504 connects the radio transmission change-over switch 27 to side b, and sends out the fax start signal to the radio communication section 26 by way of the control signal modem 28. The controller 9 of the parent unit 502, upon detection through the control signal modem 28 that the fax start signal is sent from the telephone subunit 504 during speech on the telephone subunit 504, i.e., during the speech mode (step 385), sends out the fax communication-on signal to the facsimile subunit 503, thereby performing the facsimile receiving operation by the facsimile subunit 503 (step 317 in FIG. 18). The flow of operation performed in the parent unit 502 and the facsimile subunit 503 at and after step 338 in FIG. 23 is the same as that explained above with reference to FIG. 22.

Figure 24:
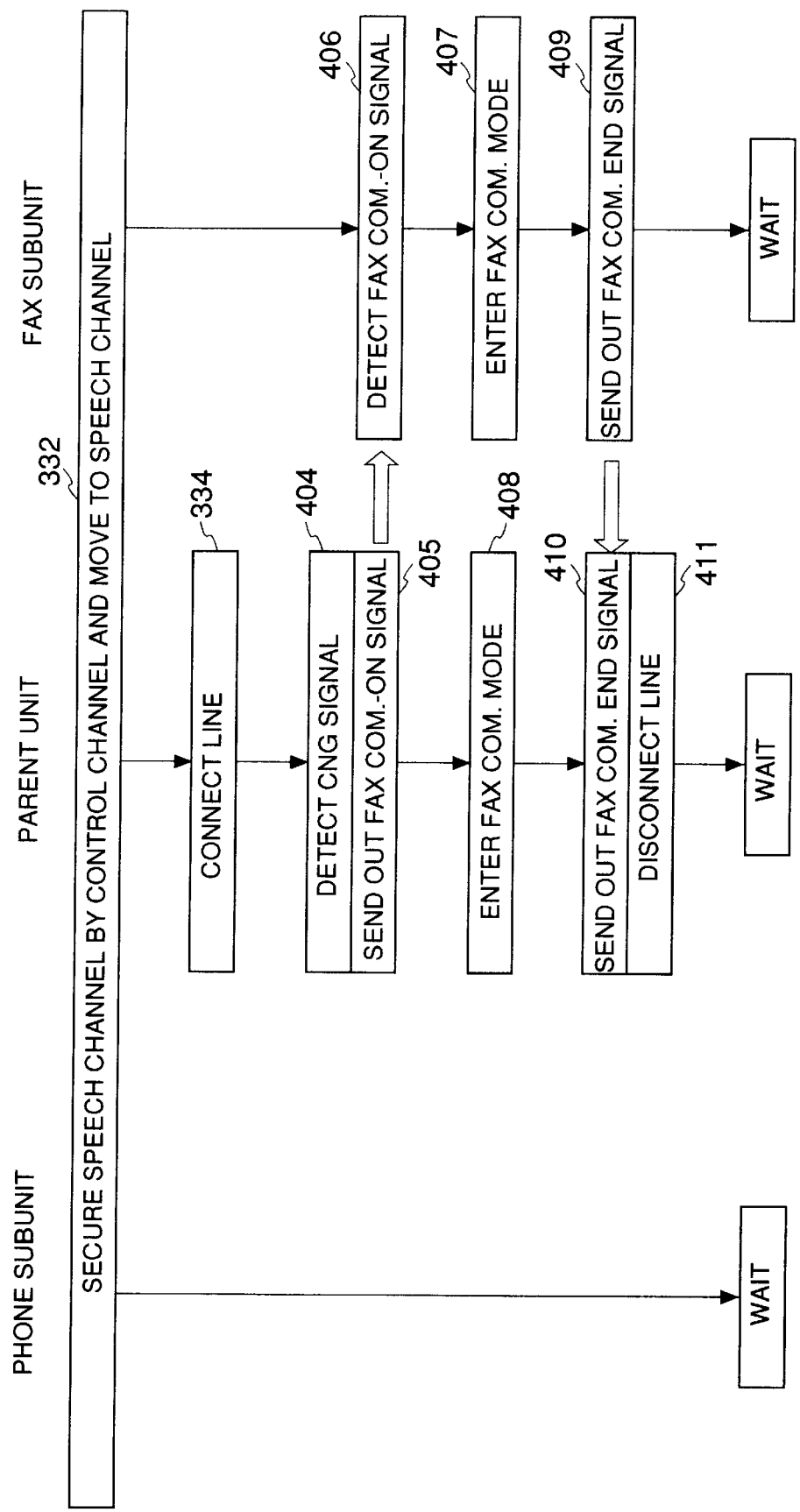
FIG. 24 is a flowchart showing the operation flow for radio communication with the CNG signal detected during voice response in the facsimile priority system according to the first embodiment.

Now, explanation will be made about the flow of operation performed when the CNG signal detector 11 detects that the CNG signal has arrived from the telephone line at step 301 in FIG. 16. The controller 9 of the parent unit 502, upon detecting that the CNG signal has arrived from the other party while a voice response is being sent out, stops sending out the voice response through the voice response generator 8 (step 302 in FIG. 16), and transfers the control to the facsimile receiving operation (step 317 in FIG. 18) on the facsimile subunit 503. The flow of operation for radio communication involved will be explained with reference to FIG. 24. In FIG. 24, the operation before the line is connected (step 334) after the speech channel is secured by the control channel and moving to the speech channel (step 332) is the same as that explained with reference to FIG. 20. Upon detection at the CNS signal detector 11 of the parent unit 502 that the CNG signal has arrived from the other party while the line is connected to send out the voice response (step 404), the controller 9 of the parent unit 502 connects the radio transmission change-over switch 4 to side b, and sends out the fax communication-on signal to the facsimile subunit 503 by way of the control signal modem 6 (step 405). This fax communication-on signal, like the ring-up tone-on signal and the ring-up tone-off signal to the telephone subunit 504 described above, is transmitted utilizing the speech channel. The controller 9 of the parent unit 502, after transmitting the fax communication-on signal, connects the radio transmission change-over switch 4 to side a, and further connecting the line transmission change-over switch 7 to side a, enters the fax communication mode (step 408). Under this condition, in the parent unit 502, the signal sent from the telephone line connected with the line wire connection terminal 1 is transmitted to the radio communication 5 through the two-wire/four-wire converter 3 and further to the facsimile subunit 503. The signal arriving from the facsimile subunit 503 by radio is received by the radio communication section 5, and sent out to the telephone line connected to the line wire connection terminal 1 through the two-wire/four-wire converter 3. In the facsimile subunit 503, on the other hand, the controller 22, upon detection that the fax communication-on signal transmitted by the parent unit 502 at step 254 is received by the control signal modem 21 (step 406), connects the radio transmission change-over switch 14 to side a and enters the fax communication mode (step 407). Under this condition, the signal transmitted by the parent unit 502 and received by the radio communication section 13 is applied to the fax modem 16, so that the signal produced from the fax modem 16 is transmitted to the parent unit 502. As a result, as long as the parent unit 502 and the facsimile subunit 503 are both in the fax communication mode, i.e., the parent unit 502 is at step 408 and the facsimile subunit 503 at step 407, the signal arriving from the telephone line connected with the line wire connection terminal of the parent unit 502 is sent out to the fax modem 16 of the facsimile subunit 503 by radio communication, and the signal produced from the fax modem 16 is applied to the telephone line connected to the line wire connection terminal 1 of the parent unit 502 by radio communication. Under this condition, the facsimile data transmitted by the other party of conversation is received. The facsimile signal transmitted from the other party is demodulated at the fax modem 16, decoded into image information by the decoder 19, and applied to the recorder 20. The procedure for facsimile communication is the same as that of the well-known facsimile system and will not be described again.

Upon completion of facsimile communication on the facsimile subunit 503, the facsimile subunit 503 sends the fax communication end signal to the parent unit 502 (step 409). The controller 22 of the facsimile subunit 503 connects the radio transmission change-over switch 14 to side b, and while producing a fax communication end signal from the control signal modem 21, transmits it to the parent unit 502 by way of the radio communication section 13. The controller 9 of the parent unit 502, upon detection of the arrival of the fax communication end signal from the facsimile subunit 503 from the control signal modem 6 (step 410), turns off the line connection relay 2 thereby to disconnect the telephone line (step 320 in FIG. 18 and step 411 in FIG. 24). After that, the facsimile subunit 503, the telephone subunit 504 and the parent unit 502 enter the waiting mode.

Figure 25:
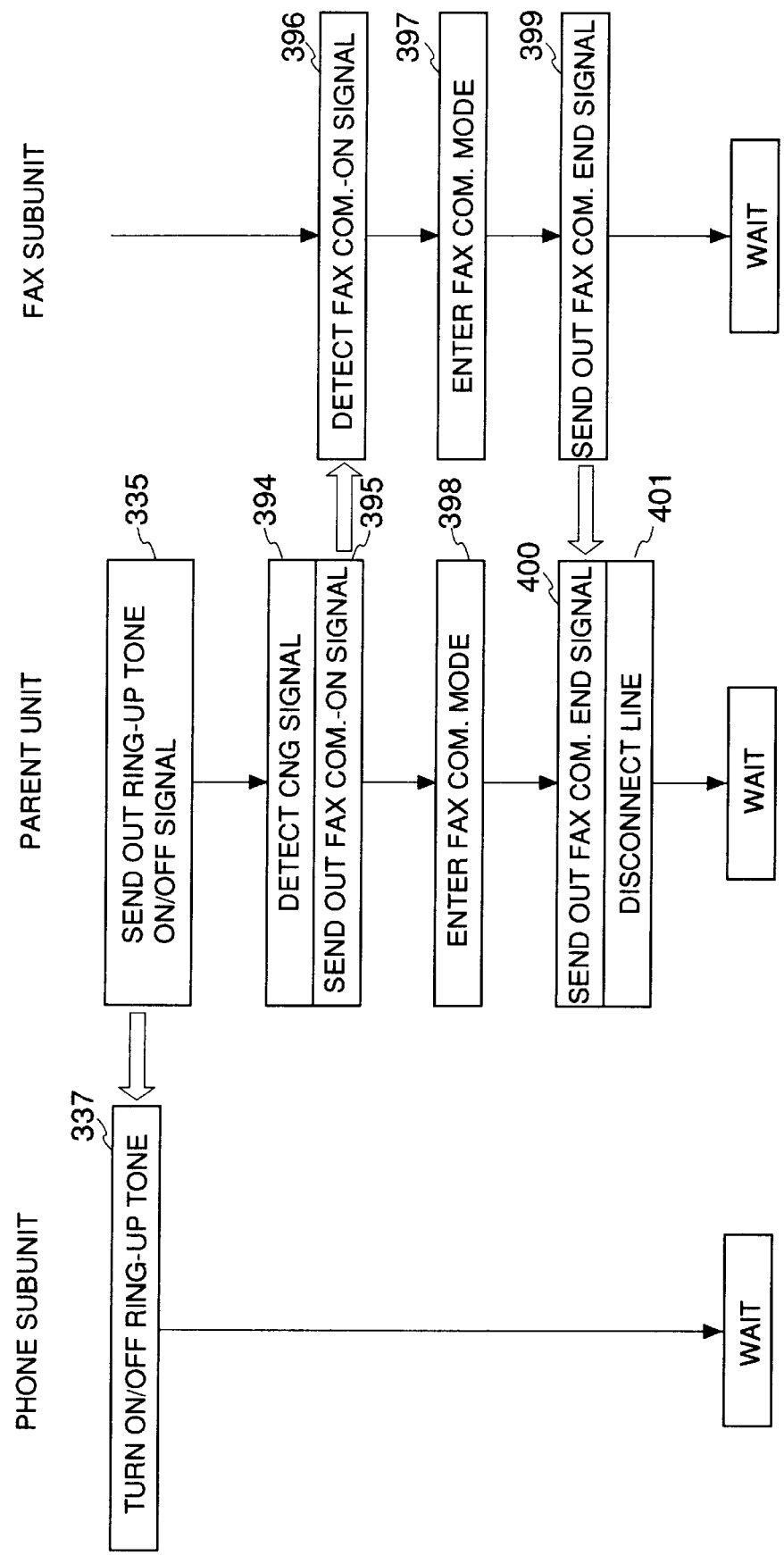
FIG. 25 is a flowchart showing the operation flow for radio communication with the CNG signal detected during the sounding of the ring-up tone in the facsimile priority system according to the first embodiment.

Now, explanation will be made with reference to FIG. 25 about the flow of operation performed upon detection of arrival of the CNG signal from the other party while the ring-up tone of the telephone subunit 504 is sounding, i.e., upon detection of the CNG signal at step 307 in FIG. 17. In FIG. 25, the flow of operation before sending out the ring-up tone-on/off signal of the parent unit (step 335) and the ring-up tone-on/off of the telephone subunit (step 337) is the same as that explained above with reference to FIG. 20. The controller 9 of the parent unit 502 controls the control signal modem 6, and while sending out the ring-up tone-on signal and the ring-up tone-off signal to the telephone subunit 504 at predetermined time intervals, causes the CNG signal detector 11 to detect whether the CNG signal has arrived from the other party. Upon detection of the arrival of the CNG signal from the other party by way of the CNG signal detector 11 (step 394), the controller 9 of the parent unit 502 connects the radio transmission change-over switch 4 to side b, and sends out the fax communication-on signal to the facsimile subunit 503 through the control signal modem 6 (step 395). This fax communication-on signal, like the ring-up tone-on signal and the ring-up tone-off signal to the telephone subunit 504 described above, is transmitted by use of the speech channel. The controller 9 of the parent unit 502, after transmitting the fax communication-on signal, connects the radio communication change-over switch 4 to side a, and switches the line transmission change-over switch 7 to side a, thereby entering the fax communication mode (step 398). Under this condition, in the parent unit 502, the signal sent from the telephone line connected to the line connection terminal 1 is sent to the radio communication section 5 through the two-wire/four-wire converter 3 and further to the facsimile subunit 503. Also, the signal arriving by radio from the facsimile subunit 503 is received by the radio communication section 5, and sent out through the two-wire/four-wire converter 3 to the telephone line connected to the line connection terminal 1. With the facsimile subunit 503, on the other hand, upon detection that the fax communication-on signal transmitted from the parent unit 502 at step 254 is received by way of the control signal modem 21 (step 396), the controller 22 connects the radio transmission change-over switch 14 to side a and thus enters the fax communication mode (step 397). Under this condition, the signal transmitted by the parent unit 502 and received by the radio communication section 13 is applied to the fax modem 16, and the signal produced from the fax modem 16 is transmitted to the parent unit 502 by the radio communication section 13. With the parent unit 502 and the facsimile subunit 503 both in fax communication mode, i.e., with the parent unit 502 at step 398 and the facsimile subunit 503 at step 397, therefore, the signal arriving from the telephone line connected with the line wire connection terminal 1 of the parent unit 502 is transmitted to the fax modem 16 of the facsimile subunit 503 by radio communication, and the signal produced from the fax modem 16 is sent to the telephone line connected with the line wire connection terminal 1 of the parent unit 502 by radio communication. The facsimile signal transmitted from the other party is received under this condition. The facsimile signal arriving from the other party is demodulated at the fax modem 16, decoded at the decoder 19, and applied to the recorder 20. The procedure for facsimile communication is identical to that of the well-known facsimile system and will not be described again herein.

Upon complete facsimile reception on the facsimile subunit 503, the fax communication end signal is sent from the facsimile subunit 503 to the parent unit 502 (step 399). The controller 22 of the facsimile subunit 503 connects the radio transmission change-over switch 14 to side b, and while producing the fax communication end signal by way of the control signal modem 6, transmits it from the radio communication section 13 to the parent unit 502. The controller 9 of the parent unit 502, upon detection of the arrival of the fax communication end signal from the facsimile subunit 503 by way of the control signal modem 6 (step 400), turns off the line connection relay 2 thereby to disconnect the telephone line (step 320 in FIG. 18 and step 401 in FIG. 25). After that, the facsimile subunit 503, the telephone subunit 504 and the parent unit 502 enter the waiting mode.

As described above, according to this embodiment, there is provide a facsimile system comprising a parent unit connected to the telephone line and a telephone subunit and a facsimile subunit connected to the parent unit by radio communication. When a telephone call arrives, the parent unit of the facsimile system connects the line, and controls it in such a manner that upon detection of a CNG signal indicating the facsimile transmission from the other party, the parent unit connects the facsimile subunit by radio for facsimile reception, while when no CNG signal is detected, the parent unit starts the ring-up tone of the telephone subunit. As a result, a single telephone line can be shared between facsimile communication and speech.

The above-mentioned embodiment shows a configuration including the parent unit 502, the facsimile subunit 503 and the telephone subunit 504 as shown in FIG. 2. Now, explanation will be made about a second embodiment of the invention comprising the parent unit 502, the telephone subunit 504 and a facsimile subunit with telephone 508 with reference to FIG. 26.

Figure 26:
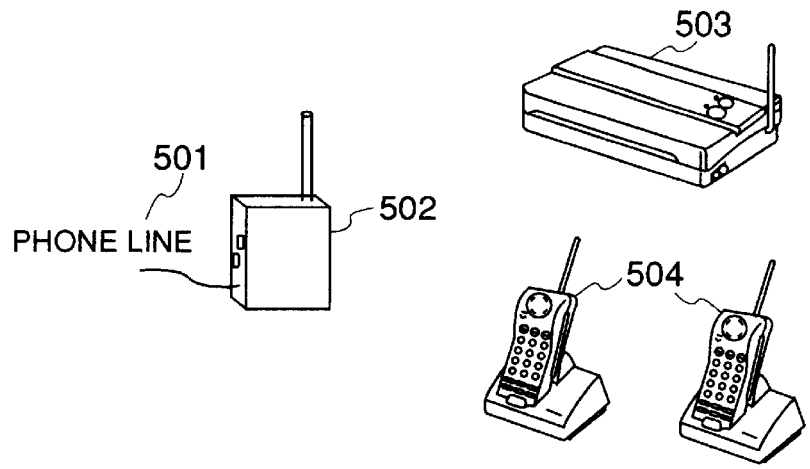
FIG. 26 is a perspective view showing the equipment configuration of a facsimile system according to a second embodiment of the invention.
Figure 27:
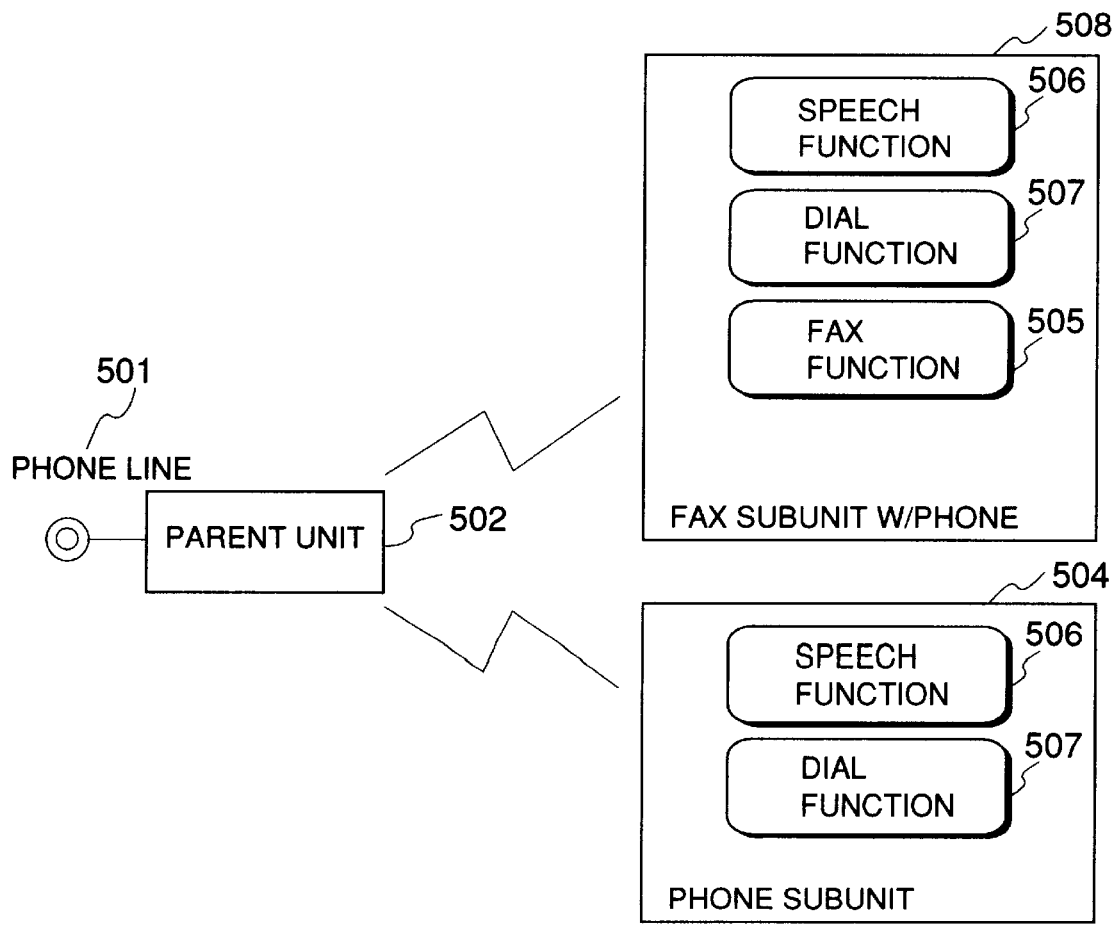
FIG. 27 is a block diagram showing the equipment configuration of various devices in FIG. 26.

As shown in FIG. 26, the embodiment under consideration comprises the parent unit 502 connected to the telephone line 501, the telephone subunit 504 described in the preceding embodiment and the facsimile subunit with telephone 508. The facsimile subunit with telephone 508 includes a handset 509, which is connected to the facsimile subunit with telephone 508 by a curl cord 510. FIG. 27 shows a functional configuration of the respective devices in FIG. 26. The functional configuration of the parent unit 502 and the telephone subunit 504 was described in the preceding embodiment with reference to FIG. 3. The facsimile subunit with telephone 508 includes a speech function 506 and a dial function 507 in addition to the above-mentioned functions of the facsimile subunit 503 of the preceding embodiment.

Figure 28:
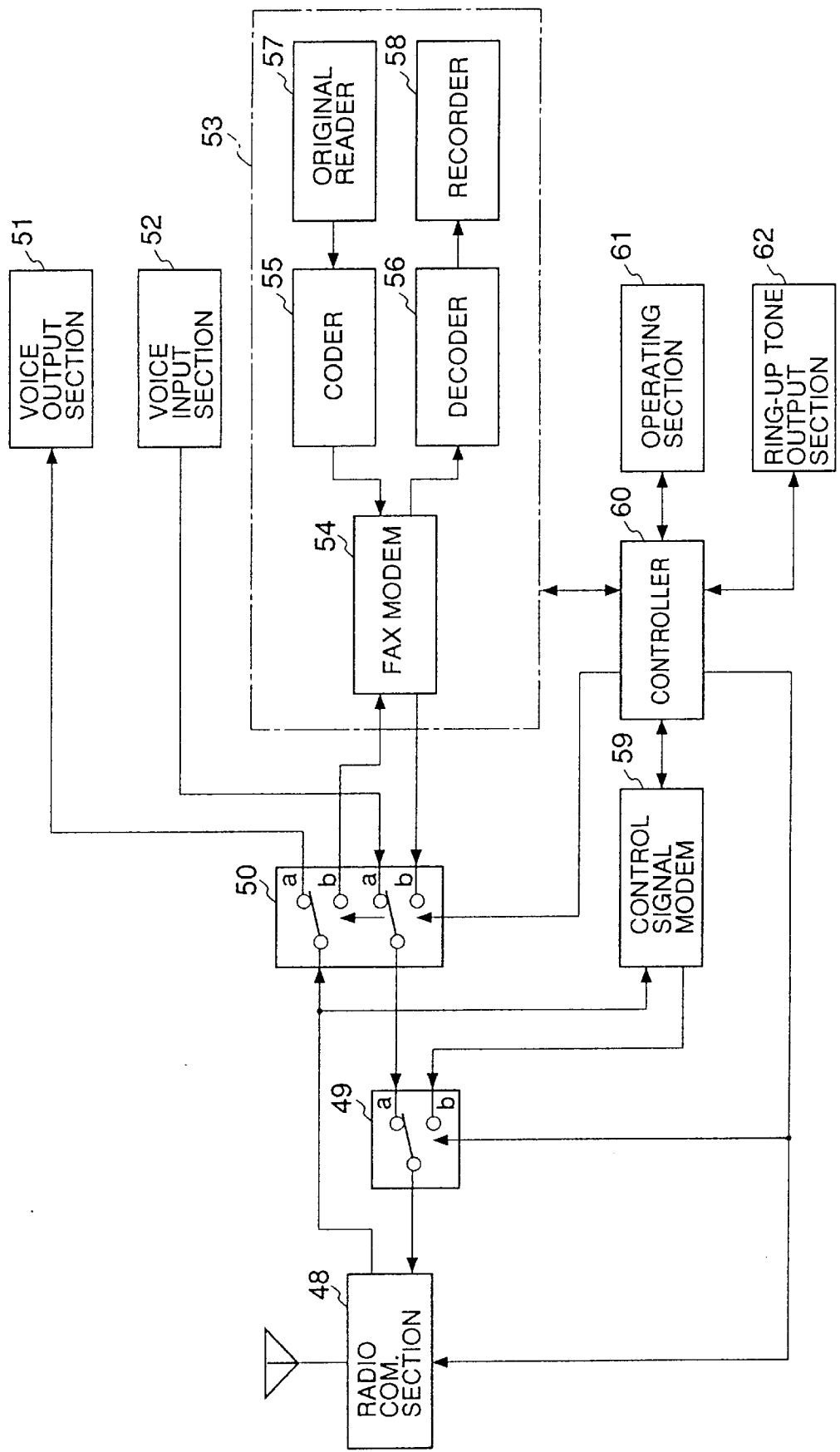
FIG. 28 is a block diagram showing the internal configuration of a facsimile subunit 508 with telephone in FIG. 26.

Now, explanation will be made about a configuration of the facsimile subunit with telephone 508 with reference to FIG. 28. A radio communication section 48 is for carrying out radio communication with the radio communication section 5 of the parent unit 502. Numeral 53 designates a facsimile signal processor including a fax modem 54, an encoder 55, a decoder 56, an original reader 57 and a recorder 58. Numeral 51 designates a voice output section, and numeral 52 a voice input section for effecting output and input of the voice in speech mode. Normally, the voice output of the voice output section 51 is effected through the speaker, and the voice input of the voice input section 52 through the microphone. According to this embodiment, the voice input section 52 and the voice output section 51 include a handset 509 shown in FIG. 26. Numeral 50 designates a telephone/facsimile change-over switch. This switch is connected to side a when the facsimile subunit with telephone 508 is used as a telephone, and to side b when it is used as a facsimile. In facsimile receiving operation, the signal transmitted by the parent unit 502 and received by the radio communication section 48 is demodulated by the fax modem 54, decoded as image information by the decoder 56, and outputted by the recorder 58. Normally, the recorder 58 includes a thermal printer or the like for printing the image information on thermal paper. In facsimile transmission, on the other hand, the original to be transmitted is read as image information by the original reader 57, encoded by the encoder 55, modulated by the fax modem 54 and transmitted by the radio communication section 48 to the parent unit 502. Numeral 59 designates a control signal converter for modulating and demodulating the control signal for radio communication with the parent unit 502. Numeral 49 designates a radio communication change-over switch. When this switch is connected to side a, the signal output of the control signal modem 54 or the voice input section 52 is applied, and when the switch is connected to side b, the signal output of the control signal modem 59 is applied, respectively, to the radio communication section 48. Numeral 61 designates an operating section including an operating unit and a display unit required for operating the facsimile subunit with telephone 508. The configuration of the operating section 61 will be described later. Numeral 62 designates a ring-up tone output section for sounding the ring-up tone. Numeral 60 designates a controller for controlling the operation of the facsimile subunit with telephone 508 by controlling the various blocks described above.

Figure 29:
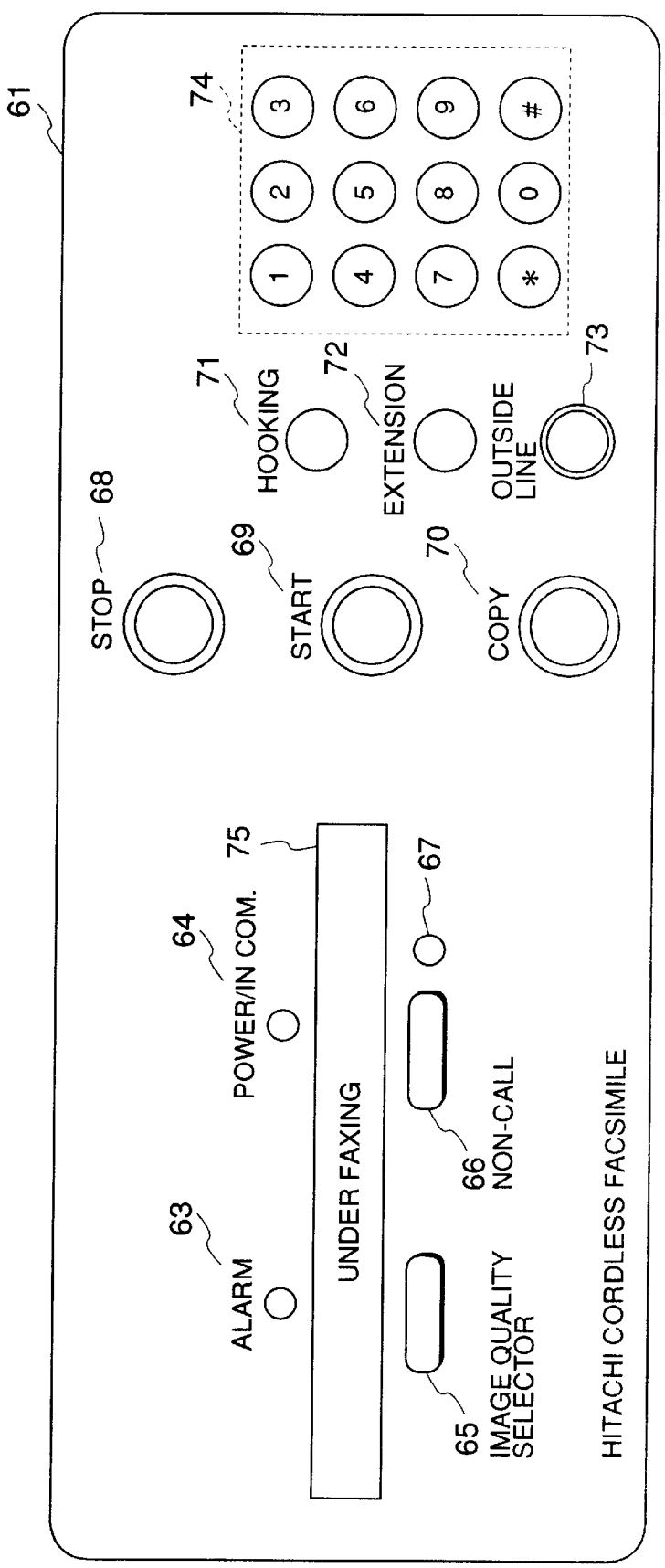
FIG. 29 is a diagram for explaining the configuration of the operating section 61 of the facsimile subunit 508 with telephone in FIG. 28.

FIG. 29 shows a configuration of the operating section 61 of the facsimile subunit with telephone 508. The operating section 61 includes a liquid crystal display unit 75 for indicating the operating conditions, the telephone number and the method of operation of the facsimile subunit with telephone 508, a stop button 68 for instructing the facsimile subunit with telephone 508 to stop the operation, a start button 69 for instructing the facsimile subunit with telephone 508 to start facsimile communication, a copy button 70 for instructing the copying operation to be started, an alarm lamp 63 for indicating an abnormal condition which may occur in the facsimile subunit with telephone 508, a power/in-communication lamp 64 for indicating that the facsimile communication is under way, an image quality selection button 66 for selecting the image quality of the original to be transmitted by facsimile or to be copied, a non-call button 66 for selecting the telephone priority system or the facsimile priority system as a method of telephone/facsimile automatic switching function, a non-call lamp 67 for indicating that the facsimile priority system is selected as a method of telephone/facsimile automatic switching function, a line wire button 73, an extension button 72, a dial button 74 and a hooking button 71. The line wire button 73 is depressed for making a telephone call and has a line wire lamp built therein. The extension button 72, on the other hand, is depressed for calling the telephone subunit 504, and has an extension lamp built therein. The dial button 74 is for dialling the telephone number, and the hooking button 71 for designating the hooking operation during speech. According to this embodiment, as described above, a method of telephone/facsimile automatic switching is selected between the telephone priority system and the facsimile priority system by the user. When the telephone priority system is selected, the non-call lamp 67 is turned off.

Assuming that the non-call button 66 is depressed under this condition, the facsimile priority system is selected as the method of telephone/facsimile automatic switching operation, with the non-call lamp 67 turned on. The flow of operation for performing this setting will be described later.

The COPY button 70 is used for performing the copying operation using the facsimile subunit with telephone 508. The copying function which is not directly related to the invention will be briefly described. When the user of the facsimile subunit with telephone 508 wants to make a copy, he sets the original to be copied on the original reader 57 of the facsimile subunit with telephone 508 and depresses the COPY button 70. Upon depression of the COPY button 70, the controller 60 of the facsimile subunit with telephone 508 sends the image information of the original read from the original reader 57, which image information is produced from the recorder 58.

In facsimile transmission or copying operation, the image quality of the original is selected by the image quality selection button 65. The method of image quality selection according to the present embodiment will be explained. When the original is set on the original reader 57, the controller 60 of the facsimile subunit with telephone 508 displays NORMAL, for example, as an image quality normally used. In the case where the user of the facsimile subunit with telephone 508 wants to use an image quality other than NORMAL, he depresses the image quality selection button 65. Each time of depression of the image quality selection button 65, the indication on the liquid crystal display section 75 changes from FINE to SUPER to HALFTONE. Another depression returns the indication to NORMAL. This combination of image qualities including NORMAL, FINE, SUPER and HALFTONE is only an example of image quality choice.

The non-call button 66, as described above, is for selecting the method of telephone/facsimile automatic switching operation. The flow of operation executed when the non-call button 66 is depressed will be explained. The controller 60 of the facsimile subunit with telephone 508, upon depression of the non-call button 66, controls the radio communication section 48 to connect the parent unit 502 by radio. In the process, the radio transmission change-over switch 49 of the facsimile subunit with telephone 508 is connected to side b, so that the control signal required for radio connection with the parent unit 502 is modulated by the control signal modem 59 and sent to the radio communication section 48. After radio connection is complete, the controller 60 of the facsimile subunit with telephone 508 sends to the parent unit 502 a control signal indicating that the non-call button 66 was depressed, i.e., that the method of telephone/facsimile automatic switching operation was turned. In the parent unit 502, the signals transmitted by the facsimile subunit with telephone 508 are received at the radio communication section 5, demodulated at the control signal modem 6, and sent to the controller 9 of the parent unit 502. The controller 9 of the parent unit 502 holds the information as to which system, telephone priority or facsimile priority, is presently selected as the method of telephone/facsimile automatic switching operation. Upon receipt of the control signal indicating the depression of the non-call button 66 from the facsimile subunit with telephone 508, the controller 9 switches the telephone priority system, if so set presently as the method of telephone/facsimile automatic switching operation, to the facsimile priority system, and the facsimile priority system, if so presently set, to the telephone priority system. Further, the controller 9 causes the control signal modem 6 to modulate the signal indicating whether the newly-set method of telephone/facsimile automatic switching operation is the telephone priority system or the facsimile priority system, and also causes the radio communication section 5 to transmit the resulting signal to the facsimile subunit with telephone 508. In the process, the radio transmission change-over switch 4 of the parent unit 502 is connected to side b. In the facsimile subunit with telephone 508, the information sent by the parent unit 502 is received by the radio communication section 48, demodulated by the control signal modem 59 and sent to the controller 60 of the facsimile subunit with telephone 508. The controller 60 turns off the non-call lamp 67 of the operating section 61 when the newly-set method of telephone/facsimile automatic switching operation is the telephone priority system, and turns on the non-call lamp 67 when the method is the facsimile priority system. In this way, according to this embodiment, the method of telephone/facsimile automatic switching operation is selectable between the telephone priority system and the facsimile priority system. Which priority system is to be used can be set by operating the facsimile subunit with telephone 508. The information as to which system is selected is held in the parent unit 502.

Now, explanation will be made about the telephone/facsimile automatic switching operation with the telephone priority system selected as the method of telephone/facsimile automatic switching operation, i.e., with the non-call lamp 42 of the telephone subunit 504 and the non-call lamp 67 of the facsimile subunit with telephone 508 turned off. FIGS. 30 to 33 show the flow of general operation in the facsimile subunit with telephone 508, the telephone subunit 504 and the parent unit 502 combined, and FIGS. 34 to 40 that of the operation for radio communication of the parent unit 502 with the facsimile subunit with telephone 508 and the telephone subunit 504. The method of radio communication between the parent unit 502 and the facsimile subunit with telephone 508 or the telephone subunit 504 is the same as the method of radio communication for the well-known cordless telephone using the control channel and the speech channel. The very nature of radio communication, therefore, will not be described herein.

Figure 30:
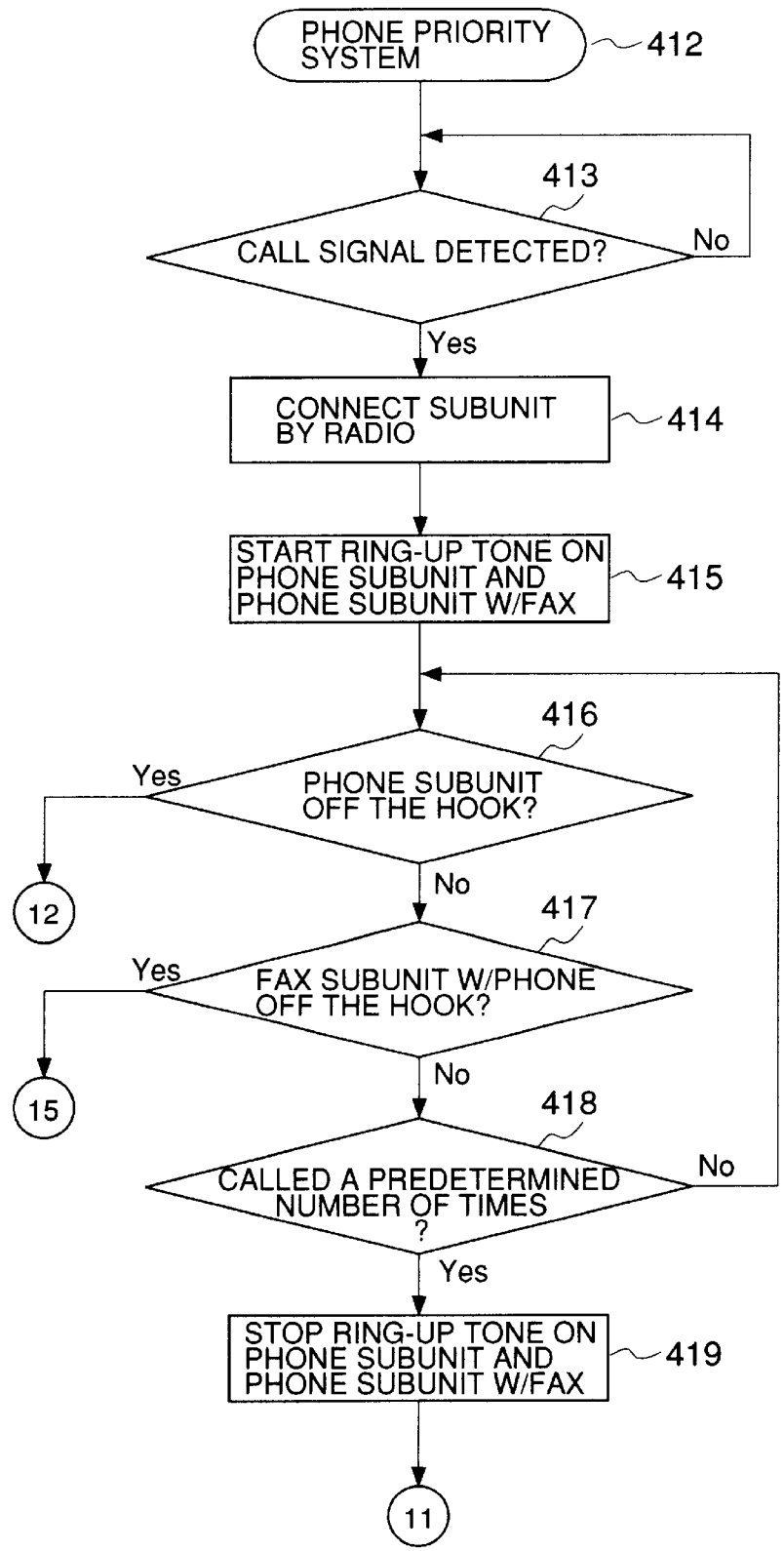
FIG. 30 is a flowchart showing a part of the operation flow in the telephone priority system according to the second embodiment.
Figure 34:
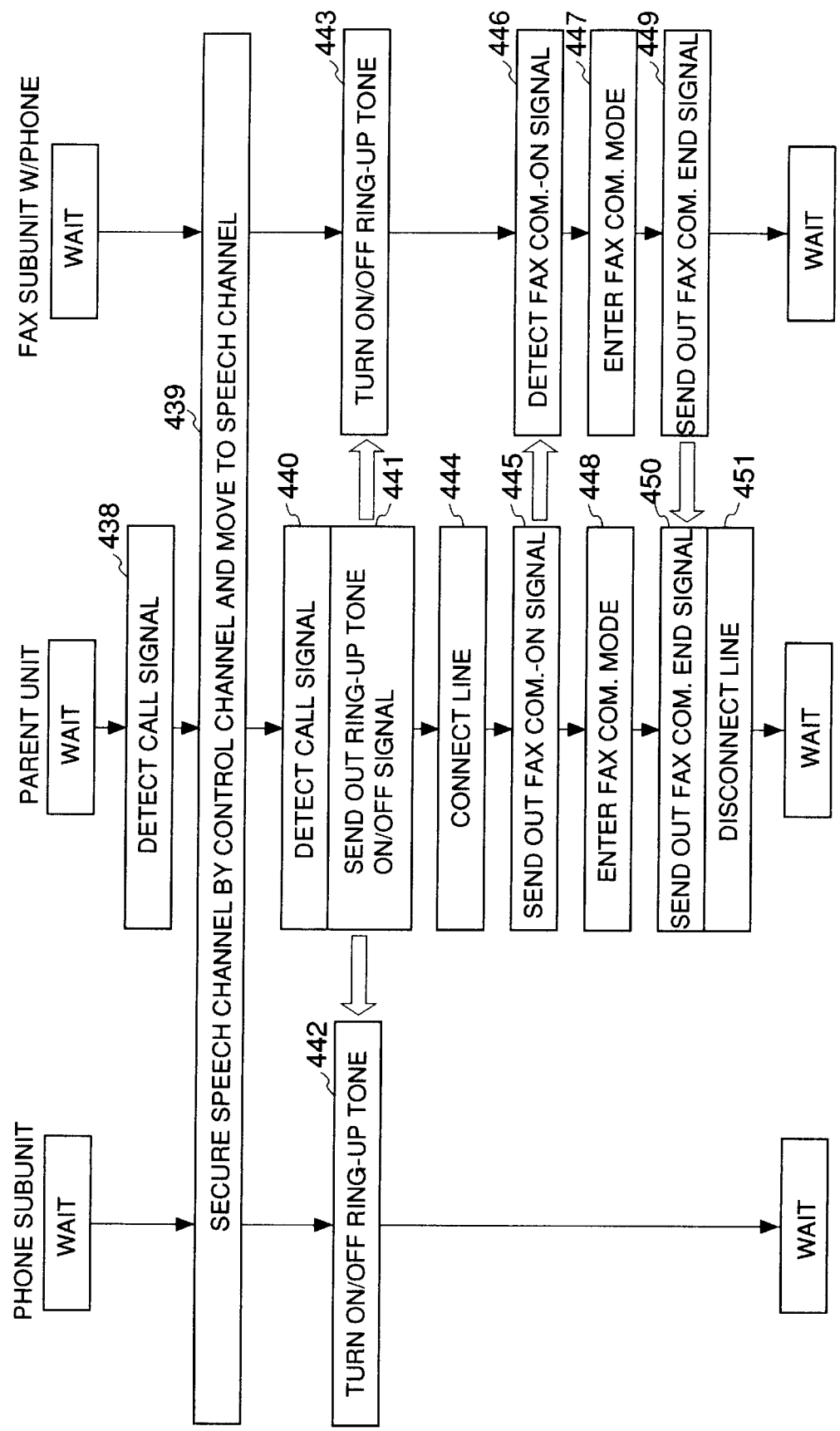
FIG. 34 is a flowchart showing the operation flow for radio communication in the telephone priority system according to the second embodiment.

As shown with the telephone priority system in FIG. 30, the controller 9 of the parent unit 502 detects whether a call signal is sent from the telephone line by the call signal detector 12 in the waiting mode (step 413). Upon detection of the arrival of a call signal from the telephone line by the call signal detector 12, the controller 9 connects the telephone subunit 504 and the facsimile subunit with telephone 508 by radio communication (step 414). The flow of operation for radio communication will be explained with reference to FIG. 34. As shown in FIG. 34, upon detection of a call signal at the parent unit (step 438), the control channel secures the speech channel and the process proceeds to the speech channel (step 439).

The flow of operation for step 439 will be explained with reference to FIGS. 4, 6 and 28.

The parent unit 502 confirms the unoccupied state of the control channel through the radio communication section 5, and after so confirming, sends out a signal to the facsimile subunit with telephone 508 designating the radio connection by use of the control channel. In the process, the controller 9 connects the radio transmission change-over switch 4 to side b, and while controlling the control signal modem 6, sends out a signal designating the radio connection to the radio communication section 5. The signal designating the radio connection (hereinafter called "the connecting designating signal") is transmitted together with the data on the speech channel the unoccupied state of which was confirmed by the radio communication section 5 of the parent unit 502 immediately before the detection of the call signal at step 439. Also, the radio communication is carried out by time division between the telephone subunit 504 and the facsimile subunit with telephone 508 sharing the same control channel. In the facsimile subunit with telephone 508, the radio signal sent from the parent unit 502 is received at the radio communication section 48, and demodulated at the control signal modem 59. Also, the controller 60 of the facsimile subunit with telephone 508 and the controller 24 of the telephone subunit 504, upon confirmation that the connection designating signal is sent from the parent unit 502, send out the connection confirming signal to the parent unit 502 as a response signal. More specifically, in the telephone subunit 504, the controller 24 connects the radio transmission change-over switch 27 to side b, and while controlling the control signal modem 28, sends out the connection confirming signal to the radio communication section 26. In the facsimile subunit with telephone 508, on the other hand, the controller 60 connects the radio transmission change-over switch 49 to side b, and while controlling the control signal modem 59, sends out the connection confirming signal to the radio communication section 48. The telephone subunit 504 and the facsimile subunit with telephone 508, after sending out the connection confirming signal to the parent unit 502, moves to the speech channel. The speech channel involved is selected by the data of the channel by which the connection designating signal is sent out. Also, the parent unit 502, upon receipt of a connection designating signal sent from the facsimile subunit with telephone 508 and the telephone subunit 504, i.e., upon detection of a connection designating signal by the control signal modem 6 from the signal received at the radio communication section 5, moves to the speech channel. The telephone subunit 504 and the facsimile subunit with telephone 508, after moving to the speech channel, confirms the unoccupied state of the particular speech channel. If the speech channel is unoccupied, a speech channel movement end signal is sent to the parent unit 502 through the speech channel. The signal flow for this operation is the same as in sending out the connection confirming signal for the control channel described above. The controller 9 of the parent unit 502, as when receiving the connection confirming signal by way of the control channel described above, receives the speech channel movement end signal sent out by the telephone subunit 504 and the facsimile subunit with telephone 508. As a result, the movement of the parent unit 502, the facsimile subunit with telephone 508 and the telephone subunit 504 to the speech channel is completed.

Upon complete radio connection of the parent unit 502 with the telephone subunit 504 and the facsimile subunit with telephone 508 at step 414 in FIG. 30, the parent unit 502 starts the telephone ring-up tone of the telephone subunit 504 and the facsimile subunit with telephone 508 (step 415). The parent unit 502 continues to sound the ring-up tone of the telephone subunit 504 and the facsimile subunit with telephone 508 while checking whether the telephone subunit 504 has been placed off the hook (step 416), whether the facsimile subunit with telephone 508 has been placed off the hook (step 417) and whether the ring-up tone of the facsimile subunit 504 and the facsimile subunit with telephone 508 have been sounded a predetermined number of times (step 418). The flow of operation for radio communication involved will be explained with reference to FIG. 34. As shown in FIG. 34, the ring-up tone of the telephone subunit 504 and the facsimile subunit with telephone 508 is sounded in such a manner that the call signal from the telephone line is detected (step 440), while sending out to the telephone subunit 504 and the facsimile subunit with telephone 508 a signal urging the sounding of the ring-up tone (ring-up tone-on signal) and a signal urging the stopping of the ring-up tone (ring-up tone-off signal) from the parent unit 502 in synchronism with the turning on/off of the call signal (step 441). Upon receipt of the call signal-on signal at the telephone subunit 504 and the facsimile subunit with telephone 508, the telephone ring-up tone is started, and upon receipt of a call signal-off signal, the sounding of the telephone ring-up tone is stopped (steps 442, 443). The process executed upon detection that the telephone subunit 504 is placed off the hook at step 416 and the facsimile subunit with telephone 508 is placed off the hook at step 417 will be described later.

The flow of operation for sounding the telephone ring-up tone at steps 440 to 443 will be explained with reference to FIGS. 4, 6 and 30. The parent unit 502 detects the ring-up tone sent from the telephone line by the call signal detector 12. The detection of the call signal continues to be effected at step 413 in FIG. 30 following the detection of a call signal. The controller 9 connects the radio transmission change-over switch 4 to side b, and in accordance with the on/off state of the call signal detected by the call signal detector 12, controls the control signal modem 6 thereby to send out the ring-up tone-on signal and the ring-up tone-off signal to the radio communication section 5. The telephone subunit 504 causes the control signal modem 28 to demodulate the signal received at the radio communication section 26. In the case where the arrival of the ring-up tone-on signal or the ring-up tone-off signal from the parent unit is detected at the control signal modem 28, the controller 24 controls the ring-up tone output section 25 to start the telephone ring-up tone. In other words, upon detection of a ring-up tone-on signal, the controller 24 turns on the ring-up tone output of the ring-up tone output section 25, while upon detection of a ring-up tone-off signal, turns off the ring-up tone output of the ring-up tone output section 25. The facsimile subunit with telephone 508 causes the control signal modem 59 to demodulate the signal received at the radio communication section 48. The controller 60, upon detection of the arrival of the ring-up tone-on signal or the ring-up tone-off signal from the parent unit 502 at the control signal modem 59, controls the ring-up tone output section 62 to start the telephone ring-up tone. More specifically, whenever the ring-up tone-on signal is detected, the controller 60 turns on the ring-up tone output of the ring-up tone output section 62, while upon detection of a ring-up tone-off signal, turns off the ring-up tone output of the ring-up tone output section 62.

Explanation will be made about the process executed when the telephone subunit 504 or the facsimile subunit with telephone 508 failed to be placed off the hook in spite of the ring-up tone having been sounded a predetermined number of times on the telephone subunit 504 or the facsimile subunit with telephone 508 at step 418 in FIG. 30. In this case, first, the ring-up tone on the telephone subunit 504 and the facsimile subunit with telephone 508 is stopped (step 419). As described above, the ring-up tone of the telephone subunit 504 and the facsimile subunit with telephone 508 is sounded in such a manner that the ring-up tone-on signal and the ring-up tone-off signal are alternately transmitted by the parent unit 502 to the telephone subunit 504 and the facsimile subunit with telephone 508 in synchronism with the call signal sent from the telephone line. If the ring-up tone of the telephone subunit 504 or the facsimile subunit with telephone 508 is to be stopped, therefore, the ring-up tone-on signal and the ring-up tone-off signal are prevented from being transmitted at or after the time of transmission of the ring-up tone-off signal. After stopping the sounding of the telephone ring-up tone of the telephone subunit 504 and the facsimile subunit with telephone 508, the parent unit 502 connects the telephone line (step 420 in FIG. 31 and step 444 in FIG. 34). In other words, in FIG. 4, the controller 9 turns on the line connection relay 2. As a result, the telephone line connected to the line wire connection terminal 1 is connected to the two-wire/four-wire converter 3, thereby connecting the telephone line to the parent unit 502. Then, the controller 9 connects the line transmission change-over switch 7 to side b, and causes the voice response generator 8 to start sending out a voice response (step 421). The contents of the voice response thus sent out are, for example, "I am away from home now. Please call again later. Facsimile data may be transmitted now." As seen from this, the other party is informed that although the telephone cannot be answered, the facsimile receiving operation is possible. The controller 9 continues to detect by the CNG signal detector 11 whether the CNG signal is sent from the other party (step 423) until the voice response generator 8 ends the transmission of a voice response (step 424). Assume that the arrival of the CNG signal from the other party is detected by the CNG signal detector 11 at step 423. The controller 9 stops sending out the voice response by the voice response generator 8 (step 425), and transfers the control operation to the facsimile reception by the facsimile subunit with telephone 508 (step 428). This is also the case (step 426) when the CNG signal failed to be detected by the CNG signal detector 11 before complete transmission of the voice response from the voice response generator 8.

Figure 31:
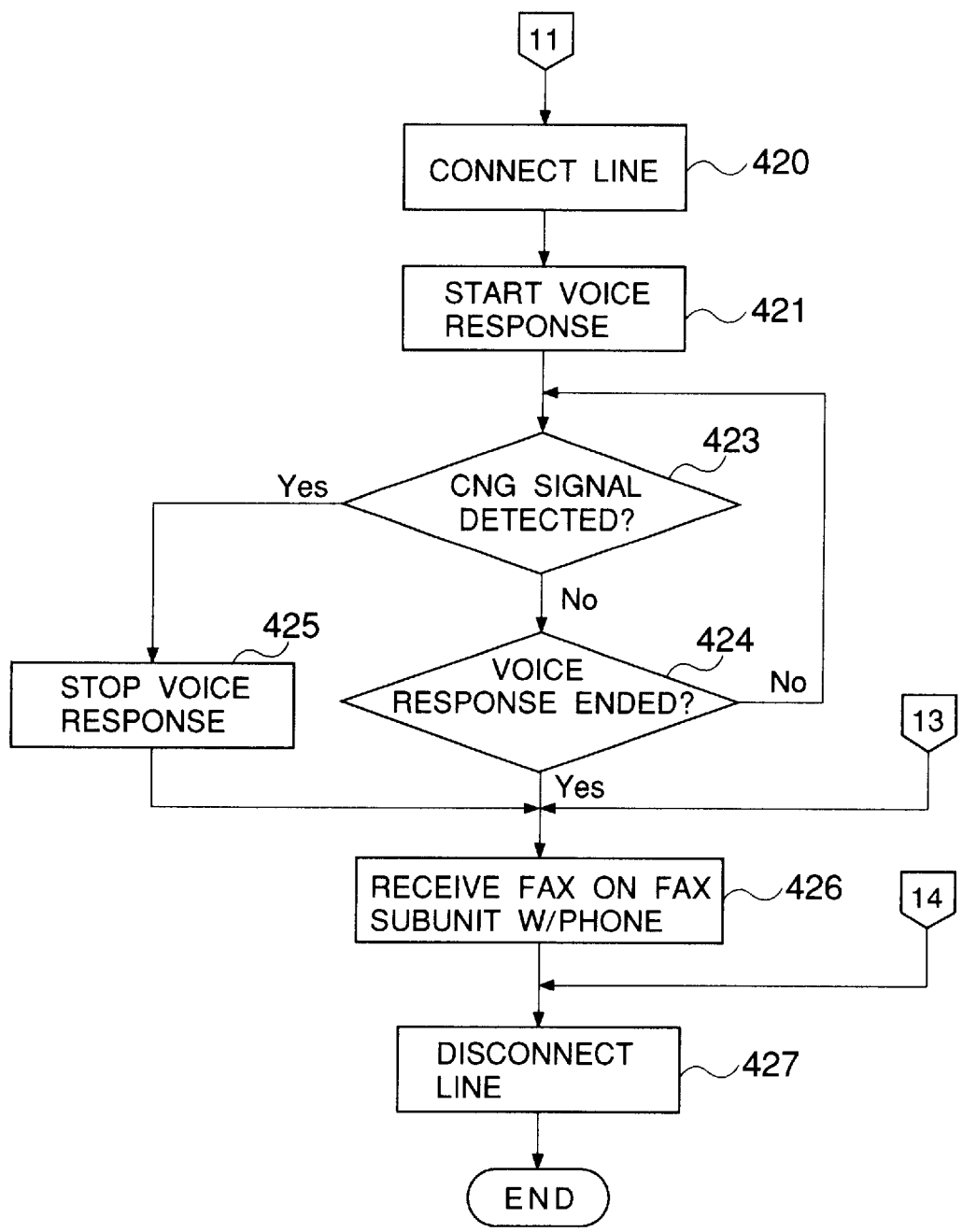
FIG. 31 is a flowchart showing another part of the operation flow in the telephone priority system according to the second embodiment.

Explanation will be made with reference to FIG. 34 about the flow of operation performed for communication in the facsimile receiving operation on the facsimile subunit with telephone 508 at step 426 in FIG. 31. The controller 9 of the parent unit 502 connects the radio transmission change-over switch 4 to side b, and sends out a fax communication-on signal to the facsimile subunit with telephone 508 by way of the control signal modem 6 (step 445). This fax communication-on signal is transmitted by use of the speech channel like the ring-up tone-on signal or the ring-up tone-off signal to the telephone subunit 504 described above. The controller 9 of the parent unit 502, after transmitting the fax communication-on signal, connects the radio transmission change-over switch 4 to side a, and further connecting the line transmission change-over switch 7 to side a, introduces the fax communication mode (step 448). Under this condition, in the parent unit 502, the signal arriving from the telephone line connected to the line wire connection terminal 1 is sent through the two-wire/four-wire converter 3 to the radio communication section 5 and then to the facsimile subunit with telephone 508. The signal arriving from the facsimile subunit with telephone 508 by radio, on the other hand, is received by the radio communication section 5, and through the two-wire/four-wire converter 3, is sent out to the telephone line connected to the line wire connection terminal 1. With the facsimile subunit with telephone 508, upon detection that the fax communication-on signal transmitted from the parent unit 502 has been received by the control signal modem 59 at step 445 (step 446), the controller 60 connects the radio transmission change-over switch 49 to side a and also the telephone/facsimile change-over switch 50 to side b, thereby introducing the fax communication mode (step 447). Under this condition, the signal transmitted by the parent unit 502 and received by the radio communication section 48 is applied to the fax modem 54, and the signal produced from the fax modem 54 is transmitted to the parent unit 502 by the radio communication section 48. With the parent unit 502 and the facsimile subunit with telephone 598 both in fax communication mode, i.e., with the parent unit 502 at step 448 and the facsimile subunit with telephone 508 at step 447, therefore, the signal arriving from the telephone line connected to the line wire connection terminal 1 of the parent unit 502 is sent out to the fax modem 54 of the facsimile subunit with telephone 508 by radio communication, and the signal produced by the fax modem 54 to the telephone line connected to the line wire connection terminal 1 of the parent unit 502 by radio communication. Under this condition, the facsimile signal transmitted from the other party of speech is received. The facsimile signal transmitted from the other party is demodulated at the fax modem 54, decoded at the decoder 56 into image information, and produced in the recorder 58.

Upon complete reception of facsimile signal on the facsimile subunit with telephone 508, the facsimile subunit with telephone 508 sends a fax communication end signal to the parent unit 502 (step 449). The controller 60 of the facsimile subunit with telephone 508 connects the radio transmission change-over switch 49 to side b, and while producing the fax communication end signal by way of the control signal modem 9, sends it out to the parent unit 502 through the radio communication section 48. The controller 9 of the parent unit 502, upon detection that the fax communication end signal has arrived from the facsimile subunit with telephone 508 through the control signal modem 6 (step 450), turns off the line connection relay 2 thereby to disconnect the telephone wire (step 427 in FIG. 31, and step 451 in FIG. 34). After that, the facsimile subunit with telephone 508, the telephone subunit 504 and the parent unit 502 enter the waiting mode.

Figure 35:
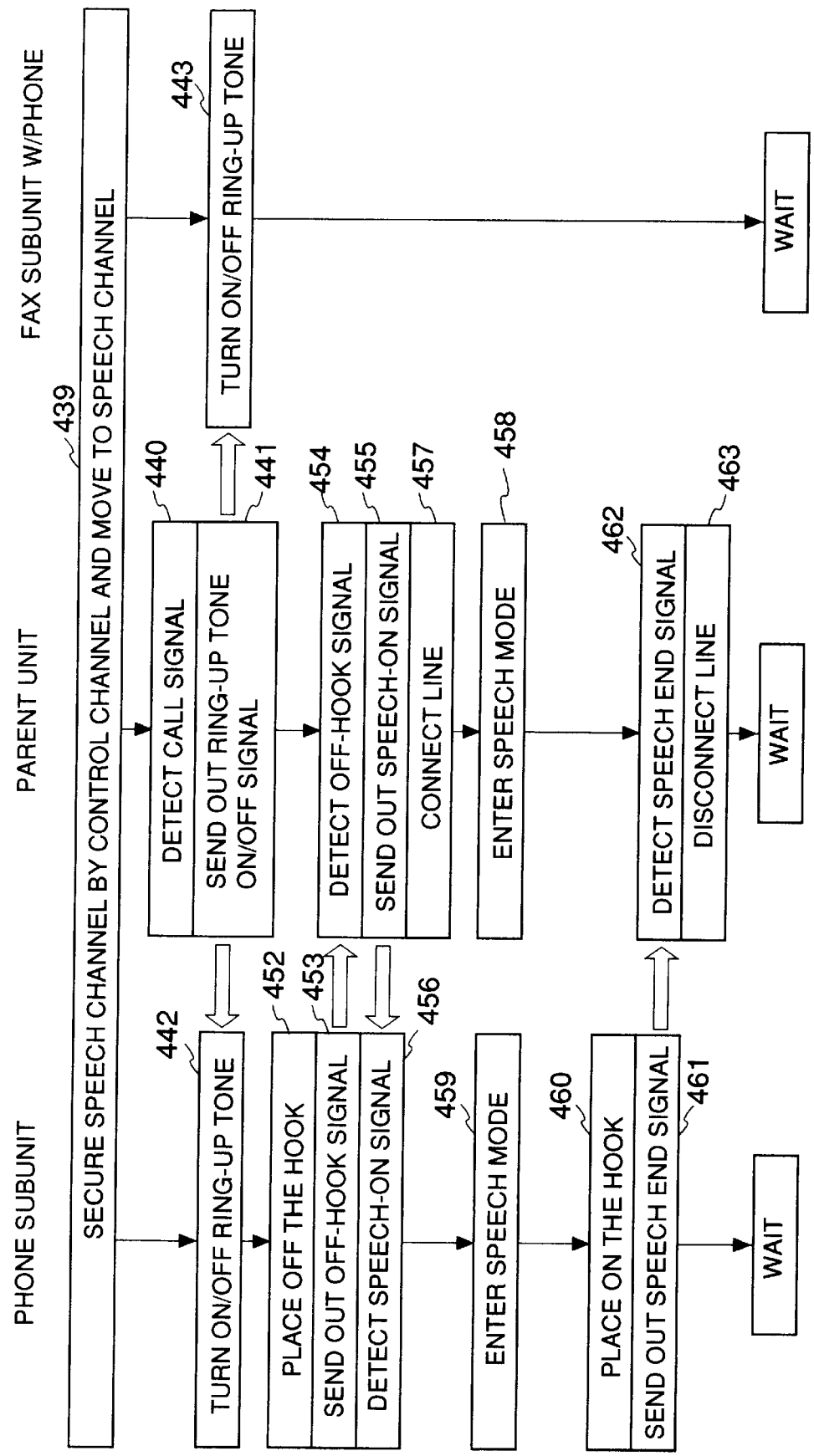
FIG. 35 is a flowchart showing the operation flow for radio communication with the telephone subunit hooked off in the telephone priority system according to the second embodiment.

Now, the control operation performed upon detection that the telephone subunit 504 is placed off the hook at step 416 in FIG. 30 will be explained. According to the present embodiment, for placing the telephone subunit 504 off the hook against the ring-up tone on the telephone subunit 504, the line wire button 45 of the operating section 31 shown in FIG. 8 is depressed. When the line wire button 45 of the operating section 31 is depressed, the controller 24 of the telephone subunit 504 turns on the line wire lamp built in the line wire button 45 in order to indicate that speech is going on. Explanation will be made about the process performed when the telephone subunit 504 is placed off the hook against a telephone call with reference to FIG. 35. In FIG. 35, the operation for moving to the speech channel (step 439) and for controlling the sounding of the ring-up tone of the telephone subunit 504 and the facsimile subunit with telephone 508 (steps 440 to 443) are the same as that described above with reference to FIG. 34. The controller 24 of the telephone subunit 504, upon depression of the line wire button 45 of the operating section 31 as described above, i.e., when the telephone subunit 504 is placed off the hook (step 452), sends out an off-hook signal to the parent unit 502 (step 453). In the process, the controller 24 of the telephone subunit 504 connects the radio transmission change-over switch 27 to side b, sends out an off-hook signal to the radio communication section 26 by the control signal modem 28, and transmits it by radio to the parent unit 502. The controller 9 of the parent unit 502, upon detection of the off-hook signal arriving from the telephone subunit 504 by way of the control signal modem 6 (step 454), sends out a speech-on signal to the telephone subunit 504 (step 455). At the same time, the controller 9 of the parent unit 502 connects the radio transmission change-over switch 4 to side b, sends out the speech-on signal to the radio communication section 5 by way of the control signal modem 6, and transmits it by radio to the telephone subunit 504. After that, the controller 9 of the parent unit 502 connects the radio transmission change-over switch 4 to side a and the line transmission change-over switch 7 to side a, while turning on the line connection relay 2 thereby to connect the line (step 428 in FIG. 32 and step 457 in FIG. 35). As a result, the parent unit 502 enters the speech mode (step 458), and the signal sent from the telephone line connected to the line wire connection terminal 1 is applied through the two-wire/four-wire converter 3 to the radio communication section 5 and further to the telephone subunit 504, while the signal arriving from the telephone subunit 504 is received at the radio communication section 5 and is sent out to the telephone line through the two-wire/four-wire converter 3. The controller 24 of the telephone subunit 504 that has detected the speech-on signal transmitted from the parent unit 502 (step 456), on the other hand, connects the radio transmission change-over switch 27 to side a. As a result, the telephone subunit 504 enters the speech mode (step 459), and the signal received at the radio communication section 26 is applied to the voice output section 29 from which it is produced as a voice output. At the same time, the voice applied from the voice input section 30 is transmitted to the parent unit 502 by the radio communication section 26. Since the parent unit 502 and the telephone subunit 504 both enter the speech mode, conversation is established on the telephone subunit 504 (step 429 in FIG. 32).

Figure 32:
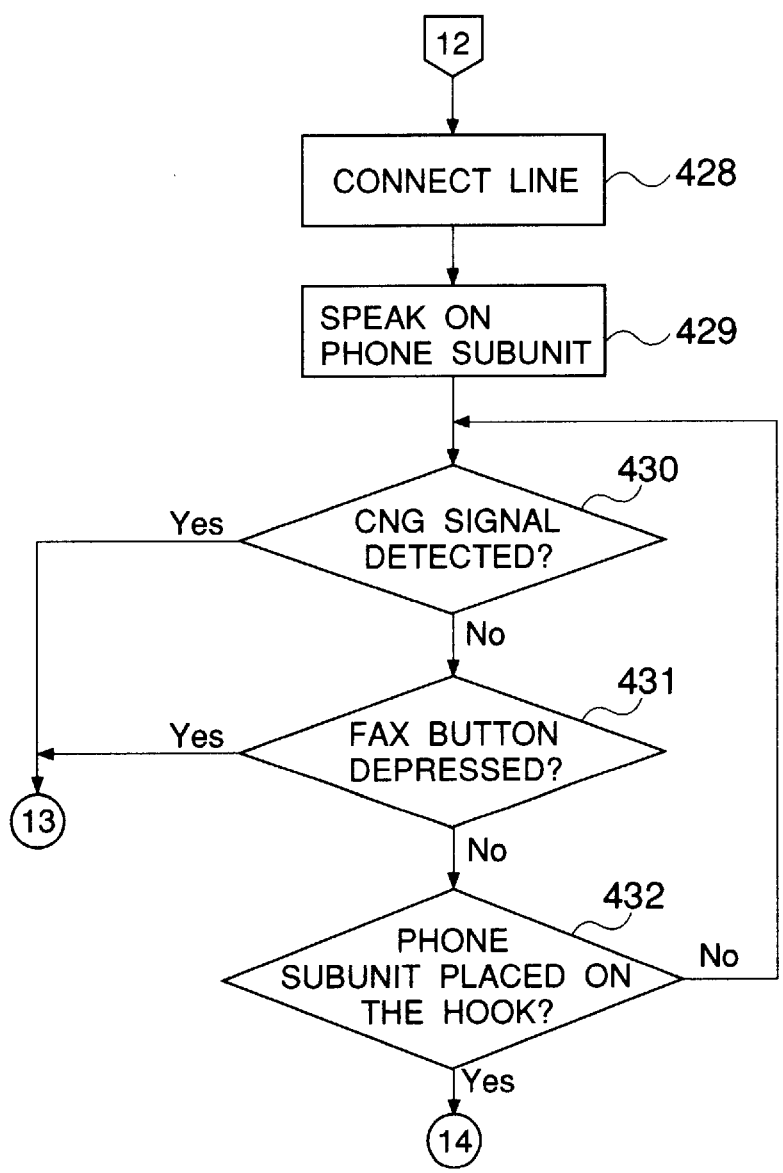
FIG. 32 is a flowchart showing still another part of the operation flow in the telephone priority system according to the second embodiment.

While the telephone subunit 504 is in speech as described above, the parent unit 502 continues to detect whether the CNG signal has been sent from the other party (step 430 in FIG. 32) or whether the FAX button on the telephone subunit 504 has been depressed (step 431 in FIG. 32) until the telephone subunit 504 is placed on the hook (step 432 in FIG. 32). The process of operation to be executed in the case where the CNG signal is detected at step 430 or where the depression of the FAX button 47 is detected at step 431 will be described later. For the time being, explanation will be made about the flow of operation executed when the CNG signal is not detected and the FAX button 47 of the telephone subunit 504 is not depressed before the telephone subunit 504 is placed on the hook, with reference to FIG. 35.

The flow of operation effected in the case where the telephone subunit 504 in speech as described above is placed off the hook, i.e., the telephone is hung up, will be explained with reference to FIG. 35. In hanging up the telephone on the telephone subunit 504 according to the present embodiment, the line wire button 45 is depressed. As described above, when the line wire button 45 is depressed with the ring-up tone of the telephone subunit 504 sounding, the telephone subunit 504 is placed off the hook and the line wire lamp built in the line wire button 45 is turned on. As a consequence, the line wire lamp built in the line wire button 45 is kept on while the telephone subunit 504 is in speech. Assuming that the line wire button 45 is depressed under this condition, the resulting off-the-hook state causes the line wire lamp built in the line wire button 45 to be turned off. More specifically, the controller 24 of the telephone subunit 504, upon detection of the fact that the line wire button 45 of the operating section 31 is depressed during speech (step 460), turns off the line wire lamp built in the line wire button 45 of the operating section 31, and while connecting the radio transmission change-over switch 27 to side b, transmits the speech end signal to the parent unit 502 by way of the control signal modem 28 (step 461). The telephone subunit 504, after transmitting this speech end signal to the parent unit, enters the waiting mode. The controller 9 of the parent unit 502, upon detection of the speech end signal transmitted by the telephone subunit 504 by way of the control signal modem 6 (step 462), turns off the line connection relay 2, thereby disconnecting the telephone line (step 427 in FIG. 31 and step 463 in FIG. 35). After disconnecting the line, the parent unit 502 enters the waiting mode.

Figure 36:
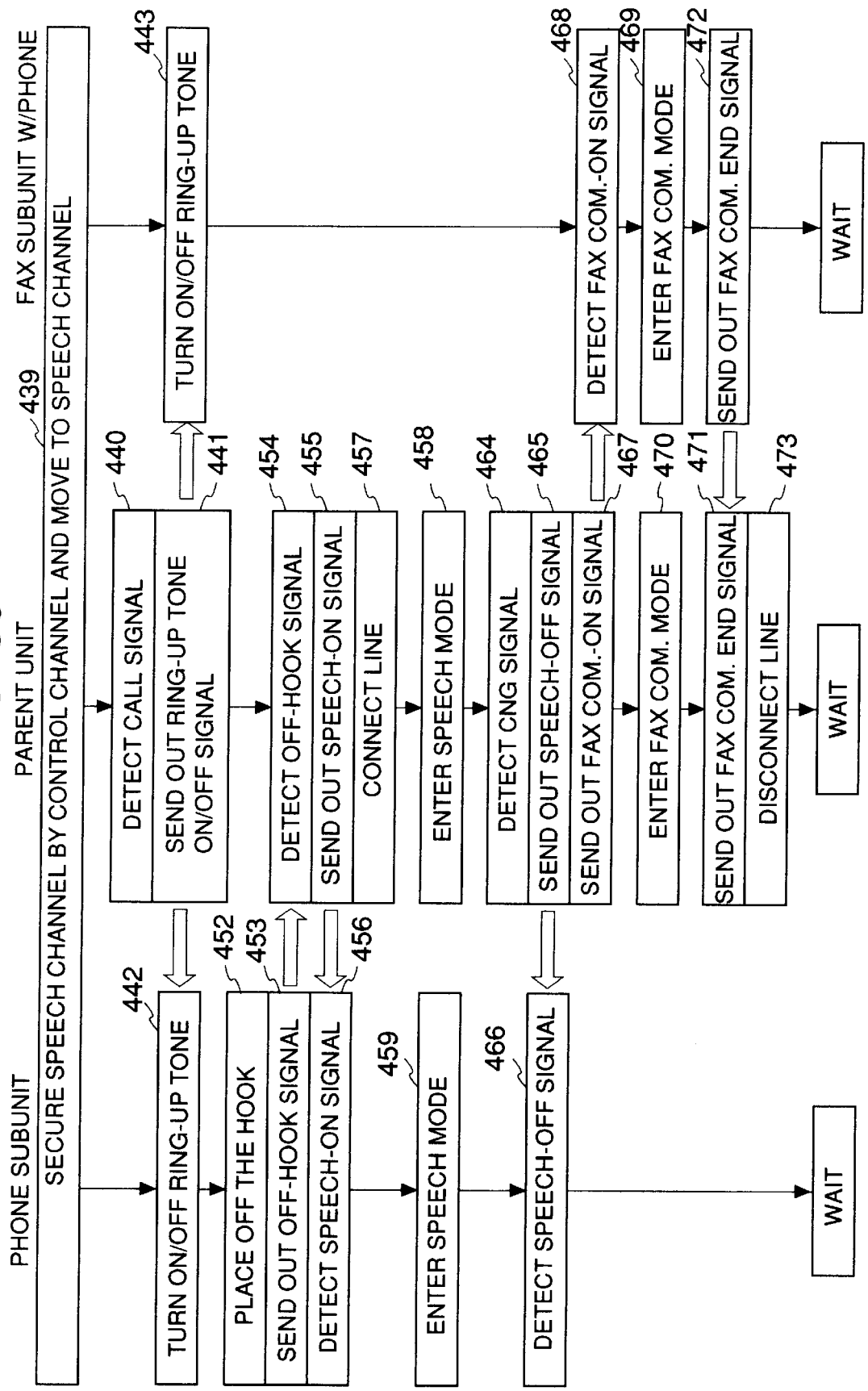
FIG. 36 is a flowchart showing the operation flow for radio communication with the CNG signal detected during conversation on the telephone subunit in the telephone priority system according to the second embodiment.

Now, explanation will be made about the flow of operation performed when the arrival of the CNG signal from the other party is detected at step 430 in FIG. 32. FIG. 36 shows the flow of operation involved. The flow of operation effected before the telephone subunit 504 and the parent unit 502 enter the speech mode (before step 458 for the parent unit 502 and before step 464 for the telephone subunit 504) is the same as the one explained above with reference to FIG. 35. Assume that the arrival of the CNG signal from the telephone line is detected by the CNG signal detector 11 of the parent unit 502 during speech on the telephone subunit 504 (step 464). The parent unit 502 sends out a speech-off signal to the telephone subunit 504 engaged in speech (step 465). More specifically, the radio transmission change-over switch 4 is connected to side b, and the speech-off signal is transmitted to the radio communication section 5 by the control signal modem 6. Upon detection of the speech-off signal by the control signal modem 28 during speech (step 466), the controller 24 of the telephone subunit 504 completes the speech mode and enters the waiting mode. The parent unit 502, after transmitting the speech-off signal to the telephone subunit 504, sends out a fax communication-on signal to the facsimile subunit with telephone 508 to carry out the facsimile receiving operation on the facsimile subunit with telephone 508 (step 426 in FIG. 31). The flow of operation on the parent unit 502 and the facsimile subunit with telephone 508 at and after steps 467 to 473 in FIG. 36 is the same as the one explained above with reference to FIG. 34 (namely, steps 445 to 451).

Figure 37:
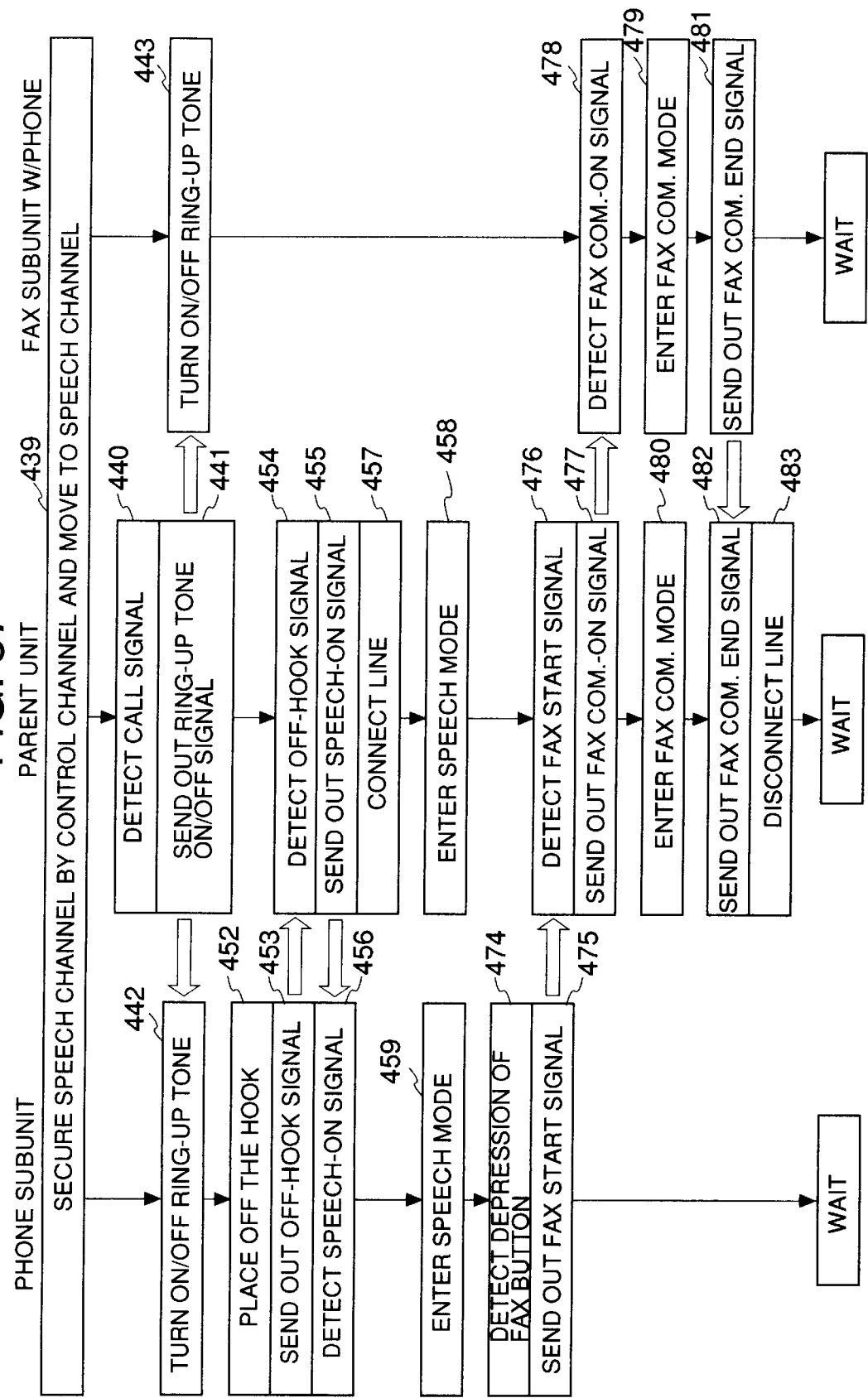
FIG. 37 is a flowchart showing the operation flow for radio communication with the FAX button depressed during conversation on the telephone subunit in the telephone priority system according to the second embodiment.

Now, explanation will be made about the flow of operation performed when the FAX button 47 of the operating section 31 of the telephone subunit 504 is depressed during speech on the telephone subunit 504 at step 431 in FIG. 32. The flow of operation involved is shown in FIG. 37. The flow of operation performed before the telephone subunit 504 and the parent unit 502 enter the speech mode (before step 458 for the parent unit and before step 459 for the telephone subunit) is the same as that explained above with reference to FIG. 35. If the depression of the FAX button 47 of the operating section 31 of the telephone subunit 504 during speech on the telephone subunit 504 is detected by the controller 24 of the telephone subunit 504 (step 474), the fax start signal is transmitted by the telephone subunit 504 to the parent unit 502 (step 475). More specifically, the controller 25 of the telephone subunit 504 connects the radio transmission change-over switch 27 to side b, and causes the control signal modem 28 to send out the fax start signal to the radio communication section 26. Assume that the controller 9 of the parent unit 502 detects the arrival of the fax start signal from the telephone subunit 504 during speech on the telephone subunit 504, i.e., during speech mode by way of the control signal modem 6 (step 476). The fax communication-on signal is sent out to the facsimile subunit with telephone 508 thereby to perform the facsimile receiving operation on the facsimile subunit with telephone 508 (step 426 in FIG. 31). The flow of operation effected on the parent unit 502 and the facsimile subunit with telephone 508 at steps 477 to 483 in FIG. 37 is the same as that explained above with reference to FIG. 34 (namely, steps 445 to 451).

Now, explanation will be made about the control operation effected upon detection of the fact that the facsimile subunit with telephone 508 is placed off the hook at step 417 in FIG. 30. According to this embodiment, in the case where the telephone subunit is to be placed off the hook against a ring-up tone on the facsimile subunit with telephone 508, either the line wire button 73 of the operating section 31 shown in FIG. 29 is depressed or the handset 509 of the facsimile subunit with telephone 508 shown in FIG. 26 is raised. When the line wire button 73 of the operating section 31 is depressed or when the handset 509 is raised, the controller 60 of the facsimile subunit with telephone 508 turns on the line wire lamp built in the line wire button 73 for indicating that the line is busy with speech. Explanation will be made about the operation performed when the facsimile subunit with telephone 508 is placed off the hook against a telephone ring-up tone with reference to FIG. 38.

Figure 38:
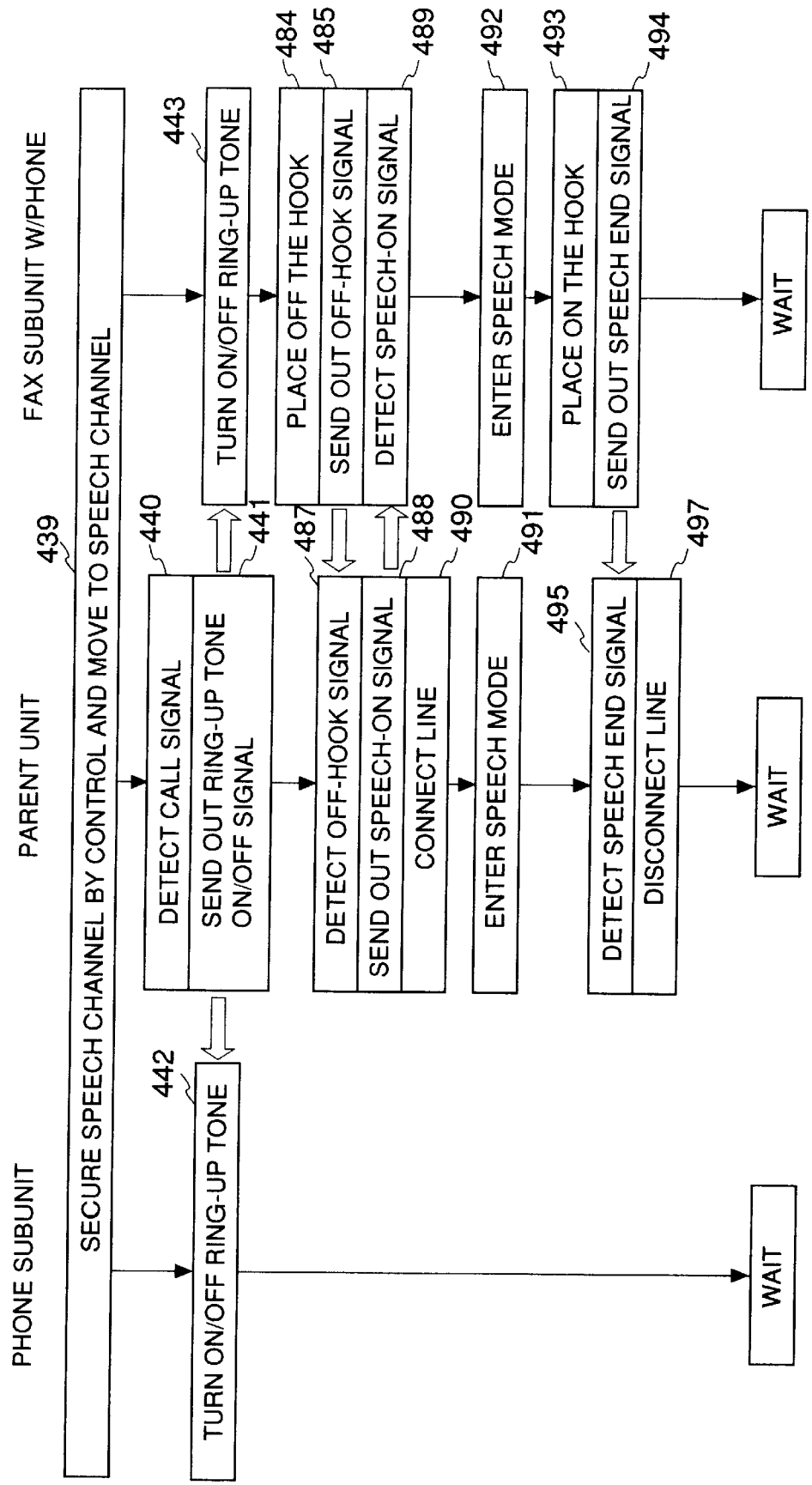
FIG. 38 is a flowchart showing the operation flow for radio communication with the facsimile subunit with telephone hooked off in the telephone priority system according to the second embodiment.

In FIG. 38, the operation for moving to the speech channel (step 439) and controlling the sounding of the ring-up tone of the telephone subunit 504 and the facsimile subunit with telephone 508 (steps 440 to 443) is the same as that explained with reference to FIG. 34 above. The controller 60 of the facsimile subunit with telephone 508, as described above, upon depression of the line wire button 73 of the operating section 61 or when the handset 509 is raised, i.e., when the facsimile subunit with telephone 508 is placed off the hook (step 484), sends out an off-hook signal to the parent unit 502 (step 485). In the process, the controller 60 of the facsimile subunit with telephone 508 connects the radio transmission change-over switch 49 to side b, sends out an off-hook signal to the radio communication section 48 by way of the control signal modem 59, and transmits it to the parent unit 502 by radio communication. Upon detection of the fact that the off-hook signal is sent from the facsimile subunit with telephone 508 by way of the control signal modem 6 (step 487), the controller 6 of the parent unit 502 sends out a speech-on signal to the facsimile subunit with telephone 508 (step 488). At the same time, the controller 9 of the parent unit 502 connects the radio transmission change-over switch 4 to side b, and while sending out the speech-on signal to the radio communication section 5 by way of the control signal modem 6, transmits it to the facsimile subunit with telephone 508 by radio communication. The controller 9 of the parent unit 502 connects the radio transmission change-over switch 4 to side a, and the line transmission change-over switch 7 to side a, whereby the line connection relay 2 is turned on, thus connecting the line (step 490 in FIG. 38 and step 433 in FIG. 33). As a result, the parent unit 502 enters the speech mode (step 491), and the signal transmitted from the telephone line connected to the line wire connection terminal 1 is applied to the radio communication section 5 through the two-wire/four-wire converter 3 and further to the facsimile subunit with telephone 508. At the same time, the signal arriving from the facsimile subunit with telephone 508 is received at the radio communication section 5 and sent to the telephone line through the two-wire/four-wire converter 3. The controller 60 of the facsimile subunit with telephone 508 that has detected the speech-on signal arriving from the facsimile subunit with telephone 508 (step 489), on the other hand, connects the radio transmission change-over switch 49 to side a and the telephone/facsimile change-over switch 50 to side a. As a result, the facsimile subunit with telephone 508 enters the speech mode (step 492), and the signal received at the radio communication section 48 is applied to the voice output section 51 for producing a voice output. At the same time, the voice applied from the voice input section 52 is sent to the parent unit 502 through the radio communication section 48. The parent unit 502 and the facsimile subunit with telephone 508 both enter the speech mode, whereby the facsimile subunit with telephone 508 is engaged in speech (step 434 in FIG. 33).

Figure 33:
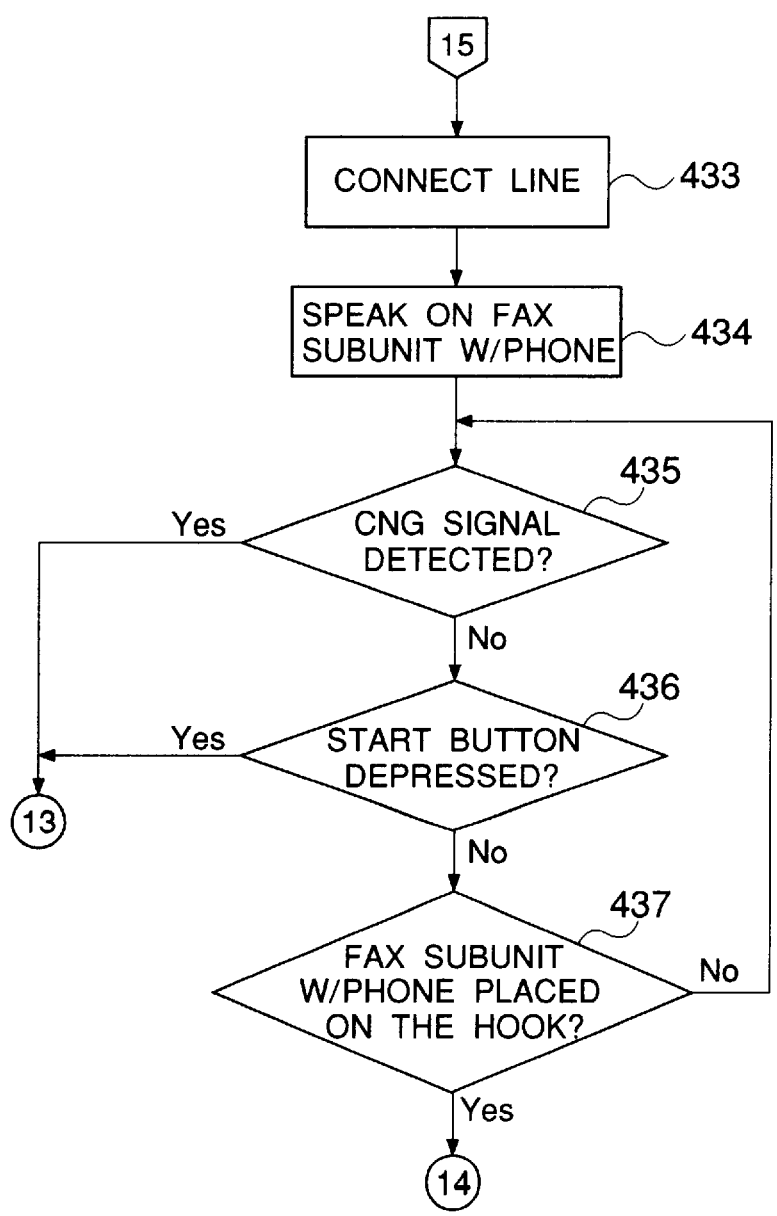
FIG. 33 is a flowchart showing still another part of the operation flow in the telephone priority system according to the second embodiment.

While the speech on the facsimile subunit with telephone 508 is going on, the parent unit 502 continues to detect whether the CNG signal has arrived from the other party (step 435 in FIG. 33) or whether the start button 69 of the facsimile subunit with telephone 508 is depressed (step 436 in FIG. 33) until the facsimile subunit with telephone 508 is placed off the hook (step 437 in FIG. 33). The flow of operation performed when the CNG signal is detected at step 435 or when the depression of the start button 69 is detected at step 436 will be described later. For the time being, explanation will be made with reference to FIG. 38 about the flow of operation performed when the start button 69 of the facsimile subunit with telephone 508 failed to be depressed with the CNG signal not detected until the facsimile subunit with telephone 508 is placed on the hook.

Explanation will be made with reference to FIG. 38 about the flow of operation performed when the facsimile subunit with telephone 508 in speech is placed on the hook, i.e., when the telephone is hung up. In hanging up the telephone on the facsimile subunit with telephone 508 according to the present embodiment, either the line wire button 73 is depressed or the handset 509 is returned to the facsimile subunit with telephone 508. As described above, in the case where the line wire button 73 is depressed or the handset 509 is raised while the ring-up tone is sounding on the facsimile subunit with telephone 508, the facsimile subunit with telephone 508 is placed off the hook, and the line wire lamp built in the line wire button 73 is turned on. As a result, the line wire lamp built in the line wire button 73 is kept on during speech on the facsimile subunit with telephone 508. Assuming that the line wire button 73 is depressed or the handset 509 is hung up under this condition, the resulting off-the-hook state causes the line wire lamp built in the line wire button 73 to turn off. More specifically, the controller 60 of the facsimile subunit with telephone 508, upon detection that the line wire button 73 of the operating section 31 has been depressed during speech or that the handset 509 has been returned into position (step 493), the line wire lamp built in the line wire button 73 of the operating section 31 is turned off, and while the radio transmission change-over switch 49 is connected to side b, the speech end signal is transmitted to the parent unit 502 by the control signal modem 59 (step 494). The facsimile subunit with telephone 508, after transmitting the speech end signal to the parent unit 502, enters the waiting mode. The controller 9 of the parent unit 502, upon detection of the speech end signal transmitted by the facsimile subunit with telephone 508 by way of the control signal modem 6 (step 495), turns off the line connection relay 2, thereby disconnecting the telephone line (step 427 in FIG. 31 and step 497 in FIG. 38). After disconnection of the telephone line, the parent unit 502 enters the waiting mode.

Figure 39:
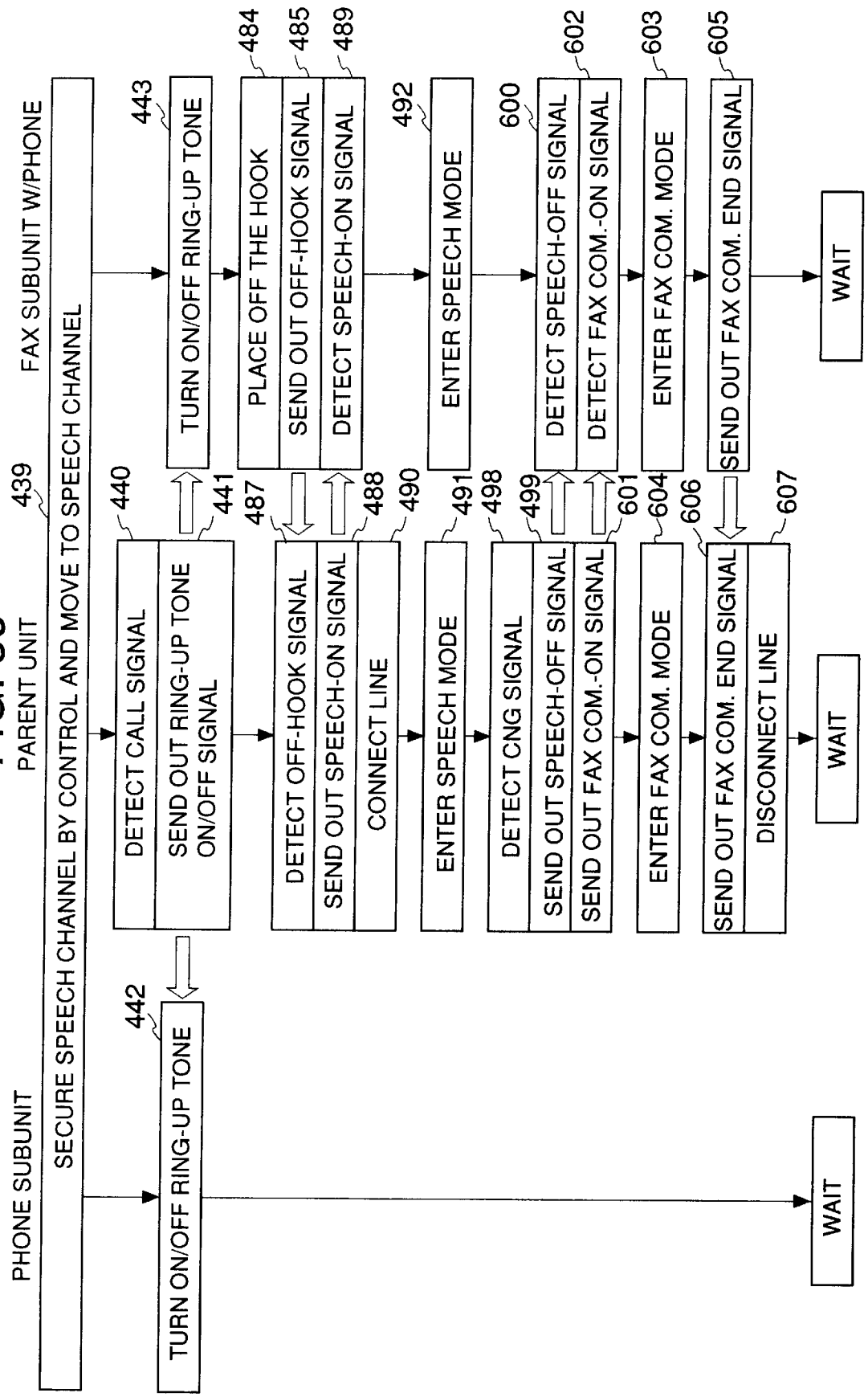
FIG. 39 is a flowchart showing the operation flow for radio communication with CNG signal detected during conversation on the facsimile subunit with telephone in the telephone priority system according to the second embodiment.

Now, explanation will be made about the flow of operation performed upon detection of the arrival of the CNG signal from the other party at step 435 in FIG. 33. The flow of operation involved is shown in FIG. 39. The flow of operation, including steps 442 and 439, performed before the facsimile subunit with telephone 508 and the parent unit 502 enter the speech mode (before step 491 for the parent unit and before step 492 for the facsimile subunit with telephone) is the same as that explained above with reference to FIG. 38. Assuming that the arrival of the CNG signal from the telephone line is detected by the CNG signal detector 11 of the parent unit 502 during speech on the facsimile subunit with telephone 508 (step 498), the parent unit 502 sends the speech-off signal to the facsimile subunit with telephone 508 (step 499). More specifically, the radio transmission change-over switch 4 is connected to side b, and the speech-off signal is sent out to the radio communication section 5 by the control signal modem 6. The controller 60 of the facsimile subunit with telephone 508, upon detection of the speech-off signal by the control signal modem 59 during speech (step 600), ends the speech mode and enters the waiting mode. The parent unit 502, after sending out a speech-off signal to the facsimile subunit with telephone 508, applies a fax communication-on signal to the facsimile subunit with telephone 508, thereby performing the facsimile receiving operation on the facsimile subunit with telephone 508 (step 426 in FIG. 31). The flow of operation performed on the parent unit 502 and the facsimile subunit with telephone 508 at steps 601 to 607 is the same as that at steps 445 to 451 explained above with reference to FIG. 39.

Figure 40:
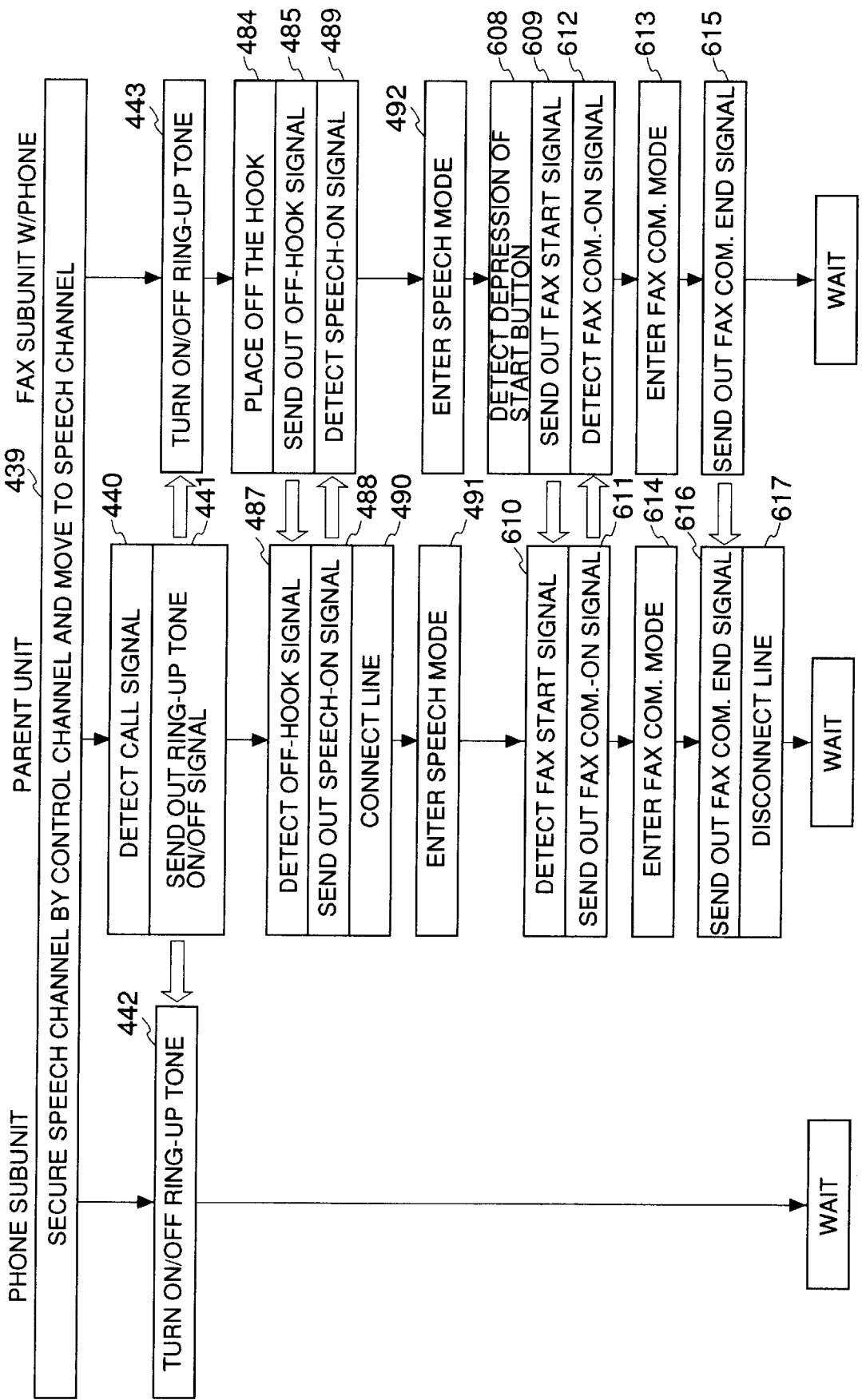
FIG. 40 is a flowchart showing the operation flow for radio communication with the FAX button depressed during conversation on the facsimile subunit with telephone in the telephone priority system according to the second embodiment.

Now, explanation will be made about the flow of operation performed when the start button 69 of the operating section 31 of the facsimile subunit with telephone 508 is depressed during speech on the facsimile subunit with telephone 508 at step 436 in FIG. 33. The flow of operation involved is shown in FIG. 40. The flow of operation performed before the facsimile subunit with telephone 508 and the parent unit 502 enter the speech mode including steps 439 and 492 (before step 491 for the parent unit and before step 492 for the facsimile subunit with telephone) is the same as that explained above with reference to FIG. 38. Upon detection by the controller 60 of the facsimile subunit with telephone 508 of the fact that the start button 69 of the operating section 31 of the facsimile subunit with telephone 508 is depressed during speech on the facsimile subunit with telephone 508 has been depressed (step 608), the facsimile subunit with telephone 508 sends a fax start signal to the parent unit 502 (step 609). More specifically, the controller 60 of the facsimile subunit with telephone 508 connects the radio transmission change-over switch 49 to side b, and sends out the fax start signal to the radio communication section 48 by way of the control signal modem 59. The controller 9 of the parent unit 502, upon detection by way of the control signal modem 6 that the fax start signal has arrived from the facsimile subunit with telephone 508 during the speech on the facsimile subunit with telephone 508, i.e., during the speech mode (step 610), the fax communication-on signal is sent to the facsimile subunit with telephone 508 thereby to perform the facsimile receiving operation on the facsimile subunit with telephone 508 (step 426 in FIG. 31). The flow of operation performed on the parent unit 502 and the facsimile subunit with telephone 508 at steps 611 to 617 in FIG. 40 is the same as that at steps 445 to 451 in FIG. 34.

Now, explanation will be made about the operation of telephone/facsimile automatic switching with the facsimile priority system selected as the method of telephone/facsimile automatic switching, i.e., with the non-call lamp 42 of the telephone subunit 504 and the non-call lamp 67 of the facsimile subunit with telephone 508 turned off. FIGS. 41 to 45 show the general flow of operation performed on the parent unit 502, the facsimile subunit with telephone 508 and the telephone subunit 504, and FIGS. 46 to 54 that for radio communication between the parent unit 502 and the facsimile subunit with telephone 508 and the telephone subunit 504. The method of radio communication between the parent unit 502 and the facsimile subunit with telephone 508 or the telephone subunit 504 is the same as that for radio communication on the well-known cordless telephone performed using the control channel and the speech channel. The principle and nature of the radio communication, therefore, will not be described herein.

Figure 41:
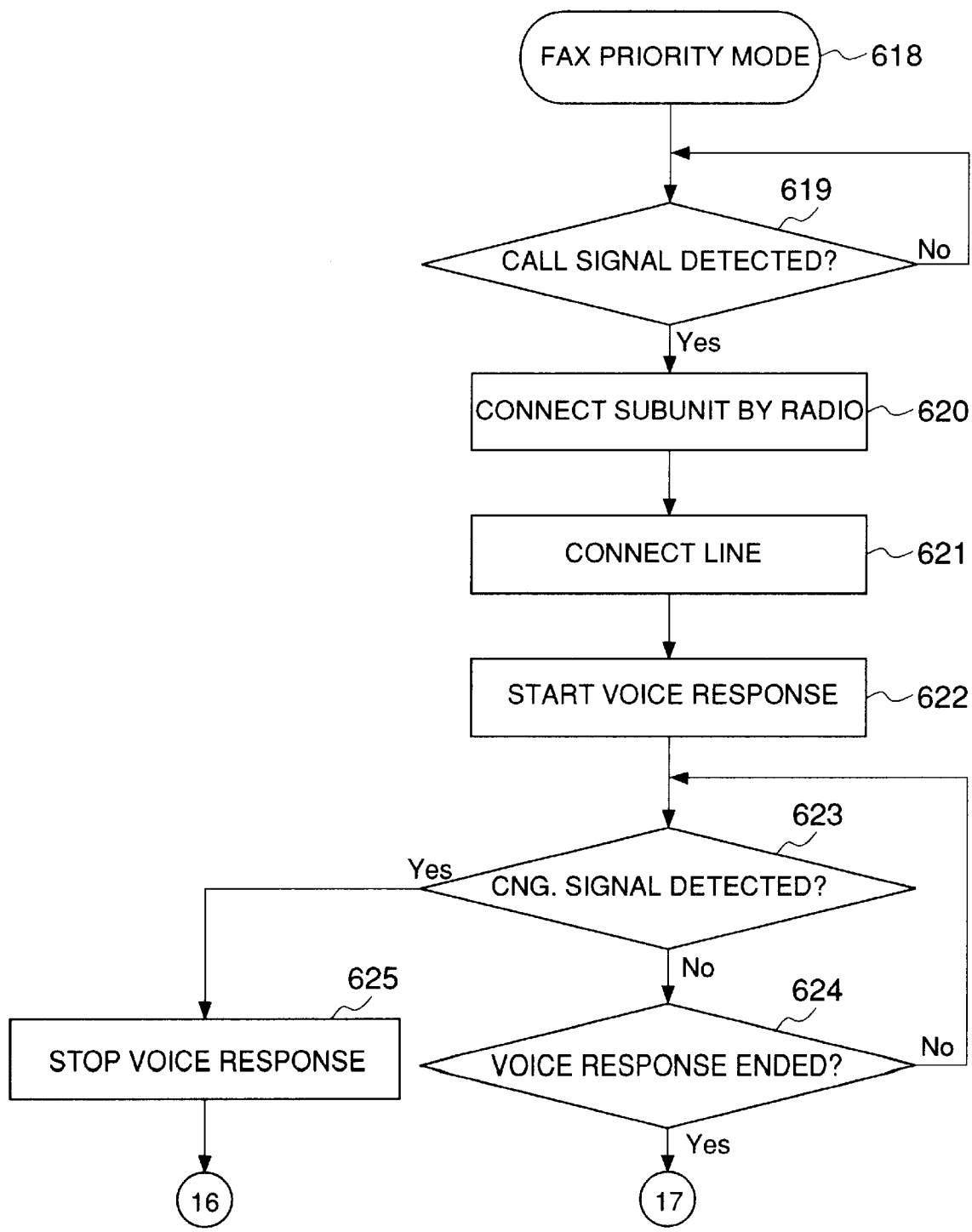
FIG. 41 is a flowchart showing a part of the operation flow in the facsimile priority system according to the second embodiment.
Figure 46:
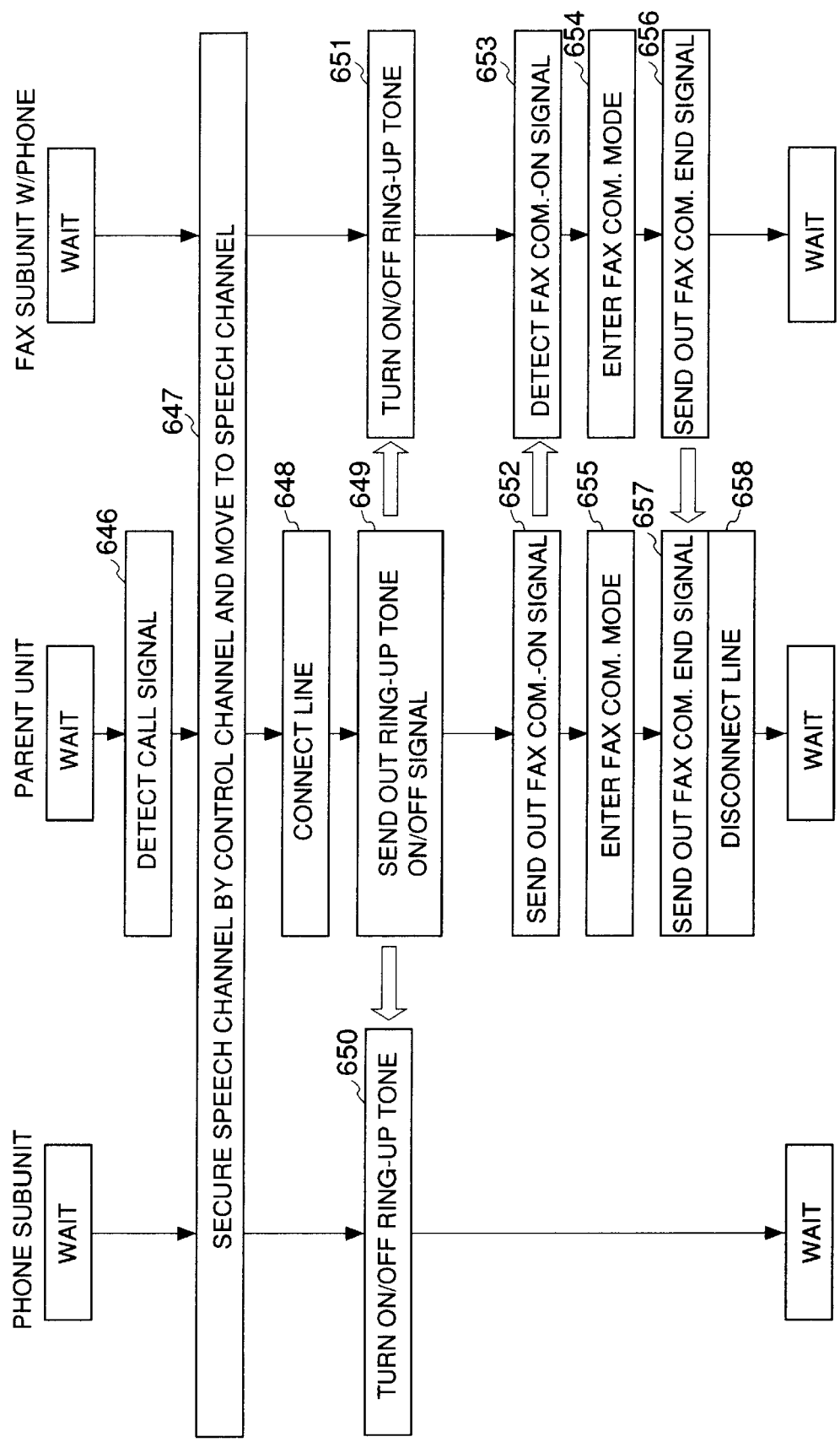
FIG. 46 is a flowchart showing the operation flow for radio communication in the facsimile priority system according to the second embodiment.

As shown in the facsimile priority system 618 of FIG. 41, the controller 9 of the parent unit 502 detects whether a call signal is sent from the telephone line by way of the call signal detector 12 in waiting mode (step 619). Upon detection that the call signal is sent from the telephone line by the call signal detector 21, the controller 9 connects the telephone subunit 504 and the facsimile subunit with telephone 508 by radio (step 620). The flow of operation for radio connection will be explained with reference to FIG. 46. As shown in FIG. 46, in the case where a call signal is detected in the parent unit 502 (step 646), the speech channel is secured by the control channel, and the process moves to the speech channel (step 647).

The flow of operation at step 647 will be explained with reference to FIGS. 4, 6 and 28.

The parent unit 502 confirms the unoccupied state of the control channel by way of the radio communication section 5, and upon so confirming, sends a signal designating the radio communication to the telephone subunit 504 and the facsimile subunit with telephone 508 by use of the control channel. In the process, the controller 9 connects the radio transmission change-over switch 4 to side b, and while controlling the control signal modem 6, sends out a signal designating the radio connection to the radio communication section 5. The signal designating the radio connection (hereinafter called "the connection designating signal") is transmitted, together with the data on the speech channel the unoccupied state of which has been confirmed through the radio communication section 5 of the parent unit 502 immediately before detection of the call signal at step 647. Also, the radio communication is effected by time division using the same control channel for the telephone subunit 504 and the facsimile subunit with telephone 508.

The facsimile subunit with telephone 508 causes the radio communication section 48 to receive the radio signal transmitted from the parent unit 502, and demodulates it at the control signal modem 59. The telephone subunit 504, on the other hand, causes the radio communication section 26 to receive the radio signal sent from the parent unit 502, and demodulates it at the control signal modem 28. The controller 60 of the facsimile subunit with telephone 508 and the controller 24 of the telephone subunit 504, upon confirming that the connection designating signal is sent from the parent unit 502, sends out a connection confirming signal to the parent unit 502 as a response signal. This connection confirming signal is also applied through the control channel. More specifically, in the parent unit 502, the controller 24 connects the radio transmission change-over switch 27 to side b, and while controlling the control signal modem 28, sends out the connection confirming signal to the radio communication section 26. In the facsimile subunit with telephone 58, on the other hand, the controller 60 connects the radio transmission change-over switch 49 to side b, and while controlling the control signal modem 59, sends out the connection confirming signal to the radio communication section 48. The telephone subunit 504 and the facsimile subunit with telephone 508, after sending out the connection confirming signal to the parent unit 502, moves to the speech channel. In the process, the speech channel is selected from among the data on the channel through which the parent unit 502 sent out the connection designating signal. The parent unit 502 moves to the speech channel in the case where the connection confirming signal sent from the facsimile subunit with telephone 508 or the telephone subunit 504 is received, i.e., in the case where the connection confirming signal is detected by the control signal modem 6 from the signal received at the radio communication section 5. The telephone subunit 504 and the facsimile subunit with telephone 508, after moving to the speech channel, confirm the unoccupied state of the particular speech channel. Upon confirmation of the unoccupied state of the speech channel, a speech channel arrival signal is sent out to the parent unit 502 by way of the speech channel. The flow of signals in this case is the same as that of the connection confirming signal for the control channel described above. With the parent unit 502, like in receiving the connection confirming signal by the control channel as described above, the controller 9 receives the speech channel arrival signal sent from the facsimile subunit with telephone 508 or the telephone subunit 504. As a result, the movement of the parent unit 502, the facsimile subunit with telephone 508 and the telephone subunit 504 to the speech channel is completed.

Upon complete movement of the parent unit 502, the facsimile subunit with telephone 508 and the telephone subunit 504 to the speech channel, the parent unit 502 connects the telephone line (step 621 in FIG. 41 and step 648 in FIG. 46). More specifically, in FIG. 4, the controller 9 turns on the line connection relay 2. As a result, the telephone line connected to the line wire connection terminal 1 is connected to the two-wire/four-wire converter 3, so that the parent unit 502 is connected to the telephone line. As the next step, the controller 9 connects the line transmission change-over switch 7 to side b, and starts to send out a voice response by way of the voice response generator 8 (step 622 in FIG. 41). The contents of the voice response thus sent out are, for example, "Proceed to fax. The phone caller wait." As seen, although the facsimile is readily available for receiving operation, the other party is notified to wait for a call which he may be given soon. The controller 9 detects whether the CNG signal is sent from the other party by way of the CNG signal detector 11 (step 623) until the voice response generator 8 completes the transmission of the voice response (step 624). In the case where the transmission of the CNG signal from the other party is detected by the CNG signal detector 11 at step 623, the controller 9 stops sending out the voice response by way of the voice response generator 8 (step 625), and transfers the control to the facsimile receiving operation on the facsimile subunit with telephone 508 (step 636 in FIG. 43). The flow of operation for facsimile receiving operation will be described later.

Figure 42:
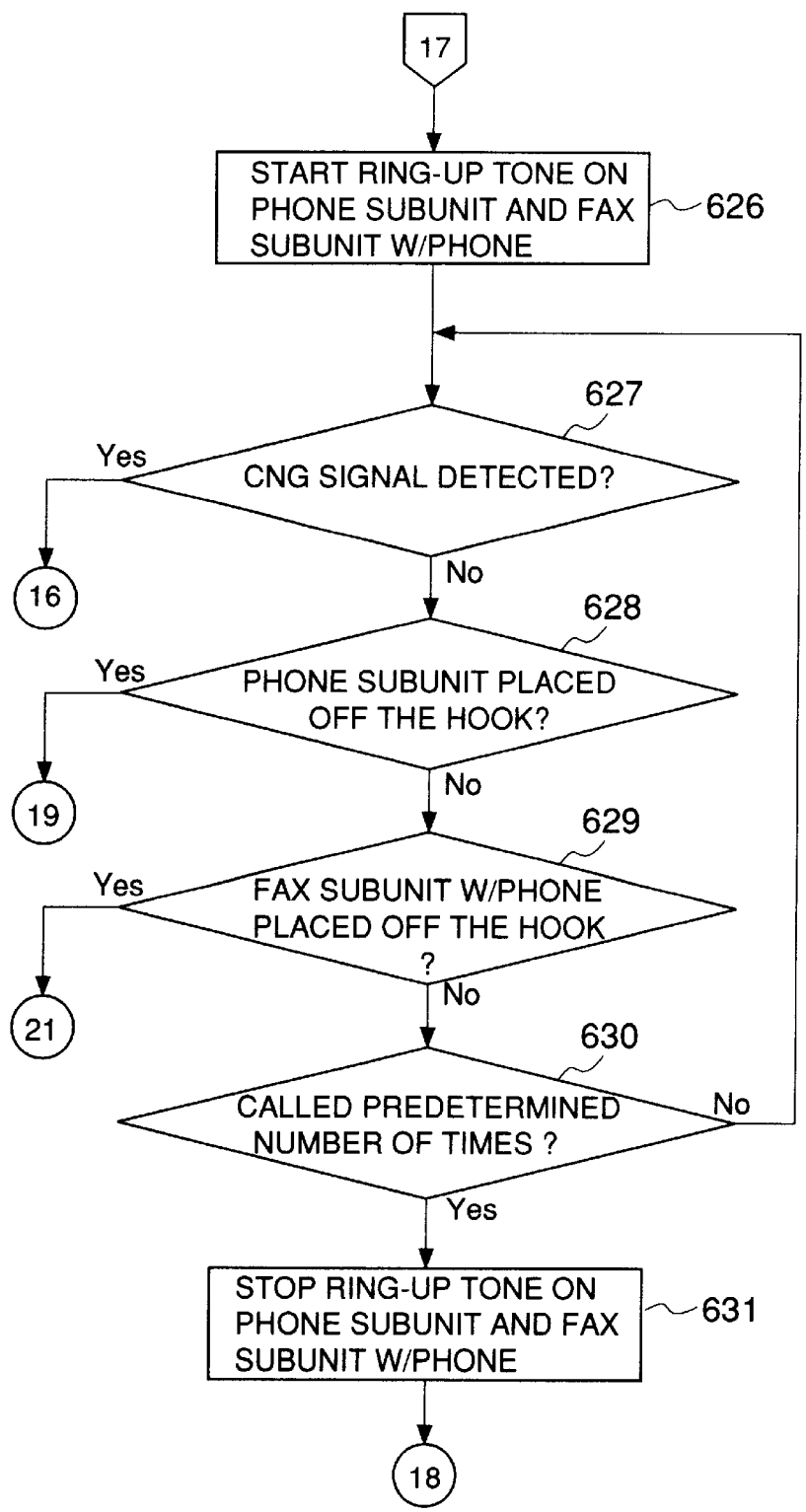
FIG. 42 is a flowchart showing another part of the operation flow in the facsimile priority system according to the second embodiment.

In FIG. 42, in the case where the transmission of the CNG signal from the other party is not detected before complete transmission of the voice response, the parent unit 502 starts the telephone ring-up tone on the telephone subunit 504 and the facsimile subunit with telephone 508 (step 626 in FIG. 42). The parent unit 502, while checking whether the CNG signal has arrived from the telephone line (step 627), whether the telephone subunit 504 or the facsimile subunit with telephone 508 is placed off the hook (steps 628 and 629) or whether the telephone ring-up tone is sounded a predetermined number of times on the telephone subunit 504 or the facsimile subunit with telephone 508 (step 630), continues to sound the ring-up tone on the telephone subunit 504 and the facsimile subunit with telephone 508. The flow of operation for radio communication involved will be explained with reference to FIG. 46.

As shown in FIG. 46, the telephone ring-up tone on the telephone subunit 504 and the facsimile subunit with telephone 508 is sounded in such a manner that the parent unit 502 sends out a signal instructing the telephone subunit 504 and the facsimile subunit with telephone 508 to sound the ring-up tone (ring-up tone-on signal) and, if the ring-up tone is sounding, a signal to stop it (ring-up tone-off signal) (step 649) to the telephone subunit 504 and the facsimile subunit with telephone 508. The telephone subunit 504 and the facsimile subunit with telephone 508, upon receiving the ring-up tone-on signal, starts the ring-up tone, and stops the ring-up tone upon receiving the ring-up tone-off signal (steps 650 and 651). Explanation will be made later about the flow of operation executed upon detection that the CNG signal is sent from the telephone line while the telephone ring-up tone is sounding on the telephone subunit 504 and the facsimile subunit with telephone 508 (when the CNG signal is detected at step 627 in FIG. 42), upon detection that the telephone subunit 504 is placed off the hook (upon detection that the telephone subunit 504 is placed off the hook at step 628 in FIG. 42) or upon detection that facsimile subunit with telephone 508 is placed off the hook (upon detection that the facsimile subunit with telephone 508 is placed off the hook at step 629 in FIG. 42).

The flow of operation for sounding the telephone ring-up tone at steps 649, 650 and 651 will be explained with reference to FIGS. 4, 6 and 28. The controller 9 of the parent unit 502 connects the radio communication change-over switch 4 to side b, and sends out the ring-up tone-on signal and the ring-up tone-off signal to the radio communication section 5 at predetermined intervals of time by controlling the control signal modem 6. In the telephone/facsimile automatic switching operation of the telephone priority system described above, the telephone ring-up tone on the telephone subunit 504 and the facsimile subunit with telephone 508 is sounded by sending the ring-up tone-on signal and the ring-up tone-off signal in accordance with the turning on/off of the call signal sent from the telephone line. With the facsimile priority system, by contrast, the telephone line is connected already before sounding the telephone ring-up tone on the telephone subunit 504 or the facsimile subunit with telephone 508, and therefore it is impossible to sound the ring-up tone on the telephone subunit 504 or the facsimile subunit with telephone 508 in accordance with the turning on/off of the call signal. As a result, in the facsimile priority system, the controller 9 of the parent unit 502 sends out the ring-up tone-on signal and the ring-up tone-off signal to the telephone subunit 504 and the facsimile subunit with telephone 508 at predetermined time intervals to sound the telephone ring-up tone of the telephone subunit 504 and the facsimile subunit with telephone 508. The ring-up tone-on signal and the ring-up tone-off signal can be set at desired time intervals or, for example, at the same time intervals as the turning on/off of the call signal sent from the telephone line. In response to the ring-up tone-on signal and the ring-up tone-off signal sent by the parent unit 502, the telephone subunit 504 causes the control signal modem 28 to demodulate the signal received through the radio communication section 26. The controller 24 of the telephone subunit 504, upon detection of the arrival of the ring-up tone-on signal and the ring-up tone-off signal at the control signal modem 28, controls the ring-up tone signal output section 25 thereby to start the telephone ring-up tone. More specifically, when the ring-up tone-on signal is detected, the ring-up tone output of the ring-up tone output section 25 is turned on, while if the ring-up tone-off signal is detected, the ring-up tone output of the ring-up tone output section 5 is turned off. The facsimile subunit with telephone 508, in response to the ring-up tone-on signal and the ring-up tone-off signal transmitted from the parent unit 502, causes the control signal modem 59 to demodulate the signal received from the radio communication section 48. The controller 60 of the facsimile subunit with telephone 508, upon detection of the arrival of the ring-up tone-on signal and the ring-up tone-off signal at the control signal modem 59, controls the ring-up tone output section 62 and starts the telephone ring-up tone. In other words, the ring-up tone output of the ring-up tone output section 62 is turned on upon detection of the ring-up tone-on signal, and turned off upon detection of the ring-up tone-off signal.

Explanation will be made about the operation performed when the telephone subunit 504 and the facsimile subunit with telephone 508 are not placed off the hook even when the ring-up tone is sounded on the telephone subunit 504 and the facsimile subunit with telephone 508 a predetermined number of times at step 630 in FIG. 42. First, the ring-up tone of the telephone subunit 504 and the facsimile subunit with telephone 508 is stopped (step 631). As described above, the ring-up tone of the telephone subunit 504 and the facsimile subunit with telephone 508 is sounded in such a manner that the parent unit 502 transmits the ring-up tone-on signal and the ring-up tone-off signal alternately to the telephone subunit 504 and the facsimile subunit with telephone 508. When it is desired to stop the ring-up tone of the telephone subunit 504 and the facsimile subunit with telephone 508, therefore, the ring-up tone-on signal and the ring-up tone-off signal are prevented from being sent off after the time of transmission of a ring-up tone-off signal. After the sounding of the telephone subunit 504 and the facsimile subunit with telephone 508 is stopped, the controller 9 of the parent unit 502 connects the line transmission change-over switch 7 to side b, and starts sending a voice response by way of the voice response generator 8 (step 632 in FIG. 43). The contents of the voice response thus transmitted are, for example, "The called party is not around here. The phone caller please call again later. The facsimile sender please continue to send data." In this way, this voice response is to inform the other party that although the telephone ringing could not be answered, the facsimile is ready to receive. The controller 9 continues to detect whether the CNG signal is sent from the other party (step 633) until the voice response is completely transmitted from the voice response generator 8 (step 634). When the arrival of the CNG signal from the other party is detected by the CNG signal detector 11 at step 633, the controller 9 stops sending the voice response by the voice response generator 8 (step 635), and transfers the control to the facsimile receiving operation on the facsimile subunit with telephone 508 (step 636). Also when the CNG signal is not detected by the CNG signal detector 11 before complete transmission of the voice response by the voice response generator 8, the control is similarly transferred to the facsimile receiving operation (step 636) on the facsimile subunit with telephone 508.

Figure 43:
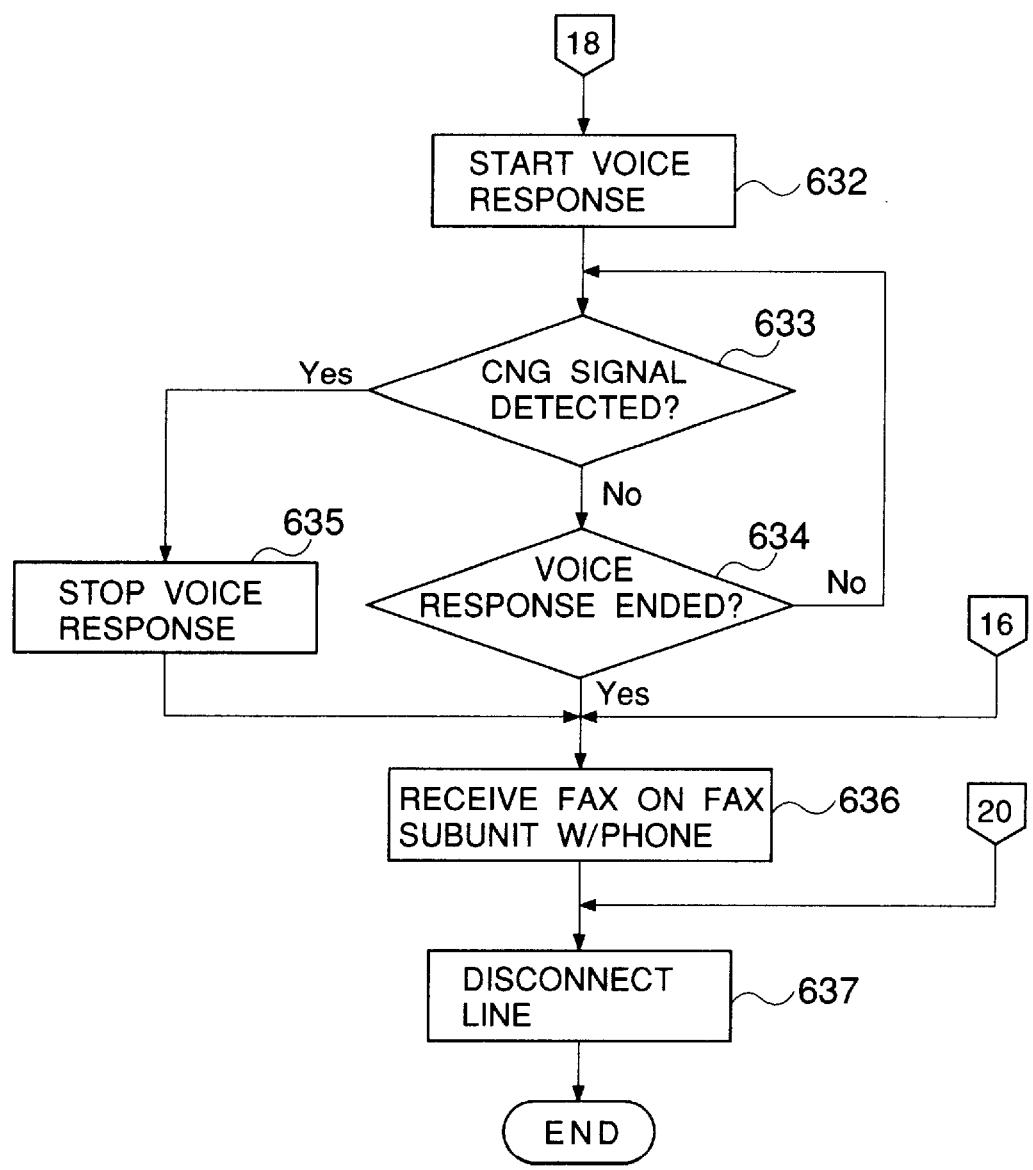
FIG. 43 is a flowchart showing still another part of the operation flow in the facsimile priority system according to the second embodiment.

The flow of operation for communication in the facsimile receiving mode on the facsimile subunit with telephone 508 at step 636 in FIG. 43 will be explained with reference to FIG. 46. The controller 9 of the parent unit 502 connects the radio transmission change-over switch 4 to side b, and sends out the fax communication-on signal to the facsimile subunit with telephone 508 by way of the control signal modem 6 (step 652). This fax communication-on signal is transmitted by the use of the speech channel like in the case of the ring-up tone-on signal or the ring-up tone-off signal described above. The controller 9 of the parent unit 502, after sending out the fax communication-on signal, connects the radio transmission change-over switch 4 to side a and further connects the line transmission change-over switch 7 to side a, thereby introducing the fax communication mode (step 655). Under this condition, with the parent unit 502, the signal sent from the telephone line connected to the line wire connection terminal 1 is sent to the radio communication section 5 through the two-wire/four-wire converter 3 and thus to the facsimile subunit with telephone 508. The signal transmitted from the facsimile subunit with telephone 508 by radio, on the other hand, is received by the radio communication section 5, and is sent out to the telephone line connected to the line wire connection terminal 1 through the two-wire/four-wire converter 3. In the facsimile subunit with telephone 508, on the other hand, upon detection that the fax communication-on signal transmitted by the parent unit 502 at step 652 is received by the control signal modem 59 (step 653), the controller 60 connects the radio transmission change-over switch 49 to side a and the telephone/facsimile automatic change-over switch 50 to side b thereby to enter the fax communication mode (step 654). Under this condition, the signal transmitted by the parent unit 502 and received at the radio communication section 48 is applied to the fax modem 54, and the signal output from the fax modem is transmitted to the parent unit 502 by way of the radio communication section 48. As a result, under the condition where both the parent unit 502 and the facsimile subunit with telephone 508 are in fax communication mode, i.e., where the parent unit 502 is at step 655 and the facsimile subunit with telephone 508 at step 654, then the signal transmitted from the telephone line connected to the line wire connection terminal 1 of the parent unit 502 is sent out to the fax modem 54 of the facsimile subunit with telephone 508 by radio communication, and the signal produced by the fax modem 54 is transmitted to the telephone line connected to the line wire connection terminal 1 of the parent unit 502 by radio communication. The facsimile signal transmitted from the other party of speech is received under this condition. The facsimile signal sent from the other party is demodulated at the fax modem 54, decoded into image information at the decoder 56, and produced as an output at the recorder 58. The procedure for facsimile communication which is identical to that with the well-known facsimile system will not be described herein.

Upon complete facsimile reception on the facsimile subunit with telephone 508, the facsimile subunit with telephone 508 sends out a fax communication end signal to the parent unit 502 (step 656). The controller 60 of the facsimile subunit with telephone 508 connects the radio transmission change-over switch 49 to side b, produces a fax communication end signal through the control signal modem 59 and transmits it to the parent unit 502 through the radio communication section 48. The controller 9 of the parent unit 502, upon detection of the arrival of the fax communication end signal from the facsimile subunit with telephone 508 by way of the control signal modem 6 (step 657), turns off the line connection relay 2 thereby to disconnect the telephone line (step 637 in FIG. 43 and step 658 in FIG. 46). After that, the facsimile subunit with telephone 508, the telephone subunit 504 and the parent unit 502 enter the waiting mode.

Figure 47:
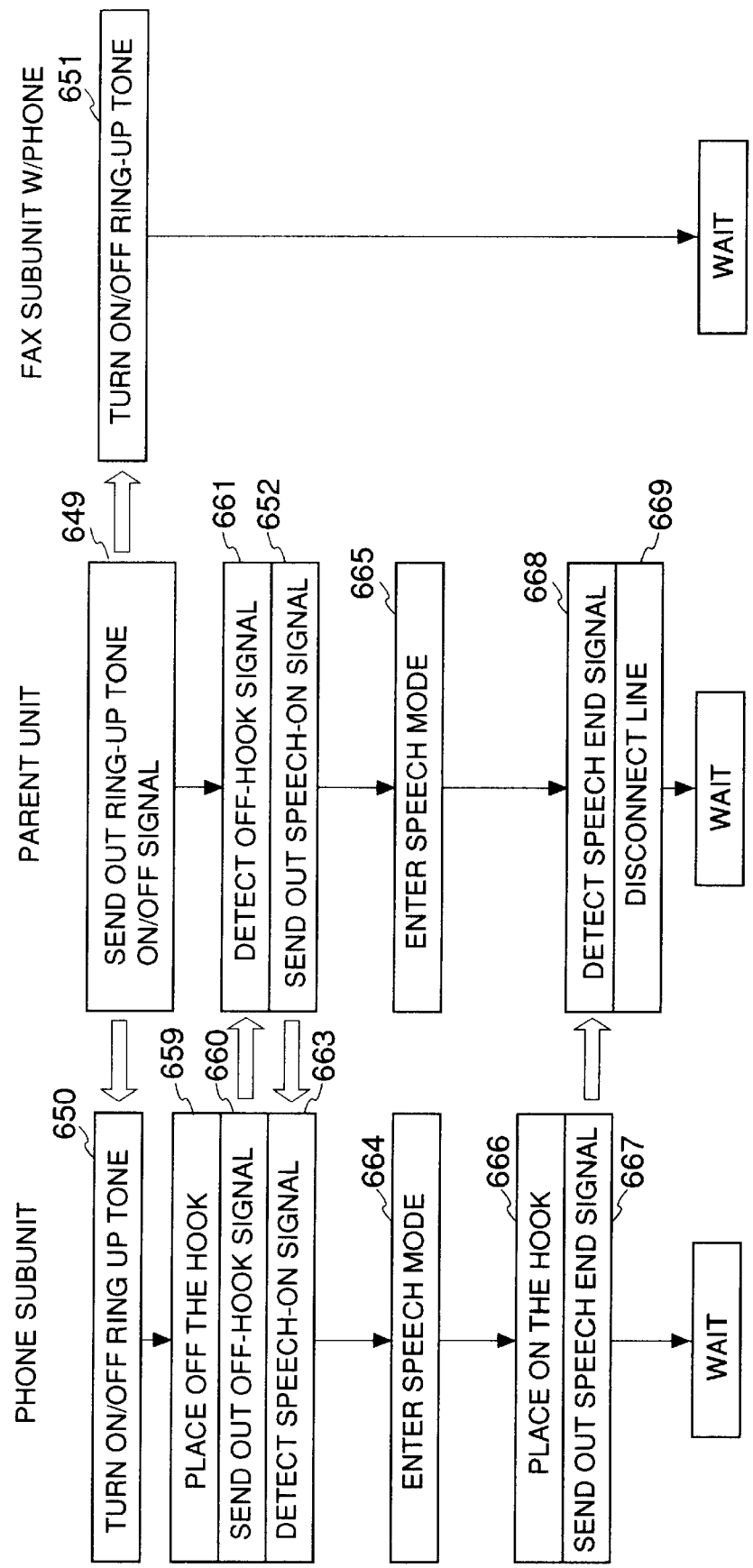
FIG. 47 is a flowchart showing the operation flow for radio communication with the telephone subunit hooked off in the facsimile priority system according to the second embodiment.

Now, explanation will be made about the control operation performed upon detection that the telephone subunit 504 is placed off the hook at step 626 in FIG. 42. According to the present embodiment, if the telephone subunit 504 is to be placed off the hook against the telephone ring-up tone on the telephone subunit 504, the line wire button 45 of the operating section 31 shown in FIG. 8 is depressed. When the line wire button 45 of the operating section 31 is depressed, the controller 24 of the telephone subunit 504 turns on the line wire lamp built in the line wire button 45 for indicating that the line is busy with speech. The operation executed with the telephone subunit 504 placed off the hook against a telephone call will be explained with reference to FIG. 47. FIG. 47 shows the process subsequent to the operation of sending out the ring-up tone-on signal and the ring-up tone-off signal from the parent unit 502 (step 649) and turning on/off the ring-up tone on the telephone subunit 504 (step 650) in FIG. 46. The flow of operation up to this stage is identical to that shown in FIG. 46. When the line wire button 45 of the operating section 31 is depressed, i.e., when the telephone subunit 504 is placed off the hook (step 659), as described above, the controller 24 of the telephone subunit 504 sends the off-hook signal to the parent unit 502 (step 660). In the process, the controller 24 of the parent unit 502 connects the radio transmission change-over switch 27 to side b, sends out an off-hook signal to the radio communication section 26 by way of the control signal modem 6, and transmits it to the parent unit 502 by radio communication. The controller 9 of the parent unit 502, upon detection of the off-hook signal arriving from the telephone subunit 504 by way of the control signal modem 6 (step 661), sends out a speech-on signal to the telephone subunit 504 (step 652). In the process, the controller 9 of the parent unit 502 connects the radio transmission change-over switch 4 to side b, and while sending out a speech-on signal to the radio communication section 5 by way of the control signal modem 6, transmits the same signal by radio to the telephone subunit 504. After that, the controller 9 of the parent unit 502 connects the radio transmission change-over switch 4 to side a. As a result, the parent unit 502 enters the speech mode (step 665), and the signal sent from the telephone line connected to the line wire connection terminal 1 is sent to the radio communication section 5 through the two-wire/four-wire converter 3 and further to the telephone subunit 504, while the signal sent from the telephone subunit 504 is received at the radio communication section 5 and sent to the telephone line through the two-wire/four-wire converter 3. On the other hand, the controller 24 of the telephone subunit 504 that has detected the speech-on signal transmitted from the parent unit 502 (step 663) connects the radio transmission change-over switch 27 to side a. As a result, the telephone subunit 504 enters the speech mode (step 664), and the signal received at the radio communication section 26 is sent to the voice response output section 29 to be produced as a voice output, while the voice applied from the voice input section 30 is transmitted to the parent unit 502 through the radio communication section 26. The parent unit 502 and the telephone subunit 504 both enter the speech mode, and thus the telephone subunit 504 begins speech (step 6 in FIG. 44).

Figure 44:
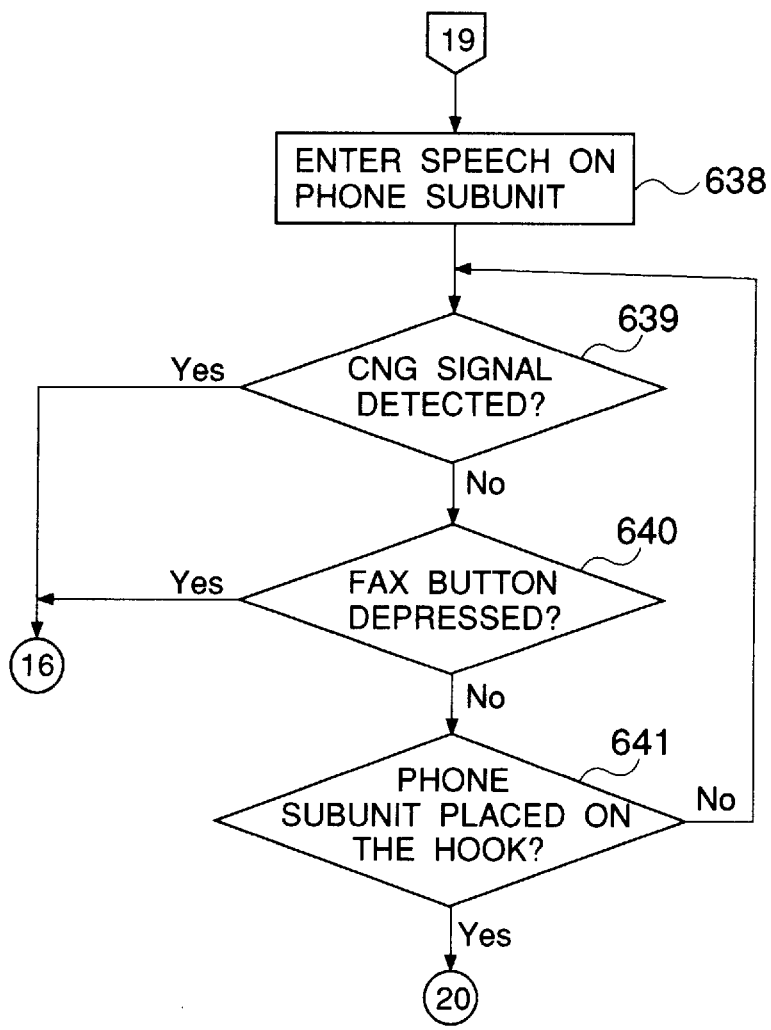
FIG. 44 is a flowchart showing a further part of the operation flow in the facsimile priority system according to the second embodiment.

While speech is proceeding on the telephone subunit 504 as described above, the parent unit 502 continues to detect whether the CNG signal has been sent from the other party (step 639 in FIG. 44) or whether the FAX button 47 of the telephone subunit 504 has been depressed (step 640 in FIG. 44) until the telephone subunit 504 is placed off the hook (step 641 in FIG. 44). The operation performed when the CNG signal is detected at step 639 or when the depression of the FAX button 47 is detected at step 640 will be described later. For the time being, explanation will be made about the flow of operation executed when the CNG signal is not detected and the FAX button 47 of the telephone subunit 504 not depressed until the telephone subunit 504 is placed off the hook with reference to FIG. 47.

Explanation will be made with reference to FIG. 47 about the flow of operation executed in the case where the telephone subunit 504 in speech as described above is placed off the hook, i.e., in the case where the telephone is hung up. In hanging up the telephone on the telephone subunit 504 according to the present embodiment, the line wire button 45 is depressed. As described above, by depressing the line wire button 45 with the ring-up tone sounding on the telephone subunit 504, the telephone subunit 504 is placed off the hook, and the line wire lamp built in the line wire button 45 is turned on. As a consequence, while the telephone subunit 504 is in speech, the line wire lamp built in the line wire button 45 is kept on. When the line wire button 45 is depressed under this condition, the telephone subunit 504 is placed on the hook, so that the line wire lamp built in the line wire button 45 is turned off. More specifically, the controller 24 of the telephone subunit 504, upon detection of the depression of the line wire button 45 of the operating section 31 during speech (step 666), turns off the line wire lamp built in the line wire button 45 of the operating section 31. At the same time, the radio transmission change-over switch 27 is connected to side b, and the speech end signal is sent to the parent unit 502 through the control signal modem 28 (step 667). The telephone subunit 504, after sending this speech end signal to the parent unit 502, enters the waiting mode. The controller 9 of the parent unit 502, upon detection of the speech end signal transmitted from the telephone subunit 504 by the control signal modem 6 (step 668), turns off the line connection relay 2, thereby to disconnect the telephone line (step 669 in FIG. 47 and step 637 in FIG. 43). After disconnection of the telephone line, the parent unit enters the waiting mode.

Figure 48:
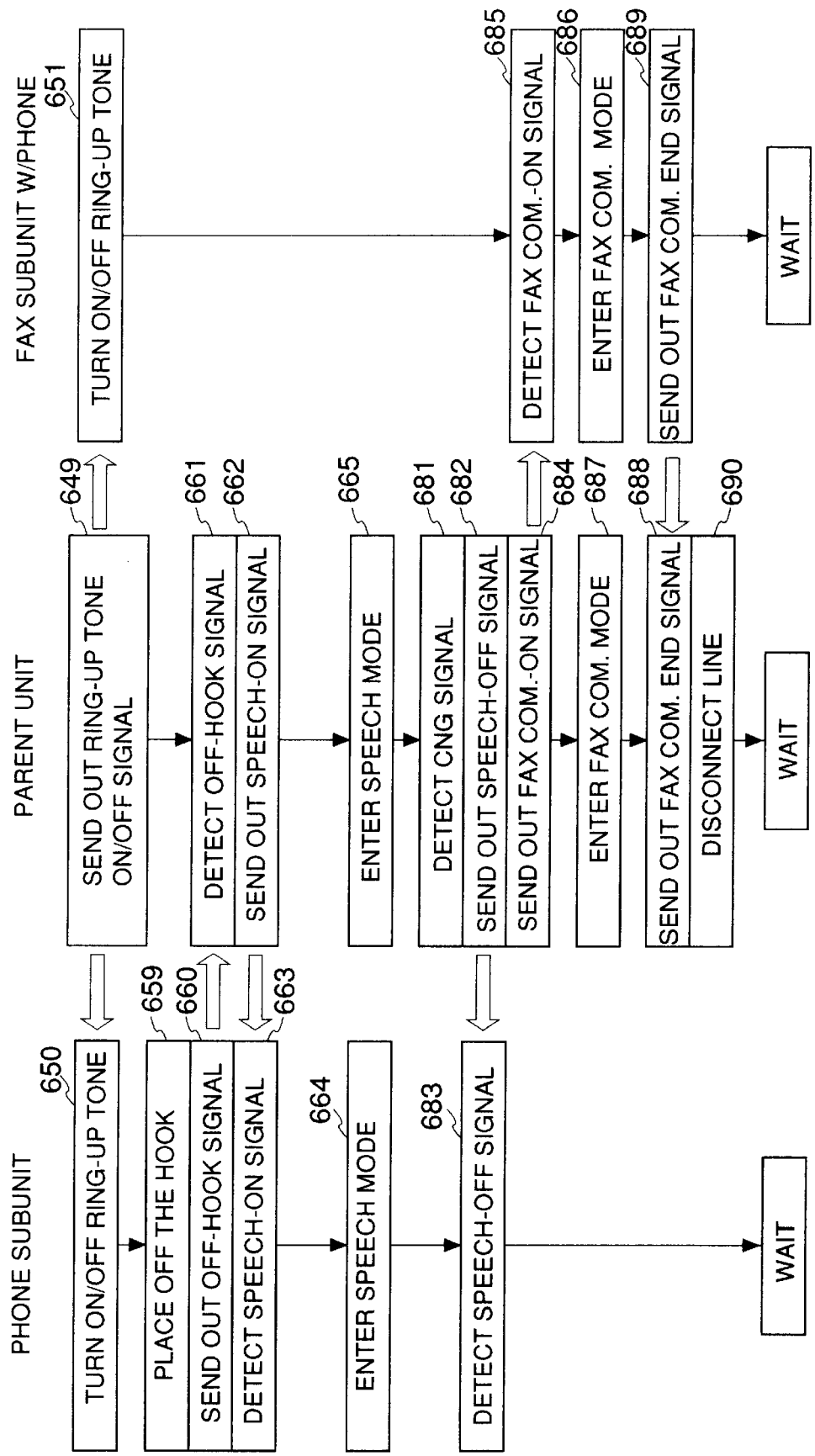
FIG. 48 is a flowchart showing the operation flow for radio communication with the CNG signal detected during conversation on the telephone subunit in the facsimile priority system according to the second embodiment.

Now, explanation will be made about the flow of operation effected upon detection of arrival of the CNG signal from the other party at step 639 in FIG. 44. The flow of operation involved is shown in FIG. 48. The flow of operation before the telephone subunit 504 and the parent unit 502 enter the speech mode (before step 665 for the parent unit and before step 664 for the telephone subunit) is the same as that explained above with reference to FIG. 47. Assuming that the arrival of the CNG signal from the telephone line is detected by the CNG signal detector 11 of the parent unit 502 during speech on the telephone subunit 504 (step 681), the parent unit 502 sends out a speech-off signal to the telephone subunit 504 in speech (step 682). More specifically, the radio transmission change-over switch 4 is connected to side b, and the speech-off signal is sent out to the radio communication section 5 by the control signal modem 6. In the case where the speech-off signal is detected by the control signal modem 28 during speech (step 683), the controller 24 of the telephone subunit 504 ends the speech mode and enters the waiting mode. The parent unit 502, after sending out the speech-off signal to the telephone subunit 504, transmits the fax communication-on signal to the facsimile subunit with telephone 508, thereby causing the facsimile subunit with telephone 508 to perform the facsimile receiving operation (step 636 in FIG. 43). The flow of operation performed in the parent unit 502 and the facsimile subunit with telephone 508 at steps 684 to 690 in FIG. 45 is the same as that explained above with reference to steps 652 to 658 in FIG. 46.

Figure 49:
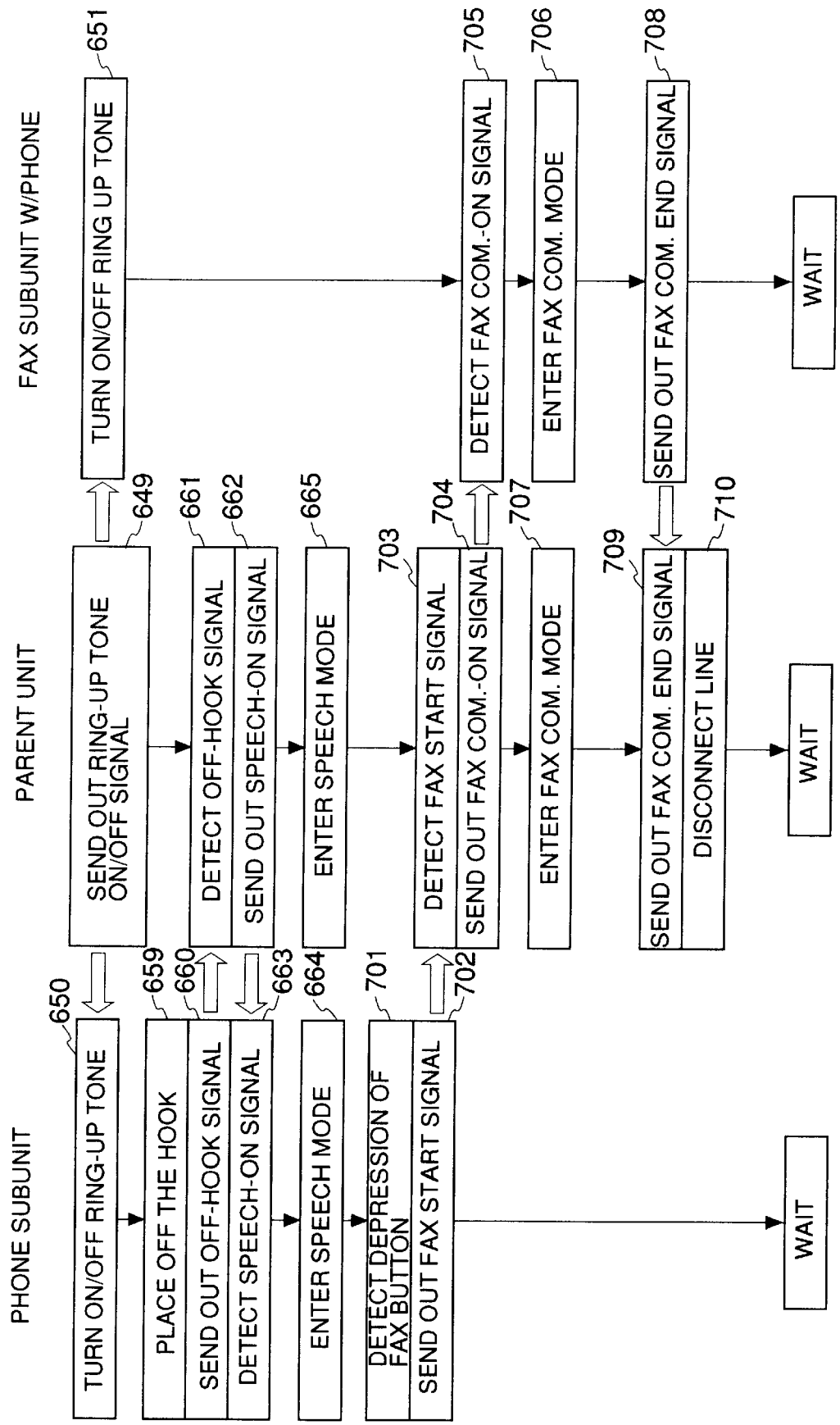
FIG. 49 is a flowchart showing the operation flow for radio communication with the FAX button depressed during conversation on the telephone subunit in the facsimile priority system according to the second embodiment.

Now, explanation will be made about the flow of operation performed upon depression of the FAX button 47 on the operating section 31 of the telephone subunit 504 during speech on the telephone subunit 504 at step 640 in FIG. 44. FIG. 49 shows the flow of operation involved. The flow of operation performed before the telephone subunit 504 and the parent unit 502 enter the speech mode (before step 664 for the parent unit and before step 665 for the telephone subunit) is the same as that explained with reference to FIG. 47. In the case where the controller 24 of the telephone subunit 504 detects that the FAX button 47 on the operating section 31 of the telephone subunit 504 is depressed during speech on the telephone subunit 504 (step 701), the telephone subunit 504 transmits a fax start signal to the parent unit 502 (step 702). More specifically, the controller 25 of the telephone subunit 504 connects the radio transmission change-over switch 27 to side b, and causes the control signal modem 28 to send out the fax start signal to the radio communication section 26. In the case where the controller 9 of the parent unit 502 detects, by way of the control signal modem 6, that the fax start signal is sent from the telephone subunit 504 during speech, i.e., during speech mode on the telephone subunit 504 (step 703), the fax communication-on signal is sent to the facsimile subunit with telephone 508 thereby causing the facsimile subunit with telephone 508 to perform the facsimile receiving operation (step 636 in FIG. 43). The flow of operation performed by the parent unit 502 and the facsimile subunit with telephone 508 at steps 704 to 710 in FIG. 49 is the same as that explained above with reference to steps 652 to 658 in FIG. 46.

Figure 50:
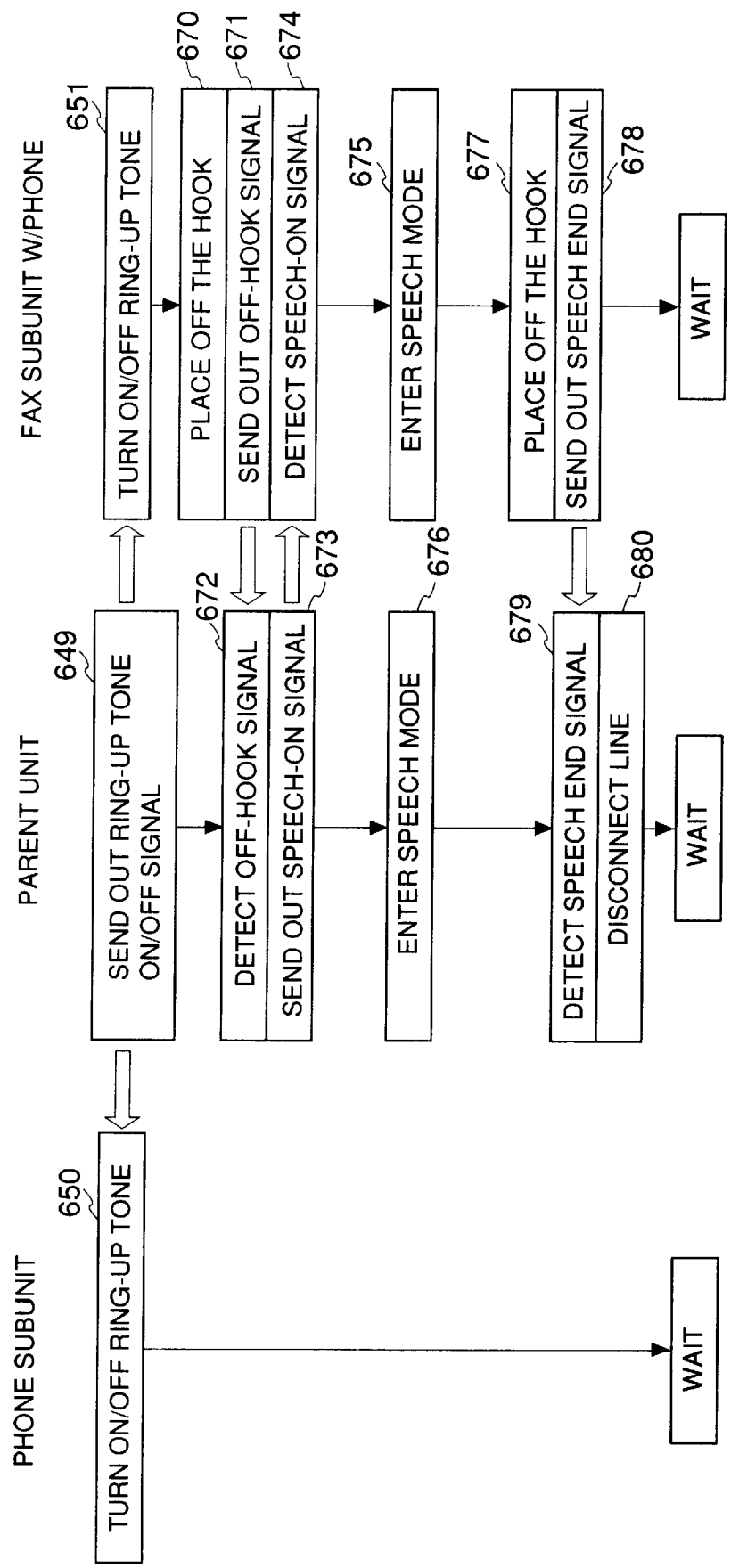
FIG. 50 is a flowchart showing the operation flow for radio communication with the facsimile subunit with telephone hooked off in the facsimile priority system according to the second embodiment.

Now, explanation will be made about the control operation performed upon detection that the facsimile subunit with telephone 508 is placed off the hook at step 629 in FIG. 42. According to this embodiment, the telephone subunit is placed off the hook in response to the telephone ring-up tone on the facsimile subunit with telephone 508 by depressing the line wire button 73 of the operating section 61 as shown in FIG. 29 or by raising the handset 509 of the facsimile subunit with telephone 508 shown in FIG. 26. When the line wire button 73 of the operating section 61 is depressed or the handset 509 is raised, the controller 60 of the facsimile subunit with telephone 508 turns on the line wire lamp built in the line wire button 73 in order to indicate that the line is in speech. Explanation will be made about the operation performed when the facsimile subunit with telephone 508 is placed off the hook in response to the telephone call shown in FIG. 50. FIG. 50 shows the process on and after step 649 where the parent unit 502 sends out the ring-up tone-on/off signal and step 651 where the facsimile subunit with telephone 508 turns on/off the ring-up tone in FIG. 46. The flow of operation performed up to this stage is the same as that explained above with reference to FIG. 46. The controller 60 of the facsimile subunit with telephone 508, upon depression of the line wire button 73 of the operating section 61 or the raising of the handset 509 described above, i.e., when the facsimile subunit with telephone 508 is placed off the hook (step 670), sends out the off-hook signal to the parent unit 502 (step 671). In the process, the controller 60 of the facsimile subunit with telephone 508 connects the radio transmission change-over switch 49 to side b, and sends out an off-hook signal to the radio communication section 48 by way of the control signal modem 59, thereby performing radio transmission to the parent unit 502. The controller 9 of the parent unit 502, upon detection of the off-hook signal sent from the facsimile subunit with telephone 508 by way of the control signal modem 6 (step 672), sends out a speech-on signal to the facsimile subunit with telephone 508 (step 673). The controller 9 of the parent unit 502 connects the radio transmission change-over switch 4 to side b, and sends out a speech-on signal to the radio communication section 5 by way of the control signal modem 6, thereby effecting radio transmission to the facsimile subunit with telephone 508. The controller 9 of the parent unit 502 then connects the radio transmission change-over switch 4 to side a. As a result, the parent unit 502 enters the speech mode (step 676), and the signal sent from the telephone line connected to the line wire connection terminal 1 is sent to the radio communication section 5 through the two-wire/four-wire converter 3, while the signal sent from the facsimile subunit with telephone 508 is received at the radio communication section 5 and sent to the telephone line through the two-wire/four-wire converter 3 at the same time. The controller 60 of the facsimile subunit with telephone 508 that has detected the speech-on signal transmitted from the parent unit 502 (step 674), on the other hand, connects the radio transmission change-over switch 49 to side a and the telephone/facsimile change-over switch 50 to side a. As a result, the facsimile subunit with telephone 508 enters the speech mode (step 675), and the signal received at the radio communication section 48 is sent to the voice output section 51 for producing a voice output, while the voice inputted from the voice input section 52 is transmitted to the parent unit 502 by the radio communication section 48. Both the parent unit 502 and the facsimile subunit with telephone 508 enter the speech mode, thereby setting the facsimile subunit with telephone 508 in speech mode (step 642 in FIG. 45).

Figure 45:
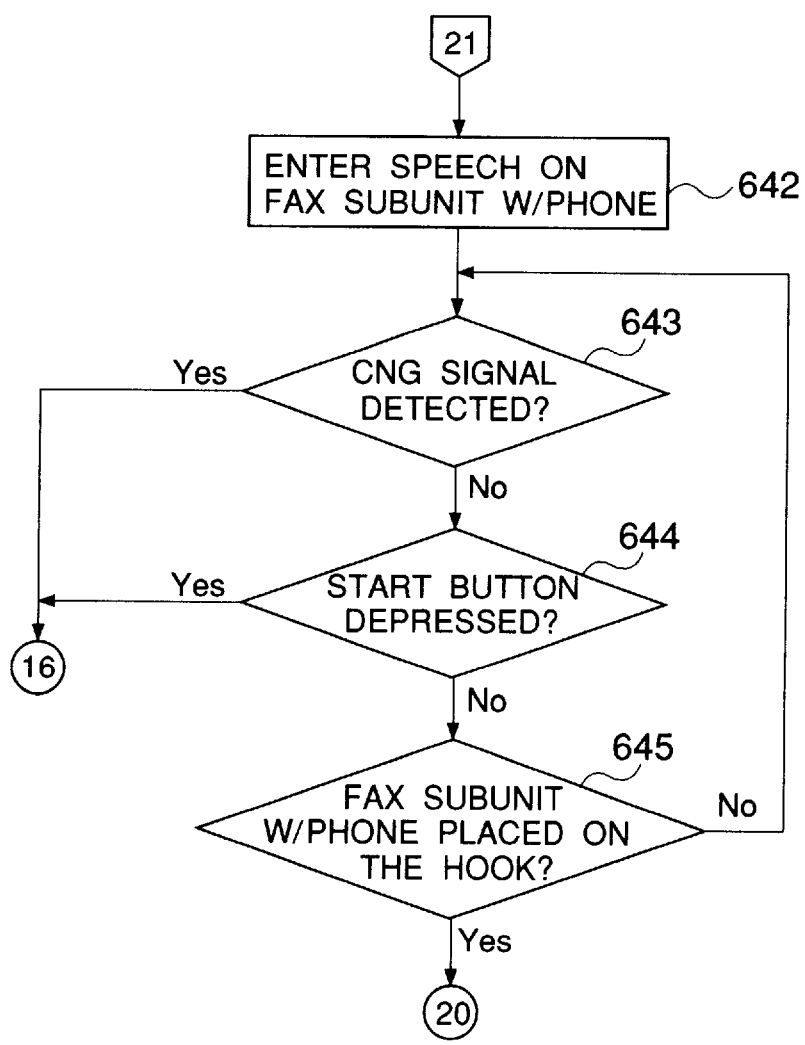
FIG. 45 is a flowchart showing a still further part of the operation flow in the facsimile priority system according to the second embodiment.

Even during the speech on the facsimile subunit with telephone 508, the parent unit 502 continues to detect whether the CNG signal has been sent from the other party (step 643 in FIG. 45) or whether the START button 69 of the facsimile subunit with telephone 508 has been depressed (step 644 in FIG. 45) until the facsimile subunit with telephone 508 is placed off the hook (step 645 in FIG. 45). Explanation will be made later about the operation performed upon detection of a CNG signal at step 643 or detection of the START button at step 644. Here, explanation will be made, with reference to FIG. 48, about the flow of operation performed when the CNG signal is not detected until the facsimile subunit with telephone 508 is placed on the hook as the START button 69 of the facsimile subunit with telephone 508 failed to be depressed.

With reference to FIG. 50, explanation will be made about the flow of operation performed when the facsimile subunit with telephone 508 in speech is placed on the hook, i.e., the telephone is hung up. FIG. 50 shows the process at and after step 649 where the ring-up tone-on/off signal is sent out from the parent unit and step 651 where the ring-up tone is turned on/ff on the facsimile subunit with telephone 508 in FIG. 46. The operation performed up to this stage is the same as that explained above with reference to FIG. 46. In hanging up the telephone on the facsimile subunit with telephone 508 according to this embodiment, the line wire button or outside line button 73 is depressed or the handset 509 is returned into position on the facsimile subunit with telephone 508. As described above, by depressing the line wire button 73 or raising the handset 509 while the ring-up tone is sounding on the facsimile subunit with telephone 508, the facsimile subunit with telephone 508 is placed off the hook and the line wire lamp built in the line wire button 73 is turned on. During speech by the facsimile subunit with telephone 508, therefore, the line wire lamp built in the line wire button 73 is kept on. Assuming that the line wire button 73 is depressed or that the handset 509 is restored into position on the facsimile subunit with telephone 508 under this condition, then the facsimile subunit with telephone 508 is placed on the hook, and the line wire lamp built in the line wire button 73 is turned off. More specifically, the controller 60 of the facsimile subunit with telephone 508, upon detection that the line wire button 73 on the operating section 31 is depressed during speech or that the handset 509 is restored into position (step 677), turns off the line wire lamp built in the line wire button 73 of the operating section 31, while at the same time connecting the radio transmission changeover switch 49 to side b with the speech end signal transmitted to the parent unit 502 through the control signal modem 59 (step 678). The facsimile subunit with telephone 508, after sending the speech end signal to the parent unit 502, enters the waiting mode. When the speech end signal sent from the facsimile subunit with telephone 508 is detected by the control signal modem 6 (step 679), the controller 9 of the parent unit 502 turns off the line connection relay 2 thereby to disconnect the telephone line (step 680 in FIG. 50 and step 637 in FIG. 43). After the telephone line is disconnected, the parent unit 502 enters the waiting mode.

Figure 51:
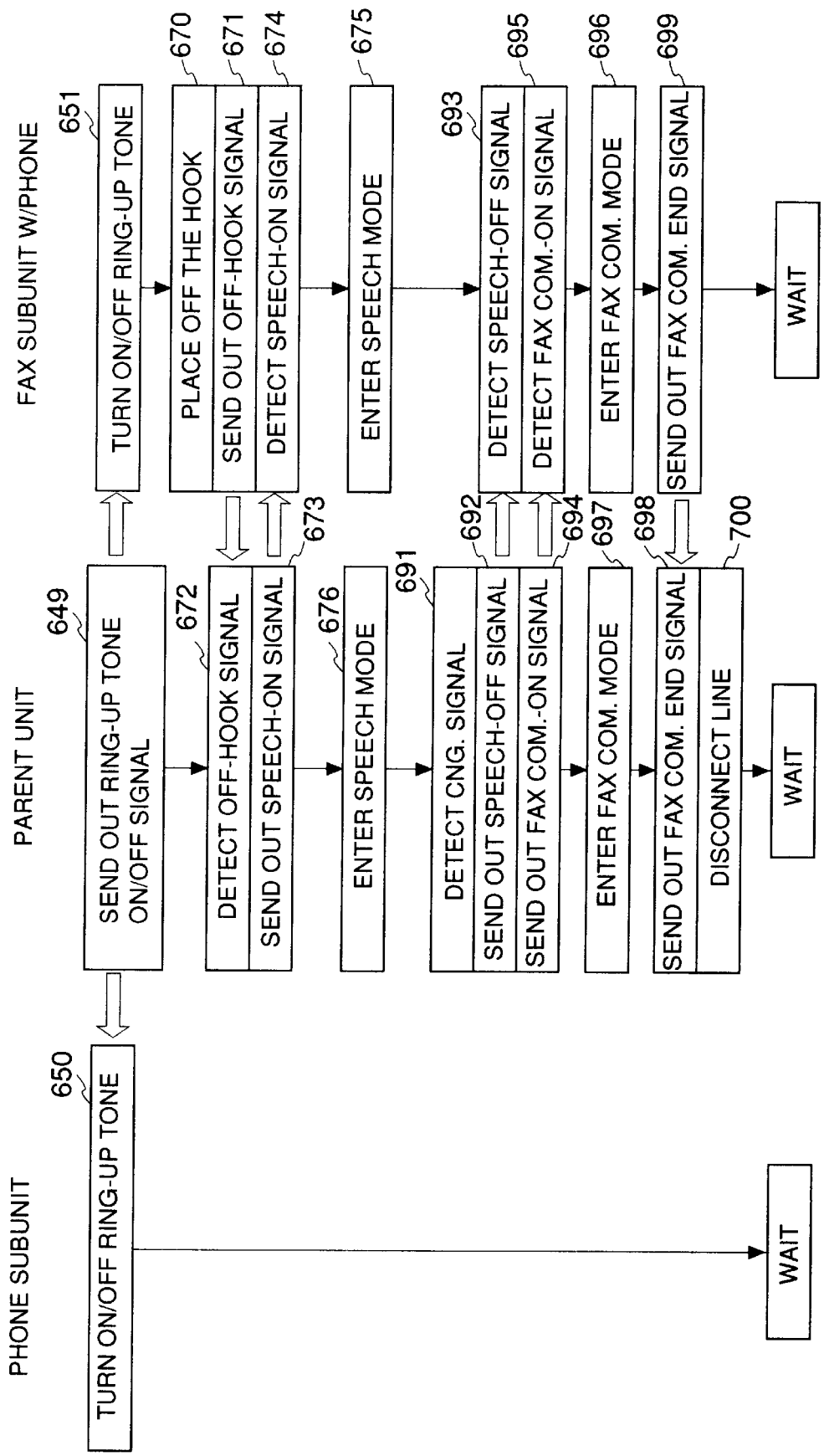
FIG. 51 is a flowchart showing the operation flow for radio communication with the CNG signal detected during conversation on the facsimile subunit with telephone in the facsimile priority system according to the second embodiment.

Explanation will be made about the flow of operation performed upon detection that the CNG signal has been sent from the other party at step 643 in FIG. 45. FIG. 50 shows the flow of operation involved. The flow of operation performed before the facsimile subunit with telephone 508 and the parent unit 502 enter the speech mode (before step 676 for the parent unit and before 675 for the facsimile subunit with telephone) is the same as that explained above with reference to FIG. 50. When the CNG signal detector 11 of the parent unit 502 detects that the CNG signal is sent from the telephone line during speech on the facsimile subunit with telephone 508 (step 691), the parent unit 502 sends out a speech-off signal to the facsimile subunit with telephone 508 in speech (step 692). More specifically, the radio transmission change-over switch 4 is connected to side b, and a speech-off signal is sent to the radio communication section 5 through the control signal modem 6. The controller 60 of the facsimile subunit with telephone 508, upon detection of the speech-off signal by the control signal modem 59 in speech (step 693), ends the speech mode and enters the waiting mode. The parent unit 502, after sending a speech-off signal to the facsimile subunit with telephone 508, sends out a fax communication-on signal to the facsimile subunit with telephone 508 thereby to perform the facsimile-receiving operation on the facsimile subunit with telephone 508 (step 636 in FIG. 43). The flow of operation performed in the parent unit 502 and the facsimile subunit with telephone 508 at steps 694 to 700 in FIG. 51 is the same as that explained above with reference to FIG. 46.

Figure 52:
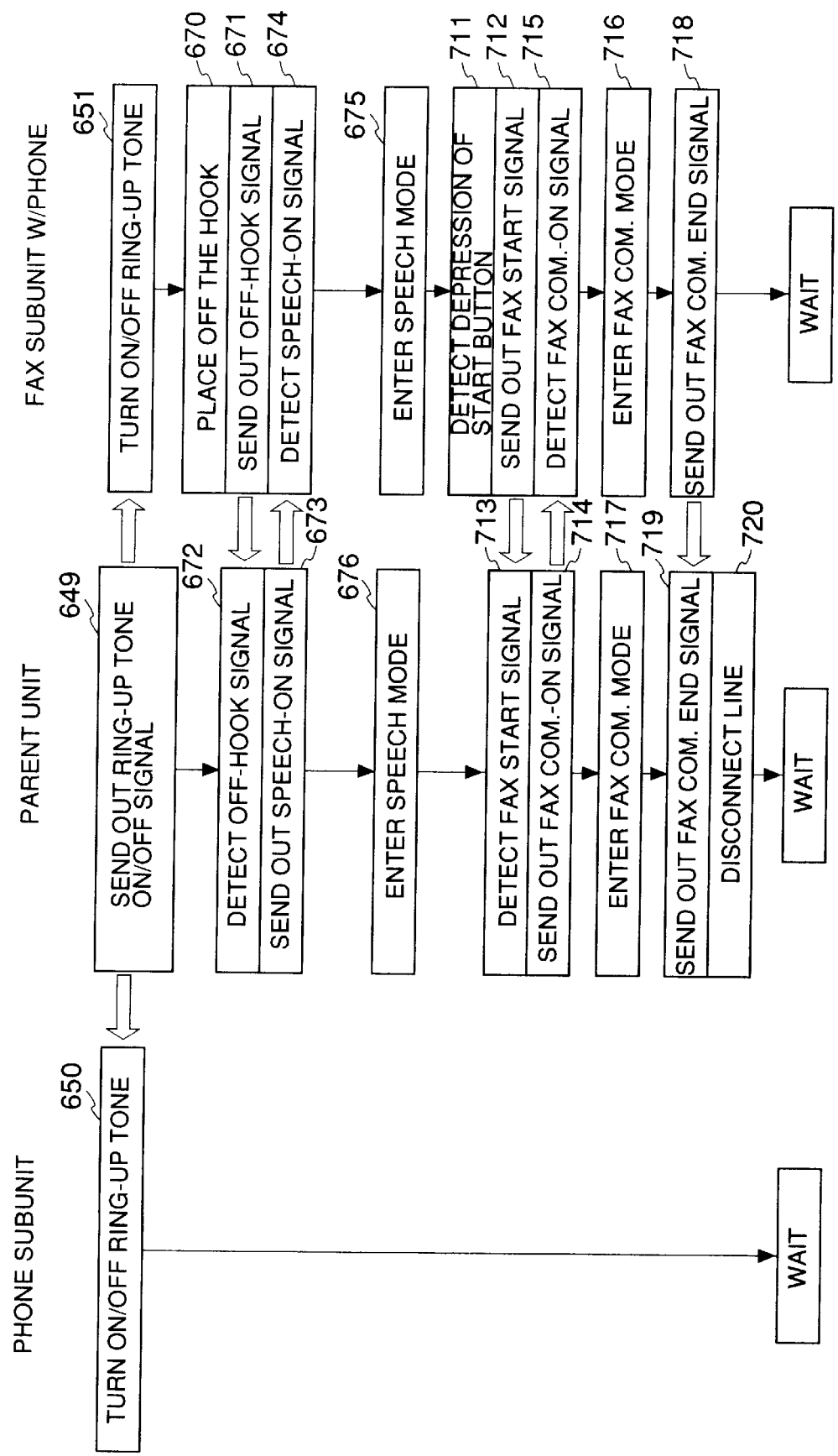
FIG. 52 is a flowchart showing the operation flow for radio communication with the START button depressed during conversation on the facsimile subunit with telephone in the facsimile priority system according to the second embodiment.
Figure 53:
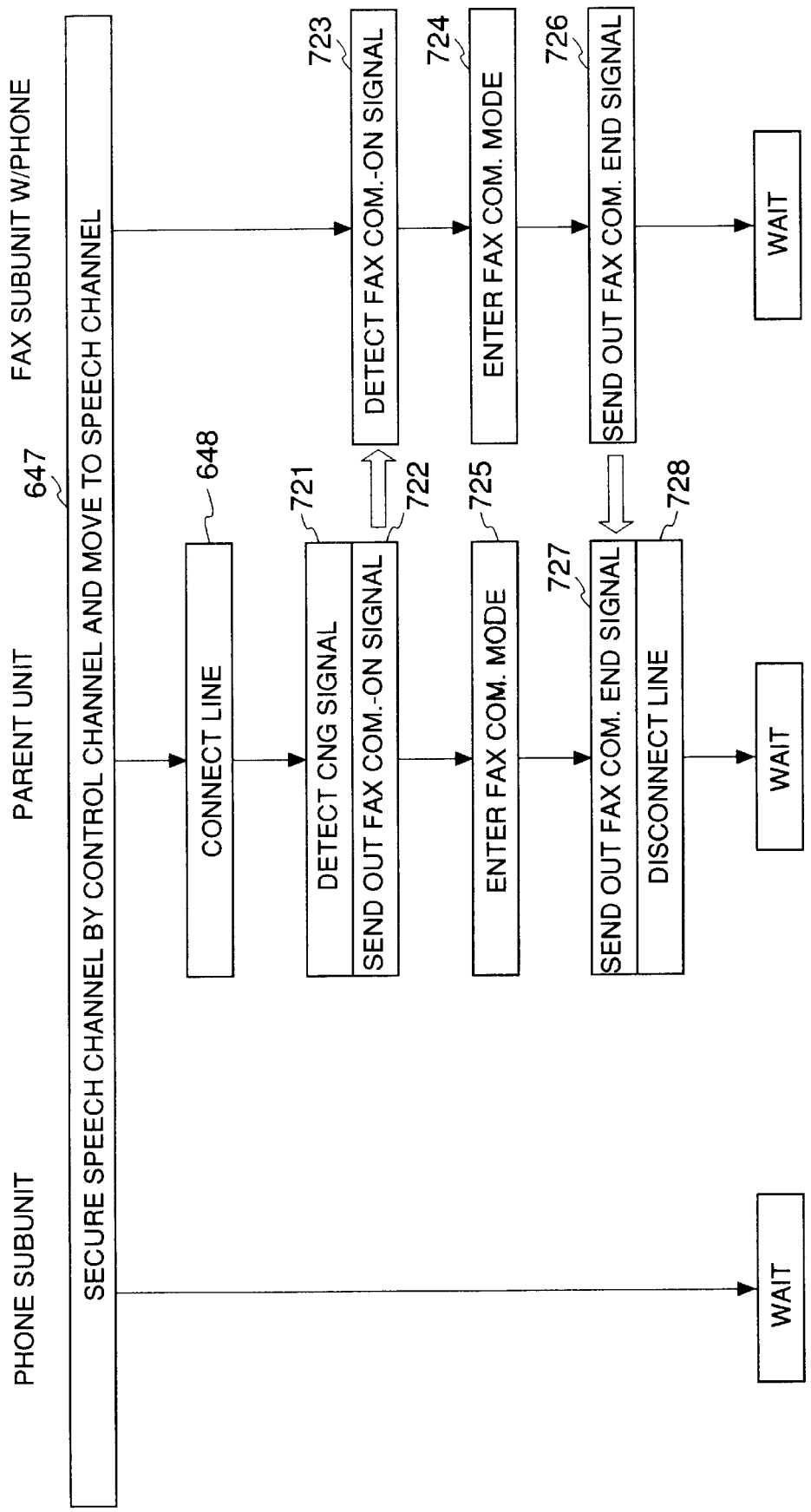
FIG. 53 is a flowchart showing the operation flow for radio communication with the CNG signal detected during voice response in the facsimile priority system according to the second embodiment.

Now, explanation will be made about the flow of operation performed when the START button 69 is depressed on the operating section 61 of the facsimile subunit with telephone 508 during speech on the facsimile subunit with telephone 508 at step 644 in FIG. 45. FIG. 52 shows the flow of operation involved. The flow of operation before the facsimile subunit with telephone 508 and the parent unit 502 enter the speech mode (before step 676 for the parent unit and before 675 for the facsimile subunit with telephone) is the same as that explained above with reference to FIG. 50. In the case where the depression of the START button 69 on the operating section 61 of the facsimiles subunit with telephone 508 is detected by the controller 60 of the facsimile subunit with telephone 508 during speech on the facsimile subunit with telephone 508 (step 711), the facsimile subunit with telephone 508 sends out a fax start signal to the parent unit 502 (step 712). More specifically, the controller 60 of the facsimile subunit with telephone 508 connects the radio transmission change-over switch 49 to side b, and sends out the fax start signal to the radio communication section 48 through the control signal modem 59. In the case where the facsimile subunit with telephone 508 detects through the control signal modem 6 that the fax start signal has been sent from the facsimile subunit with telephone 508 during speech, i.e., during speech mode on the facsimile subunit with telephone 508 (step 713), the fax communication-on signal is sent out to the facsimile subunit with telephone 508, thereby causing the facsimile subunit with telephone 508 to perform the facsimile-receiving operation (step 636 in FIG. 43). The flow of operation performed on the parent unit 502 and the facsimile subunit with telephone 508 at steps 714 to 720 in FIG. 52 is the same as that explained above with reference to FIG. 46.

Now, explanation will be made about the flow of operation performed upon detection by the CNG signal detector 11 that the CNG signal has arrived from the telephone line at step 623 in FIG. 41. The controller 9 of the parent unit 502, upon detection that the CNG signal has been sent from the other party while sending out a voice response, stops sending out the voice response at the voice response generator 8 (step 625 in FIG. 41), and transfers the control to the facsimile reception on the facsimile subunit with telephone 508 (step 636 in FIG. 43). The flow of operation for radio communication involved will be explained with reference to FIG. 53. The operation performed after a speech channel is secured by the control channel and transfer is made to the speech channel in FIG. 53 (step 647) before the line is connected (step 648) is the same as that explained above with reference to FIG. 46. In the case where the CNG signal detector 11 of the parent unit 502 detects that the CNG signal has arrived from the other party while the line is connected and the voice response is sent out (step 721), the controller 9 of the parent unit 502 connects the radio transmission change-over switch 4 to side b and sends out a fax communication-on signal to the facsimile subunit with telephone 508 by means of the control signal modem 6 (step 722). This fax communication-on signal, like the ring-up tone-on signal and the ring-up tone-off signal described above, is transmitted by taking advantage of the speech channel. The controller 9 of the parent unit 502, after transmitting the fax communication-on signal, connects the radio transmission change-over switch 4 to side a and further connects the line transmission change-over switch 7 to side a thereby to enter the fax communication mode (step 725). Under this condition, in the parent unit 502, the signal sent from the telephone line connected to the line wire connection terminal 1 is sent to the radio communication section 5 through the two-wire/four-wire converter 3 and then to the facsimile subunit with telephone 508. Also, the signal sent by radio from the facsimile subunit with telephone 508 is received at the radio communication section 5, and sent through the two-wire/four-wire converter 3 to the telephone line connected to the line wire connection terminal 1. In the facsimile subunit with telephone 508, on the other hand, the controller 60, upon detection that the fax communication-on signal transmitted by the parent unit 502 is received by the control signal modem 59 at step 254 (step 723), connects the radio transmission change-over switch 49 to side a and the telephone/facsimile change-over switch 50 to side b, thereby entering the fax communication mode (step 724). Under this condition, the signal received by the radio communication section 48 and sent from the parent unit 502 is applied to the fax modem 54, and the signal outputted from the fax modem 54 is transmitted to the parent unit 502 through the radio communication section 48. As a result, with the parent unit 502 and the facsimile subunit with telephone 508 both in fax communication mode, i.e., with the parent unit 502 at step 725 and the facsimile subunit with telephone 508 at step 724, the signal sent from the telephone line connected to the line wire connection terminal 1 of the parent unit 502 is sent out to the fax modem 54 of the facsimile subunit with telephone 508 by radio communication, and the signal output of the fax modem 54 to the telephone line connected to the line wire connection terminal 1 of the parent unit 502 by radio communication. Under this condition, the facsimile information sent from the other party in speech is received. The facsimile signal sent from the other party is demodulated at the fax modem 54, decoded into image information at the decoder 56, and produced as an output on the recorder 58. The procedure for facsimile communication is the same as that of the well-known facsimile system and will not be described again.

Upon completion of the facsimile receiving operation at the facsimile subunit with telephone 508, the facsimile subunit with telephone 508 sends a fax communication end signal to the parent unit 502 (step 726). The controller 60 of the facsimile subunit with telephone 508 connects the radio transmission change-over switch 49 to side b, and produces a fax communication end signal by way of the control signal modem 6, which output signal is transmitted to the parent unit 502 by the radio communication section 48. The controller 9 of the parent unit 502, upon detection through the control signal modem 6 that a fax communication end signal has arrived from the facsimile subunit with telephone 508 (step 727), turns off the line connection relay 2 thereby to disconnect the telephone line (step 637 in FIG. 43 and step 728 in FIG. 53). After that, the facsimile subunit with telephone 508, the telephone subunit 504 and the parent unit 502 all enter the waiting mode.

Figure 54:
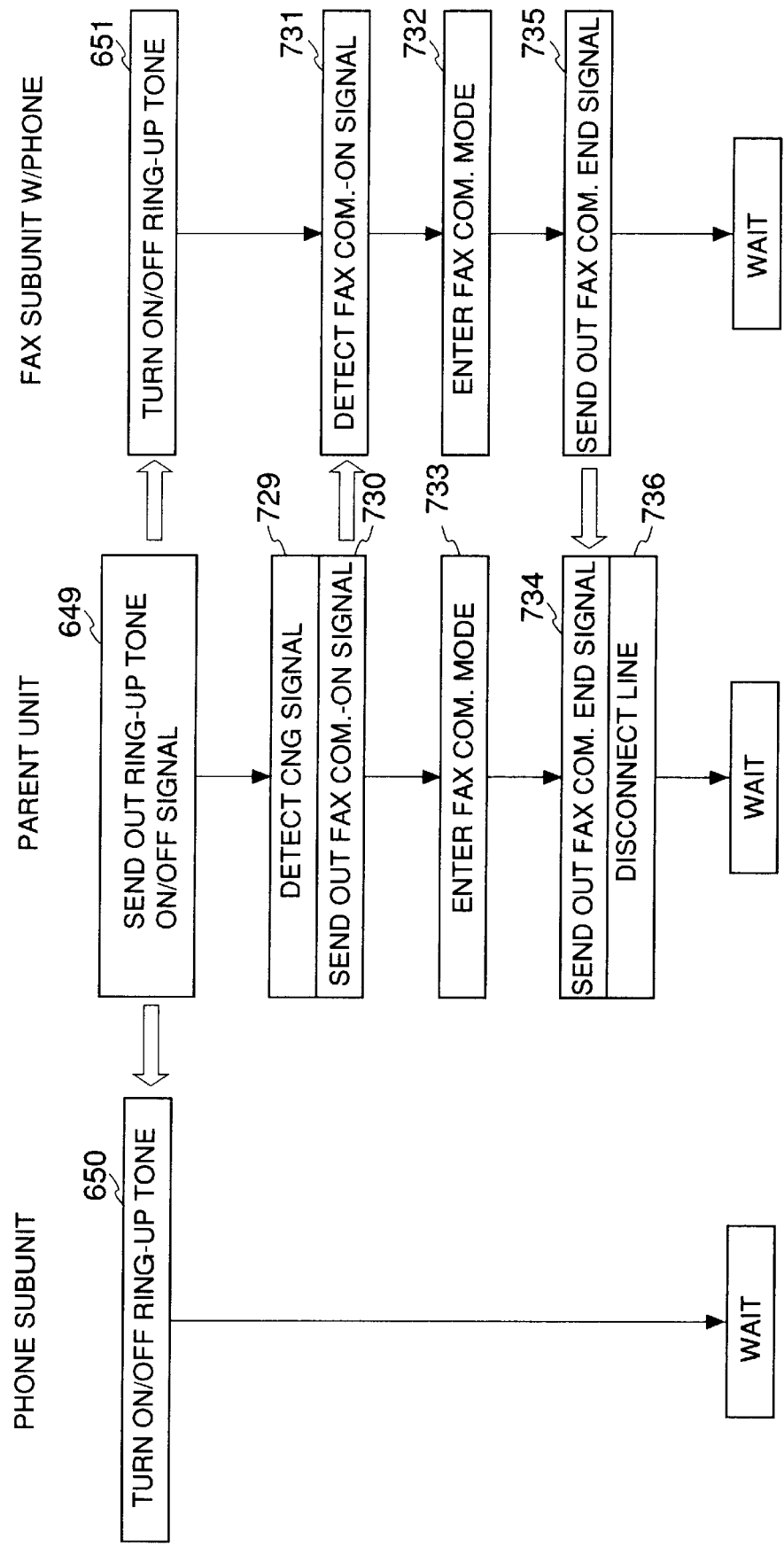
FIG. 54 is a flowchart showing the operation flow for radio communication with the CNG signal detected during the sounding of the ring-up tone in the facsimile priority system according to the second embodiment.

Now, explanation will be made about the flow of operation performed when the arrival of the CNG signal from the other party is detected during the sounding of the ring-up tone on the telephone subunit 504, i.e., when the CNG signal is detected at step 627 in FIG. 42. In FIG. 54, the flow of operation up to the sending out of the ring-up tone-on/off signal of the parent unit 502 (step 649), the turning on/off of the ring-up tone on the telephone subunit (step 650) and the turning on/off of the ring-up tone on the facsimile subunit with telephone 508 (step 651) is the same as that explained above with reference to FIG. 46. The controller 9 of the parent unit 502 controls the control signal modem 6 to send out a ring-up tone-on signal and a ring-up tone-off signal to the telephone subunit 504 and the facsimile subunit with telephone 508 at predetermined intervals of time, while causing the CNG signal detector 11 to detect whether the CNG signal has arrived from the other party. When the arrival of the CNG signal from the other party is detected by the CNG signal detector 11 (step 729), the controller 9 of the parent unit 502 connects the radio transmission change-over switch 4 to side b, and causes the control signal modem 6 to send out a fax communication-on signal to the facsimile subunit with telephone 508 (step 730). The fax communication-on signal, like the above-mentioned ring-up tone-on signal and the ring-up tone-off signal, is sent by taking advantage of the speech channel. The controller 9 of the parent unit 502, after transmitting the fax communication-on signal, connects the radio transmission change-over switch 4 to side a, and further connecting the line transmission change-over switch 7 to side a, enters the fax communication mode (step 733). Under this condition, in the parent unit 502, the signal sent from the telephone line connected to the line wire connection terminal 1 is sent to the radio communication section 5 through the two-wire/four-wire converter 3 and then transmitted to the facsimile subunit with telephone 508. Also, the signal arriving from the facsimile subunit with telephone 508 by radio is received by the radio communication section 5, and sent out to the telephone line connected to the line wire connection terminal 1 through the two-wire/four-wire converter 3. With the facsimile subunit with telephone 508, on the other hand, upon detection that the fax communication-on signal transmitted by the parent unit 502 at step 730 is received by the control signal modem 59 (step 731), the controller 60 connects the radio transmission change-over switch 49 to side a and the telephone/facsimile change-over switch 50 to side b, thereby entering the fax communication mode (step 732). Under this condition, the signal received at the radio communication section 48 and transmitted by the parent unit 502 is applied to the fax modem 54, and the signal outputted from the fax modem 54 is transmitted to the parent unit 502 through the radio communication section 48. With the parent unit 502 and the facsimile subunit with telephone 508 both set in fax communication mode, i.e., with the parent unit 502 at step 733 and the facsimile subunit with telephone 508 at step 732, therefore, the signal sent from the telephone line connected to the line wire connection terminal 1 of the parent unit 502 is sent out to the fax modem 54 of the facsimile subunit with telephone 508 by radio communication, while the signal produced by the fax modem 54 is transmitted to the telephone line connected to the line wire connection terminal 1 of the parent unit 502 by radio communication. The facsimile information transmitted by the other party is received under this condition. The facsimile signal sent from the other party is demodulated at the fax modem 54, decoded into image information at the decoder 56, and produced as an output on the recorder 58. The procedure for facsimile communication is identical with that for the conventional facsimile system and therefore will not be described again.

Upon completion of the facsimile receiving operation on the facsimile subunit with telephone 508, the facsimile subunit with telephone 508 sends a fax communication end signal to the parent unit 502 (step 735). The controller 60 of the facsimile subunit with telephone 508 connects the radio transmission change-over switch 49 to side b, produces a fax communication end signal by way of the control signal modem 59, and transmits it to the parent unit 502 through the radio communication section 48. The controller 9 of the parent unit 502, upon detection that the fax communication end signal has been sent from the facsimile subunit with telephone 508 by way of the control signal modem 6 (step 734), turns off the line connection relay 2 thereby to disconnect the telephone line (step 637 in FIG. 43 and step 736 in FIG. 54). After that, the facsimile subunit with telephone 508, the telephone subunit 504 and the parent unit 502 all enter the waiting mode.

As described above, according to this embodiment, there is provided a facsimile system comprising a parent unit connected to the telephone line, a telephone subunit connected to the parent unit by radio and a facsimile subunit with telephone having the speech function, in which when a telephone call arrives, the parent unit connects the line, and upon detection of a CNG signal indicating the facsimile transmission from the other party, the facsimile subunit with telephone is connected by radio for facsimile receiving operation, while upon failure to detect a CNG signal, the ring-up tone on the facsimile subunit with telephone is sounded, thereby making it possible for a single telephone line to be shared by the facsimile communication and speech. Also, upon detection of the arrival of a CNG signal from the other party during speech on the telephone subunit or the facsimile subunit with telephone, the parent unit detects the CNG signal, thereby automatically switching to the facsimile receiving operation on the facsimile subunit with telephone. The operating convenience of the facsimile system user is thus improved.

Now, a third embodiment of the invention will be explained below with reference to the accompanying drawings.

Figure 55:
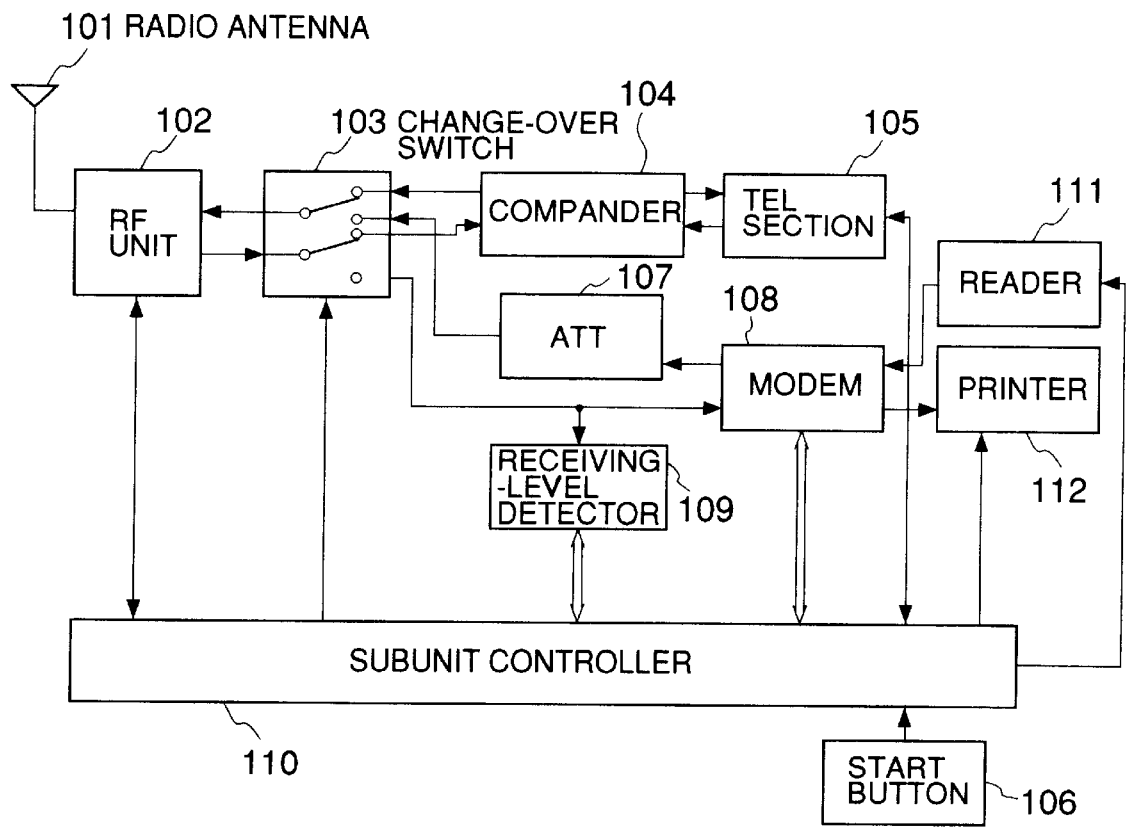
FIG. 55 is a block diagram showing a facsimile subunit according to a third embodiment of the invention.

FIG. 55 is a block diagram showing a cordless subunit facsimile system according to the present invention. In FIG. 55, numeral 101 designates a transmission/receiving antenna, numeral 102 a radio unit (hereinafter called "the RF unit"), numeral 103 a change-over switch, numeral 14 a compander for compressing and expanding signals, numeral 105 a telephone section (hereinafter called "the TEL section"), numeral 106 a START button, numeral 107 an attenuator (hereinafter called "the ATT") for controlling the signal for image data transmission, numeral 108 a modem, numeral 109 a receiving level detector for detecting the level of the signal received, numeral 111 a subunit controller for controlling the cordless subunit facsimile system, numeral 111 a reader for reading and encoding the image information to be sent, and numeral 112 a printer for decoding and producing a print output of the image signal received.

The RF unit 102 has the function of demodulating and sending by radio the voice signal, the image data signal, the control signal, etc. sent from the subunit controller 110 or demodulating and sending to various parts the signal sent by radio. In other words, the control signal sent from the parent unit is applied to the subunit controller 110, and the voice or facsimile signal to the switch 103.

The compander 104 is for improving the signal quality of the voice signal transmitted or received.

The ATT has the function of regulating the output signal level of the modem 108 to the optimum level for the RF unit 102 at the time of transmitting image data. The image transmission level is determined at a constant value by the modem, and therefore the value of ATT, once determined, is not required to be changed against such image transmission level.

The receiving level detector 109 is for detecting and sending the signal level at the time of image data reception and sending it to the subunit controller 110.

The reader 111 has the function of reading and encoding the image information to be transmitted in response to the control signal from the subunit controller 110 and sending it to the modem 108.

The printer 112 is to decode and print the image data sent from the modem 108 in response to the control signal from the subunit controller 110.

Figure 56:
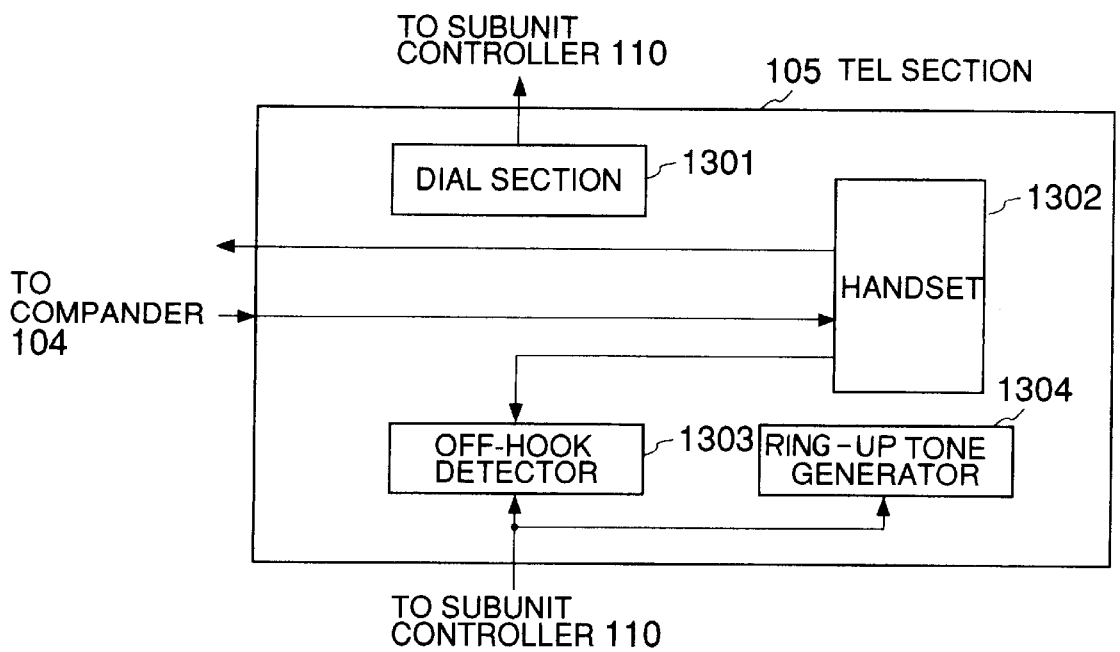
FIG. 56 is a block diagram showing the TEL section of a facsimile subunit in FIG. 55.

FIG. 56 is a diagram showing the details of the TEL section 105 in FIG. 55. Numeral 1301 designates a dial, numeral 1302 a handset to input and output the voice signal, numeral 1303 an off-hook detector for detecting whether the handset 1302 is placed off the hook and numeral 1304 a ring-up tone generator for informing the subunit that the telephone ring-up tone has arrived.

Figure 57:
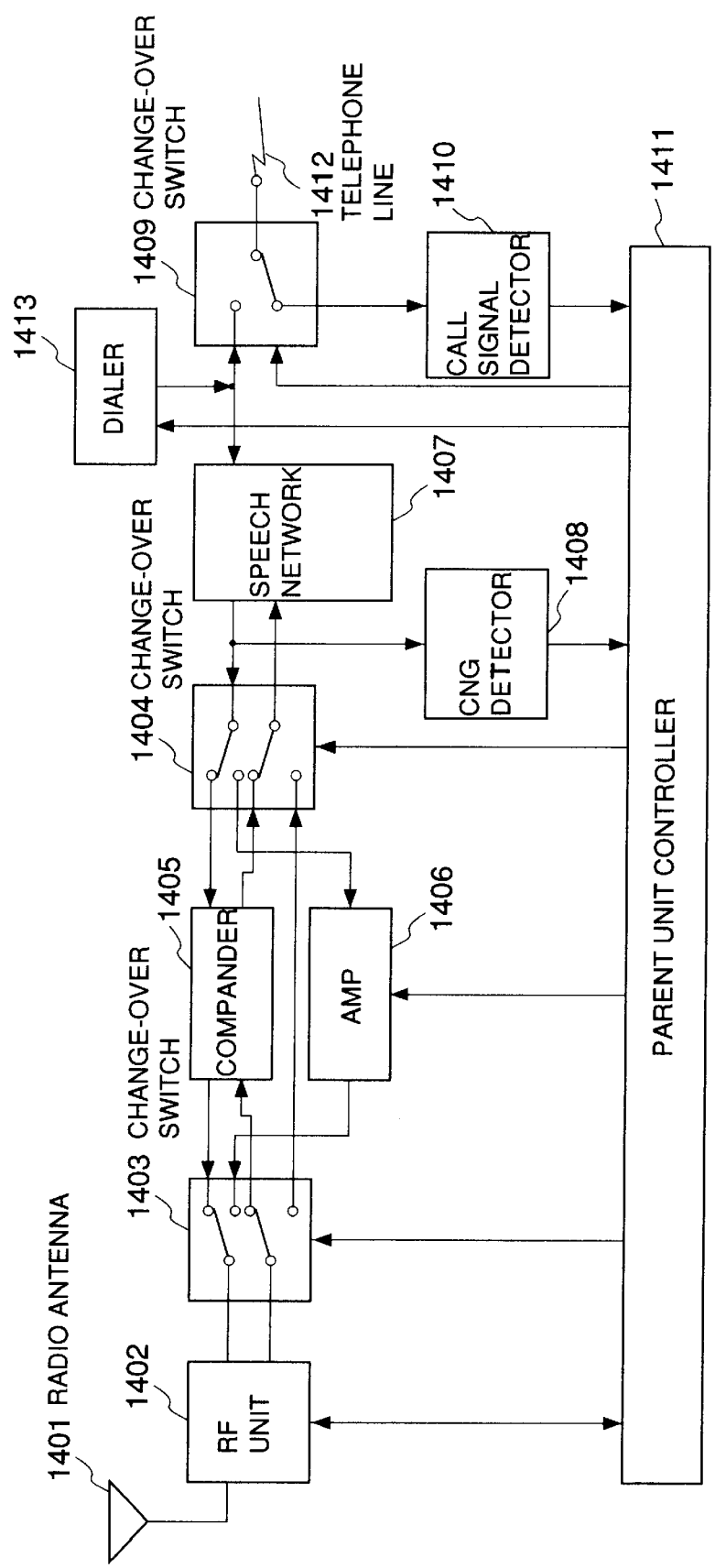
FIG. 57 is a block diagram showing a parent unit according to the third embodiment.

FIG. 57 is a block diagram showing the parent unit for transmitting by radio the signal sent from the telephone line to the cordless subunit facsimile system, and receiving by radio and sending to the other party by the telephone line the signal sent from the subunit. Numeral 1401 designates a transmission/receiving antenna, numeral 1402 a radio unit (hereinafter called "the RF unit"), numerals 1403, 1404 change-over switches, numeral 1405 a compander, numeral 1406 an amplifier for adjusting the level of the image data signal received, numeral 1407 a speech network, numeral 1408 a CNG (calling tone) signal sent from the other party during the facsimile receiving operation, numeral 1409 a change-over switch, numeral 1410 a call detector for detecting a telephone call, numeral 1411 a parent unit controller for controlling the parent unit as a whole, numeral 1412 a telephone line, and numeral 1413 a dialer for dialing the telephone number of the other party that is the calling party.

The amplifier 1406 has the function of regulating the signal level by determining a set gain with a control signal sent from the parent unit controller 1411 as described later in order to regulate and send the level of the received image data signal to the optimum value of the RF unit 1402.

The CNG signal detector 1408 is for detecting the CNG signal produced at the time of facsimile transmission from the other party with the telephone line connected, and sending a control signal indicating the fact to the parent unit controller 1411.

The call detector 1410 is for detecting a call signal on the telephone line and sending a control signal informing the parent controller 1411 of the fact.

Figure 58:
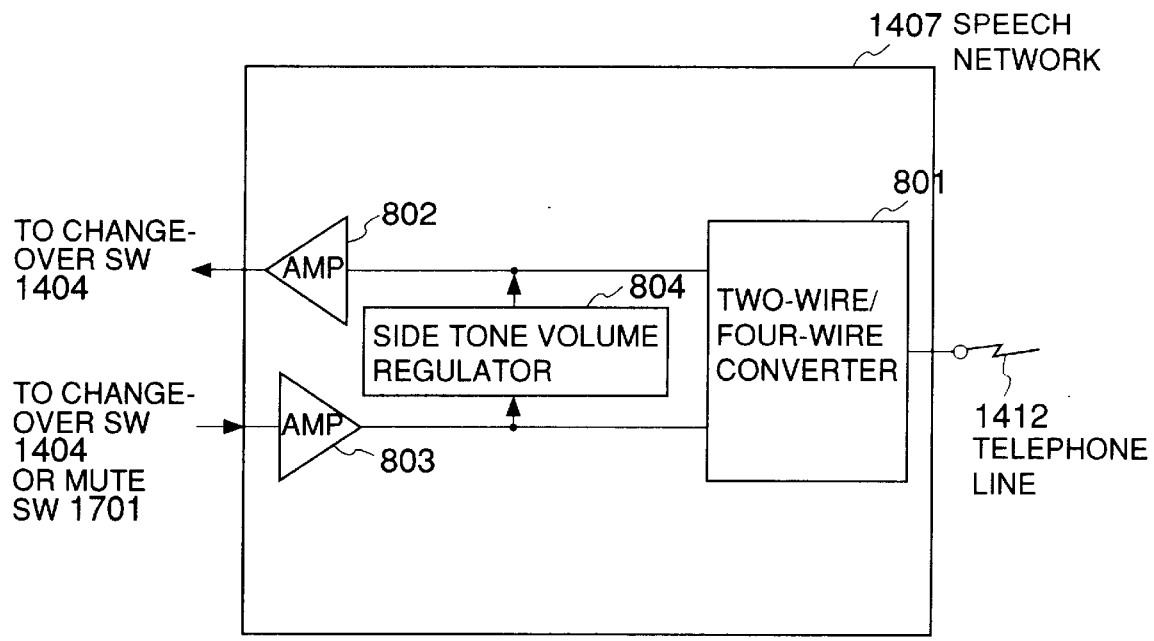
FIG. 58 is a block diagram showing the speech network of the parent unit in FIG. 57.

FIG. 58 is a diagram showing the details of the speech network 1407 in FIG. 57, in which numeral 801 designates a two-wire/four-wire converter used for two-way conversation with two wires, numeral 802 an amplifier for amplifying the signal at the called party in speech, numeral 803 an amplifier for amplifying the signal at the calling party in speech, and numeral 804 a sidetone regulator for regulating the side tone.

First, the facsimile receiving operation will be explained.

When a telephone call arrives, the ring-up tone is sent to the telephone line 1412. With the parent unit, under the initial condition, the change-over switch 1409 is connected to the call signal detector 1410, so that the call signal is detected by the call signal detector 1410 and the parent unit controller 1411 is so informed. The parent unit controller 1411 transmits by radio the control signal indicating the detection of the call signal to the subunit through the RF unit 1402. In the subunit, the subunit controller 110 receives the control signal through the RF unit 102. The subunit controller 110 activates the ring-up tone generator 1304 of the TEL section 105 thereby to start the ring-up tone by way of the ring-up tone generator. When the user at the called end picks up the handset 1302, the fact is detected by the off-hook detector 1303. Even when the user fails to pick up the handset 1302, the subunit controller 110 is automatically placed off the hook after the lapse of a predetermined length of time. The subunit controller 110 transmits the control signal indicating the off-hook condition to the parent unit by radio through the RF unit 102. With the parent unit, after the control signal is received at the RF unit 1402, the parent unit controller 1411 switches the change-over switch 1409 to the speech network 1407.

Now, the receiving operation is over. After that, the CNG signal detector 1408 detects the CNG signal for a predetermined length of time (about ten seconds). In initial condition, the change-over switches 1403 and 1404 for the parent unit are connected to the compander 1405. Upon detection of a CNG signal, a signal indicating the detection is sent from the CNG signal detector 1408 to the parent unit controller 1411, which in turn sends the control signal to the RF unit 1402, the switch 1403 and the switch 1404 respectively, thereby turning the switch 1403 and the switch 1404 in the reverse direction. The control signal is sent also to the subunit controller 110 through the RF unit 102 from the RF unit 1402, thereby turning the switch 103 also in the direction reverse to the compander 104. The switches 103, 1403 and 1404 are not turned before the subunit controller 110 receives a signal indicating the end of image communication from the modem 108.

In the case where the CNG detector 1408 fails to detect the CNG signal, the other party is in telephone mode. Under this condition, the change-over switch 103 is connected to the compander 104, and the change-over switches 1403, 1404 are also connected to the compander 5. The voice signal can thus be transmitted and received.

In this way, when the system is used as a telephone, the compander effectively functions with both the parent unit and the subunit, thereby improving the S/N of the voice signal. In facsimile communication, on the other hand, the signal distortion by the compander is prevented from being aggravated.

Generally, with the facsimile communication, a procedural signal is transmitted and received in order to determine a most suitable method of communication by confirming the transmission quality including the line condition between the calling and called stations before transmitting or receiving the image signal. A time period of about one second is allowed as a preamble before a procedural signal is sent in order to assure transmission without adversely affecting the procedural signal.

According to the present embodiment, the receiving level of the preamble signal is detected in the subunit before receiving the facsimile signal, and the parent unit is set in the best condition for radio transmission from the RF unit 402 of the parent unit to the RF unit 102 of the subunit by adjusting the input signal from the telephone line 412 to the optimum level. Generally, the receiving level of the image data signal on the facsimile system is from −15 dBm to −43 dBm with a wide dynamic range. The radio apparatus, on the other hand, is limited in channel intervals, and with the FM modulation normally used, the input signal level is limited to prevent over-modulation. As a result, if the signal level inputted to the RF unit 1402 is large, the signal is distorted and the right image data cannot be transmitted. In the case where the signal level applied to the RF unit 1402 is too small, by contrast, the S/N of the radio section is deteriorated, thereby making it impossible to transmit a right image data. In view of this, the deterioration of the signal transmitted by radio to the subunit from the parent unit is reduced by regulating the level of the signal inputted to the RF unit 1402 to optimum value.

Specifically, in the subunit, when the preamble signal begins to be received, the modem 108 applies the fact to the subunit controller 110. The subunit controller 110 produces a control signal to the receiving level detector 109 to read the receiving level. The receiving level detector 109 applies the receiving level data thus read to the subunit controller 110. Then, the receiving level data is sent from the subunit controller 110 to the RF unit 102, and further sent to the parent unit controller 1411 through the RF unit 1402. The parent unit 1411 that has received the receiving level data calculates a set gain corresponding to the receiving level thus supplied. The set gain is set in the amplifier 1406 by the parent unit controller 1411.

As a result, the signal level applied to the RF unit 1402 is adjusted to an optimum value, and therefore the deterioration of the signal quality in the radio transmission from the parent unit to the subunit is reduced.

According to this embodiment, the parent unit controller 1411 and the subunit controller 110 operate in such a manner as to complete the setting of the gain of the amplifier 1406 during the preamble of the procedural signal. Therefore, after the gain is set, the procedural signal data for facsimile is sent and the image data communication is started after completion of the procedure.

Now, explanation will be made about the facsimile transmission.

When making a telephone call, i.e., at the time of transmission, the handset is first placed off the hook by the user. With the subunit, the off-hook condition is detected by the off-hook detector 1303, so that the subunit controller 110 sends a control signal indicating the off-hook condition to the parent unit controller 1411 through the RF unit 102 and the RF unit 1402. With the parent unit, the change-over switch 1409 is turned to the speech network 1407 by the parent unit controller 1411, and the telephone line is connected to permit dialing. When the dial section 1401 dials the number of the other party, the particular signal is applied to the subunit controller 110 and then sent to the parent controller 1411 through the RF unit 102 and the RF unit 1402. The parent unit controller 1411 starts the dialer 1413 and applies a dial signal to the telephone line 1412. Now, the transmission operation is over.

Subsequently, upon depression of the START button for sending an original, a control signal indicating the fact is applied to the subunit controller 110. Further, this signal is sent to the parent unit controller 1411 through the RF unit 1402 from the RF unit 102. This signal causes a control signal to be applied from the subunit controller 110 to the change-over switch 103, and further from the parent unit controller 1411 to the change-over switches 1403 and 1404 for turning these switches in the direction reverse to the companders 104 and 1405, thereby turning the respective switches. In the absence of this start button signal, i.e., when the system is used as a telephone, the switches 103, 1403 and 1404 are connected to the companders 104, 1405.

In this way, when the system is used as a telephone, both the parent unit and the subunit have the compander operated to improve the signal-to-noise ratio of the voice signal. In facsimile communication, on the other hand, the signal distortion due to the compander is prevented from increasing.

After the transmission and receiving of the procedural signal is complete, the image data is transmitted.

As described above, according to this embodiment, the signal level applied to the RF unit 1402 is adjusted to the optimum level by the amplifier 1406 in accordance with the level of the received signal during the facsimile receiving operation, and therefore the deterioration of signal quality is reduced in the radio portion. Also, during the facsimile transmission/receiving, a compander for improving the S/N of the voice signal is inserted in a bypass thereby to prevent the distortion of the facsimile signal from being aggravated.

Now, explanation will be made about a fourth embodiment of the cordless subunit facsimile system according to the present invention.

Figure 59:
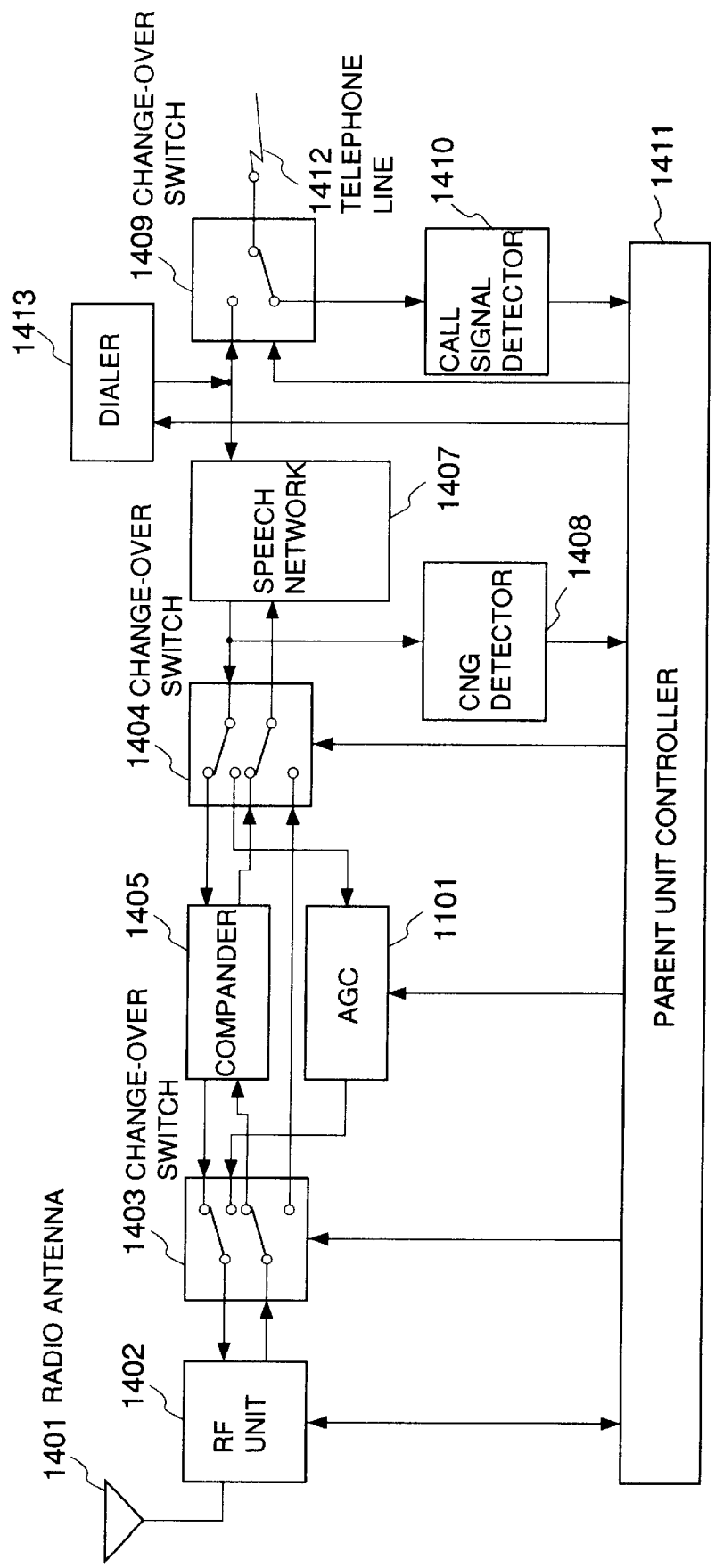
FIG. 59 is a block diagram showing a parent unit according to a fourth embodiment of the invention.

FIG. 59 is a block diagram showing a parent unit of a cordless subunit facsimile system according to the fourth embodiment of the invention. In FIG. 59, those component parts denoted by the same reference numerals as in FIG. 57 operate the same manner as described with reference to the third embodiment. The difference from FIG. 57 is that an automatic level regulator (hereinafter referred to as "the AGC") 1101 is inserted for automatically adjusting the level of the received signal in place of the amplifier 1406.

The operation of facsimile transmission according to this embodiment is the same as in the embodiment described above. Explanation below will be made about the operation of facsimile receiving.

The operation before the turning of the switches upon detection of a CNG signal after signal arrival and transmission is the same as in the third embodiment. With the parent unit, the signals (preamble signal, procedural signal, facsimile signal, etc.) transmitted through the telephone line 1412 from the other party are applied to the AGC 1101 through the change-over switch 1409, the speech network 1407 and the change-over switch 1404. The signal applied to the AGC 1101 is adjusted to the optimum level of input to the RF unit 1402 and so applied to the RF unit 1402.

The AGC is of two types. One is used with the radio cassette or the like for automatically regulating the gain in accordance with the input signal as required. The other is of such a type that the gain is automatically adjusted during a specified period of time and the particular gain is maintained thereafter.

The process up to this stage is performed in the preamble. After that, upon completion of the transmission and receiving of the procedural signal, the communication of the image data is started.

As a result, the quality deterioration of the facsimile signal transmitted from the RF unit 1402 to the RF unit 102 is reduced.

Now, a fifth embodiment of the invention will be explained.

Figure 60:
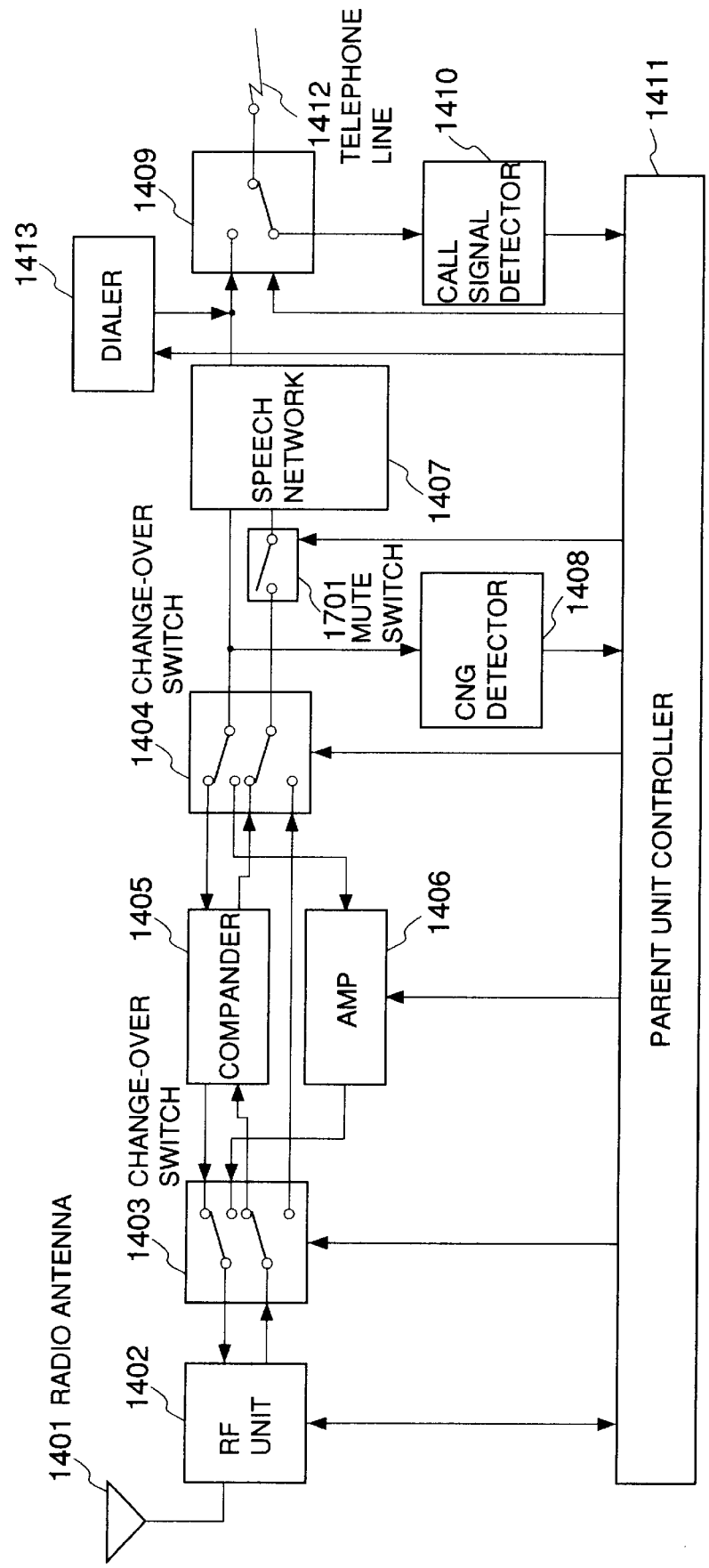
FIG. 60 is a block diagram showing a parent unit according to a fifth embodiment of the invention.

FIG. 60 is a block diagram showing a configuration of the parent unit of a cordless subunit facsimile system according to the invention. In FIG. 60, the same component parts as in the third embodiment shown in FIG. 57 are denoted with the same reference numerals respectively. The embodiment under consideration is different from that in FIG. 57 only in that a mute switch 1701 is added.

In the speech network 1407, generally, the voice applied through the telephone transmitter during speech is sent not only to the other party but also to the telephone receiver. The reason is that the conversation of human being is fundamentally what is called the full duplex communication in which the speech of the other party must also be heard. And the voice of the speaker is made audible to himself as well in order to improve the man-machine interface through the handset held in hand. The volume of sound returned to the receiver is called the side tone volume, the level of which is adjusted at the side tone regulator 804. The facsimile communication, however, is a semi-duplex communication in which transmission and receiving are independent of each other, and therefore the side tone is not required. The presence of side tone forms a background noise and would deteriorate the communication performance. In view of this, according to this embodiment, as shown in FIG. 60, the mute switch 1701 is opened only when the signal is transmitted from the RF unit 1402 of the parent unit to the RF unit 102 of the subunit. As a result, when the signal is received by the subunit, the unrequired signal (which forms a side tone signal in telephone mode) received at the receiver of the RF unit 1402 of the parent unit is prevented from returning at the speech network 1407 and mixing with the signal transmitted to the subunit. The deterioration of the communication performance is thus prevented.

The mute switch 1701 has the same effect if inserted between the amplifier 803 and the side tone volume regulator 804 in the speech network 1407 in FIG. 58. As an alternative, the mute switch 1701 may be replaced by a switch for releasing the side tone volume regulator 804 with equal effect.

Now, a sixth embodiment of the invention will be explained.

Figure 61:
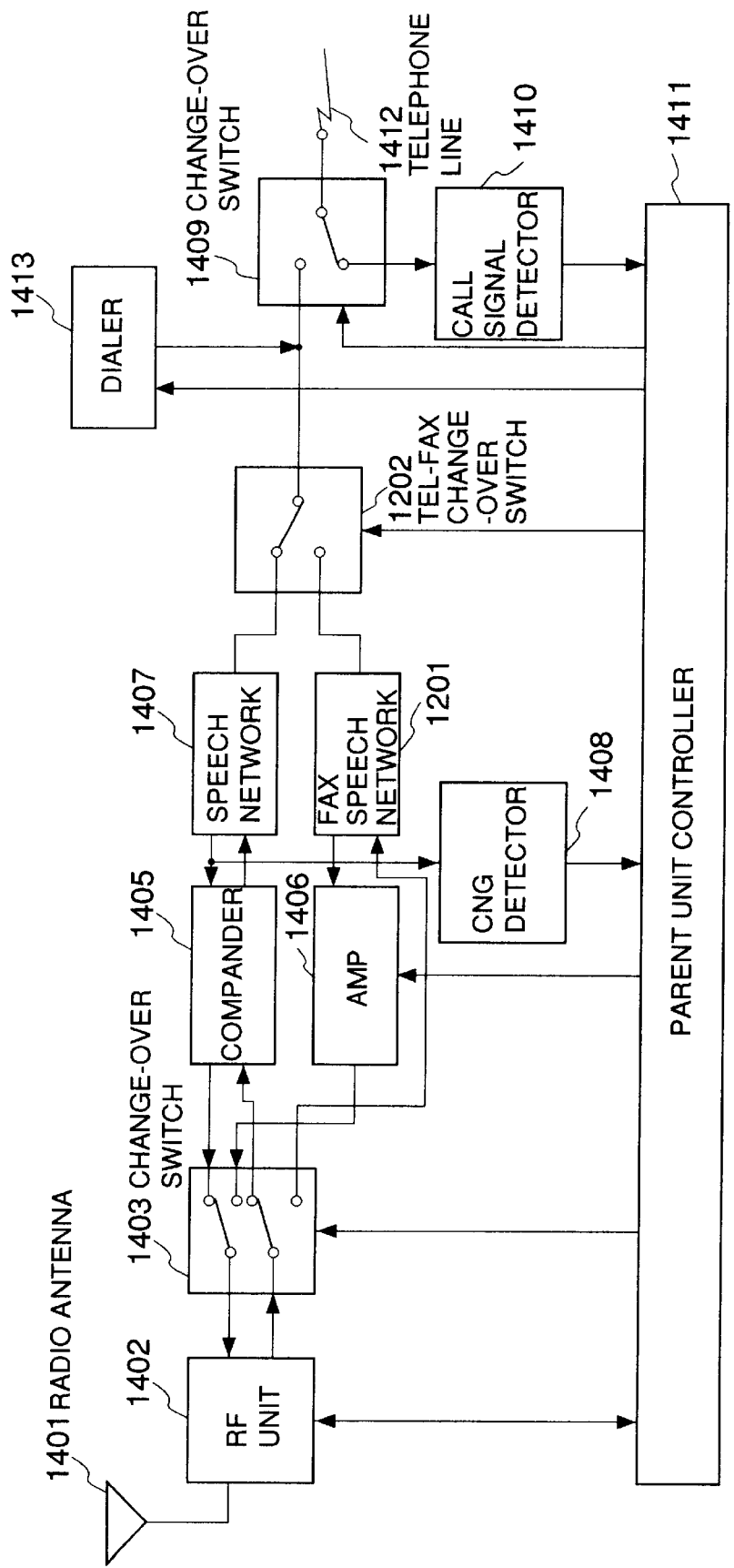
FIG. 61 is a block diagram showing a parent unit according to a sixth embodiment of the invention.

FIG. 61 is a block diagram showing the parent unit of a cordless subunit facsimile system according to the sixth embodiment of the invention. In FIG. 61, the same reference numerals as in FIG. 57 denote the same component parts as in FIG. 57 which operate the same way respectively as described with reference to the third embodiment. Numeral 1201 designates a fax speech network, and numeral 1202 a TEL-FAX change-over switch.

Figure 62:
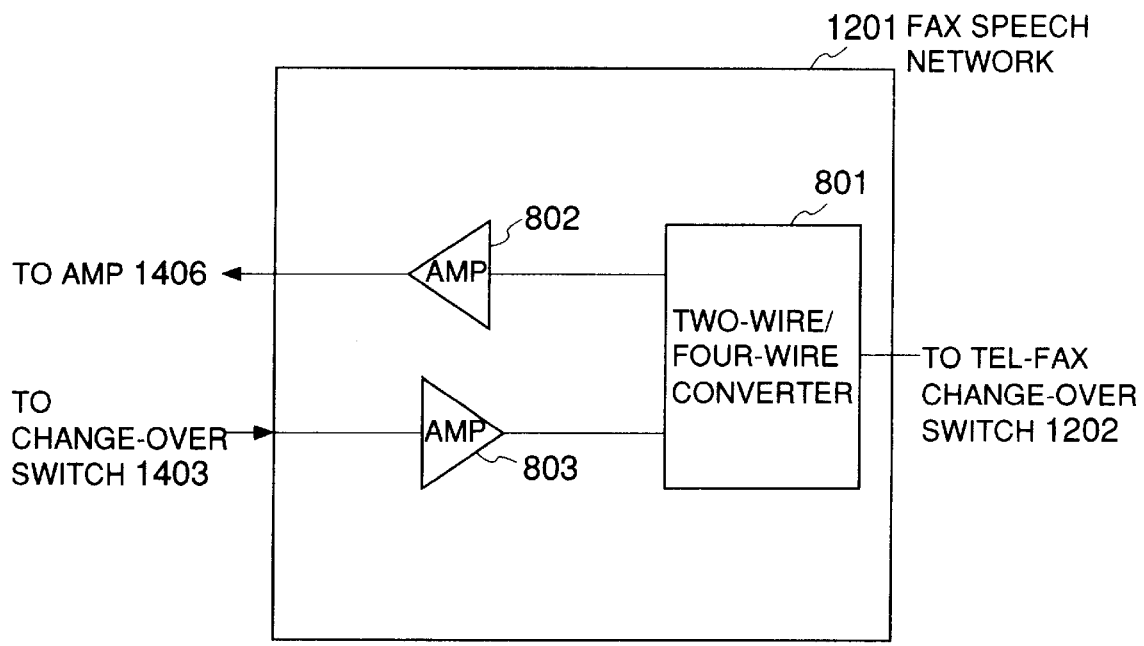
FIG. 62 is a block diagram showing the fax speech network of the parent unit in FIG. 61.

FIG. 62 is a block diagram showing a detailed configuration of the fax speech network shown in FIG. 61.

In FIG. 62, the blocks of the same numbers as in FIG. 58 operate the same way as explained with reference to the third embodiment. As shown in FIG. 62, the fax speech network 1201 is so configured as not to be affected by the side tone circumscribing from the transmission side even when the facsimile signal is applied during the facsimile signal receiving mode since the side tone volume regulator 804 is eliminated from the speech network 1407.

According to this embodiment, during facsimile communication, the speech network is switched to exclusive use for facsimile communication, thereby improving the facsimile receiving performance. The operation of facsimile transmission is the same as in the foregoing embodiments, and therefore explanation will be made about the facsimile receiving operation.

The operation after signal transmission or arrival before the turning of each switch upon detection of a CNG signal is the same as in the third embodiment. With the parent unit, the CNG detector 1408 subsequently detects the CNG signal for a predetermined length of time (about ten seconds). In initial conditions, the change-over switch 1403 of the parent unit is connected to the compander 1405, and the change-over switch 1202 to the speech network 1407. Upon detection of a CNG signal, a signal informing the fact is applied from the CNG detector 1408 to the parent unit controller 411, which in turn sends a control signal to the RF unit 1402, the switch 1403 and the switch 1202. The switch 403 then turns to the amplifier 1406 side, and the switch 1202 to the fax speech network 1201 side. This control signal is also applied through the RF unit 1402 and the RF unit 102 to the subunit controller 110, so that the switch 103 is turned to the compander 104 side in the opposite direction. The switches 103, 1403 and 1202 are not turned until the subunit controller 110 receives a signal indicating the end of image communication from the modem 108. In the case where the CNG detector 1408 fails to detect the CNG signal, the other party is engaged in telephone mode. Under this condition, the change-over switch 103 is connected to the compander 104, the change-over switch 403 to the compander 1405, and the switch 1202 to the speech network 1407, so that the voice signal can be transmitted or received. In this way, when the system is used as a telephone, both the parent unit and the subunit have the compander work effectively for an improved S/N. In facsimile communication mode, on the other hand, the increased signal distortion due to the compander is prevented, while at the same time preventing the S/N from being deteriorated by the side tone.

Now, a seventh embodiment of the invention will be explained.

According to this embodiment, the RF unit of the telephone subunit is used either as a telephone or as a unit sharing the facsimile communication on the facsimile subunit.

Figure 63:
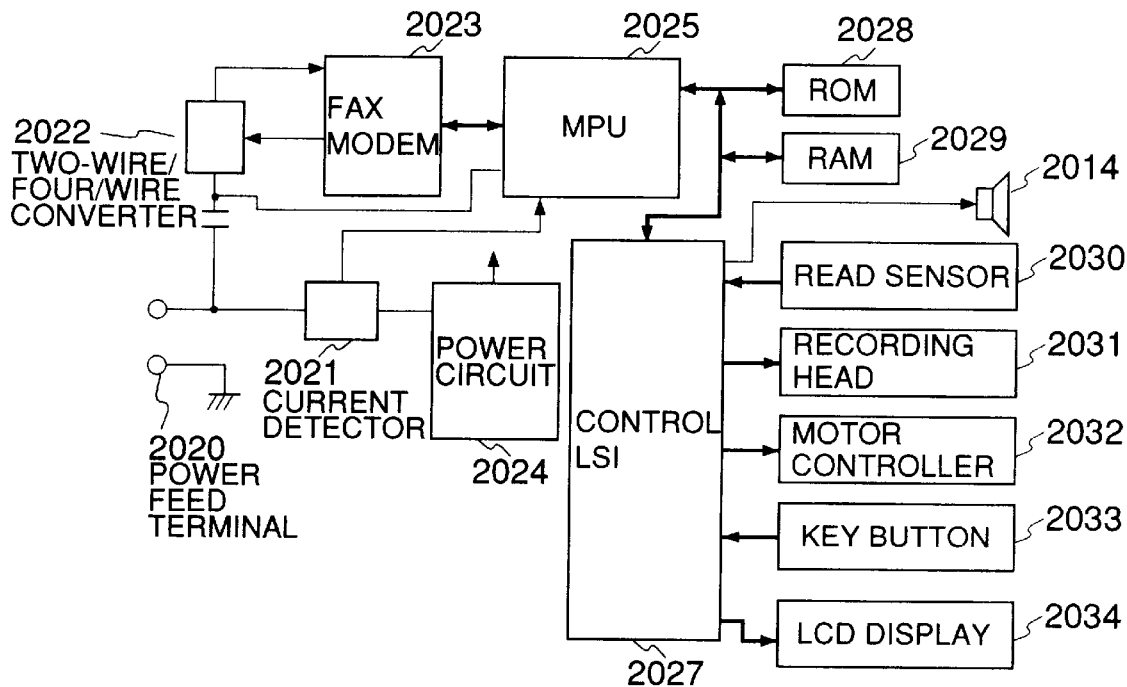
FIG. 63 is a block diagram showing a facsimile subunit according to a seventh embodiment of the invention.
Figure 64:
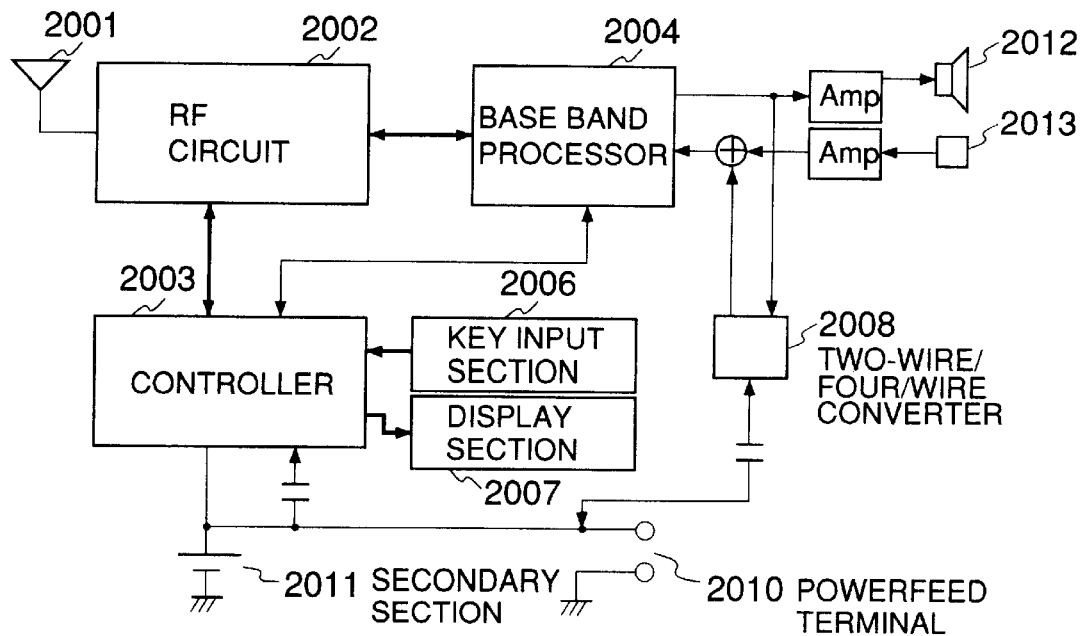
FIG. 64 is a block diagram showing a telephone subunit according to the seventh embodiment.
Figure 65:
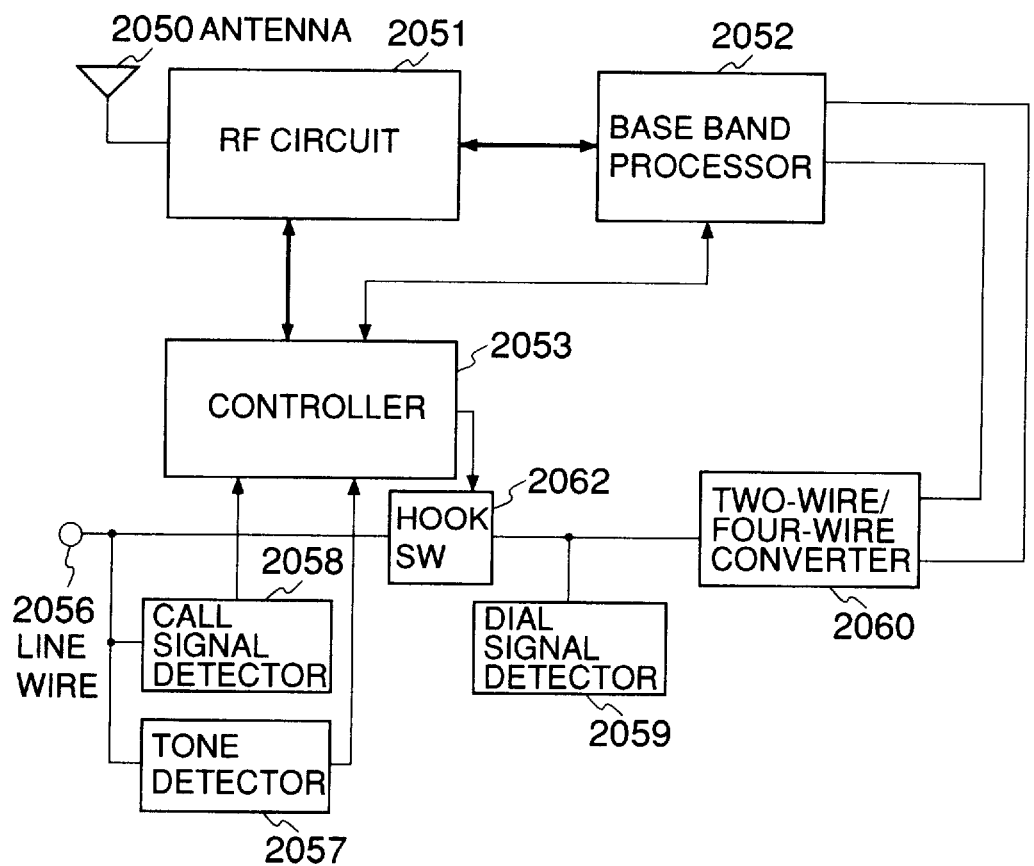
FIG. 65 is a block diagram showing a parent unit according to the seventh embodiment.

FIG. 63 is a block diagram showing a facsimile subunit of a cordless subunit facsimile system according to the present invention, FIG. 64 a block diagram showing a telephone subunit, and FIG. 65 a block diagram of a parent unit.

In FIG. 65, a facsimile subunit includes, as shown in FIG. 63, a facsimile control LSI 2027, a read-only memory 2028, a random access memory 2029, a read sensor 2030, a record printing head 2031, a motor control circuit 2032, a key input section 2033, an LCD display section 2034, a speaker 2014, a subunit power feed terminal 2020, a current detector 2021, two-wire/four-wire converter 2022, a facsimile modem (V.29 modem) 2023, a power circuit 2024 and a microcomputer 2025 for controlling the whole configuration.

A telephone subunit, on the other hand, as shown in FIG. 64, includes a radio antenna 2001, an RF circuit 2002, a base band processor 2004, a key input section 2006, an LCD display section 2007, a two-wire/four-wire converter 2008, a power feed terminal 2010, a secondary cell 2011, a speaker 2012, a microphone 2013 and a controller 2003 for controlling the whole configuration.

A parent unit, as shown in FIG. 65, includes an antenna 2050, an RF circuit 2051, a base band processor 2052, a tone detector 2057 for detecting the tone signal of 1300 Hz and 1100 Hz specific to the facsimile communication, a call signal detector 2058 for detecting a call signal from a telephone line 2056, a dial signal generator 2059, a two-wire/four-wire converter 2060, a hook switch 2062 and a controller 2053 for controlling the whole configuration.

Figure 66A:
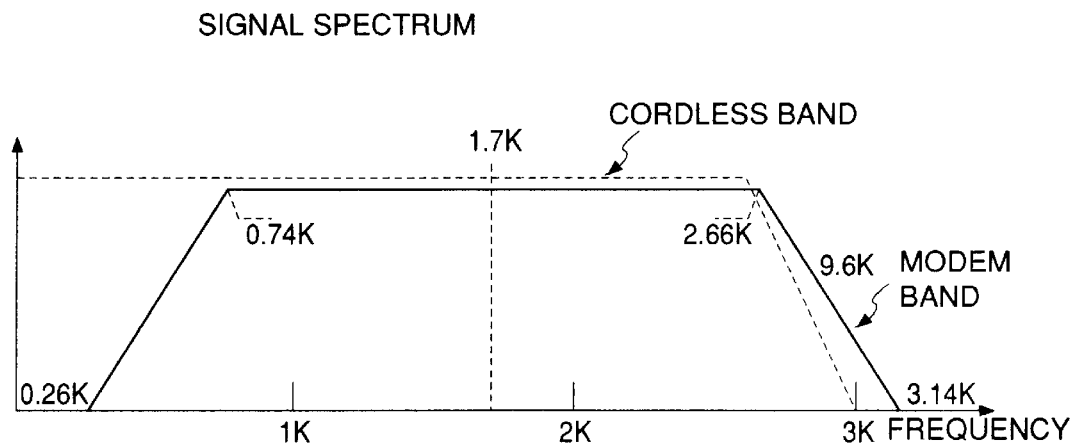
FIGS. 66A, 66B are signal spectrum diagrams useful for explaining the seventh embodiment.
Figure 66B:
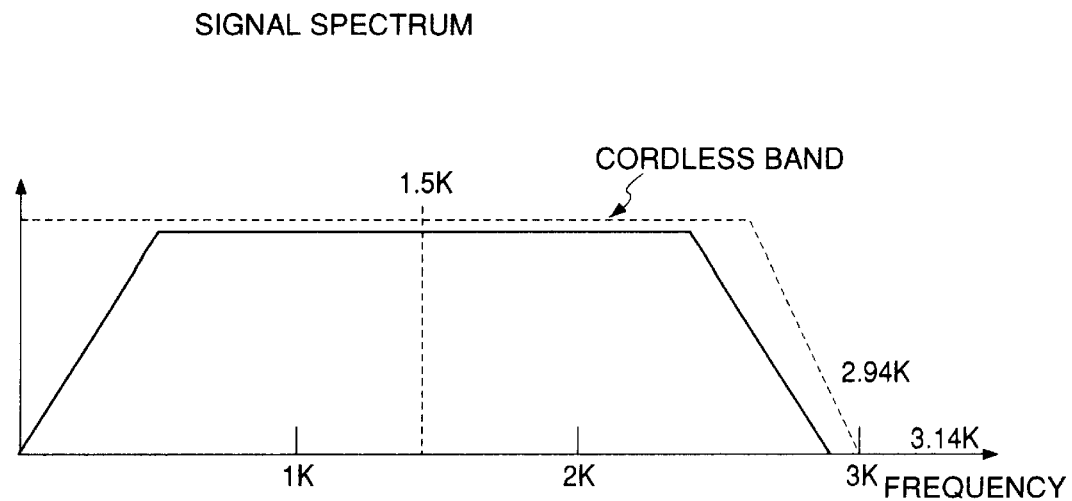
Figure 68A:
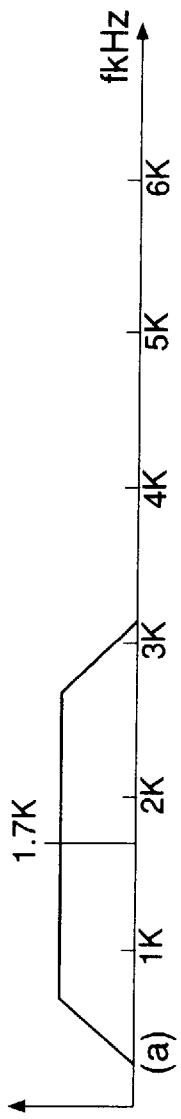
FIGS. 68A–68E are signal spectrum diagrams useful for explaining the seventh embodiment.
Figure 68B:
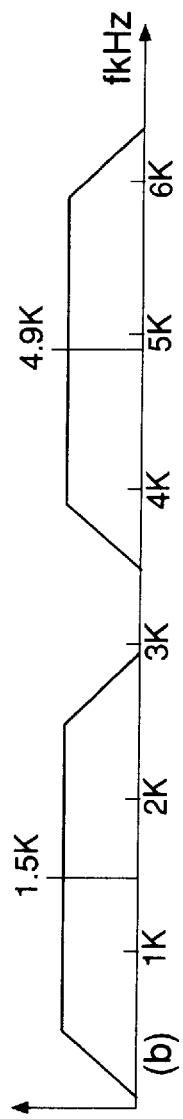
Figure 68C:
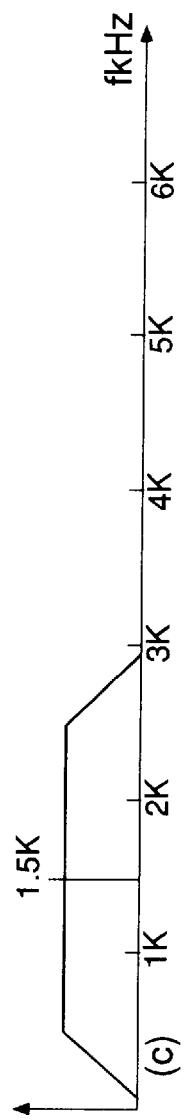
Figure 68D:
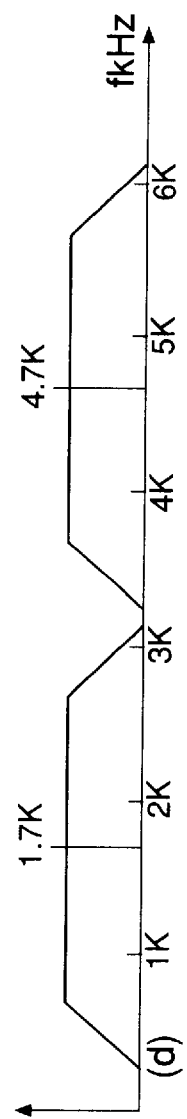
Figure 68E:
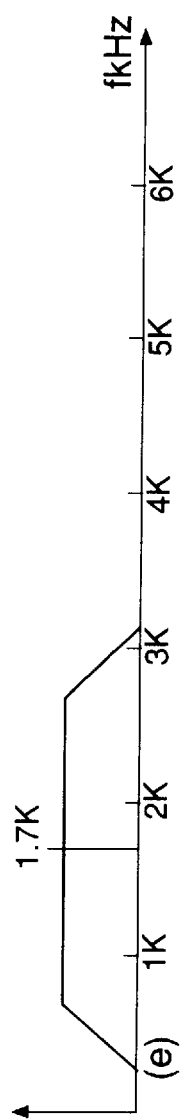

Explanation will be made about the operation for facsimile transmission according to this embodiment. First, the user sets the original the image of which is to be transmitted and, then picking up the telephone subunit, operates the key buttons 200 and dials the telephone number of the other party to which the facsimile information is to be sent. This dial signal is sent to the base band processor 2004 and modulated into an MSK signal of 1200 bps under the control of the controller 2003. Further, the signal is FM-modulated at the RF circuit 2002 and transmitted by radio to the parent unit from the radio antenna 2001. In the parent unit, the signal received at the radio antenna 2050 is demodulated at the RF circuit 2051 and the base band processor 2052, and is sent to the controller 2053. The controller 2053 activates the dial signal generator 2059, and sends out a dial signal to the telephone line 2056. With a response returned from the other party, the user depresses the START button of the key arrangement 2033 on the facsimile subunit, and returns the telephone subunit onto the telephone subunit charger included in the facsimile subunit. After the telephone subunit is returned into position, power begins to be supplied through the power feed terminal 2020 of the facsimile subunit and the power feed terminal 2010 of the telephone subunit. The microcomputer 2025 of the facsimile subunit thus causes the current detector 2021 to detect that the telephone subunit has returned. The CED signal, the NSF signal, the CSI signal and the DIS signal from the facsimile system of the other party are FM-modulated at the RF circuit 2051 and sent to the telephone subunit as a radio signal. The telephone subunit demodulates this signal, converts it into a two-wire signal through the four-wire/two-wire converter 2008, and sends the resulting signal to the facsimile subunit through the power feed terminal 2010. In the facsimile subunit, the signal sent from the power feed terminal 2020 is converted into a four-wire signal through the two-wire/four-wire converter 2022 and is demodulated at the facsimile modem 2023. In the case where the unique communication mode with the NSF signal from the facsimile of the other party is possible, a unique communication mode is designated with the NSS signal as a response signal thereto, followed by sending out the TSI and DCS signals from the facsimile modem 2023. This signal is FM-modulated from the RF circuit 2002 of the telephone subunit through the four-wire/two-wire converter 2022, the power feed terminal 2020, the power feed terminal 2010 and the four-wire/two-wire converter 2008, and then sent to the parent unit by radio. In the parent unit, the resulting signal is demodulated at the RF circuit 2051 and the base band processor 2052 and sent out to the telephone line 2056. The TCF signal following the DCS signal, in standard communication mode, is a CCITT V.29 modulated signal of 9600 bps. The carrier is a hexadecimal QAM of 2400 baud at 1700 Hz, with the roll-off characteristic of 20%. The frequency band, therefore, is 260 Hz to 3140 Hz. In radio transmission, on the other hand, in order to prevent interference with adjacent channels, the frequency band of the base band signal is limited to 3000 Hz from DC as shown in FIG. 66A. In standard communication mode, therefore, a fall-down may occur from 9600 bps to 7200 pbs, or further to 4800 bps. In order to obviate this inconvenience, the unique communication mode is such that the 9600 bps modulated signal is shifted by 200 Hz toward the lower frequency side with the carrier at 1500 Hz as shown in FIG. 66B. The facsimile signal modulated with the 1500-Hz carrier is applied from the power feed terminal 2020 of the facsimile subunit to the telephone subunit, where it is FM-modulated at the RF circuit 2002 and sent to the parent unit by radio communication. The parent unit receives this signal, causes the RF circuit 2051 and the base band processor 2052 to FM-demodulate it, and sends it out to the telephone line 2056. The CFR signal which is a response signal to the TCF signal is sent to the facsimile subunit through the same signal route as the DIS signal from the facsimile system of the other party. After that, the motor controller 2032 and the read sensor 2030 are activated to read the original image transmitted. The data thus read is MH-coded by the control LSI 2027 and the microcomputer 2025, and sent to the facsimile system of the other party through the same signal route as the TCF signal.

Now, the receiving operation will be explained.

In the parent unit, when a call signal arrives from the telephone line, the call signal detector 2058 detects the call signal and transfers it to the controller 2053. The controller 2053 controls the hook switch 2062 into an off-hook state. After that, in order to check whether the other party is a facsimile system or not, the controller 2053 waits for the arrival of the CNG signal for five seconds. Upon detection of the CNG signal at the tone detector 2057, the controller 2053 sends a command data by MSK modulation indicating that the other party is a facsimile system, to the telephone subunit through the base band processor 2052 and the RF circuit 2051. The command data MSK-demodulated at the RF circuit 2002 and the base band processor 2004 of the telephone subunit is sent to the facsimile subunit through the signal line 2018 and the power feed terminal 2010. In the facsimile subunit, the command is sent to the microcomputer 2025 through the power feed terminal 2020 and the signal line 2038. After that, the CED signal, the NSF signal, the CSI signal and the DIS signal which are a facsimile response signal are modulated into a CCITT T.30 signal at the facsimile modem 2023, and is sent to the telephone subunit through the power feed terminal 2020. In the telephone subunit, the same signal is FM-demodulated at the base band processor 2004 and the RF circuit 2002 and transmitted by radio to the parent unit. With the parent unit, the signal is FM-demodulated at the RF circuit 2051 and the base band processor 2052, and transmitted to the facsimile system of the other party through the telephone line. The NSS signal, the TSI signal and the DCS signal which are a response signal from the other party facsimile are transmitted to the facsimile subunit through the same signal route as the NSF signal for the transmitting operation. The following TCF signal, in the unique communication mode, is subjected to hexadecimal QAM modulation at a carrier frequency of 1500 Hz on the other party facsimile, and demodulated with 1500-Hz carrier on the facsimile subunit. Subsequently, the CFR signal is transmitted through the same signal route as the NSF signal, and the image signal through the same signal route as the TCF signal.

In the case where the CNG signal cannot be detected after the lapse of five seconds following the detection of a call signal from the telephone line, a command data B indicating that the other party is not a facsimile system is transmitted to the microcomputer 2025 of the facsimile subunit through the same signal route as the command data A is transmitted. Then, the microcomputer 2025 controls the control LSI 2027 to activate the speaker 2014, thereby informing the user that a telephone call has arrived.

In the event that the user is a subscriber to the network service like a facsimile network, the call signal from the telephone line is a 1300-Hz tone signal, in which case the call signal is detected by the tone detector 2057 of the parent unit. The subsequent operation is the same as that for CNG signal detection described above.

As explained above, the frequency band of the signal modulated at the facsimile modem is 260 Hz to 3140 Hz, and that of the cordless radio signal is 0 to 3000 Hz. According to this embodiment, therefore, the modulated signal is shifted to low frequency side by 200 Hz as compared with the V.29 facsimile modem. More specifically, a non-standard modem is used, requiring a special modem for the other party facsimile system. The result is the use of a unique communication mode. However, the shifting of the band signal to low frequency side by 200 Hz only in the radio section between parent unit and subunit fails to lead to an improved effect. FIG. 67 is a block diagram for explaining the outline of the operation. FIGS. 68A to 68E show a spectrum at each part in the block diagram of FIG. 67. Reference is made to the case in which a signal is sent from the facsimile subunit.

In FIG. 67, numeral 2400 designates a modulator, and numeral 2401 a demodulator making up the essential parts of a facsimile modem (V.29 standard) 2800. Also, numeral 2402 designates a multiplier, numeral 2403 a low-pass filter, and numeral 2404 a frequency multiplier making up the essential parts of the base band processor 4000. Numeral 4050 designates a radio transmitter, and numeral 4060 a radio receiver constituting the essential parts of the RF circuit 4100. Numeral 4070 designates a radio receiver and numeral 4080 a radio transmitter making up the essential parts of the RF circuit 4200. Numeral 4409 designates a ½ frequency divider, numeral 4410 a multiplier, numeral 4411 a low-pass filter, and numeral 4412 a 4200-Hz oscillator making up the essential parts of the base band processor 5000. Numeral 5414 designates a demodulator and numeral 5415 a modulator which make up the essential parts of the facsimile modem 5416 of the other party facsimile system 5417.

FIG. 67 refers to the case in which a signal is transmitted from a cordless facsimile subunit, i.e., the facsimile system proper 6000.

The 9600-bps signal A in the band of 260 Hz to 3100 Hz modulated at the V.29 modem 400 is subjected to DSB (double sideband) modulation with the second carrier of 3200 Hz. The DSB signal B assumes a band signal C of 60 Hz to 2940 Hz with only the lower side thereof taken out at the low-pass filter 2403. This signal is FM-modulated at the RF circuit and radiated by way of the antenna 2001. This radio signal is caught by the parent unit antenna 2050, and FM-demodulated at the RF circuit thereby to assume a band signal of 60 Hz to 2940 Hz again. After that, a signal D is obtained by sync detection with a second carrier of 3200 Hz. Only the lower side of this signal D is picked out by the low-pass filter 2411, thereby producing the original V.29 signal E. In order to assure perfect sync detection on the parent unit, a reference transmitter 2410 is inserted in the detector side, which frequency is reduced to one half and sent to the subunit by radio. With the subunit, the 1600-Hz reference signal is doubled and used as a second carrier.

In this configuration, a special modem is not required for the other party facsimile system, thereby making standard mode communication possible.

Figure 69:
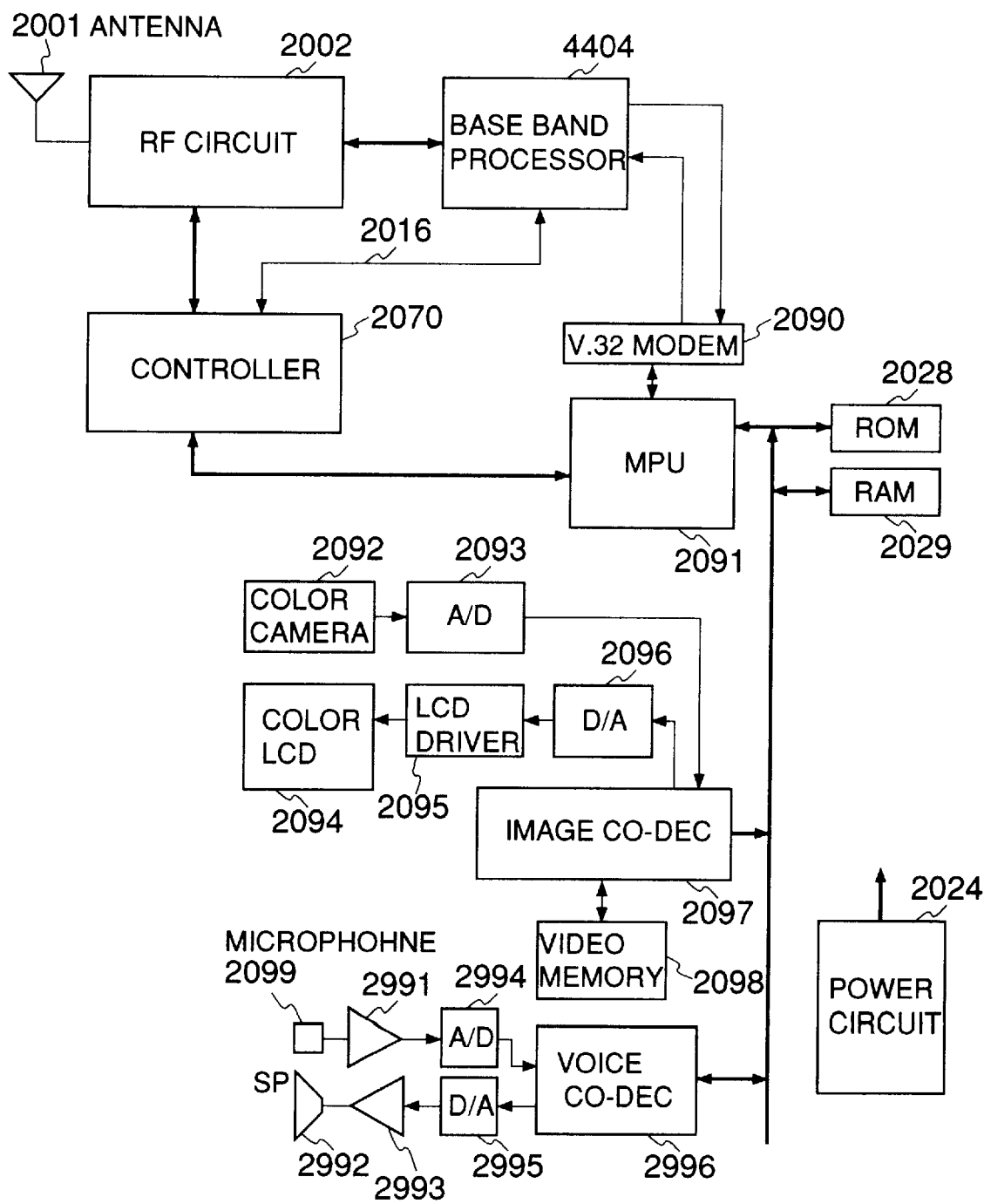
FIG. 69 is a block diagram showing a cordless TV telephone according to an eighth embodiment of the invention.

Now, a cordless TV phone according to an eighth embodiment of the invention will be explained. FIG. 69 is a block diagram showing a cordless telephone, and FIG. 70 a block diagram of a parent unit.

The cordless TV phone in FIG. 69 comprises a voice coder-decoder (Codec) 2996 for coding and decoding the voice signal, and an image coder-decoder 2097 for coding the animation picked up at the color camera 2092 and decoding and displaying on the color LCD 2094 a moving picture data sent from the other party. The modem 2090 is a CCITT V.2 bis full-duplex modem of 14.4 kbps.

Further, in FIG. 69, numeral 2001 designates an antenna, numeral 2002 an RF circuit, numeral 4400 a base band processor, numeral 2090 a modem, numeral 2091 a microcomputer (MPU), numeral 2070 a controller, numeral 2028 a ROM, numeral 2029 a RAM, numeral 2094 a color LCD, numeral 2095 an LCD driver, numerals 2093 and 2096 an A/D converter and a D/A converter respectively, numeral 2099 a microphone, numeral 2992 a loud speaker, numerals 2991 and 2993 amplifiers, numerals 2994 and 2995 an A/D converter and a D/A converter respectively, and numeral 2094 a power circuit.

The controller 2070 has the function of controlling the RF circuit 2002 to scan an unoccupied channel and transmit and receive various control data for maintaining the radio communication with the parent unit. The base band processor 4400 is for correcting the difference between the signal band of the modem 2090 and the RF circuit 2002. MPU 2091 is for controlling the parts engaged in the TV phone function including the image coder-decoder 2097 and the voice coder-decoder 2996 in accordance with the program stored in the ROM 2028.

Figure 70:
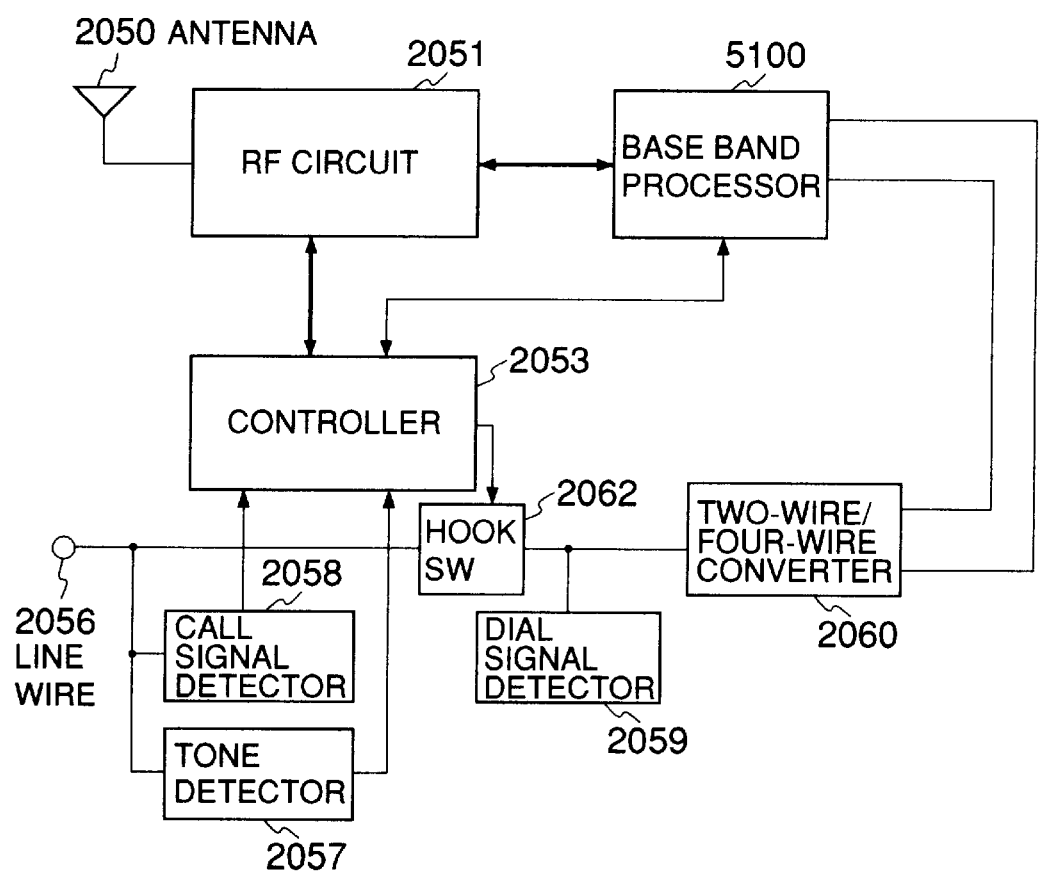
FIG. 70 is a block diagram showing a parent unit according to the eighth embodiment.

In FIG. 70, numeral 2051 designates an RF circuit for performing radio communication with the subunit, numeral 2053 a controller for controlling the RF circuit 2051, and numeral 4400 a base band processor for correcting the displacement with the signal band of the modem and that of the RF circuit like the base band circuit in FIG. 69. A dial generator circuit 2059 is for transmitting a telephone signal to the line 2056. A call signal detector 2058 and a tone detector 2057 are for automatic receiving of the signal transmitted from the other party of communication. The parent unit in FIG. 70 is configured almost the same way as the parent unit according to the above-mentioned embodiments. The only difference lies in that the base band processor 5100 is of full-duplex communication type.

According to this embodiment, the voice signal is compressed into a 4.8-kbps data by high-efficiency compression coding. The moving picture, on the other hand, is compressed into a 9.6-kbps data also by high-efficiency compression coding system. The V.32-bis modem has a carrier of 1800 Hz at 2400 baud. This signal band ranges from 480 Hz to 3120 Hz with the roll-off characteristic of 10%. This signal band is fitted in the radio transmissible range by being shifted by 200 Hz to low frequency side at the base band processor 4400. According to the above-mentioned seventh embodiment, the semi-duplex communication made full sync detection possible by sending a 3200-Hz carrier in one of the two radio channels, up and down. In the present embodiment, on the other hand, there is no channel to transmit a carrier due to the full-duplex communication. For this reason, a demodulation carrier is reproduced by such a well-known technique as the Costas loop from the received signal.

FIG. 71 is a block diagram for explaining the above-mentioned concept. In FIG. 71, numeral 2501 designates a modulator, and numeral 2502 a demodulator making up the essential parts of the facsimile modem (V.32 bis) 2090. Numeral 2592 designates a multiplier, numeral 2504 a low-pass filter, numeral 2503 a 3400-Hz oscillator, numeral 2506 a low-pass filter, numeral 2507 a carrier reproduction circuit, and numeral 2594 a multiplier, all making up the essential parts of the base band processor 4400. Numeral 2405 a radio transmitter, and numeral 2406 a radio receiver, all making up the essential parts of the RF circuit 2700. A block diagram of FIG. 71 shows the modulation and demodulation process of a cordless TV phone. In FIG. 71, numeral 2407 designates a radio receiver, and numeral 2408 a radio transmitter making up the RF circuit 2800. Also, numeral 2596 designates a multiplier, numeral 2510 a low-pass filter, numeral 2513 a 3400-Hz oscillator, numeral 2511 a low-pass filter, numeral 2598 a multiplier, and numeral 2512 a carrier wave reproduction circuit, all making up the essential parts of base band processor 5100. The RF circuit 2800 and the base band processor 5100 constitute the parent unit 2950. Numeral 2520 designates a demodulator and numeral 2521 a modulator, both making up the essential parts of the modem 3000 of the cordless TV phone 2522 of the other party. Explanation will be made here about the operation of transmitting a signal from the cordless TV phone. This also applies to the receiving operation. The signal modulated at the V.32 bis modem 2501 is subjected to the DSB (double side band) modulation by the carrier of the 3200-Hz oscillator 2503. The DSB signal has the lower side thereof taken at the low-pass filter 2504 thereby to provide a band signal of less than 3000 Hz. This signal is subjected to FM modulation at the RF circuit and is radiated by way of the antenna 2001. The resulting radio signal is trapped by the antenna 2050, and FM-demodulated by the RF circuit into a band signal of less than 3000 Hz again. After that, the signal is subjected to sync detection with the 3200-Hz reproduction carrier from the carrier reproduction circuit 2512 constituted of a Costas loop circuit. Then, the signal is taken out by the low-pass filter 2510, thereby producing the original V.32 bis signal. This signal is demodulated by the demodulation modem 2520 of the TV telephone 2522 of the other party.

According to the present invention, there is provided a method for controlling a facsimile system comprising a telephone subunit connected by radio to a parent unit and a facsimile device of a cordless subunit connected by radio to the parent unit, in which a telephone line shared by facsimile communication and telephone speech can be automatically switched between facsimile and telephone communication. Also, the deterioration of the signal quality is reduced in radio transmission to the facsimile subunit at the time of facsimile receiving operation, thereby making possible a high-speed transmission like an ordinary facsimile system directly connected to the telephone line.

We claim:
1. A cordless facsimile system comprising:
   a parent unit adapted to be connected to a telephone line, and including means for detecting a call signal from the telephone line;
   a telephone subunit, including means for connecting said telephone subunit by radio to said parent unit, means for producing a ring-up tone and means providing a speech communication function; and
   a facsimile subunit, including means for connecting said facsimile subunit by radio to said parent unit, and means providing a facsimile communication function;
   said parent unit further comprising means for detecting a signal from the telephone line indicating that another party connected to the telephone line is in a facsimile transmission mode, means for closing the telephone line when the call signal is detected by said call signal detecting means, means for connecting said parent unit to said facsimile subunit by radio for performing a facsimile receiving operation when the facsimile transmission mode signal is detected by said facsimile transmission mode signal detecting means, and means for connecting said parent unit to said telephone subunit by radio to produce a telephone ring-up tone through said ring-up tone producing means when the facsimile transmission mode signal is not detected.

2. A cordless facsimile system according to claim 1, further comprising means responsive to said telephone subunit failing to be placed off the hook after the telephone ring-up tone is produced a predetermined number of times by said ring-up tone producing means of said telephone subunit, for connecting said parent unit to said facsimile subunit by radio to permit performing of the facsimile receiving operation by said facsimile subunit.

3. A cordless facsimile system according to claim 1, wherein:
   said telephone subunit is responsive to being placed off the hook in response to the production of the ring-up tone by said ring-up tone producing means of said telephone subunit, for permitting speech communication to be conducted; and
   said parent unit is responsive to detection of the facsimile mode transmission signal during speech communication to suspend the radio connection from said parent unit to said telephone subunit and for connecting said parent unit to said facsimile subunit by radio to permit performing of the facsimile receiving operation by said facsimile subunit.

4. A cordless facsimile system comprising:
   a parent unit adapted to be connected to a telephone line, and including means for detecting a call signal from the telephone line;
   a telephone subunit including means for connecting said telephone subunit by radio to said parent unit, means for producing a ring-up tone, and means providing a speech communication function; and
   a facsimile subunit, including means for connecting said facsimile subunit by radio to said parent unit, and means providing a facsimile communication function;
   said parent unit further comprising means for detecting a signal from the telephone line indicating that another party connected to the telephone line is in a facsimile transmission mode, means connecting said parent unit to said telephone subunit by radio to cause said ring-up tone generating means to generate the ring-up tone when a call signal is detected by said call signal detecting means, means for closing the telephone line when said telephone subunit is not placed off the hook after producing the ring-up tone a predetermined number of times, and means for connecting said parent unit to said facsimile subunit by radio to perform a facsimile receiving operation when the facsimile transmission mode signal is detected by said facsimile transmission mode signal detecting means.

5. A cordless facsimile system according to claim 4, wherein:

said telephone subunit is responsive to being placed off the hook in response to the production of the ring-up tone by said ring-up tone producing means of said telephone subunit, for permitting speech to be conducted; and said parent unit is responsive to detection of the facsimile mode transmission signal during speech transmission, for suspending the radio connection from said parent unit to said telephone subunit and for connecting said parent unit to said facsimile subunit by radio to permit performing of the facsimile receiving operation by said facsimile subunit.

6. A cordless facsimile system comprising:

a parent unit adapted to be connected to a telephone line, and including means for detecting a call signal from the telephone line;

a telephone subunit including means for connecting said telephone subunit to said parent unit by radio, means for producing a ring-up tone, and means providing a speech communication function; and a facsimile subunit including means for connecting said facsimile subunit to said parent unit by radio, and means providing a facsimile communication function;

said telephone subunit further including means for designating the facsimile communication function;

said parent unit being responsive to receipt by radio from said telephone subunit of an instruction to start a facsimile receiving operation during speech communication to suspend the radio connection from said parent unit to said telephone subunit, and to connect said parent unit to said facsimile subunit by radio to permit performing of the facsimile communication function by said facsimile subunit.

7. A cordless facsimile system comprising:

a parent unit adapted to be connected to a telephone line, and including means for detecting a call signal from the telephone line;

a plurality of telephone subunits, each including first radio communication means for directly connecting said telephone subunit by radio to said parent unit, means for producing a ring-up tone, and means providing a speech communication function; and a plurality of facsimile subunits, each including second radio communication means which operate independently of any first radio communication means, for directly connecting said facsimile subunit by radio to said parent unit, and means providing a facsimile communication function;

said parent unit further including third radio communication means, separate and independent from said first and second radio communication means, and having an input and an output, and line connection means for connecting said input and output of said third radio communication means to the telephone line;

said system further comprising automatic level regulation means in the signal route on the line from said line connection means to said third radio communication means.

8. A cordless facsimile system comprising:

a parent unit adapted to be connected to a telephone line, and including means for detecting a call signal from the telephone line;

a telephone subunit including means for connecting said telephone subunit by radio to said parent unit, means for producing a ring-up tone, and means providing a speech communication function; and a facsimile subunit including means for connecting said facsimile subunit by radio to said parent unit, and means providing a facsimile communication function;

said parent unit further including radio communication means having an input and an output, and line connection means for connecting said input and output of said radio communication means to the telephone line;

said system further comprising switch means for preventing signals proceeding from said radio communication means toward said line connection means from mixing with signals proceeding from said line connection means toward said radio communication means.

9. A cordless facsimile system comprising:

a parent unit adapted to be connected to a telephone line, and including means for detecting a call signal from the telephone line;

a plurality of telephone subunits, each including means for connecting said telephone subunit by radio to said parent unit, means for producing a ring-up tone, and means providing a speech communication function; and a plurality of facsimile subunits, each including means which operates independently of any telephone subunit radio connecting means, for connecting said facsimile subunit by radio to said parent unit, and means providing a facsimile communication function;

wherein said parent unit further includes first band conversion means for converting a first band signal occupied when making a facsimile communication with said parent unit via the telephone line to a second band signal occupied when said connection by radio is performed, and wherein said facsimile subunit includes second band conversion means for converting the second band signal sent by radio from said parent unit to said facsimile subunit to the first band signal.

10. A cordless facsimile system comprising:

a parent unit adapted to be connected to a telephone line, and including means for detecting a call signal from the telephone line;

a telephone subunit including first radio communication means for connecting said telephone subunit by radio to said parent unit, means for producing a ring-up tone, and means providing a speech communication function; and a facsimile subunit including second radio communication means for connecting said facsimile subunit by radio to said parent unit, and means providing a facsimile communication function;

said parent unit further including control means, third radio communication means having an input and an output and responsive to said control means for selectively connecting said parent unit with a selected one of said telephone subunit and said facsimile subunit, and line connection means for connecting said input and output of said third radio communication means to the telephone line.

11. A cordless facsimile system as claimed in claim 10, further comprising automatic level regulation means in the signal route of at least one of said first, second and third radio communication means.

12. A cordless facsimile system comprising:

a parent unit adapted to be connected to a telephone line, and including means for detecting a call signal from the telephone line;

a plurality of telephone subunits, each including first radio communication means for directly connecting said telephone subunit by radio to said parent unit, means for producing a ring-up tone, and means providing a speech communication function; and at least one facsimile subunit, including second radio communication means which operate independently of any first radio communication means, for directly connecting said facsimile subunit by radio to said parent unit, and means providing a facsimile communication function;

said parent unit further including third radio communication means, separate and independent from said first and second radio communication means, and having an input and an output, and line connection means for connecting said input and output of said third radio communication means to the telephone line;

said system further comprising automatic level regulation means in the signal route on the line from said line connection means to said third radio communication means.

13. A cordless facsimile system comprising:

a parent unit adapted to be connected to a telephone line, and including means for detecting a call signal from the telephone line;

a plurality of telephone subunits, each including means for connecting said telephone subunit by radio to said parent unit, means for producing a ring-up tone, and means providing a speech communication function; and at least one of facsimile subunit, including means which operates independently of any telephone subunit radio connecting means, for connecting said facsimile subunit by radio to said parent unit, and means providing a facsimile communication function;

wherein said parent unit further includes first band conversion means for converting a first band signal occupied when making a facsimile communication with said parent unit via the telephone line to a second band signal occupied when said connection by radio is performed, and wherein said at least one facsimile subunit includes second band conversion means for converting the second band signal sent by radio from said parent unit to said facsimile subunit to the first band signal.

14. A cordless facsimile system comprising:

a parent unit adapted to be connected to a telephone line, and including means for detecting a call signal from the telephone line;

a plurality of telephone subunits, each including first radio communication means for directly connecting said telephone subunit by radio to said parent unit, means for producing a ring-up tone, and means providing a speech communication function; and at least one facsimile subunit, including second radio communication means which operate independently of any first radio communication means, for directly connecting said facsimile subunit by radio to said parent unit, and means providing a facsimile communication function;

said parent unit further including third radio communication means, separate and independent from said first and second radio communication means, and having an input and an output, and line connection means for connecting said input and output of said third radio communication means to the telephone line.

* * * * *